US006798420B1

(12) United States Patent  (10) Patent No.: US 6,798,420 B1
Xie  (45) Date of Patent: Sep. 28, 2004

(54) VIDEO AND GRAPHICS SYSTEM WITH A SINGLE-PORT RAM

(75) Inventor: Xiaodong Xie, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 392 days.

(21) Appl. No.: 09/642,510

(22) Filed: Aug. 18, 2000

Related U.S. Application Data

(63) Continuation-in-part of application No. 09/437,208, filed on Nov. 9, 1999, now Pat. No. 6,570,579.
(60) Provisional application No. 60/170,866, filed on Dec. 14, 1999, and provisional application No. 60/107,875, filed on Nov. 9, 1998.

(51) Int. Cl.$^7$ ................................................. G09G 5/36
(52) U.S. Cl. ........................ 345/554; 345/535; 345/541; 345/547; 345/545; 345/564; 365/230.01; 365/230.05; 348/715; 348/718
(58) Field of Search ................................. 345/535, 547, 345/554, 541, 545, 564; 365/230.01, 230.05; 348/715, 718

(56) References Cited

U.S. PATENT DOCUMENTS

| | | | |
|---|---|---|---|
| 4,020,332 A | 4/1977 | Crochiere et al. | |
| 4,679,040 A | 7/1987 | Yan | |
| 4,908,780 A | 3/1990 | Priem et al. | |
| 5,097,257 A | 3/1992 | Clough et al. | |
| 5,142,273 A | 8/1992 | Wobermin | |
| 5,148,417 A | 9/1992 | Wong et al. | |
| 5,155,816 A | 10/1992 | Kohn | |
| 5,254,981 A | 10/1993 | Disanto et al. | |
| 5,258,747 A | 11/1993 | Oda et al. | |
| 5,262,854 A | 11/1993 | Ng | |
| 5,301,332 A | 4/1994 | Dukes | |
| 5,307,177 A | 4/1994 | Shibata et al. | |
| 5,327,125 A | 7/1994 | Iwase et al. | |

(List continued on next page.)

FOREIGN PATENT DOCUMENTS

| | | |
|---|---|---|
| EP | 752695 | 1/1997 |
| EP | 0840276 A2 | 5/1998 |
| EP | 0840277 A2 | 5/1998 |
| EP | 840505 | 5/1998 |
| GB | 2287627 A | 9/1995 |
| JP | 2000-196586 A | 7/2000 |
| WO | WO 94/10641 A1 | 5/1994 |
| WO | WO 00/28518 | 5/2000 |

OTHER PUBLICATIONS

Patent Abstract of Japan, Publication No. JP2000–196586 A, Published on Jul. 14, 2000, in the name of Matsushita Electric Ind Co Ltd.

(List continued on next page.)

Primary Examiner—Matthew C. Bella
Assistant Examiner—Po Wei Chen
(74) Attorney, Agent, or Firm—Christie, Parker & Hale, LLP

(57) ABSTRACT

A video and graphics system has an input for receiving compressed video data and an input for receiving graphics data. The compressed video data may include HDTV video and/or SDTV video, and may be included in compressed data streams such as an MPEG-2 Transport stream. The video and graphics system also includes a video decoder for processing the compressed video data to generate a video for displaying, a display engine for processing the graphics data to generate graphics for displaying, and an overlaying system for compositing the video and the graphics to generate an output video. The display engine includes a memory used during conversion of a graphics format from a first format to a second format to be in a format compatible with a video format. The memory may be implemented in a single-port SRAM configured to simulate a dual-port SRAM. The system may be integrated on an integrated circuit chip.

26 Claims, 70 Drawing Sheets

U.S. PATENT DOCUMENTS

| | | |
|---|---|---|
| 5,335,074 A | 8/1994 | Stec |
| 5,371,877 A * | 12/1994 | Drako et al. ............... 711/109 |
| 5,384,912 A | 1/1995 | Ogrinc et al. |
| 5,396,567 A | 3/1995 | Jass |
| 5,398,211 A | 3/1995 | Willenz et al. |
| 5,422,858 A * | 6/1995 | Mizukami et al. .......... 365/233 |
| 5,432,769 A | 7/1995 | Honjo |
| 5,432,900 A | 7/1995 | Rhodes et al. |
| 5,434,683 A | 7/1995 | Sekine et al. |
| 5,434,957 A | 7/1995 | Moller |
| 5,469,223 A | 11/1995 | Kimura |
| 5,488,385 A | 1/1996 | Singhal et al. |
| 5,515,077 A | 5/1996 | Tateyama |
| 5,532,749 A | 7/1996 | Hong |
| 5,533,182 A | 7/1996 | Bates et al. |
| 5,539,891 A | 7/1996 | Childers et al. |
| 5,574,572 A | 11/1996 | Malinowski et al. |
| 5,583,575 A | 12/1996 | Arita et al. |
| 5,592,601 A | 1/1997 | Kelley et al. |
| 5,598,525 A | 1/1997 | Nally et al. |
| 5,598,545 A | 1/1997 | Childers et al. |
| 5,600,364 A | 2/1997 | Hendricks et al. |
| 5,600,379 A | 2/1997 | Wagner |
| 5,604,514 A | 2/1997 | Hancock |
| 5,610,983 A | 3/1997 | Stewart |
| 5,614,952 A | 3/1997 | Boyce et al. |
| 5,615,376 A | 3/1997 | Ranganathan |
| 5,619,270 A | 4/1997 | Demmer |
| 5,619,337 A | 4/1997 | Naimpally |
| 5,621,478 A | 4/1997 | Demmer |
| 5,621,869 A | 4/1997 | Drews |
| 5,621,906 A | 4/1997 | O'Neill et al. |
| 5,623,311 A | 4/1997 | Phillips et al. |
| 5,625,611 A | 4/1997 | Yokota et al. |
| 5,635,985 A | 6/1997 | Boyce et al. |
| 5,638,501 A | 6/1997 | Gough et al. |
| 5,640,543 A | 6/1997 | Farrell et al. |
| 5,664,162 A | 9/1997 | Dye |
| 5,696,527 A | 12/1997 | King et al. |
| 5,706,482 A * | 1/1998 | Matsushima et al. ....... 345/535 |
| 5,719,593 A | 2/1998 | De Lange |
| 5,737,455 A | 4/1998 | Harrington et al. |
| 5,742,779 A | 4/1998 | Steele et al. |
| 5,745,095 A | 4/1998 | Parchem et al. |
| 5,758,177 A | 5/1998 | Gulick et al. |
| 5,761,516 A | 6/1998 | Rostoker et al. ............ 395/733 |
| 5,764,238 A | 6/1998 | Lum et al. |
| 5,765,010 A | 6/1998 | Chung et al. |
| 5,790,136 A | 8/1998 | Hoffert et al. |
| 5,790,795 A | 8/1998 | Hough |
| 5,790,842 A | 8/1998 | Charles et al. |
| 5,793,384 A | 8/1998 | Okitsu |
| 5,793,445 A | 8/1998 | Lum et al. |
| 5,802,579 A * | 9/1998 | Crary ......................... 711/149 |
| 5,812,210 A | 9/1998 | Arai et al. |
| 5,815,137 A | 9/1998 | Weatherford et al. |
| 5,828,383 A | 10/1998 | May et al. |
| 5,831,615 A | 11/1998 | Drews et al. |
| 5,844,608 A | 12/1998 | Yu et al. |
| 5,854,761 A * | 12/1998 | Patel et al. .................... 365/49 |
| 5,864,345 A | 1/1999 | Wickstrom et al. |
| 5,867,166 A | 2/1999 | Myhrvold et al. |
| 5,874,967 A | 2/1999 | West et al. |
| 5,883,670 A | 3/1999 | Sporer et al. |
| 5,889,949 A | 3/1999 | Charles |
| 5,894,300 A | 4/1999 | Takizawa |
| 5,903,261 A | 5/1999 | Walsh et al. |
| 5,903,281 A | 5/1999 | Chen et al. |
| 5,907,295 A | 5/1999 | Lin |
| 5,914,728 A | 6/1999 | Yamagishi et al. |
| 5,920,572 A | 7/1999 | Washington et al. |
| 5,920,842 A | 7/1999 | Cooper et al. |
| 5,923,316 A | 7/1999 | Kitamura et al. |
| 5,923,385 A * | 7/1999 | Mills et al. .................. 348/715 |
| 5,926,647 A | 7/1999 | Adams et al. |
| 5,940,080 A | 8/1999 | Ruehle et al. |
| 5,948,082 A | 9/1999 | Ichikawa |
| 5,949,432 A | 9/1999 | Gough et al. |
| 5,949,439 A | 9/1999 | Ben-Yoseph et al. |
| 5,951,664 A | 9/1999 | Lambrecht et al. |
| 5,953,691 A | 9/1999 | Mills |
| 5,956,041 A | 9/1999 | Koyamada et al. |
| 5,959,626 A | 9/1999 | Garrison et al. |
| 5,959,637 A | 9/1999 | Mills et al. |
| 5,963,201 A | 10/1999 | McGreggor et al. |
| 5,963,222 A | 10/1999 | Cheney et al. |
| 5,973,955 A * | 10/1999 | Nogle et al. ................. 365/154 |
| 5,977,933 A | 11/1999 | Wicher et al. |
| 5,982,305 A | 11/1999 | Taylor |
| 5,982,459 A | 11/1999 | Fandrianto et al. |
| 5,987,555 A | 11/1999 | Alzien et al. |
| 6,005,546 A | 12/1999 | Keene |
| 6,006,286 A | 12/1999 | Baker et al. |
| 6,006,303 A | 12/1999 | Barnaby et al. |
| 6,018,803 A | 1/2000 | Kardach |
| 6,023,302 A | 2/2000 | MacInnis et al. |
| 6,028,583 A | 2/2000 | Hamburg |
| 6,038,031 A | 3/2000 | Murphy |
| 6,061,402 A | 5/2000 | Boyce et al. |
| 6,067,322 A | 5/2000 | Wang |
| 6,077,084 A | 6/2000 | Mino et al. |
| 6,078,305 A | 6/2000 | Mizutani |
| 6,088,355 A | 7/2000 | Mills et al. |
| 6,100,899 A | 8/2000 | Ameline et al. |
| 6,105,048 A | 8/2000 | He |
| 6,115,422 A | 9/2000 | Anderson et al. |
| 6,121,978 A | 9/2000 | Miler |
| 6,124,878 A | 9/2000 | Adams et al. |
| 6,133,901 A | 10/2000 | Law |
| 6,134,378 A | 10/2000 | Abe et al. |
| 6,144,392 A | 11/2000 | Rogers |
| 6,151,030 A | 11/2000 | DeLeeuw et al. |
| 6,157,415 A | 12/2000 | Glen .......................... 348/599 |
| 6,157,978 A | 12/2000 | Ng et al. |
| 6,160,989 A | 12/2000 | Hendricks et al. |
| 6,178,486 B1 | 1/2001 | Gill et al. |
| 6,184,908 B1 | 2/2001 | Chan et al. |
| 6,189,064 B1 | 2/2001 | MacInnis et al. |
| 6,189,073 B1 | 2/2001 | Pawlowski |
| 6,199,131 B1 | 3/2001 | Melo et al. |
| 6,204,859 B1 | 3/2001 | Jouppi et al. |
| 6,205,260 B1 | 3/2001 | Crinon et al. |
| 6,208,354 B1 | 3/2001 | Porter |
| 6,208,671 B1 | 3/2001 | Paulos et al. |
| 6,212,590 B1 | 4/2001 | Melo et al. |
| 6,215,703 B1 | 4/2001 | Bogin et al. |
| 6,226,794 B1 | 5/2001 | Anderson, Jr. et al. |
| 6,229,550 B1 | 5/2001 | Gloudemans et al. |
| 6,233,634 B1 | 5/2001 | Clark et al. |
| 6,236,727 B1 | 5/2001 | Ciacelli et al. |
| 6,239,810 B1 | 5/2001 | Van Hook et al. |
| 6,252,608 B1 | 6/2001 | Snyder et al. |
| 6,263,019 B1 | 7/2001 | Ryan |
| 6,263,023 B1 | 7/2001 | Ngai |
| 6,263,396 B1 | 7/2001 | Cottle et al. |
| 6,269,107 B1 | 7/2001 | Jong |
| 6,275,507 B1 | 8/2001 | Anderson et al. |
| 6,286,103 B1 | 9/2001 | Maillard et al. |
| 6,311,204 B1 | 10/2001 | Mills |
| 6,335,746 B1 | 1/2002 | Enokida et al. |
| 6,337,703 B1 | 1/2002 | Konar et al. |

| | | |
|---|---|---|
| 6,339,434 B1 | 1/2002 | West et al. |
| 6,357,045 B1 | 3/2002 | Devaney |
| 6,369,855 B1 | 4/2002 | Chauvel et al. |
| 6,374,244 B1 | 4/2002 | Shibata |
| 6,393,021 B1 | 5/2002 | Chow et al. |
| 6,408,436 B1 | 6/2002 | de Haas |
| 6,411,333 B1 * | 6/2002 | Auld et al. .................. 348/441 |
| 6,434,319 B1 | 8/2002 | Wine |
| 6,456,335 B1 | 9/2002 | Miura et al. |
| 6,459,456 B1 | 10/2002 | Oh |
| 6,466,206 B1 | 10/2002 | Deering |
| 6,466,210 B1 | 10/2002 | Carlsen et al. |
| 6,466,624 B1 | 10/2002 | Fogg |
| 6,467,093 B1 | 10/2002 | Inoue et al. |
| 6,496,186 B1 | 12/2002 | Deering |
| 6,496,228 B1 | 12/2002 | McGee et al. |
| 6,529,284 B1 | 3/2003 | Ganapathy et al. |
| 6,662,329 B1 | 12/2003 | Foster et al. |
| 2002/0176506 A1 | 11/2002 | Ferreira Florencio et al. |

OTHER PUBLICATIONS

Sun, Huifang et al., "A New Approach for Memory Efficient ATV Decoding," 1997 IEEE International Conference on Consumer Electronics, pp. 174–175, Los Angeles, 1997.

Blinn, Jim, "Jim Blinn's Corner: Dirty Pixels," Chapter 16, pp. 179–190; Morgan Kaufman Publishers, Inc., San Francisco, California, 1998.

Foley, James D. et al., "Computer Graphics: Principles and Practice," 4 Pages, Second Edition in C, Addison–Wesley Publishing Company, USA, 1996.

Bao, Jay et al., "HDTV Down–Conversion Decoder," IEEE Transactions on Consumer Electronics, pp. 402–410, vol. 42, No. 3, Aug. 1996.

Mokry, Robert et al., "Minimal Error Drift in Frequency Scalability for Motion–Compensated DCT Coding," IEEE Transactions on Circuits and Systems for Video Technology, pp. 392–406, vol. 4, No. 4, Aug. 1994.

Vetro, Anthony et al., "Minimum Drift Architectures for 3–Layer Scalable DTV Decoding," IEEE Transactions on Consumer Electronics, pp. 527–536, vol. 44, No. 3, Aug. 1998.

Motorola, Inc., MC92100, ""Scorpion" Graphics Display Generator," SDRAM Controller, and Digital Video Encoder, pp. 1–6, 1997.

Power TV, Inc., "Eagle™ Graphics/Audio Media Compositor Data Sheet," Version 1.7, pp. 1–63, Feb. 27, 1997.

Lee, Dong–Ho et al., "HDTV Video Decoder Which Can Be Implemented With Low Complexity," IEEE International Conference on Consumer Electronics, pp. 6–7, 1994.

Sun, Huifang, "Hierarchical Decoder For MPEG Compressed Video Data," IEEE Transactions on Consumer Electronics, pp. 559–564, vol. 39, No. 3, Aug. 1993.

Yu, Haoping et al., "Block–Based Image Processor for Memory Efficient MPEG Video Decoding," 1999 IEEE International Conference on Consumer Electronics, pp. 114–115, 1999.

* cited by examiner

FRAME-PREDICTION FOR I-PICTURES AND P-PICTURES

FIELD PREDICTION IN A FRAME-PICTURE

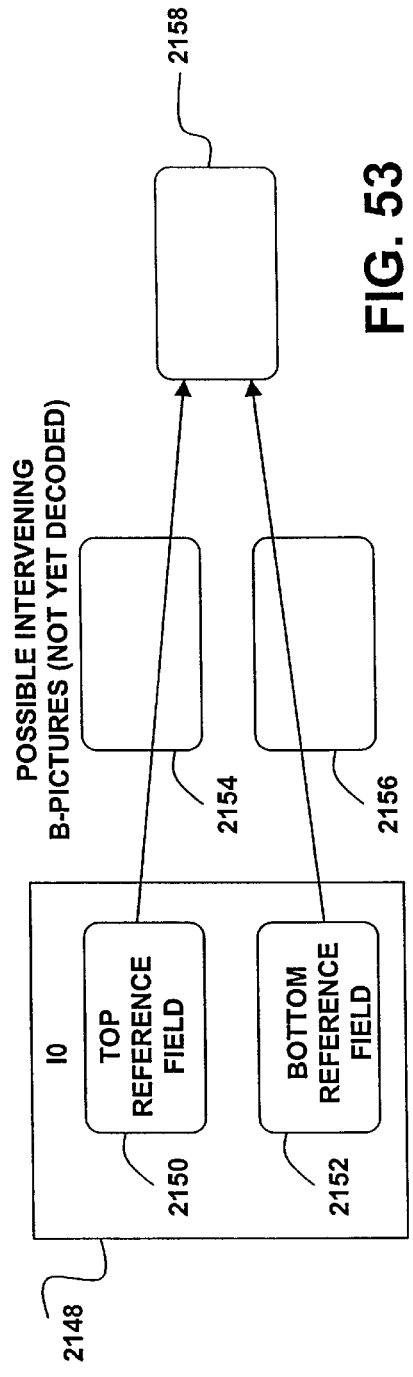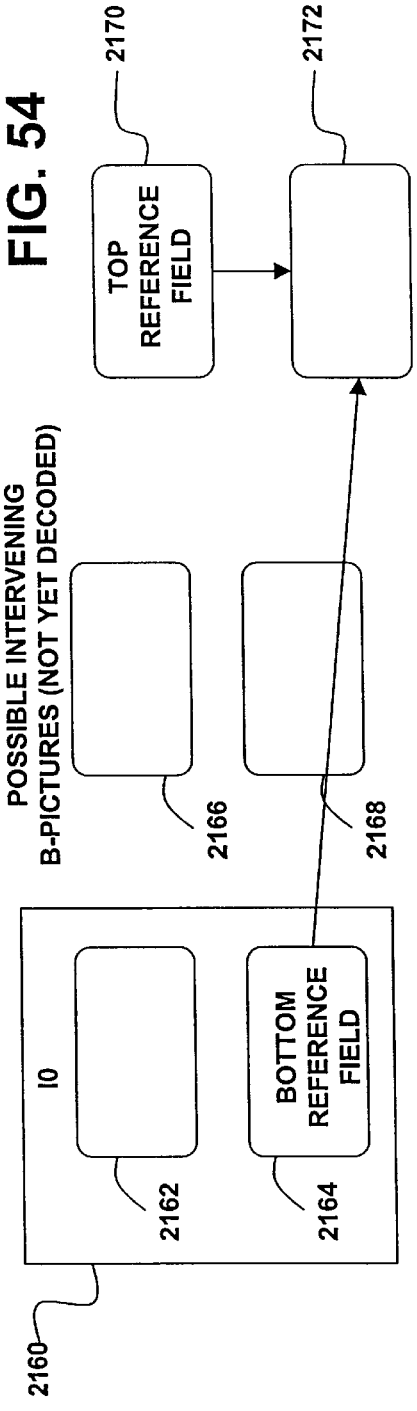

PREDICTION OF THE "TOP FIELD" SECOND FIELD-PICTURE

FIELD-PREDICTION OF B FIELD PICTURES OR B FRAME PICTURES

Image Organization - 64 bit SDRAM

| | | | | | | | | |
|---|---|---|---|---|---|---|---|---|
| Row #1 | b0 | $M_0$ | $M_1$ | $M_2$ | $M_3$ | b1 | $M_4$ | $M_5$ | $M_6$ | $M_7$ |
| | b2 | $M_8$ | $M_9$ | $M_a$ | $M_b$ | b3 | $M_c$ | $M_d$ | $M_e$ | $M_f$ |
| Row #2 | b0 | $M_{10}$ | $M_{11}$ | $M_{12}$ | $M_{13}$ | b1 | $M_{14}$ | $M_{15}$ | $M_{16}$ | $M_{17}$ |
| | b2 | $M_{18}$ | $M_{19}$ | $M_{1a}$ | $M_{1b}$ | b3 | $M_{1c}$ | $M_{1d}$ | $M_{1e}$ | $M_{1f}$ |
| Row #3 | b0 | $M_{20}$ | $M_{21}$ | $M_{22}$ | $M_{23}$ | b1 | $M_{24}$ | $M_{25}$ | $M_{26}$ | $M_{27}$ |
| | b2 | $M_{28}$ | $M_{29}$ | $M_{2a}$ | $M_{2b}$ | b3 | $M_{2c}$ | $M_{2d}$ | $M_{2e}$ | $M_{2f}$ |

FIG. 58

VIDEO AND GRAPHICS SYSTEM WITH A SINGLE-PORT RAM

CROSS-REFERENCE TO RELATED APPLICATION(S)

This application is a continuation-in-part of U.S. patent application Ser. No. 09/437,208, filed Nov. 9, 1999, now issued as U.S. Pat. No. 6,570,579 on May 27, 2003 and entitled "Graphics Display System," which claims the benefit of the filing date of U.S. provisional patent application No. 60/107,875, filed on Nov. 9, 1998, and claims the benefit of the filing date of U.S. provisional patent application No. 60/170,866, filed Dec. 14, 1999 and entitled "Graphics Chip Architecture," the contents of which are hereby incorporated by reference.

The present application contains subject matter related to the subject matter disclosed in U.S. patent application Ser. No. 09/641,374 entitled "Video, Audio and Graphics Decode, Composite and Display System," U.S. patent application Ser. No. 09/641,936 entitled "Video and Graphics System with an MPEG Video Decoder for Concurrent Multi-Row Decoding," U.S. patent application Ser. No. 09/643,223 entitled "Video and Graphics System with MPEG Specific Data Transfer Commands," U.S. patent application Ser. No. 09/640,870 entitled "Video and Graphics System with Video Scaling," U.S. patent application Ser. No. 09/640,869, now U.S. Pat. No. 6,538,656, issued on Mar. 25, 2003 entitled "Video and Graphics System with a Data Transport Processor," U.S. patent application Ser. No. 09/641,930 entitled "Video and Graphics System with a Video Transport Processor," U.S. patent application Ser. No. 09/641,935, now U.S. Pat. No. 6,573,905, issued on Jun. 3, 2003 entitled "Video and Graphics System with Parallel Processing of Graphics Windows," and U.S. patent application Ser. No. 09/642,458 entitled "Video and Graphics System with an Integrated System Bridge Controller," all filed Aug. 18, 2000.

FIELD OF THE INVENTION

The present invention relates generally to integrated circuits, and more particularly to an integrated circuit system for processing and displaying video and graphics.

BACKGROUND OF THE INVENTION

Graphics display systems are typically used in television control electronics, such as set top boxes, integrated digital TVs, and home network computers. Graphics display systems typically include a display engine that may perform display functions. The display engine is the part of the graphics display system that receives display pixel data from any combination of locally attached video and graphics input ports, processes the data in some way, and produces final display pixels as output.

This application includes references to both graphics and video, which reflects in certain ways the structure of the hardware itself. This split does not, however, imply the existence of any fundamental difference between graphics and video, and in fact much of the functionality is common to both. Graphics as used herein may include graphics, text and video.

SUMMARY OF THE INVENTION

One embodiment of the present invention is a system having an input for receiving compressed video data and an input for receiving graphics data. The system also includes a video decoder for processing the compressed video data to generate a video for displaying, a display engine for processing the graphics data to generate graphics for displaying, and means for overlaying the video and the graphics to generate an output video. The display engine includes a memory used during conversion of a graphics format from a first format to a second format to be in a format compatible with a video format The memory may be implemented in a single-port RAM configured to simulate a dual-port RAM. The single-port RAM may be a single-port SRAM and the dual-port SRAM may refer to a dual-port SRAM. The system may be integrated on an integrated circuit chip.

Another embodiment of the present invention is a method of processing video and graphics. The method includes receiving compressed video data, receiving graphics data, processing the compressed video data to generate a video for displaying, processing the graphics data to generate graphics for displaying, and overlaying the video and the graphics to generate an output video. The graphics format is converted to a format compatible with a video format using a single-port RAM configured to simulate a dual-port RAM.

Yet another embodiment of the present invention is a memory access system, which includes an input for receiving first data and an output for providing second data. The memory access system also includes a single-port RAM, which is configured to simulate a dual-port RAM, and one or more registers to store at least two words of the first data to be used during a write operation. Two words of the second data are read concurrently in a read operation during a first memory access cycle, and two words of the first data are written concurrently in the write operation during a second memory access cycle.

BRIEF DESCRIPTION OF THE DRAWINGS

FIG. 53 is a process diagram illustrating prediction of the first field-picture;

FIG. 54 is a process diagram illustrating prediction of the "bottom field" second field-picture;

FIG. 58 is a block diagram of image organization in SDRAM;

DETAILED DESCRIPTION

I. Graphics Display System Architecture

Figure 1:
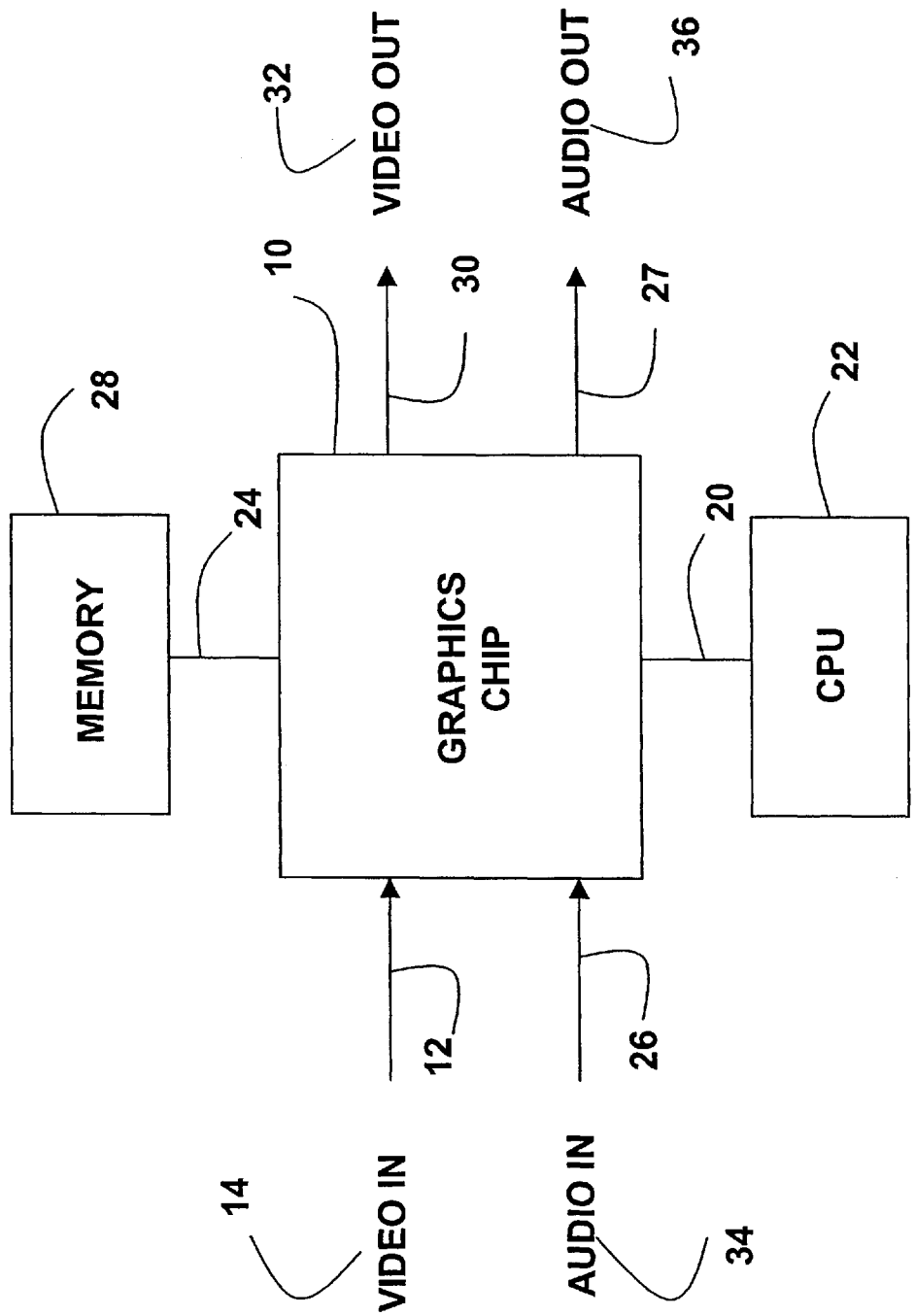
FIG. 1 is a block diagram of an integrated circuit graphics display system according to a presently preferred embodiment of the invention.

Referring to FIG. 1, the graphics display system according to the present invention is preferably contained in an integrated circuit 10. The integrated circuit may include inputs 12 for receiving video signals 14, a bus 20 for connecting to a CPU 22, a bus 24 for transferring data to and from memory 28, and an output 30 for providing a video output signal 32. The system may further include an input 26 for receiving audio input 34 and an output 27 for providing audio output 36.

The graphic display system accepts video input signals that may include analog video signals, digital video signals, or both. The analog signals may be, for example, NTSC, PAL and SECAM signals or any other conventional type of analog signal. The digital signals may be in the form of decoded MPEG signals or other format of digital video. In an alternate embodiment, the system includes an on-chip decoder for decoding the MPEG or other digital video signals input to the system. Graphics data for display is produced by any suitable graphics library software, such as Direct Draw marketed by Microsoft Corporation, and is read from the CPU 22 into the memory 28. The video output signals 32 may be analog signals, such as composite NTSC, PAL, Y/C (S-video), SECAM or other signals that include video and graphics information. In an alternate embodiment, the system provides serial digital video output to an on-chip or off-chip serializer that may encrypt the output.

The graphics display system memory 28 is preferably a unified synchronous dynamic random access memory (SDRAM) that is shared by the system, the CPU 22 and other peripheral components. In the preferred embodiment the CPU uses the unified memory for its code and data while the graphics display system performs all graphics, video and audio functions assigned to it by software. The amount of memory and CPU performance are preferably tunable by the system designer for the desired mix of performance and memory cost. In the preferred embodiment, a set-top box is implemented with SDRAM that supports both the CPU and graphics.

Figure 2:
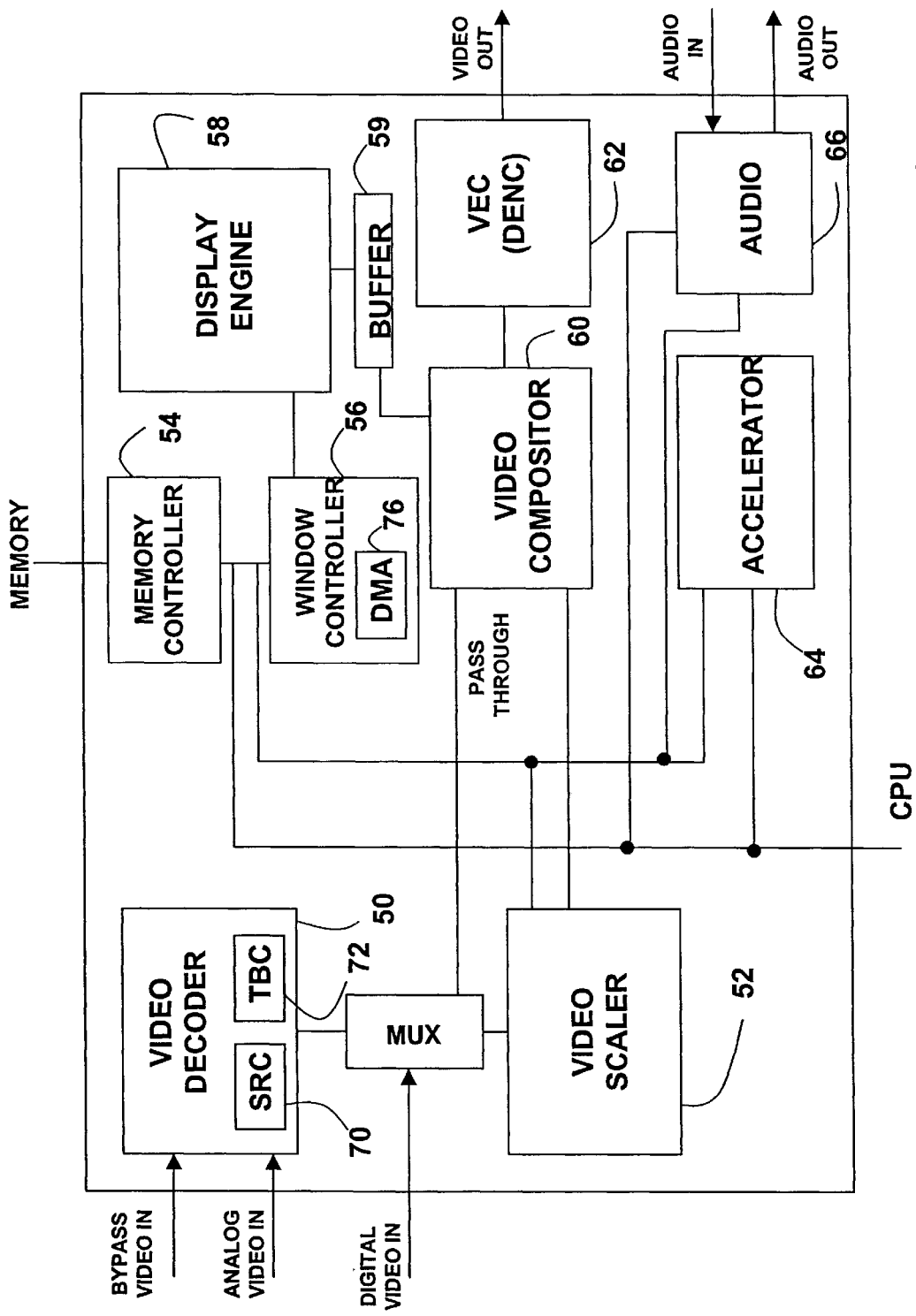
FIG. 2 is a block diagram of certain functional blocks of the system.

Referring to FIG. 2, the graphics display system preferably includes a video decoder 50, video scaler 52, memory controller 54, window controller 56, display engine 58, video compositor 60, and video encoder 62. The system may optionally include a graphics accelerator 64 and an audio engine 66. The system may display graphics, passthrough video, scaled video or a combination of the different types of video and graphics. Passthrough video includes digital or analog video that is not captured in memory. The passthrough video may be selected from the analog video or the digital video by a multiplexer. Bypass video, which may come into the chip on a separate input, includes analog video that is digitized off-chip into conventional YUV (luma chroma) format by any suitable decoder, such as the BT829 decoder, available from Brooktree Corporation, San Diego, Calif. The YUV format may also be referred to as YCrCb format where Cr and Cb are equivalent to U and V, respectively.

The video decoder (VDEC) 50 preferably digitizes and processes analog input video to produce internal YUV component signals with separated luma and chroma components. In an alternate embodiment, the digitized signals may be processed in another format, such as RGB. The VDEC 50 preferably includes a sample rate converter 70 and a time base corrector 72 that together allow the system to receive non-standard video signals, such as signals from a VCR. The time base corrector 72 enables the video encoder to work in passthrough mode, and corrects digitized analog video in the time domain to reduce or prevent jitter.

The video scaler 52 may perform both downscaling and upscaling of digital video and analog video as needed. In the preferred embodiment, scale factors may be adjusted continuously from a scale factor of much less than one to a scale factor of four. With both analog and digital video input, either one may be scaled while the other is displayed full size at the same time as passthrough video. Any portion of the input may be the source for video scaling. To conserve memory and bandwidth, the video scaler preferably downscales before capturing video frames to memory, and upscales after reading from memory, but preferably does not perform both upscaling and downscaling at the same time.

The memory controller 54 preferably reads and writes video and graphics data to and from memory by using burst accesses with burst lengths that may be assigned to each task. The memory is any suitable memory such as SDRAM. In the preferred embodiment, the memory controller includes two substantially similar SDRAM controllers, one primarily for the CPU and the other primarily for the graphics display system, while either controller may be used for any and all of these functions.

The graphics display system preferably processes graphics data using logical windows, also referred to as viewports, surfaces, sprites, or canvasses, that may overlap or cover one another with arbitrary spatial relationships. Each window is preferably independent of the others. The windows may consist of any combination of image content, including anti-aliased text and graphics, patterns, GIF images, JPEG images, live video from MPEG or analog video, three dimensional graphics, cursors or pointers, control panels, menus, tickers, or any other content, all or some of which may be animated.

Graphics windows are preferably characterized by window descriptors. Window descriptors are data structures that describe one or more parameters of the graphics window. Window descriptors may include, for example, image pixel format, pixel color type, alpha blend factor, location on the screen, address in memory, depth order on the screen, or other parameters. The system preferably supports a wide variety of pixel formats, including RGB 16, RGB 15, YUV 4:2:2 (ITU-R 601), CLUT2, CLUT4, CLUT8 or others.

In addition to each window having its own alpha blend factor, each pixel in the preferred embodiment has its own alpha value. In the preferred embodiment, window descriptors are not used for video windows. Instead, parameters for video windows, such as memory start address and window size are stored in registers associated with the video compositor.

In operation, the window controller 56 preferably manages both the video and graphics display pipelines. The window controller preferably accesses graphics window descriptors in memory through a direct memory access (DMA) engine 76. The window controller may sort the window descriptors according to the relative depth of their corresponding windows on the display. For graphics windows, the window controller preferably sends header information to the display engine at the beginning of each window on each scan line, and sends window header packets to the display engine as needed to display a window. For video, the window controller preferably coordinates capture of non-passthrough video into memory, and transfer of video between memory and the video compositor.

The display engine 58 preferably takes graphics information from memory and processes it for display. The display engine preferably converts the various formats of graphics data in the graphics windows into YUV component format, and blends the graphics windows to create blended graphics output having a composite alpha value that is based on alpha values for individual graphics windows, alpha values per pixel, or both. In the preferred embodiment, the display engine transfers the processed graphics information to memory buffers that are configured as line buffers. In an alternate embodiment, the buffer may include a frame buffer. In another alternate embodiment, the output of the display engine is transferred directly to a display or output block without being transferred to memory buffers.

The video compositor 60 receives one or more types of data, such as blended graphics data, video window data, passthrough video data and background color data, and produces a blended video output. The video encoder 62 encodes the blended video output from the video compositor into any suitable display format such as composite NTSC, PAL, Y/C (S-video), SECAM or other signals that may include video information, graphics information, or a combination of video and graphics information. In an alternate embodiment, the video encoder converts the blended video output of the video compositor into serial digital video output using an on-chip or off chip serializer that may encrypt the output.

The graphics accelerator 64 preferably performs graphics operations that may require intensive CPU processing, such as operations on three dimensional graphics images. The graphics accelerator may be programmable. The audio engine 66 preferably supports applications that create and play audio locally within a set-top box and allow mixing of the locally created audio with audio from a digital audio source, such as MPEG or Dolby, and with digitized analog audio. The audio engine also preferably supports applications that capture digitized baseband audio via an audio capture port and store sounds in memory for later use, or that store audio to memory for temporary buffering in order to delay the audio for precise lip-syncing when frame-based video time correction is enabled.

Figure 3:
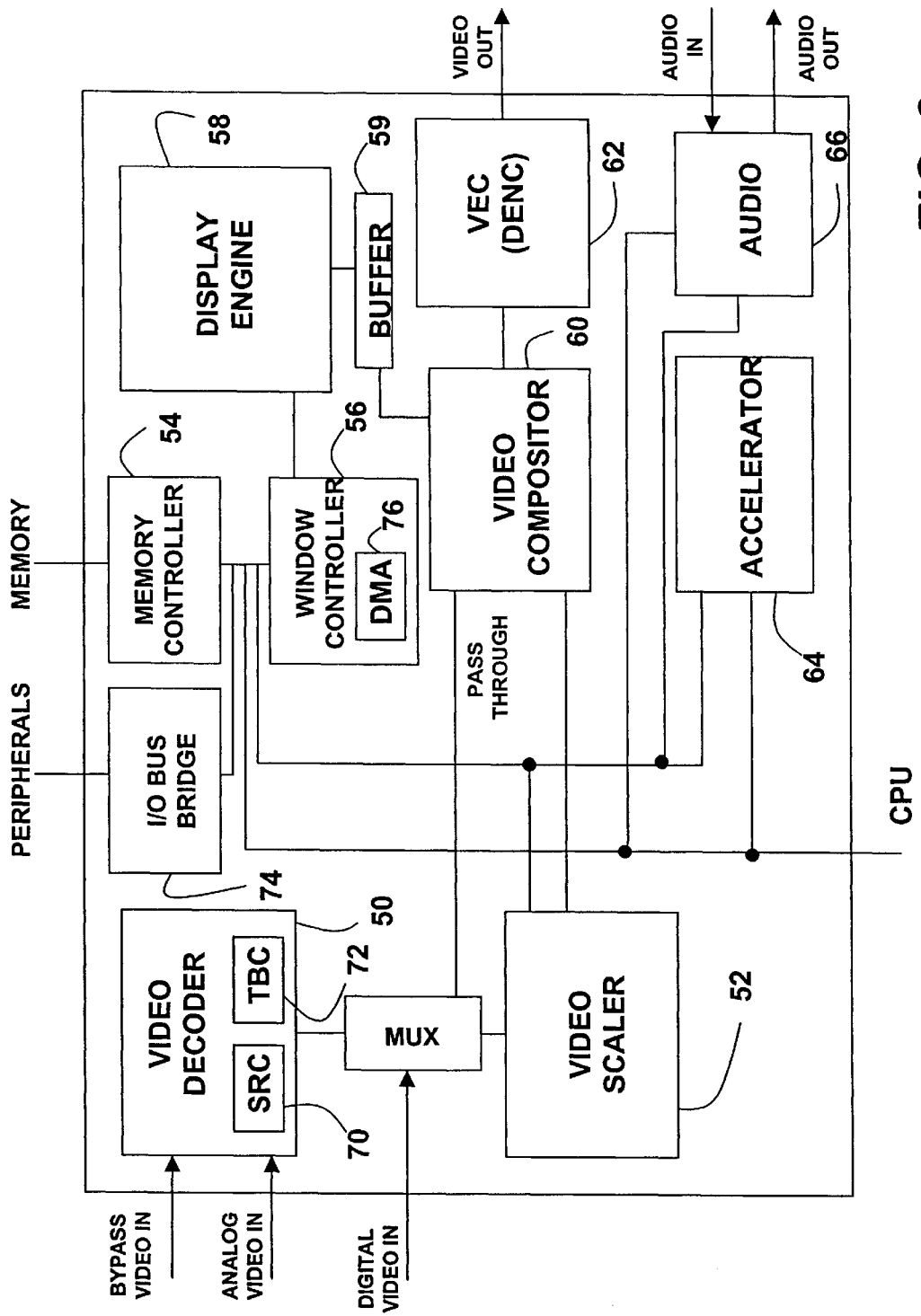
FIG. 3 is a block diagram of an alternate embodiment of the system of FIG. 2 that incorporates an on-chip I/O bus.

Referring to FIG. 3, in an alternate embodiment of the present invention, the graphics display system further includes an I/O bus 74 connected between the CPU 22, memory 28 and one or more of a wide variety of peripheral devices, such as flash memory, ROM, MPEG decoders, cable modems or other devices. The on-chip I/O bus 74 of the present invention preferably eliminates the need for a separate interface connection, sometimes referred in the art to as a north bridge. The I/O bus preferably provides high speed access and data transfers between the CPU, the memory and the peripheral devices, and may be used to support the full complement of devices that may be used in a full featured set-top box or digital TV. In the preferred embodiment, the I/O bus is compatible with the 68000 bus definition, including both active DSACK and passive DSACK (e.g., ROM/flash devices), and it supports external bus masters and retry operations as both master and slave. The bus preferably supports any mix of 32-bit, 16-bit and 8-bit devices, and operates at a clock rate of 33 MHz. The clock rate is preferably asynchronous with (not synchronized with) the CPU clock to enable independent optimization of those subsystems.

Figure 4:
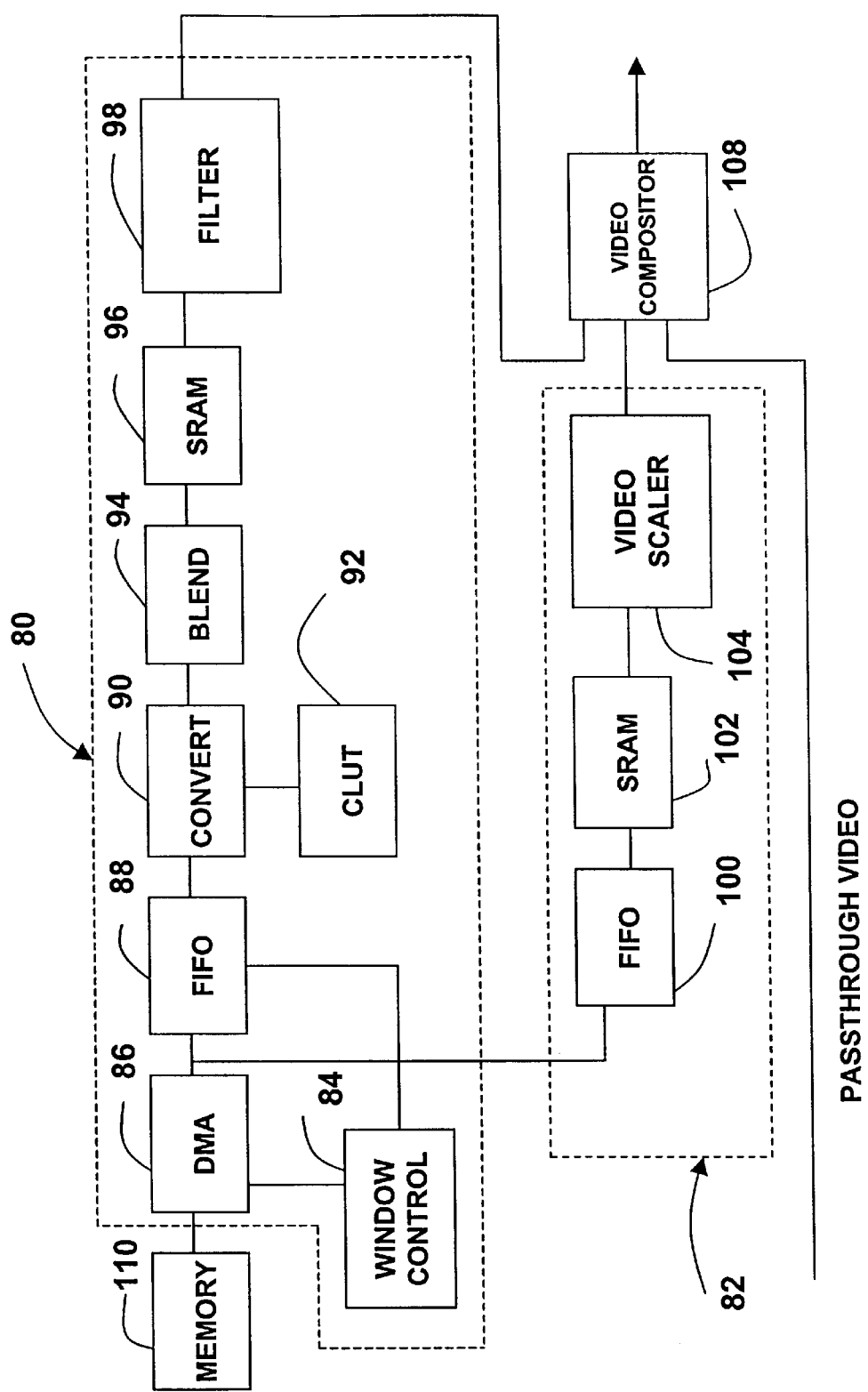
FIG. 4 is a functional block diagram of exemplary video and graphics display pipelines.

Referring to FIG. 4, the graphics display system generally includes a graphics display pipeline 80 and a video display pipeline 82. The graphics display pipeline preferably contains functional blocks, including window control block 84, DMA (direct memory access) block 86, FIFO (first-in-first-out memory) block 88, graphics converter block 90, color look up table (CLUT) block 92, graphics blending block 94, static random access memory (SRAM) block 96, and filtering block 98. The system preferably spatially processes the graphics data independently of the video data prior to blending.

In operation, the window control block 84 obtains and stores graphics window descriptors from memory and uses the window descriptors to control the operation of the other blocks in the graphics display pipeline. The windows may be processed in any order. In the preferred embodiment, on each scan line, the system processes windows one at a time from back to front and from the left edge to the right edge of the window before proceeding to the next window. In an alternate embodiment, two or more graphics windows may be processed in parallel. In the parallel implementation, it is possible for all of the windows to be processed at once, with the entire scan line being processed left to right. Any number of other combinations may also be implemented, such as processing a set of windows at a lower level in parallel, left to right, followed by the processing of another set of windows in parallel at a higher level.

The DMA block 86 retrieves data from memory 110 as needed to construct the various graphics windows according to addressing information provided by the window control block. Once the display of a window begins, the DMA block preferably retains any parameters that may be needed to continue to read required data from memory. Such parameters may include, for example, the current read address, the address of the start of the next lines, the number of bytes to read per line, and the pitch. Since the pipeline preferably includes a vertical filter block for anti-flutter and scaling purposes, the DMA block preferably accesses a set of adjacent display lines in the same frame, in both fields. If the output of the system is NTSC or other form of interlaced video, the DMA preferably accesses both fields of the interlaced final display under certain conditions, such as when the vertical filter and scaling are enabled. In such a case, all lines, not just those from the current display field, are preferably read from memory and processed during every display field. In this embodiment, the effective rate of reading and processing graphics is equivalent to that of a non-interlaced display with a frame rate equal to the field rate of the interlaced display.

The FIFO block 88 temporarily stores data read from the memory 110 by the DMA block 86, and provides the data on demand to the graphics converter block 90. The FIFO may also serve to bridge a boundary between different clock domains in the event that the memory and DMA operate under a clock frequency or phase that differs from the graphics converter block 90 and the graphics blending block 94. In an alternate embodiment, the FIFO block is not needed. The FIFO block may be unnecessary, for example, if the graphics converter block processes data from memory at the rate that it is read from the memory and the memory and conversion functions are in the same clock domain.

In the preferred embodiment, the graphics converter block 90 takes raw graphics data from the FIFO block and converts it to YUValpha (YUVa) format. Raw graphics data may include graphics data from memory that has not yet been processed by the display engine. One type of YUVa format that the system may use includes YUV 4:2:2 (i.e. two U and V samples for every four Y samples) plus an 8-bit alpha value for every pixel, which occupies overall 24 bits per pixel. Another suitable type of YUVa format includes YUV 4:4:4 plus the 8-bit alpha value per pixel, which occupies 32 bits per pixel. In an alternate embodiment, the graphics converter may convert the raw graphics data into a different format, such as RGBalpha.

The alpha value included in the YUVa output may depend on a number of factors, including alpha from chroma keying in which a transparent pixel has an alpha equal to zero, alpha per CLUT entry, alpha from Y (luma), or alpha per window where one alpha value characterizes all of the contents of a given window.

The graphics converter block 90 preferably accesses the CLUT 92 during conversion of CLUT formatted raw graphics data. In one embodiment of the present invention, there is only one CLUT. In an alternate embodiment, multiple CLUTs are used to process different graphics windows having graphics data with different CLUT formats. The CLUT may be rewritten by retrieving new CLUT data via the DMA block when required. In practice, it typically takes longer to rewrite the CLUT than the time available in a horizontal blanking interval, so the system preferably allows one horizontal line period to change the CLUT. Non-CLUT images may be displayed while the CLUT is being changed. The color space of the entries in the CLUT is preferably in YUV but may also be implemented in RGB.

The graphics blending block 94 receives output from the graphics converter block 90 and preferably blends one window at a time along the entire width of one scan line, with the back-most graphics window being processed first. The blending block uses the output from the converter block to modify the contents of the SRAM 96. The result of each pixel blend operation is a pixel in the SRAM that consists of the weighted sum of the various graphics layers up to and including the present one, and the appropriate alpha blend value for the video layers, taking into account the graphics layers up to and including the present one.

The SRAM 96 is preferably configured as a set of graphics line buffers, where each line buffer corresponds to a single display line. The blending of graphics windows is preferably performed one graphics window at a time on the display line that is currently being composited into a line buffer. Once the display line in a line buffer has been completely composited so that all the graphics windows on that display line have been blended, the line buffer is made available to the filtering block 98.

The filtering block 98 preferably performs both anti-flutter filtering (AFF) and vertical sample rate conversion (SRC) using the same filter. This block takes input from the line buffers and performs finite impulse response polyphase filtering on the data. While anti-flutter filtering and vertical axis SRC are done in the vertical axis, there may be different functions, such as horizontal SRC or scaling that are performed in the horizontal axis. In the preferred embodiment, the filter takes input from only vertically adjacent pixels at one time. It multiplies each input pixel times a specified coefficient, and sums the result to produce the output. The polyphase action means that the coefficients, which are samples of an approximately continuous impulse response, may be selected from a different fractional-pixel phase of the impulse response every pixel. In an alternate embodiment, where the filter performs horizontal scaling, appropriate coefficients are selected for a finite impulse response polyphase filter to perform the horizontal scaling. In an alternate embodiment, both horizontal and vertical filtering and scaling can be performed.

The video display pipeline 82 may include a FIFO block 100, an SRAM block 102, and a video scaler 104. The video display pipeline portion of the architecture is similar to that of the graphics display pipeline, and it shares some elements with it. In the preferred embodiment, the video pipeline supports up to one scaled video window per scan line, one passthrough video window, and one background color, all of which are logically behind the set of graphics windows. The order of these windows, from back to front, is preferably fixed as background color, then passthrough video, then scaled video.

The video windows are preferably in YUV format, although they may be in either 4:2:2 or 4:2:0 variants or other variants of YUV, or alternatively in other formats such as RGB. The scaled video window may be scaled up in both directions by the display engine, with a factor that can range up to four in the preferred embodiment. Unlike graphics, the system generally does not have to correct for square pixel aspect ratio with video. The scaled video window may be alpha blended into passthrough video and a background color, preferably using a constant alpha value for each video signal.

The FIFO block 100 temporarily stores captured video windows for transfer to the video scaler 104. The video scaler preferably includes a filter that performs both upscaling and downscaling. The scaler function may be a set of two polyphase SRC functions, one for each dimension. The vertical SRC may be a four-tap filter with programmable coefficients in a fashion similar to the vertical filter in the graphics pipeline, and the horizontal filter may use an 8-tap SRC, also with programmable coefficients. In an alternate embodiment, a shorter horizontal filter is used, such as a 4-tap horizontal SRC for the video upscaler. Since the same filter is preferably used for downscaling, it may be desirable to use more taps than are strictly needed for upscaling to accommodate low pass filtering for higher quality downscaling.

In the preferred embodiment, the video pipeline uses a separate window controller and DMA. In an alternate embodiment, these elements may be shared. The FIFOs are logically separate but may be implemented in a common SRAM.

The video compositor block 108 blends the output of the graphics display pipeline, the video display pipeline, and passthrough video. The background color is preferably blended as the lowest layer on the display, followed by passthrough video, the video window and blended graphics. In the preferred embodiment, the video compositor composites windows directly to the screen line-by-line at the time the screen is displayed, thereby conserving memory and bandwidth. The video compositor may include, but preferably does not include, display frame buffers, double-buffered displays, off-screen bit maps, or blitters.

Figure 5:
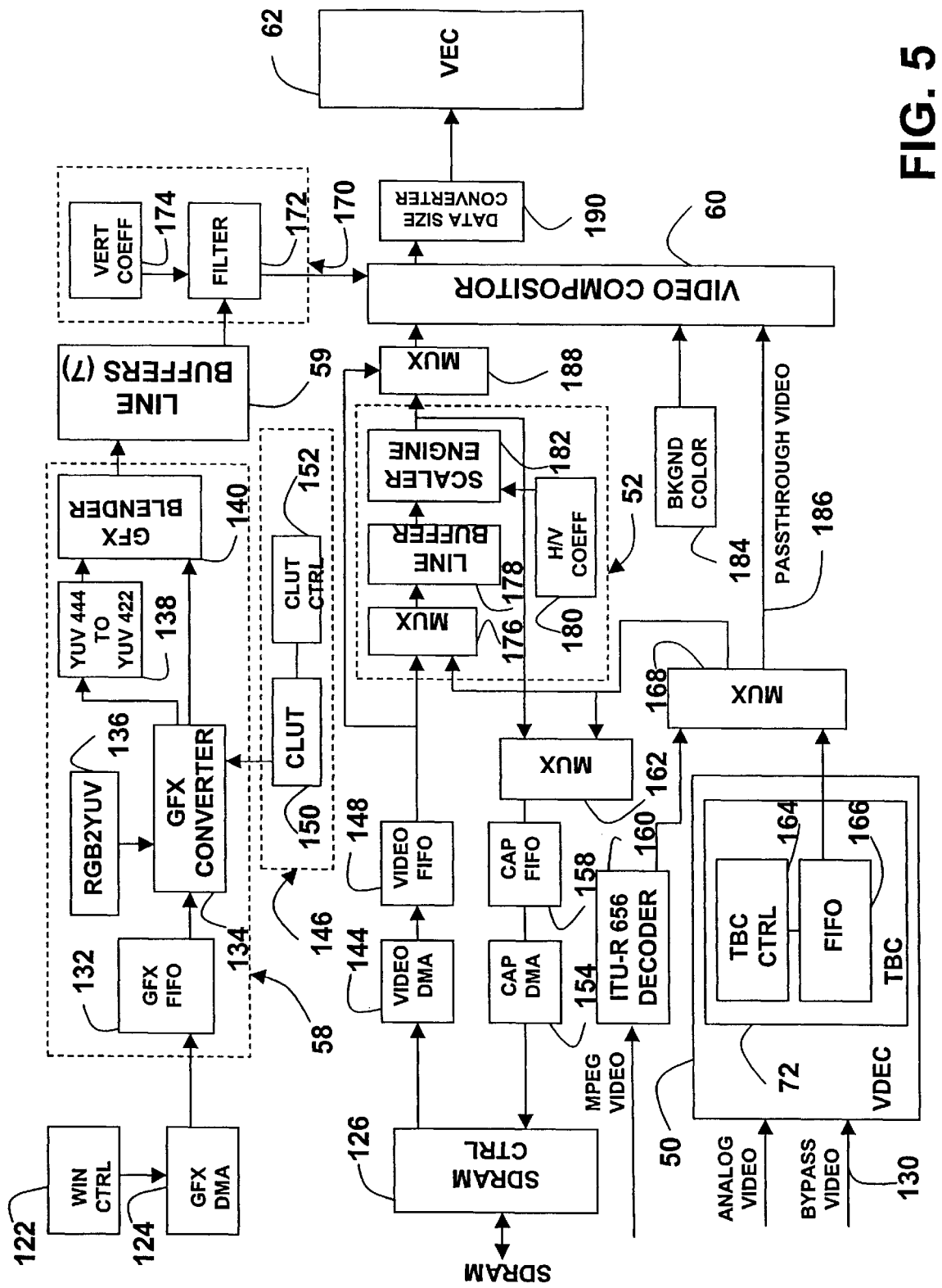
FIG. 5 is a more detailed block diagram of the graphics and video pipelines of the system.

Referring to FIG. 5, the display engine 58 preferably includes graphics FIFO 132, graphics converter 134, RGB-to-YUV converter 136, YUV-444-to-YUV422 converter 138 and graphics blender 140. The graphics FIFO 132 receives raw graphics data from memory through a graphics DMA 124 and passes it to the graphics converter 134, which preferably converts the raw graphics data into YUV 4:4:4 format or other suitable format. A window controller 122 controls the transfer of raw graphics data from memory to the graphics converter 132. The graphics converter preferably accesses the RGB-to-YUV converter 136 during conversion of RGB formatted data and the graphics CLUT 146 during conversion of CLUT formatted data. The RGB-to-YUV converter is preferably a color space converter that converts raw graphics data in RGB space to graphics data in YUV space. The graphics CLUT 146 preferably includes a CLUT 150, which stores pixel values for CLUT-formatted graphics data, and a CLUT controller 152, which controls operation of the CLUT.

The YUV444-to-YUV422 converter 138 converts graphics data from YUV 4:4:4 format to YUV 4:2:2 format. The term YUV 4:4:4 means, as is conventional, that for every four horizontally adjacent samples, there are four Y values, four U values, and four V values; the term YUV 4:2:2 means, as is conventional, that for every four samples, there are four Y values, two U values and two V values. The YUV444-to-YUV422 converter 138 is preferably a UV decimator that sub-samples U and V from four samples per every four samples of Y to two samples per every four samples of Y.

Graphics data in YUV 4:4:4 format and YUV 4:2:2 format preferably also includes four alpha values for every four samples. Graphics data in YUV 4:4:4 format with four alpha values for every four samples may be referred to as being in aYUV 4:4:4:4 format; graphics data in YUV 4:2:2 format with four alpha values for every four samples may be referred to as being in aYUV 4:4:2:2 format.

The YUV444-to-YUV422 converter may also perform low-pass filtering of UV and alpha. For example, if the graphics data with YUV 4:4:4 format has higher than desired frequency content, a low pass filter in the YUV444-to-YUV422 converter may be turned on to filter out high frequency components in the U and V signals, and to perform matched filtering of the alpha values.

The graphics blender 140 blends the YUV 4:2:2 signals together, preferably one line at a time using alpha blending, to create a single line of graphics from all of the graphics windows on the current display line. The filter 170 preferably includes a single 4-tap vertical polyphase graphics filter 172, and a vertical coefficient memory 174. The graphics filter may perform both anti-flutter filtering and vertical scaling. The filter preferably receives graphics data from the display engine through a set of seven line buffers 59, where four of the seven line buffers preferably provide data to the taps of the graphics filter at any given time.

In the preferred embodiment, the system may receive video input that includes one decoded MPEG video in ITU-R 656 format and one analog video signal. The ITU-R 656 decoder 160 processes the decoded MPEG video to extract timing and data information. In one embodiment, an on-chip video decoder (VDEC) 50 converts the analog video signal to a digitized video signal. In an alternate embodiment, an external VDEC such as the Brooktree BT829 decoder converts the analog video into digitized analog video and provides the digitized video to the system as bypass video 130.

Analog video or MPEG video may be provided to the video compositor as passthrough video. Alternatively, either type of video may be captured into memory and provided to the video compositor as a scaled video window. The digitized analog video signals preferably have a pixel sample rate of 13.5 MHz, contain a 16 bit data stream in YUV 4:2:2 format, and include timing signals such as top field and vertical sync signals.

The VDEC 50 includes a time base corrector (TBC) 72 comprising a TBC controller 164 and a FIFO 166. To provide passthrough video that is synchronized to a display clock preferably without using a frame buffer, the digitized analog video is corrected in the time domain in the TBC 72 before being blended with other graphics and video sources. During time base correction, the video input which runs nominally at 13.5 MHZ is synchronized with the display clock which runs nominally at 13.5 MHZ at the output; these two frequencies that are both nominally 13.5 MHz are not necessarily exactly the same frequency. In the TBC, the video output is preferably offset from the video input by a half scan line per field.

A capture FIFO 158 and a capture DMA 154 preferably capture the digitized analog video signals and MPEG video. The SDRAM controller 126 provides captured video frames to the external SDRAM. A video DMA 144 transfers the captured video frames to a video FIFO 148 from the external SDRAM.

The digitized analog video signals and MPEG video are preferably scaled down to less than 100% prior to being captured and are scaled up to more than 100% after being captured. The video scaler 52 is shared by both upscale and downscale operations. The video scaler preferably includes a multiplexer 176, a set of line buffers 178, a horizontal and vertical coefficient memory 180 and a scaler engine 182. The scaler engine 182 preferably includes a set of two polyphase filters, one for each of horizontal and vertical dimensions.

The vertical filter preferably includes a four-tap filter with programmable filter coefficients. The horizontal filter preferably includes an eight-tap filter with programmable filter coefficients. In the preferred embodiment, three line buffers 178 supply video signals to the scaler engine 182. The three line buffers 178 preferably are 720×16 two port SRAM. For vertical filtering, the three line buffers 178 may provide video signals to three of the four taps of the four-tap vertical filter while the video input provides the video signal directly to the fourth tap. For horizontal filtering, a shift register having eight cells in series may be used to provide inputs to the eight taps of the horizontal polyphase filter, each cell providing an input to one of the eight taps.

For downscaling, the multiplexer 168 preferably provides a video signal to the video scaler prior to capture. For upscaling, the video FIFO 148 provides a video signal to the video scaler after capture. Since the video scaler 52 is shared between downscaling and upscaling filtering, downscaling and upscaling operations are not performed at the same time in this particular embodiment.

In the preferred embodiment, the video compositor 60 blends signals from up to four different sources, which may include blended graphics from the filter 170, video from a video FIFO 148, passthrough video from a multiplexer 168, and background color from a background color module 184. Alternatively, various numbers of signals may be composited, including, for example, two or more video windows. The video compositor preferably provides final output signal to the data size converter 190, which serializes the 16-bit word sample into an 8-bit word sample at twice the clock frequency, and provides the 8-bit word sample to the video encoder 62.

The video encoder 62 encodes the provided YUV 4:2:2 video data and outputs it as an output of the graphics display system in any desired analog or digital format.

II. Window Descriptor and Solid Surface Description

Often in the creation of graphics displays, the artist or application developer has a need to include rectangular objects on the screen, with the objects having a solid color and a uniform alpha blend factor (alpha value). These regions (or objects) may be rendered with other displayed objects on top of them or beneath them. In conventional graphics devices, such solid color objects are rendered using the number of distinct pixels required to fill the region. It may be advantageous in terms of memory size and memory bandwidth to render such objects on the display directly, without expending the memory size or bandwidth required in conventional approaches.

In the preferred embodiment, video and graphics are displayed on regions referred to as windows. Each window is preferably a rectangular area of screen bounded by starting and ending display lines and starting and ending pixels on each display line. Raw graphics data to be processed and displayed on a screen preferably resides in the external memory. In the preferred embodiment, a display engine converts raw graphics data into a pixel map with a format that is suitable for display.

In one embodiment of the present invention, the display engine implements graphics windows of many types directly in hardware. Each of the graphics windows on the screen has its own value of various parameters, such as location on the screen, starting address in memory, depth order on the screen, pixel color type, etc. The graphics windows may be displayed such that they may overlap or cover each other, with arbitrary spatial relationships.

In the preferred embodiment, a data structure called a window descriptor contains parameters that describe and control each graphics window. The window descriptors are preferably data structures for representing graphics images arranged in logical surfaces, or windows, for display. Each data structure preferably includes a field indicating the relative depth of the logical surface on the display, a field indicating the alpha value for the graphics in the surface, a field indicating the location of the logical surface on the display, and a field indicating the location in memory where graphics image data for the logical surface is stored.

All of the elements that make up any given graphics display screen are preferably specified by combining all of the window descriptors of the graphics windows that make up the screen into a window descriptor list. At every display field time or a frame time, the display engine constructs the display image from the current window descriptor list. The display engine composites all of the graphics windows in the current window descriptor list into a complete screen image in accordance with the parameters in the window descriptors and the raw graphics data associated with the graphics windows.

With the introduction of window descriptors and real-time composition of graphics windows, a graphics window with a solid color and fixed translucency may be described entirely in a window descriptor having appropriate parameters. These parameters describe the color and the translucency (alpha) just as if it were a normal graphics window. The only difference is that there is no pixel map associated with this window descriptor. The display engine generates a pixel map accordingly and performs the blending in real time when the graphics window is to be displayed.

For example, a window consisting of a rectangular object having a constant color and a constant alpha value may be created on a screen by including a window descriptor in the window descriptor list. In this case, the window descriptor indicates the color and the alpha value of the window, and a null pixel format, i.e., no pixel values are to be read from memory. Other parameters indicate the window size and location on the screen, allowing the creation of solid color windows with any size and location. Thus, in the preferred embodiment, no pixel map is required, memory bandwidth requirements are reduced and a window of any size may be displayed.

Another type of graphics window that the window descriptors preferably describe is an alpha-only type window. The alpha-only type windows preferably use a constant color and preferably have graphics data with 2, 4 or 8 bits per pixel. For example, an alpha-4 format may be an alpha-only format used in one of the alpha-only type windows. The alpha-4 format specifies the alpha-only type window with alpha blend values having four bits per pixel. The alpha-only type window may be particularly useful for displaying anti-aliased text.

A window controller preferably controls transfer of graphics display information in the window descriptors to the display engine. In one embodiment, the window controller has internal memory to store eight window descriptors. In other embodiments, the window controller may have memory allocated to store more or less window descriptors. The window controller preferably reads the window descriptors from external memory via a direct memory access (DMA) module.

The DMA module may be shared by both paths of the display pipeline as well as some of the control logic, such as the window controller and the CLUT. In order to support the display pipeline, the DMA module preferably has three channels where the graphics pipeline and the video pipeline use separate DMA modules. These may include window descriptor read, graphics data read and CLUT read. Each channel has externally accessible registers to control the start address and the number of words to read.

Once the DMA module has completed a transfer as indicated by its start and length registers, it preferably activates a signal that indicates the transfer is complete. This allows the DMA module that sets up operations for that channel to begin setting up of another transfer. In the case of graphics data reads, the window controller preferably sets up a transfer of one line of graphics pixels and then waits for the DMA controller to indicate that the transfer of that line is complete before setting up the transfer of the next line, or of a line of another window.

Figure 6:
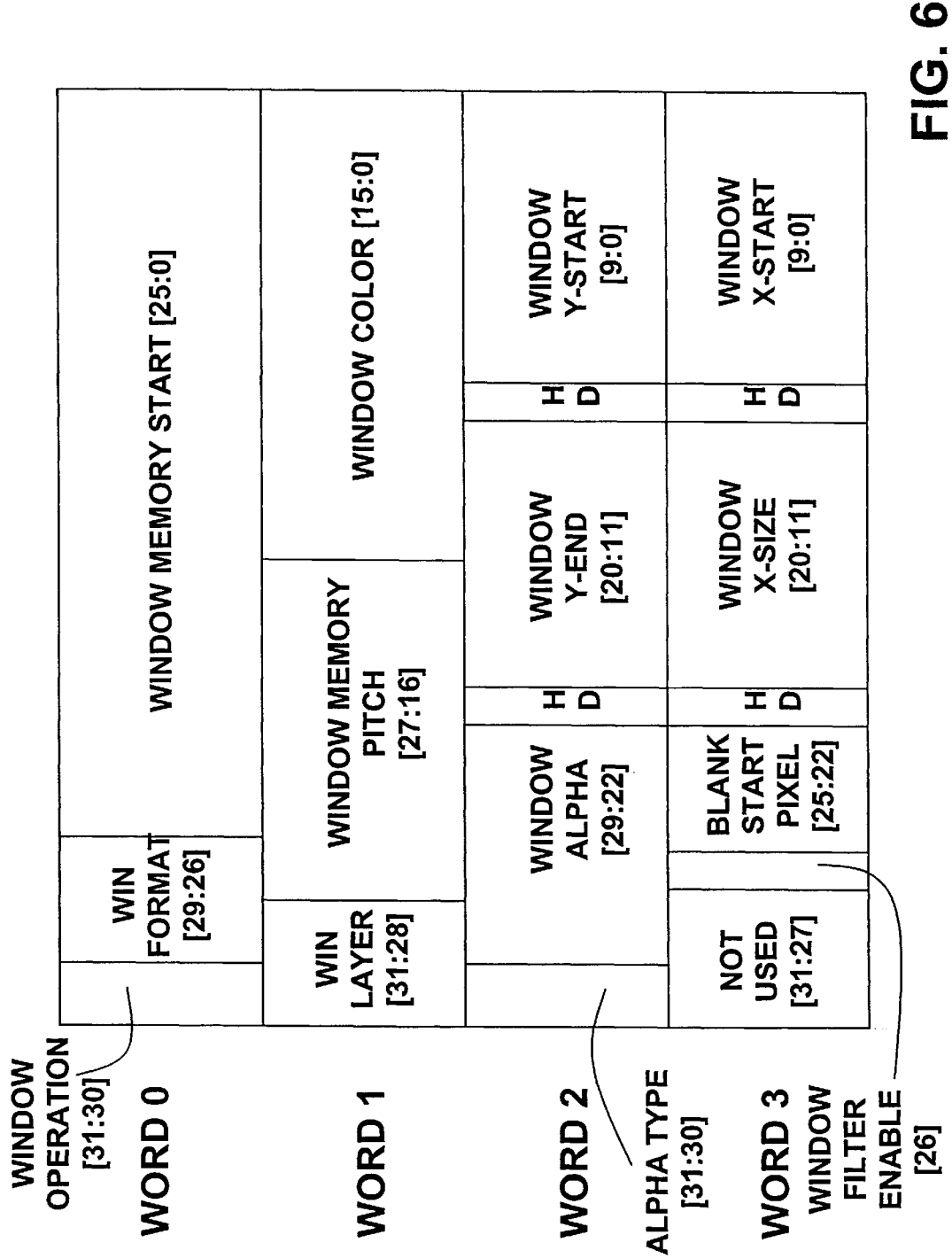
FIG. 6 is a map of an exemplary window descriptor for describing graphics windows and solid surfaces.

Referring to FIG. 6, each window descriptor preferably includes four 32-bit words (labeled Word 0 through Word 3) containing graphics window display information. Word 0 preferably includes a window operation parameter, a window format parameter and a window memory start address. The window operation parameter preferably is a 2-bit field that indicates which operation is to be performed with the window descriptor. When the window operation parameter is 00b, the window descriptor performs a normal display operation and when it is 01b, the window descriptor performs graphics color look-up table ("CLUT") re-loading. The window operation parameter of 10b is preferably not used. The window operation parameter of 11b preferably indicates that the window descriptor is the last of a sequence of window descriptors in memory.

The window format parameter preferably is a 4-bit field that indicates a data format of the graphics data to be displayed in the graphics window. The data formats corresponding to the window format parameter is described in Table 1 below.

TABLE 1

Graphics Data Formats

| win_format | Data Format | Data Format Description |
|---|---|---|
| 0000b | RGB16 | 5-BIT RED, 6-BIT GREEN, 5-BIT BLUE |
| 0001b | RGB15 + 1 | RGB15 plus one bit alpha (keying) |
| 0010b | RGBA4444 | 4-BIT RED, GREEN, BLUE, ALPHA |
| 0100b | CLUT2 | 2-bit CLUT with YUV and alpha in table |
| 0101b | CLUT4 | 4-bit CLUT with YUV and alpha in table |
| 0110b | CLUT8 | 8-bit CLUT with YUV and alpha in table |
| 0111b | ACLUT16 | 8-BIT ALPHA, 8-BIT CLUT INDEX |
| 1000b | ALPHA0 | single win_alpha and single RGB win_color |
| 1001b | ALPHA2 | 2-bit alpha with single RGB win_color |

TABLE 1-continued

Graphics Data Formats

| win_ format | Data Format | Data Format Description |
|---|---|---|
| 1010b | ALPHA4 | 4-bit alpha with single RGB win_color |
| 1011b | ALPHA8 | 8-bit alpha with single RGB win_color |
| 1100b | YUV422 | U and V are sampled at half the rate of Y |
| 1111b | RESERVED | Special coding for blank line in new header, i.e., indicates an empty line |

The window memory start address preferably is a 26-bit data field that indicates a starting memory address of the graphics data of the graphics window to be displayed on the screen. The window memory start address points to the first address in the corresponding external SDRAM which is accessed to display data on the graphics window defined by the window descriptor. When the window operation parameter indicates the graphics CLUT reloading operation, the window memory start address indicates a starting memory address of data to be loaded into the graphics CLUT.

Word 1 in the window descriptor preferably includes a window layer parameter, a window memory pitch value and a window color value. The window layer parameter is preferably a 4-bit data indicating the order of layers of graphics windows. Some of the graphics windows may be partially or completely stacked on top of each other, and the window layer parameter indicates the stacking order. The window layer parameter preferably indicates where in the stack the graphics window defined by the window descriptor should be placed.

In the preferred embodiment, a graphics window with a window layer parameter of 0000b is defined as the bottom most layer, and a graphics window with a window layer parameter of 1111b is defined as the top most layer. Preferably, up to eight graphics windows may be processed in each scan line. The window memory pitch value is preferably a 12-bit data field indicating the pitch of window memory addressing. Pitch refers to the difference in memory address between two pixels that are vertically adjacent within a window.

The window color value preferably is a 16-bit RGB color, which is applied as a single color to the entire graphics window when the window format parameter is 1000b, 1001b, 1010b, or 1011b. Every pixel in the window preferably has the color specified by the window color value, while the alpha value is determined per pixel and per window as specified in the window descriptor and the pixel format. The engine preferably uses the window color value to implement a solid surface.

Word 2 in the window descriptor preferably includes an alpha type, a widow alpha value, a window y-end value and a window y-start value. The word 2 preferably also includes two bits reserved for future definition, such as high definition television (HD) applications. The alpha type is preferably a 2-bit data field that indicates the method of selecting an alpha value for the graphics window. The alpha type of 00b indicates that the alpha value is to be selected from chroma keying. Chroma keying determines whether each pixel is opaque or transparent based on the color of the pixel. Opaque pixels are preferably considered to have an alpha value of 1.0, and transparent pixels have an alpha value of 0, both on a scale of 0 to 1. Chroma keying compares the color of each pixel to a reference color or to a range of possible colors; if the pixel matches the reference color, or if its color falls within the specified range of colors, then the pixel is determined to be transparent. Otherwise it is determined to be opaque.

The alpha type of 01b indicates that the alpha value should be derived from the graphics CLUT, using the alpha value in each entry of the CLUT. The alpha type of 10b indicates that the alpha value is to be derived from the luminance Y. The Y value that results from conversion of the pixel color to the YUV color space, if the pixel color is not already in the YUV color, is used as the alpha value for the pixel. The alpha type of 11b indicates that only a single alpha value is to be applied to the entire graphics window. The single alpha value is preferably included as the window alpha value next.

The window alpha value preferably is an 8-bit alpha value applied to the entire graphics window. The effective alpha value for each pixel in the window is the product of the window alpha and the alpha value determined for each pixel. For example, if the window alpha value is 0.5 on a scale of 0 to 1, coded as 0×80, then the effective alpha value of every pixel in the window is one-half of the value encoded in or for the pixel itself. If the window format parameter is 1000b, i.e., a single alpha value is to be applied to the graphics window, then the per-pixel alpha value is treated as if it is 1.0, and the effective alpha value is equal to the window alpha value.

The window y-end value preferably is a 10-bit data field that indicates the ending display line of the graphics window on the screen. The graphics window defined by the window descriptor ends at the display line indicated by the window y-end value. The window y-start value preferably is a 10-bit data field that indicates a starting display line of the graphics window on a screen. The graphics window defined by the window descriptor begins at the display line indicated in the window y-start value. Thus, a display of a graphics window can start on any display line on the screen based on the window y-start value.

Word 3 in the window descriptor preferably includes a window filter enable parameter, a blank start pixel value, a window x-size value and a window x-start value. In addition, the word 3 includes two bits reserved for future definition, such as HD applications. Five bits of the 32-bit word 3 are not used. The window filter enable parameter is a 1-bit field that indicates whether low pass filtering is to be enabled during YUV 4:4:4 to YUV 4:2:2 conversion.

The blank start pixel value preferably is a 4-bit parameter indicating a number of blank pixels at the beginning of each display line. The blank start pixel value preferably signifies the number of pixels of the first word read from memory, at the beginning of the corresponding graphics window, to be discarded. This field indicates the number of pixels in the first word of data read from memory that are not displayed. For example, if memory words are 32 bits wide and the pixels are 4 bits each, there are 8 possible first pixels in the first word. Using this field, 0 to 7 pixels may be skipped, making the $1^{st}$ to the $8^{th}$ pixel in the word appear as the first pixel, respectively. The blank start pixel value allows graphics windows to have any horizontal starting position on the screen, and may be used during soft horizontal scrolling of a graphics window.

The window x-size value preferably is a 10-bit data field that indicates the size of a graphics window in the x direction, i.e., horizontal direction. The window x-size value preferably indicates the number of pixels of a graphics window in a display line.

The window x-start value preferably is a 10-bit data field that indicates a starting pixel of the graphics window on a display line. The graphics window defined by the window descriptor preferably begins at the pixel indicated by the window x-start value of each display line. With the window x-start value, any pixel of a given display line can be chosen to start painting the graphics window. Therefore, there is no need to load pixels on the screen prior to the beginning of the graphics window display area with black.

III. Graphics Window Control Data Passing Mechanism

In one embodiment of the present invention, a FIFO in the graphics display path accepts raw graphics data as the raw graphics data is read from memory, at the full memory data rate using a clock of the memory controller. In this embodiment, the FIFO provides this data, initially stored in an external memory, to subsequent blocks in the graphics pipeline.

In systems such as graphics display systems where multiple types of data may be output from one module, such as a memory controller subsystem, and used in another subsystem, such as a graphics processing subsystem, it typically becomes progressively more difficult to support a combination of dynamically varying data types and data transfer rates and FIFO buffers between the producing and consuming modules. The conventional way to address such problems is to design a logic block that understands the varying parameters of the data types in the first module and controls all of the relevant variables in the second module. This may be difficult due to variable delays between the two modules, due to the use of FIFOs between them and varying data rate, and due to the complexity of supporting a large number of data types.

The system preferably processes graphics images for display by organizing the graphics images into windows in which the graphics images appear on the screen, obtaining data that describes the windows, sorting the data according to the depth of the window on the display, transferring graphics images from memory, and blending the graphics images using alpha values associated with the graphics images.

In the preferred embodiment, a packet of control information called a header packet is passed from the window controller to the display engine. All of the required control information from the window controller preferably is conveyed to the display engine such that all of the relevant variables from the window controller are properly controlled in a timely fashion and such that the control is not dependent on variations in delays or data rates between the window controller and the display engine.

A header packet preferably indicates the start of graphics data for one graphics window. The graphics data for that graphics window continues until it is completed without requiring a transfer of another header packet. A new header packet is preferably placed in the FIFO when another window is to start. The header packets may be transferred according to the order of the corresponding window descriptors in the window descriptor lists.

In a display engine that operates according to lists of window descriptors, windows may be specified to overlap one another. At the same time, windows may start and end on any line, and there may be many windows visible on any one line. There are a large number of possible combinations of window starting and ending locations along vertical and horizontal axes and depth order locations. The system preferably indicates the depth order of all windows in the window descriptor list and implements the depth ordering correctly while accounting for all windows.

Each window descriptor preferably includes a parameter indicating the depth location of the associated window. The range that is allowed for this parameter can be defined to be almost any useful value. In the preferred embodiment there are 16 possible depth values, ranging from 0 to 15, with 0 being the back-most (deepest, or furthest from the viewer), and 15 being the top or front-most depth. The window descriptors are ordered in the window descriptor list in order of the first display scan line where the window appears. For example if window A spans lines 10 to 20, window B spans lines 12 to 18, and window C spans lines 5 to 20, the order of these descriptors in the list would be {C, A, B}.

In the hardware, which is a preferably a VLSI device, there is preferably on-chip memory capable of storing a number of window descriptors. In the preferred implementation, this memory can store up to 8 window descriptors on-chip, however the size of this memory may be made larger or smaller without loss of generality. Window descriptors are read from main memory into the on-chip descriptor memory in order from the start of the list, and stopping when the on-chip memory is full or when the most recently read descriptor describes a window that is not yet visible, i.e., its starting line is on a line that has a higher number than the line currently being constructed. Once a window has been displayed and is no longer visible, it may be cast out of the on-chip memory and the next descriptor in the list may read from main memory. At any given display line, the order of the window descriptors in the on-chip memory bears no particular relation to the depth order of the windows on the screen.

The hardware that controls the compositing of windows builds up the display in layers, starting from the back-most layer. In the preferred embodiment, the back most layer is layer 0. The hardware performs a quick search of the back-most window descriptor that has not yet been composited, regardless of its location in the on-chip descriptor memory. In the preferred embodiment, this search is performed as follows:

All 8 window descriptors are stored on chip in such a way that the depth order numbers of all of them are available simultaneously. While the depth numbers in the window descriptors are 4 bit numbers, representing 0 to 15, the on-chip memory has storage for 5 bits for the depth number. Initially the 5 bit for each descriptor is set to 0. The depth order values are compared in a hierarchy of pair-wise comparisons, and the lower of the two depth numbers in each comparison wins the comparison. That is, at the first stage of the test descriptor pairs {0, 1}, {2, 3}, {4, 5}, and {6, 7} are compared, where {0–7} represent the eight descriptors stored in the on-chip memory. This results in four depth numbers with associated descriptor numbers. At the next stage two pair-wise comparisons compare {(0, 1), (2, 3)} and {(4, 5), (6, 7)}.

Each of these results in a depth number of the lower depth order number and the associated descriptor number. At the third stage, one pair-wise comparison finds the smallest depth number of all, and its associated descriptor number. This number points the descriptor in the on-chip memory with the lowest depth number, and therefore the greatest depth, and this descriptor is used first to render the associated window on the screen. Once this window has been rendered onto the screen for the current scan line, the fifth bit of the depth number in the on-chip memory is set to 1, thereby ensuring that the depth value number is greater than 15, and as a result this depth number will preferably never again be found to be the back-most window until all windows have been rendered on this scan line, preventing rendering this window twice.

Once all the windows have been rendered for a given scan line, the fifth bits of all the on-chip depth numbers are again set to 0; descriptors that describe windows that are no longer visible on the screen are cast out of the on-chip memory; new descriptors are read from memory as required (that is, if all windows in the on-chip memory are visible, the next descriptor is read from memory, and this repeats until the most recently read descriptor is not yet visible on the screen), and the process of finding the back most descriptor and rendering windows onto the screen repeats.

Figure 7:
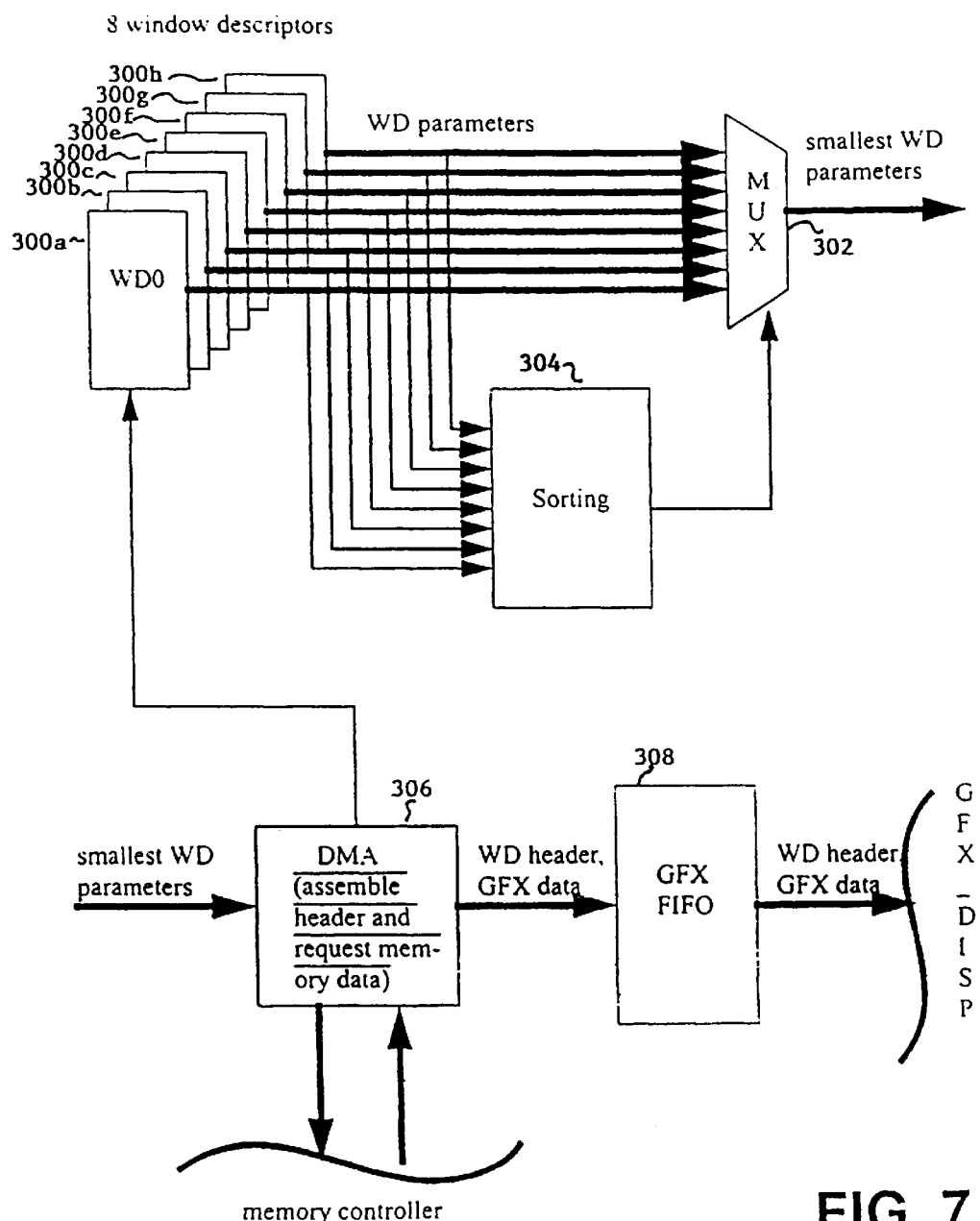
FIG. 7 is a flow diagram of an exemplary process for sorting window descriptors in a window controller.

Referring to FIG. 7, window descriptors are preferably sorted by the window controller and used to transfer graphics data to the display engine. Each of window descriptors, including the window descriptor 0 through the window descriptor 7 300a–h, preferably contains a window layer parameter. In addition, each window descriptor is preferably associated with a window line done flag indicating that the window descriptor has been processed on a current display line.

The window controller preferably performs window sorting at each display line using the window layer parameters and the window line done flags. The window controller preferably places the graphics window that corresponds to the window descriptor with the smallest window layer parameter at the bottom, while placing the graphics window that corresponds to the window descriptor with the largest window layer parameter at the top.

The window controller preferably transfers the graphics data for the bottom-most graphics window to be processed first. The window parameters of the bottom-most window are composed into a header packet and written to the graphics FIFO. The DMA engine preferably sends a request to the memory controller to read the corresponding graphics data for this window and send the graphics data to the graphics FIFO. The graphics FIFO is then read by the display engine to compose a display line, which is then written to graphics line buffers.

The window line done flag is preferably set true whenever the window surface has been processed on the current display line. The window line done flag and the window layer parameter may be concatenated together for sorting. The window line done flag is added to the window layer parameter as the most significant bit during sorting such that {window line done flag[4], window layer parameter[3:0]} is a five bit binary number, a window layer value, with window line done flag as the most significant bit.

The window controller preferably selects a window descriptor with the smallest window layer value to be processed. Since the window line done flag is preferably the most significant bit of the window layer value, any window descriptor with this flag set, i.e., any window that has been processed on the current display line, will have a higher window layer value than any of the other window descriptors that have not yet been processed on the current display line. When a particular window descriptor is processed, the window line done flag associated with that particular window descriptor is preferably set high, signifying that the particular window descriptor has been processed for the current display line.

A sorter 304 preferably sorts all eight window descriptors after any window descriptor is processed. The sorting may be implemented using binary tree sorting or any other suitable sorting algorithm. In binary tree sorting for eight window descriptors, the window layer value for four pairs of window descriptors are compared at a first level using four comparators to choose the window descriptor that corresponds to a lower window in each pair. In the second level, two comparators are used to select the window descriptor that corresponds to the bottom most graphics window in each of two pairs. In the third and the last level, the bottom-most graphics windows from each of the two pairs are compared against each other preferably using only one comparator to select the bottom window.

A multiplexer 302 preferably multiplexes parameters from the window descriptors. The output of the sorter, i.e., window selected to be the bottom most, is used to select the window parameters to be sent to a direct memory access ("DMA") module 306 to be packaged in a header packet and sent to a graphics FIFO 308. The display engine preferably reads the header packet in the graphics FIFO and processes the raw graphics data based on information contained in the header packet.

The header packet preferably includes a first header word and a second header word. Corresponding graphics data is preferably transferred as graphics data words. Each of the first header word, the second header word and the graphics data words preferably includes 32 bits of information plus a data type bit. The first header word preferably includes a 1-bit data type, a 4-bit graphics type, a 1-bit first window parameter, a 1-bit top/bottom parameter, a 2-bit alpha type, an 8-bit window alpha value and a 16-bit window color value. Table 2 shows contents of the first header word.

TABLE 2

| | First Header Word | | | | | |
|---|---|---|---|---|---|---|
| Bit Position | 32 | 31–28 | 27 | 26 | 25–24 | 23–16 | 15–0 |
| Data Content | Data type | graphics type | First Window | top/ bottom | alpha type | window alpha | window color |

The 1-bit data type preferably indicates whether a 33-bit word in the FIFO is a header word or a graphics data word. A data type of 1 indicates that the associated 33-bit word is a header word while the data type of 0 indicates that the associated 33-bit word is a graphics data word. The graphics type indicates the data format of the graphics data to be displayed in the graphics window similar to the window format parameter in the word 0 of the window descriptor, which is described in Table 1 above. In the preferred embodiment, when the graphics type is 1111, there is no window on the current display line, indicating that the current display line is empty.

The first window parameter of the first header word preferably indicates whether the window associated with that first header word is a first window on a new display line. The top/bottom parameter preferably indicates whether the current display line indicated in the first header word is at the top or the bottom edges of the window. The alpha type preferably indicates a method of selecting an alpha value individually for each pixel in the window similar to the alpha type in the word 2 of the window descriptor.

The window alpha value preferably is an alpha value to be applied to the window as a whole and is similar to the window alpha value in the word 2 of the window descriptor. The window color value preferably is the color of the window in 16-bit RGB format and is similar to the window color value in the word 1 of the window descriptor.

The second header word preferably includes the 1-bit data type, a 4-bit blank pixel count, a 10-bit left edge value, a 1-bit filter enable parameter and a 10-bit window size value. Table 3 shows contents of the second header word in the preferred embodiment.

TABLE 3

| | | Second Header Word | | |
|---|---|---|---|---|
| Bit Position | 32 | 31–28 | 25–16 | 10 | 9–0 |
| Data Content | data type | Blank pixel count | Left edge | filter enabler | window size |

Similar to the first header word, the second header word preferably starts with the data type indicating whether the second header word is a header word or a graphics data word. The blank pixel count preferably indicates a number of blank pixels at a left edge of the window and is similar to the blank start pixel value in the word 3 of the window descriptor. The left edge preferably indicates a starting location of the window on a scan line, and is similar to the window x-start value in the word 3 of the window descriptor. The filter enable parameter preferably enables a filter during a conversion of graphics data from a YUV 4:4:4 format to a YUV 4:2:2 format and is similar to the window filter enable parameter in word 3 of the window descriptor. Some YUV 4:4:4 data may contain higher frequency content than others, which may be filtered by enabling a low pass filter during a conversion to the YUV 4:2:2 format. The window size value preferably indicates the actual horizontal size of the window and is similar to the window x-size value in word 3 of the window descriptor.

When the composition of the last window of the last display line is completed, an empty-line header is preferably placed into the FIFO so that the display engine may release the display line for display.

Packetized data structures have been used primarily in the communication world where large amount of data needs to be transferred between hardware using a physical data link (e.g., wires). The idea is not known to have been used in the graphics world where localized and small data control structures need to be transferred between different design entities without requiring a large off-chip memory as a buffer. In one embodiment of the present system, header packets are used, and a general-purpose FIFO is used for routing. Routing may be accomplished in a relatively simple manner in the preferred embodiment because the write port of the FIFO is the only interface.

In the preferred embodiment, the graphics FIFO is a synchronous 32×33 FIFO built with a static dual-port RAM with one read port and one write port. The write port preferably is synchronous to a 81 MHz memory clock while the read port may be asynchronous (not synchronized) to the memory clock. The read port is preferably synchronous to a graphics processing clock, which runs preferably at 81 MHz, but not necessarily synchronized to the memory clock. Two graphics FIFO pointers are preferably generated, one for the read port and one for the write port. In this embodiment, each graphics FIFO pointer is a 6-bit binary counter which ranges from 000000b to 111111b, i.e., from 0 to 63. The graphics FIFO is only 32 words deep and requires only 5 bits to represent each 33-bit word in the graphics FIFO. An extra bit is preferably used to distinguish between FIFO full and FIFO empty states.

The graphics data words preferably include the 1-bit data type and 32-bit graphics data bits. The data type is 0 for the graphics data words. In order to adhere to a common design practice that generally limits the size of a DMA burst into a FIFO to half the size of the FIFO, the number of graphics data words in one DMA burst preferably does not exceed 16.

In an alternate embodiment, a graphics display FIFO is not used. In this embodiment, the graphics converter processes data from memory at the rate that it is read from memory. The memory and conversion functions are in a same clock domain. Other suitable FIFO designs may be used.

Figure 8:
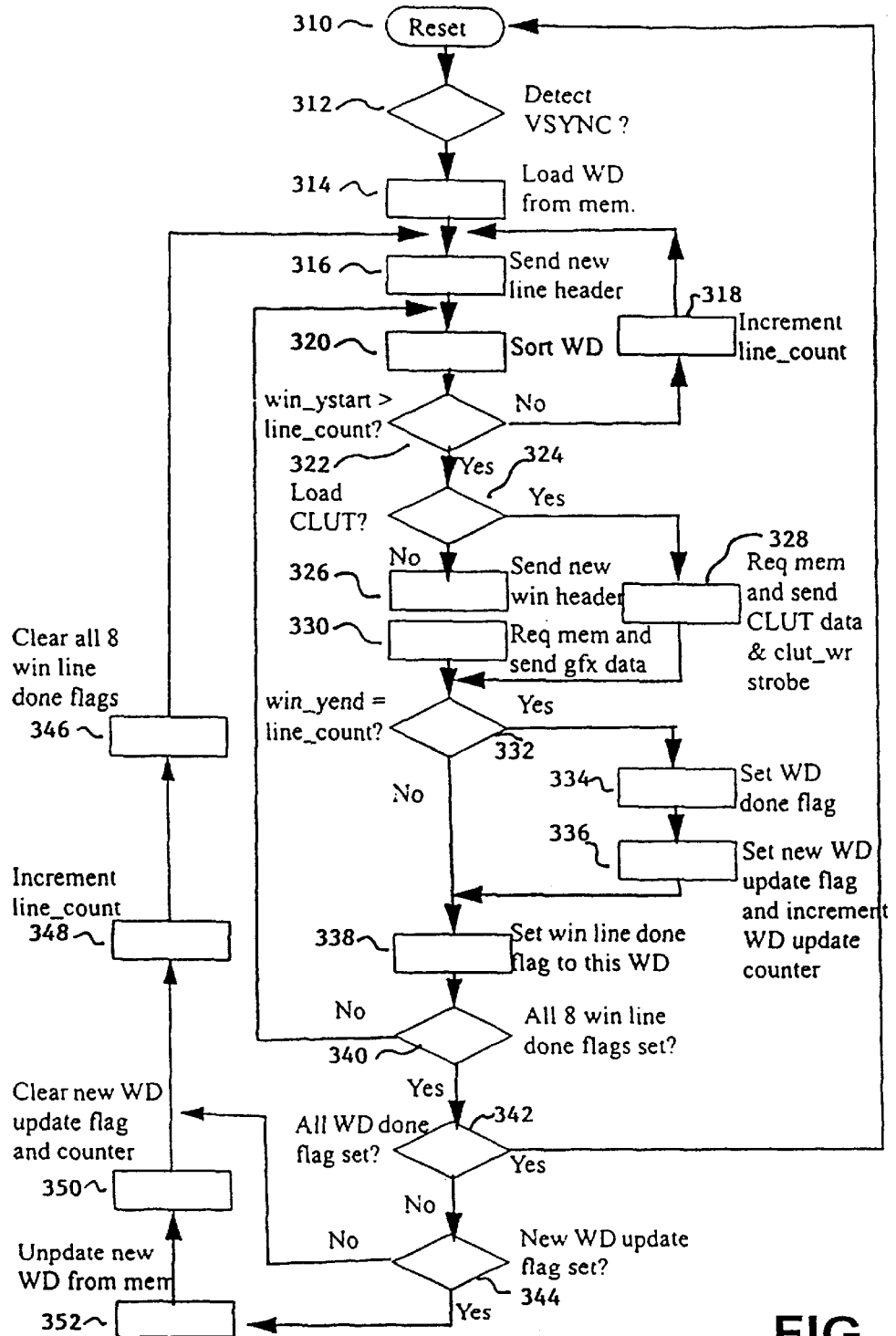
FIG. 8 is a flow diagram of a graphics window control data passing mechanism and a color look-up table loading mechanism.

Referring to FIG. 8, a flow diagram illustrates a process for loading and processing window descriptors. First the system is preferably reset in step 310. Then the system in step 312 preferably checks for a vertical sync ("VSYNC"). When the VSYNC is received, the system in step 314 preferably proceeds to load window descriptors into the window controller from the external SDRAM or other suitable memory over the DMA channel for window descriptors. The window controller may store up to eight window descriptors in one embodiment of the present invention.

The step in step 316 preferably sends a new line header indicating the start of a new display line. The system in step 320 preferably sorts the window descriptors in accordance with the process described in reference to FIG. 7. Although sorting is indicated as a step in this flow diagram, sorting actually may be a continuous process of selecting the bottom-most window, i.e., the window to be processed. The system in step 322 preferably checks to determine if a starting display line of the window is greater than the line count of the current display line. If the starting display line of the window is greater than the line count, i.e., if the current display line is above the starting display line of the bottom most window, the current display line is a blank line. Thus, the system in step 318 preferably increments the line count and sends another new line header in step 316. The process of sending a new line header and sorting window descriptor continues as long as the starting display line of the bottom most (in layer order) window is below the current display line.

The display engine and the associated graphics filter preferably operate in one of two modes, a field mode and a frame mode. In both modes, raw graphics data associated with graphics windows is preferably stored in frame format, including lines from both interlaced fields in the case of an interlaced display. In the field mode, the display engine preferably skips every other display line during processing. In the field mode, therefore, the system in step 318 preferably increments the line count by two each time to skip every other line. In the frame mode, the display engine processes every display line sequentially. In the frame mode, therefore, the system in step 318 preferably increments the line count by one each time.

When the system in step 322 determines that the starting display of the window is greater than the line count, the system in step 324 preferably determines from the header packet whether the window descriptor is for displaying a window or re-loading the CLUT. If the window header indicates that the window descriptor is for re-loading CLUT, the system in step 328 preferably sends the CLUT data to the CLUT and turns on the CLUT write strobe to load CLUT.

If the system in step 324 determines that the window descriptor is for displaying a window, the system in step 326 preferably sends a new window header to indicate that graphics data words for a new window on the display line are going to be transferred into the graphics FIFO. Then, the system in step 330 preferably requests the DMA module to send graphics data to the graphics FIFO over the DMA channel for graphics data. In the event the FIFO does not have sufficient space to store graphics data in a new data packet, the system preferably waits until such space is made available.

When graphics data for a display line of a current window is transferred to the FIFO, the system in step 332 preferably determines whether the last line of the current window has been transferred. If the last line has been transferred, a window descriptor done flag associated with the current window is preferably set. The window descriptor done flag indicates that the graphics data associated with the current window descriptor 3has been completely transferred. When the window descriptor done flag is set, i.e., when the current window descriptor is completely processed, the system sets a window descriptor done flag in step 334. Then the system in step 336 preferably sets a new window descriptor update flag and increments a window descriptor update counter to indicate that a new window descriptor is to be copied from the external memory.

Regardless of whether the last line of the current window has been processed, the system in step 338 preferably sets the window line done flag for the current window descriptor to signify that processing of this window descriptor on the current display line has been completed. The system in step 340 preferably checks the window line done flags associated with all eight window descriptors to determine whether they are all set, which would indicate that all the windows of the current display line have been processed. If not all window line done flags are set, the system preferably proceeds to step 320 to sort the window descriptors and repeat processing of the new bottom-most window descriptor.

If all eight window line done flags are determined to be set in step 340, all window descriptors on the current display line have been processed. In this case, the system in step 342 preferably checks whether an all window descriptor done flag has been set to determine whether all window descriptors have been processed completely. The all window descriptor done flag is set when processing of all window descriptors in the current frame or field have been processed completely. If the all window descriptor done flag is set, the system preferably returns to step 310 to reset and awaits another VSYNC in step 312. If not all window descriptors have been processed, the system in step 344 preferably determines if the new window descriptor update flag has been set. In the preferred embodiment, this flag would have been set in step 334 if the current window descriptor has been completely processed.

When the new window descriptor update flag is set, the system in step 352 preferably sets up the DMA to transfer a new window descriptor from the external memory. Then the system in step 350 preferably clears the new window descriptor update flag. After the system clears the new window descriptor update flag or when the new window descriptor update flag is not set in the first place, the system in step 348 preferably increments a line counter to indicate that the window descriptors for a next display line should be processed. The system in step 346 preferably clears all eight window line done flags to indicate that none of the window descriptors have been processed for the next display line. Then the system in step 316 preferably initiates processing of the new display line by sending a new line header to the FIFO.

Figure 9:
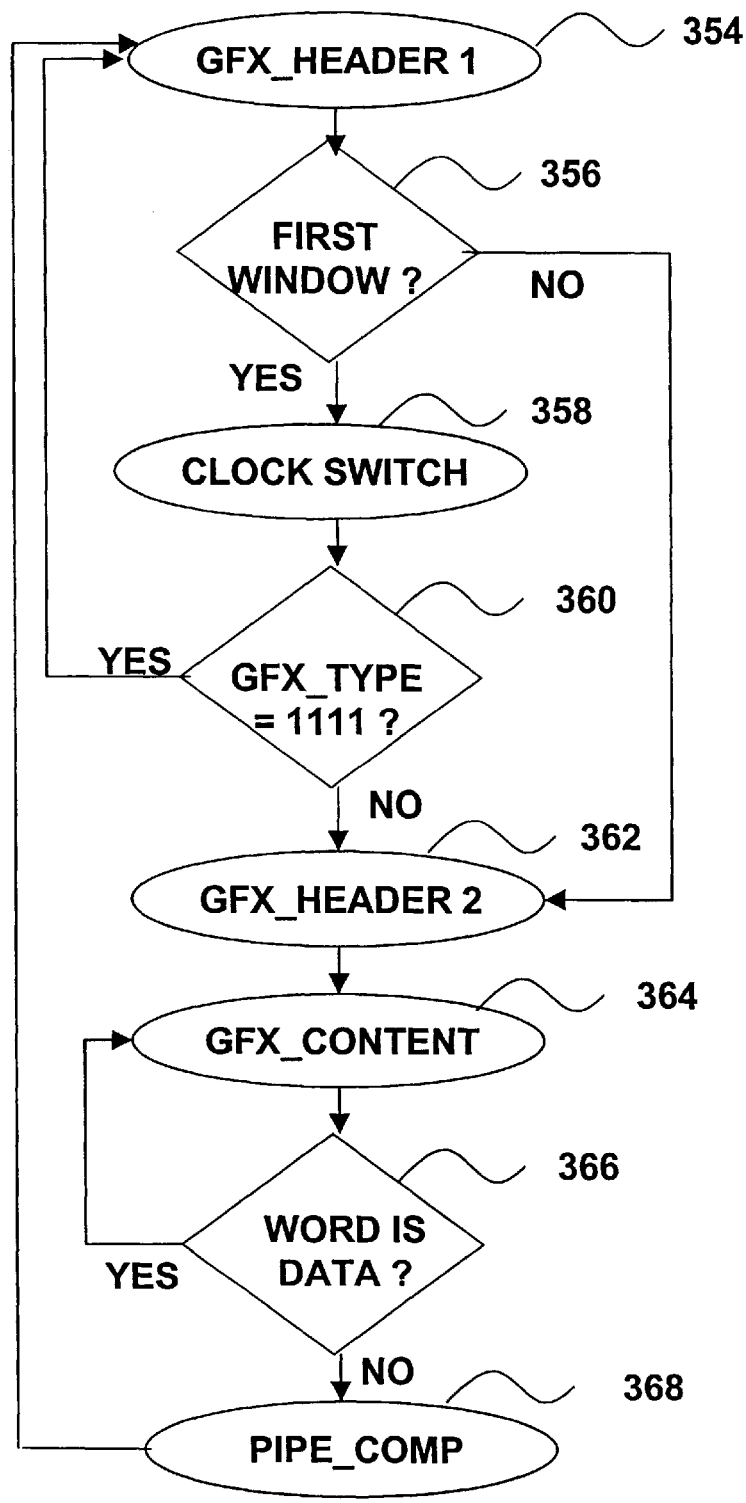
FIG. 9 is a state diagram of a state machine in a graphics converter that may be used during processing of header packets.

In the preferred embodiment, the graphics converter in the display engine converts raw graphics data having various different formats into a common format for subsequent compositing with video and for display. The graphics converter preferably includes a state machine that changes state based on the content of the window data packet. Referring to FIG. 9, the state machine in the graphics converter preferably controls unpacking and processing of the header packets. A first header word processing state 354 is preferably entered wherein a first window parameter of the first header word is checked (step 356) to determine if the window data packet is for a first graphics window of a new line. If the header packet is not for a first window of a new line, after the first header word is processed, the state preferably changes to a second header word processing state 362.

If the header packet is for a first graphics window of a new line, the state machine preferably enters a clock switch state 358. In the clock switch state, the clock for a graphics line buffer which is going to store the new line switches from a display clock to a memory clock, e.g., from a 13.5 MHz clock to a 81 MHz clock. From the clock switch state, a graphics type in the first header word is preferably checked (step 360) to determine if the header packet represents an empty line. A graphics type of 1111b preferably refers to an empty line.

If the graphics type is 1111b, the state machine enters the first header word processing state 354, in which the first header word of the next header packet is processed. If the graphics type is not 1111b, i.e. the display line is not empty, the second header word is processed. Then the state machine preferably enters a graphics content state 364 wherein words from the FIFO are checked (step 366) one at a time to verify that they are data words. The state machine preferably remains in the graphics content state as long as each word read is a data word. While in the graphics content state, if a word received is not a data word, i.e., it is a first or second header word, then the state machine preferably enters a pipeline complete state 368 and then to the first header processing state 354 where reading and processing of the next window data packet is commenced.

Figure 10:
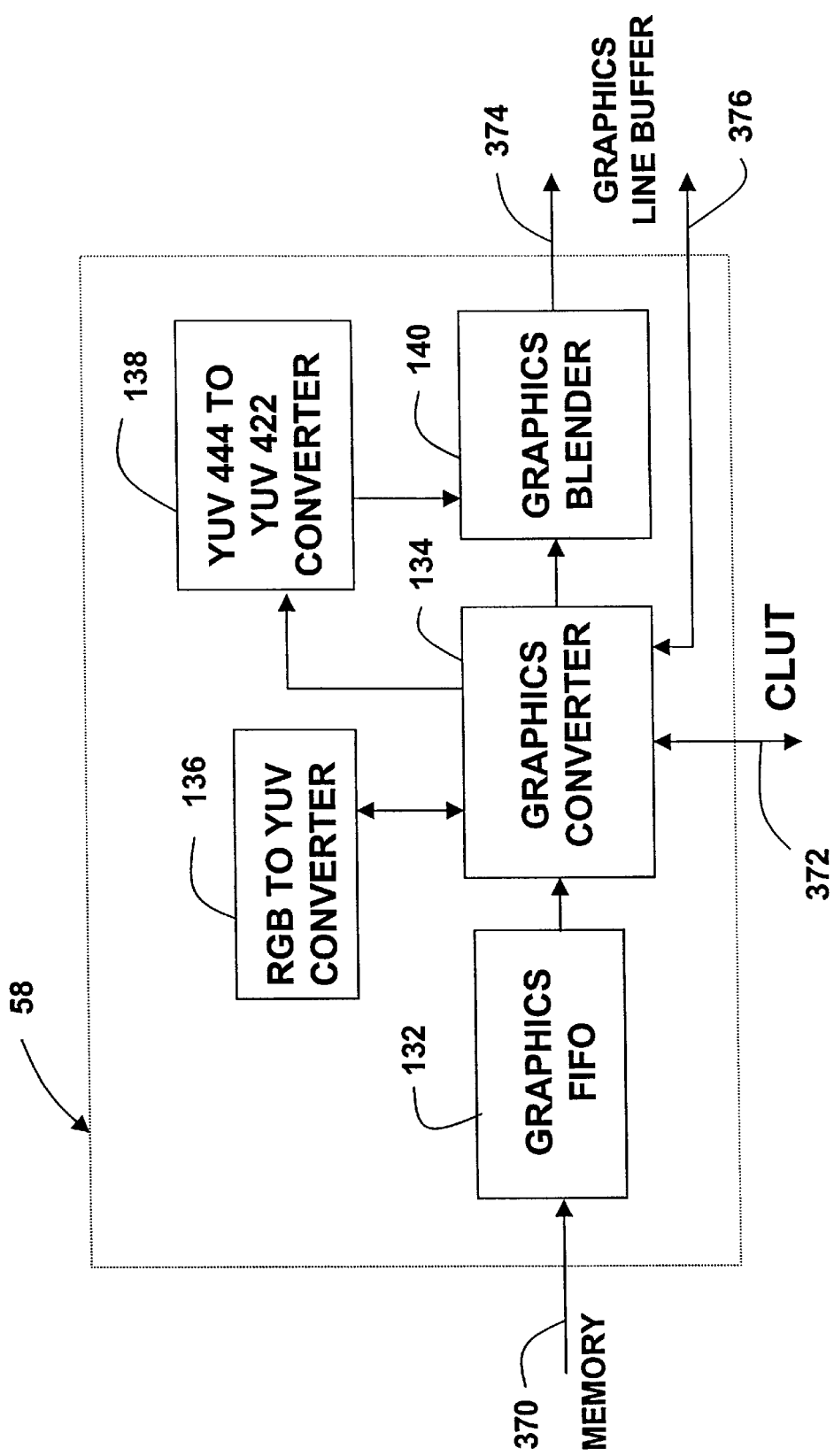
FIG. 10 is a block diagram of an embodiment of a display engine.

Referring to FIG. 10, the display engine 58 is preferably coupled to memory over a memory interface 370 and a CLUT over a CLUT interface 372. The display engine preferably includes the graphics FIFO 132 which receives the header packets and the graphics data from the memory controller over the memory interface. The graphics FIFO preferably provides received raw graphics data to the graphics converter 134 which converts the raw graphics data into the common compositing format. During the conversion of graphics format, the RGB to YUV converter 136 and data from the CLUT over the CLUT interface 372 are used to convert RGB formatted data and CLUT formatted data, respectively.

The graphics converter preferably processes all of the window layers of each scan line in half the time, or less, of an interlaced display line, due to the need to have lines from both fields available in the SRAM for use by the graphics filter when frame mode filtering is enabled. The graphics converter operates at 81 MHz in one embodiment of the present invention, and the graphics converter is able to process up to eight windows on each can line and up to three full width windows.

For example, with a 13.5 MHz display clock, if the graphics converter processes 81 Mpixels per second, it can convert three windows, each covering the width of the display, in half of the active display time of an interlaced scan line. In one embodiment of the present invention, the graphics converter processes all the window layers of each scan line in half the time of an interlaced display line, due to the need to have lines from both fields available in the SRAM for use by the graphics filter. In practice, there may be some more time available since the active display time leaves out the blanking time, while the graphics converter can operate continuously.

Graphics pixels are preferably read from the FIFO in raw graphics format, using one of the multiple formats allowed in the present invention and specified in the window descriptor. Each pixel may occupy as little as two bits or as much as 16 bits in the preferred embodiment. Each pixel is converted to a YUVa24 format (also referred to as aYUV 4:4:2:2), such as two adjacent pixels sharing a UV pair and having unique Y and alpha values, and each of the Y, U, V and alpha components occupying eight bits. The conversion process is generally dependent on the pixel format type and the alpha specification method, both of which are indicated by the window descriptor for the currently active window. Preferably, the graphics converter uses the CLUT memory to convert CLUT format pixels into RGB or YUV pixels.

Conversions of RGB pixels may require conversion to YUV, and therefore, the graphics converter preferably includes a color space converter. The color space converter preferably is accurate for all coefficients. If the converter is accurate to eight or nine bits it can be used to accurately convert eight bit per-component graphics, such as CLUT entries with this level of accuracy or RGB24 images.

The graphics converter preferably produces one converted pixel per clock cycle, even when there are multiple graphics pixels packed into one word of data from the FIFO. Preferably the graphics processing clock, which preferably runs at 81 MHz, is used during the graphics conversion. The graphics converter preferably reads data from the FIFO whenever both conditions are met, including that the converter is ready to receive more data, and the FIFO has data ready. The graphics converter preferably receives an input from a graphics blender, which is the next block in the pipeline, which indicates when the graphics blender is ready to receive more converted graphics data. The graphics converter may stall if the graphics blender is not ready, and as a result, the graphics converter may not be ready to receive graphics data from the FIFO.

The graphics converter preferably converts the graphics data into a YUValpha ("YUVa") format. This YUVa format includes YUV 4:2:2 values plus an 8-bit alpha value for every pixel, and as such it occupies 24 bits per pixel; this format is alternately referred to as aYUV 4:4:2:2. The YUV444-to-YUV422 converter 138 converts graphics data with the aYUV 4:4:4:4 format from the graphics converter into graphics data with the aYUV 4:4:2:2 format and provides the data to the graphics blender 140. The YUV444-to-YUV422 converter preferably has a capacity of performing low pass filtering to filter out high frequency components when needed. The graphics converter also sends and receives clock synchronization information to and from the graphics line buffers over a clock control interface 376.

When provided with the converted graphics data, the graphics blender 140 preferably composites graphics windows into graphics line buffers over a graphics line buffer interface 374. The graphics windows are alpha blended into blended graphics and preferably stored in graphics line buffers.

IV. Color Look-up Table Loading Mechanism

A color look-up table ("CLUT") is preferably used to supply color and alpha values to the raw graphics data formatted to address information contents of the CLUT. For a window surface based display, there may be multiple graphics windows on the same display screen with different graphics formats. For graphics windows using a color look-up table (CLUT) format, it may be necessary to load specific color look-up table entries from external memory to on-chip memory before the graphics window is displayed.

The system preferably includes a display engine that processes graphics images formatted in a plurality of formats including a color look up table (CLUT) format. The system provides a data structure that describes the graphics in a window, provides a data structure that provides an indicator to load a CLUT, sorts the data structures into a list according to the location of the window on the display, and loads conversion data into a CLUT for converting the CLUT-formatted data into a different data format according to the sequence of data structures on the list.

In the preferred embodiment, each window on the display screen is described with a window descriptor. The same window descriptor is used to control CLUT loading as the window descriptor used to display graphics on screen. The window descriptor preferably defines the memory starting address of the graphics contents, the x position on the display screen, the width of the window, the starting vertical display line and end vertical display line, window layer, etc. The same window structure parameters and corresponding fields may be used to define the CLUT loading. For example, the graphics contents memory starting address may define CLUT memory starting address; the width of graphics window parameter may define the number of CLUT entries to be loaded; the starting vertical display line and ending vertical display line parameters may be used to define when to load the CLUT; and the window layer parameter may be used to define the priority of CLUT loading if several windows are displayed at the same time, i.e., on the same display line.

In the preferred embodiment, only one CLUT is used. As such, the contents of the CLUT are preferably updated to display graphics windows with CLUT formatted data that is not supported by the current content of the CLUT. One of ordinary skill in the art would appreciate that it is straightforward to use more than one CLUT and switch back and forth between them for different graphics windows.

In the preferred embodiment, the CLUT is closely associated with the graphics converter. In one embodiment of the present invention, the CLUT consists of one SRAM with 256 entries and 32 bits per entry. In other embodiments, the number of entries and bits per entry may vary. Each entry contains three color components; either RGB or YUV format, and an alpha component. For every CLUT-format pixel converted, the pixel data may be used as the address to the CLUT and the resulting value may be used by the converter to produce the YUVa (or alternatively RGBa) pixel value.

The CLUT may be re-loaded by retrieving new CLUT data via the direct memory access module when needed. It generally takes longer to re-load the CLUT than the time available in a horizontal blanking interval. Accordingly, in the preferred embodiment, a whole scan line time is allowed to re-load the CLUT. While the CLUT is being reloaded, graphics images in non-CLUT formats may be displayed. The CLUT reloading is preferably initiated by a window descriptor that contains information regarding CLUT reloading rather than a graphics window display information.

Figure 11:
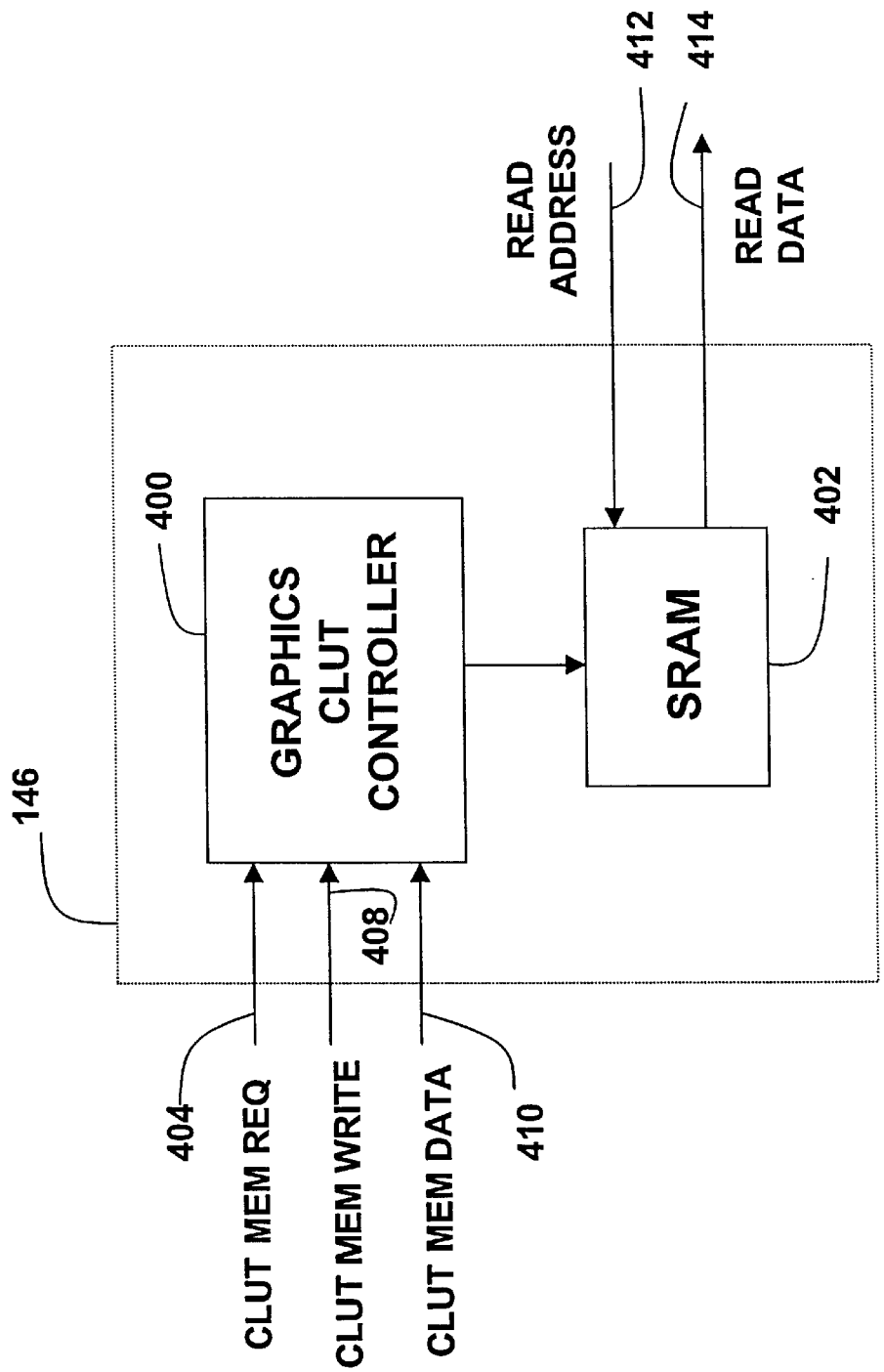
FIG. 11 is a block diagram of an embodiment of a color look-up table (CLUT)

Referring to FIG. 11, the graphics CLUT 146 preferably includes a graphics CLUT controller 400 and a static dual-port RAM (SRAM) 402. The SRAM preferably has a size of 256×32 which corresponds to 256 entries in the graphics CLUT. Each entry in the graphics CLUT preferably has 32 bits composed of Y+U+V+alpha from the most significant bit to the least significant bit. The size of each field, including Y, U, V, and alpha, is preferably eight bits.

The graphics CLUT preferably has a write port that is synchronized to a 81 MHz memory clock and a read port that may be asynchronous to the memory clock. The read port is preferably synchronous to the graphics processing clock, which runs preferably at 81 MHz, but not necessarily synchronized to the memory clock. During a read operation, the static dual-port RAM ("SRAM") is preferably addressed by a read address which is provided by graphics data in the CLUT images. During the read operation, the graphics data is preferably output as read data 414 when a memory address in the CLUT containing that graphics data is addressed by a read address 412.

During write operations, the window controller preferably controls the write port with a CLUT memory request signal 404 and a CLUT memory write signal 408. CLUT memory data 410 is also preferably provided to the graphics CLUT via the direct memory access module from the external memory. The graphics CLUT controller preferably receives the CLUT memory data and provides the received CLUT memory data to the SRAM for writing.

Figure 12:
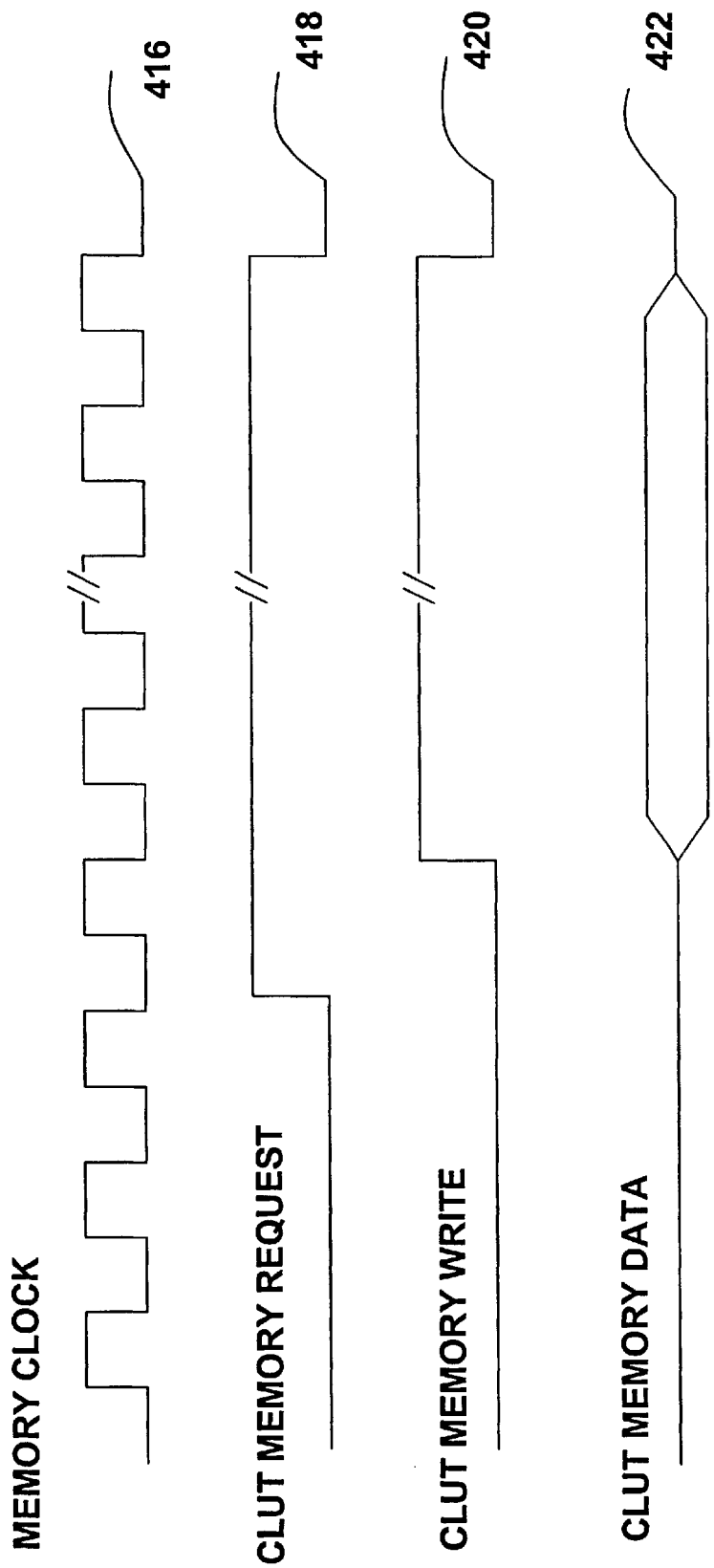
FIG. 12 is a timing diagram of signals that may be used to load a CLUT.

Referring to FIG. 12, an exemplary timing diagram shows different signals involved during a writing operation of the CLUT. The CLUT memory request signal 418 is asserted when the CLUT is to be re-loaded. A rising edge of the CLUT memory request signal 418 is used to reset a write pointer associated with the write port. Then the CLUT memory write signal 420 is asserted to indicate the beginning of a CLUT re-loading operation. The CLUT memory data 422 is provided synchronously to the 81 MHz memory clock 416 to be written to the SRAM. The write pointer associated with the write port is updated each time the CLUT is loaded with CLUT memory data.

In the preferred embodiment, the process of reloading a CLUT is associated with the process of processing window descriptors illustrated in FIG. 8 since CLUT re-loading is initiated by a window descriptor. As shown in steps 324 and 328 of FIG. 8, if the window descriptor is determined to be for reloading CLUT in step 324, the system in step 328 sends the CLUT data to the CLUT. The window descriptor for the CLUT reloading may appear anywhere in the window descriptor list. Accordingly, the CLUT reloading may take place at any time whenever CLUT data is to be updated.

Using the CLUT loading mechanism in one embodiment of the present invention, more than one window with different CLUT tables may be displayed on the same display line. In this embodiment, only the minimum required entries are preferably loaded into the CLUT, instead of loading all the entries every time. The loading of only the minimum required entries may save memory bandwidth and enables more functionality. The CLUT loading mechanism is preferably relatively flexible and easy to control, making it suitable for various applications. The CLUT loading mechanism of the present invention may also simplify hardware design, as the same state machine for the window controller may be used for CLUT loading. The CLUT preferably also shares the same DMA logic and layer/priority control logic as the window controller.

V. Graphics Line Buffer Control Scheme

In the preferred embodiment of the present invention, the system preferably blends a plurality of graphics images using line buffers. The system initializes a line buffer by loading the line buffer with data that represents transparent black, obtains control of a line buffer for a compositing operation, composites graphics contents into the line buffer by blending the graphics contents with the existing contents of the line buffer, and repeats the step of compositing graphics contents into the line buffer until all of the graphics surfaces for the particular line have been composited.

The graphics line buffer temporarily stores composited graphics images (blended graphics). A graphics filter preferably uses blended graphics in line buffers to perform vertical filtering and scaling operations to generate output graphics images. In the preferred embodiment, the display engine composites graphics images line by line using a clock rate that is faster than the pixel display rate, and graphics filters run at the pixel display rate. In other embodiments, multiple lines of graphics images may be composited in parallel. In still other embodiments, the line buffers may not be needed. Where line buffers are used, the system may incorporate an innovative control scheme for providing the line buffers containing blended graphics to the graphics filter and releasing the line buffers that are used up by the graphics filter.

The line buffers are preferably built with synchronous static dual-port random access memory ("SRAM") and dynamically switch their clocks between a memory clock and a display clock. Each line buffer is preferably loaded with graphics data using the memory clock and the contents of the line buffer is preferably provided to the graphics filter synchronously to the display clock. In one embodiment of the present invention, the memory clock is an 81 MHz clock used by the graphics converter to process graphics data while the display clock is a 13.5 MHz clock used to display graphics and video signals on a television screen. Other embodiments may use other clock speeds.

Figure 13:
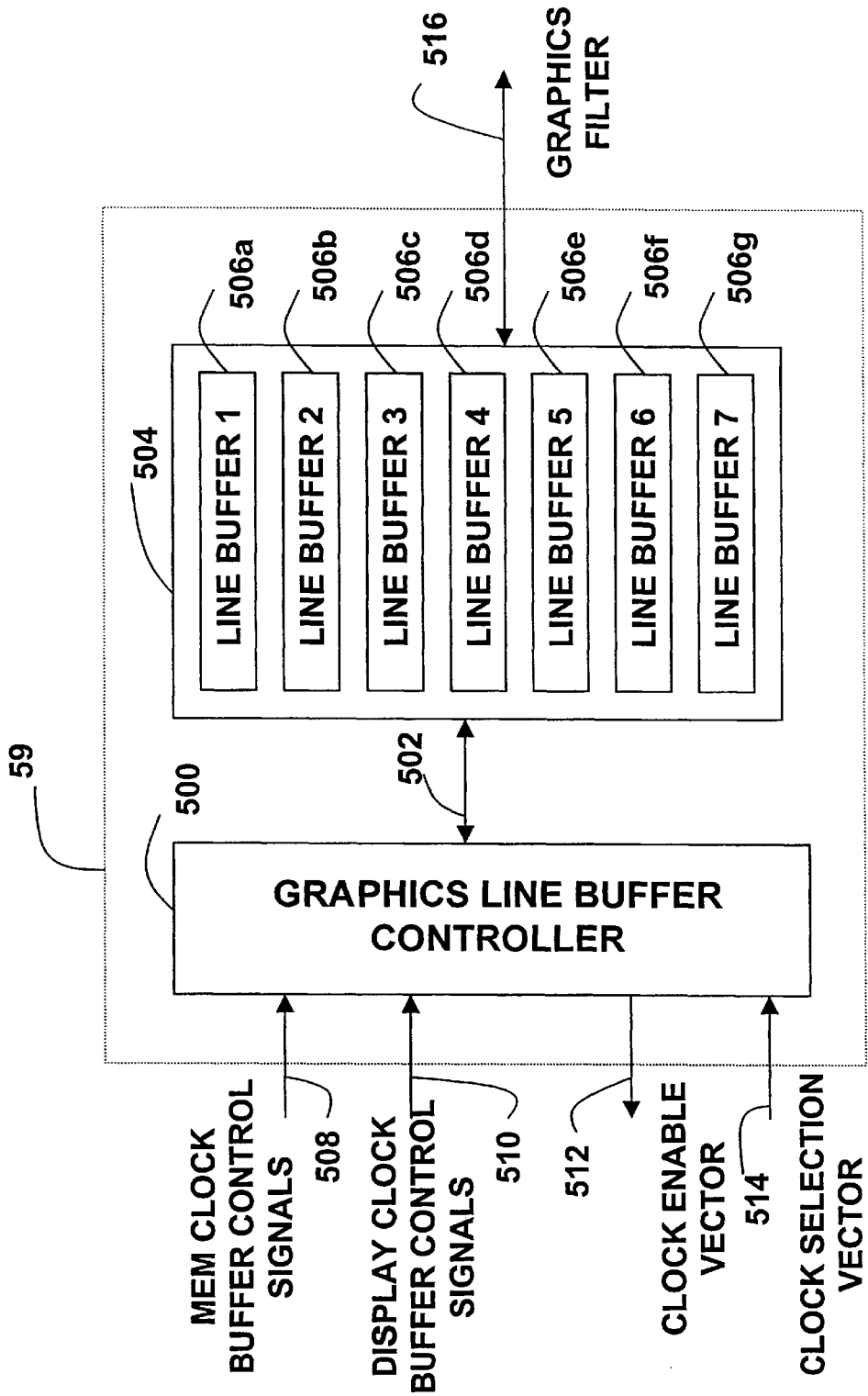
FIG. 13 is a block diagram illustrating exemplary graphics line buffers.

Referring to FIG. 13, the graphics line buffer preferably includes a graphics line buffer controller 500 and line buffers 504. The graphics line buffer controller 500 preferably receives memory clock buffer control signals 508 as well as display clock buffer control signals 510. The memory clock control signals and the display clock control signals are used to synchronize the graphics line buffers to the memory clock and the display clock, respectively. The graphics line buffer controller receives a clock selection vector 514 from the display engine to control which graphics line buffers are to operate in which clock domain. The graphics line buffer controller returns a clock enable vector to the display engine to indicate clock synchronization settings in accordance with the clock selection vector.

In the preferred embodiment, the line buffers 504 include seven line buffers 506*a–g*. The line buffers temporarily store lines of YUVa24 graphics pixels that are used by a subsequent graphics filter. This allows for four line buffers to be used for filtering and scaling, two are available for progressing by one or two lines at the end of every line, and one for the current compositing operation. Each line buffer may store an entire display line. Therefore, in this embodiment, the total size of the line buffers is (720 pixels/display line)*(3 bytes/pixel)*(7 lines)=15,120 bytes.

Each of the ports to the SRAM including line buffers is 24 bits wide to accommodate graphics data in YUVa24 format in this embodiment of the present invention. The SRAM has one read port and one write port. One read port and one write port are used for the graphics blender interface, which performs a read-modify-write typically once per clock cycle. In another embodiment of the present invention, an SRAM with only one port is used. In yet another embodiment, the data stored in the line buffers may be YUVa32 (4:4:4:4), RGBa32, or other formats. Those skilled in the art would appreciate that it is straightforward to vary the number of graphics line buffers, e.g., to use different number of taps for filter, the format of graphics data or the number of read and write ports for the SRAM.

The line buffers are preferably controlled by the graphics line buffer controller over a line buffer control interface 502. Over this interface, the graphics line buffer controller transfers graphics data to be loaded to the line buffers. The graphics filter reads contents of the line buffers over a graphics line buffer interface 516 and clears the line buffers by loading them with transparent black pixels prior to releasing them to be loaded with more graphics data for display.

Figure 14:
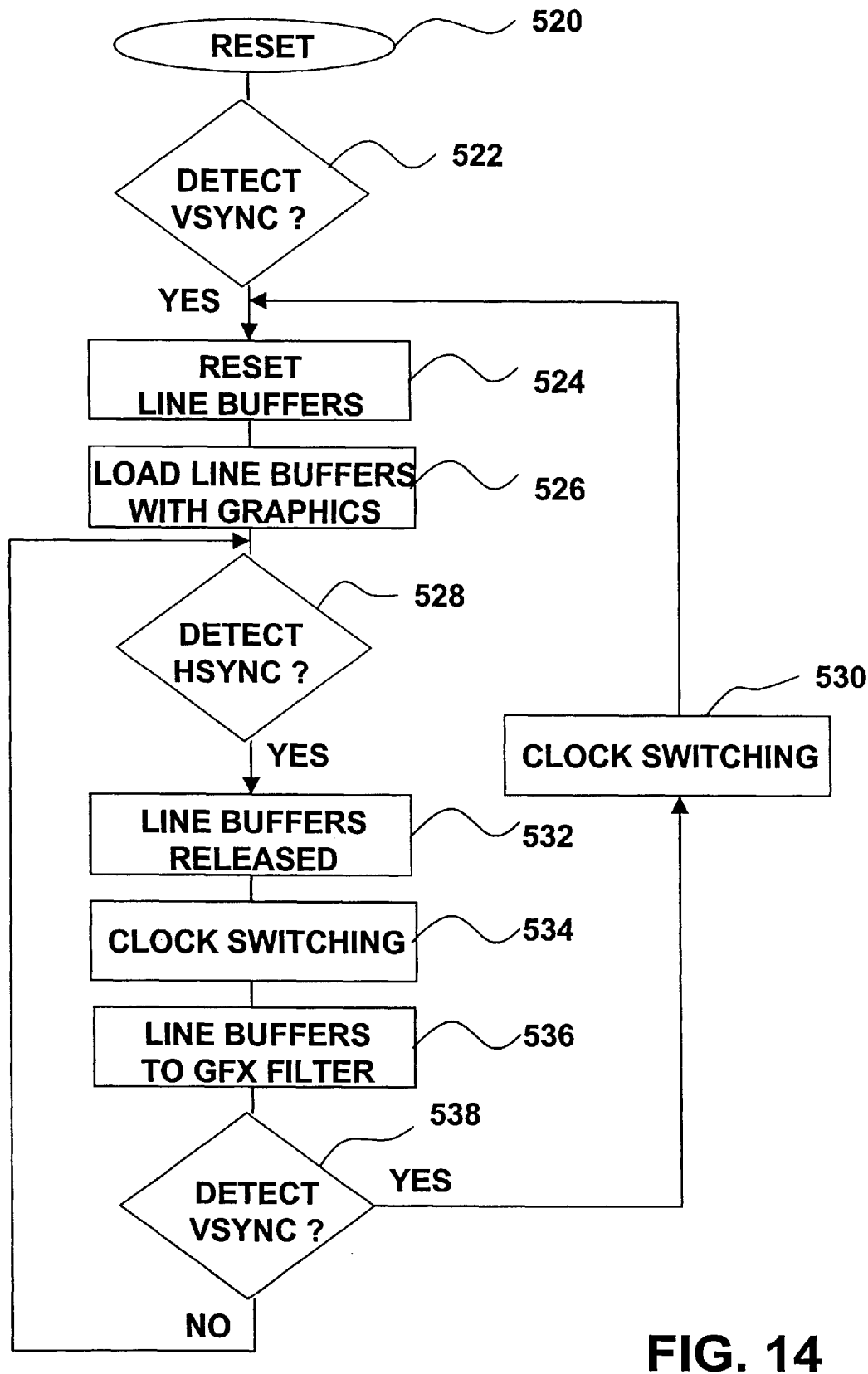
FIG. 14 is a flow diagram of a system for controlling the graphics line buffers of FIG. 13.

Referring FIG. 14, a flow diagram of a process of using line buffers to provide composited graphics data from a display engine to a graphics filter is illustrated. After the graphics display system is reset in step 520, the system in step 522 receives a vertical sync (VSYNC) indicating a field start. Initially, all line buffers preferably operate in the memory clock domain. Accordingly, the line buffers are synchronized to the 81 MHz memory clock in one embodiment of the present invention. In other embodiments, the speed of the memory clock may be different from 81 MHz, or the line buffers may not operate in the clock domain of the main memory. The system in step 524 preferably resets all line buffers by loading them with transparent black pixels.

The system in step 526 preferably stores composited graphics data in the line buffers. Since all buffers are cleared at every field start by the display engine to the equivalent of transparent black pixels, the graphics data may be blended the same way for any graphics window, including the first graphics window to be blended. Regardless of how many windows are composited into a line buffer, including zero windows, the result is preferably always the correct pixel data.

The system in step 528 preferably detects a horizontal sync (HSYNC) which signifies a new display line. At the start of each display line, the graphics blender preferably receives a line buffer release signal from the graphics filter when one or more line buffers are no longer needed by the graphics filter. Since four line buffers are used with the four-tap graphics filter at any given time, one to three line buffers are preferably made available for use by the graphics blender to begin constructing new display lines in them. Once a line buffer release signal is recognized, an internal buffer usage register is updated and then clock switching is performed to enable the display engine to work on the newly released one to three line buffers. In other embodiments, the number of line buffers may be more or less than seven, and more or less than three line buffers may be released at a time.

The system in step 534 preferably performs clock switching. Clock switching is preferably done in the memory clock domain by the display engine using a clock selection vector. Each bit of the clock selection vector preferably corresponds to one of the graphics line buffers. Therefore, in one embodiment of the present invention with seven graphics line buffers, there are seven bits in the clock selection vector. For example, a corresponding bit of logic 1 in the clock selection vector indicates that the line buffer operates in the memory clock domain while a corresponding bit of logic 0 indicates that the line buffer operates in the display clock domain.

Other embodiments may have different numbers of line buffers and the number of bits in the clock selection vector may vary accordingly. Clock switching logic preferably switches between the memory clock and the display clock in accordance with the clock selection vector. The clock selection vector is preferably also used to multiplex the memory clock buffer control signals and the display clock buffer control signals.

Since there is preferably no active graphics data at field and line starts, clock switching preferably is done at the field start and the line start to accommodate the graphics filter to access graphics data in real-time. At the field and line starts, clock switching may be done without causing glitches on the display side. Clock switching typically requires a dead cycle time. A clock enable vector indicates that the graphics line buffers are ready to synchronize to the clocks again. The clock enable vector is preferably the same size at the clock selection vector. The clock enable vector is returned to the display engine to be compared with the clock selection vector.

During clock switching, the clock selection vector is sent by the display engine to the graphics line buffer block. The clocks are preferably disabled to ensure a glitch-free clock switching. The graphics line buffers send the clock enable vector to the display engine with the clock synchronization settings requested in the clock selection vector. The display engine compares contents of the clock selection vector and the clock enable vector. When the contents match, the clock synchronization is preferably turned on again.

After the completion of clock switching during the video inactive region, the system in step 536 preferably provides the graphics data in the line buffers to the graphics filter for anti-flutter filtering, sample rate conversion (SRC) and display. At the end of the current display line, the system looks for a VSYNC in step 538. If the VSYNC is detected, the current field has been completed, and therefore, the system in step 530 preferably switches clocks for all line buffers to the memory clock and resets the line buffers in step 524 for display of another field. If the VSYNC is not detected in step 538, the current display line is not the last display line of the current field. The system continues to step 528 to detect another HSYNC for processing and displaying of the next display line of the current field.

VI. Window Soft Horizontal Scrolling Mechanism

Sometimes it is desirable to scroll a graphics window softly, e.g., display text that moves from left to right or from right to left smoothly on a television screen. There are some difficulties that may be encountered in conventional methods that seek to implement horizontal soft scrolling.

Graphics memory buffers are conventionally implemented using low-cost DRAM, SDRAM, for example. Such memory devices are typically slow and may require each burst transfer to be within a page. Smooth (or soft) horizontal scrolling, however, preferably enables the starting address to be set to any arbitrary pixel. This may conflict with the transfer of data in bursts within the well-defined pages of DRAM. In addition, complex control logic may be required to monitor if page boundaries are to be crossed during the transfer of pixel maps for each step during soft horizontal scrolling.

In the preferred embodiment, an implementation of a soft horizontal scrolling mechanism is achieved by incrementally modifying the content of a window descriptor for a particular graphics window. The window soft horizontal scrolling mechanism preferably enables positioning the contents of graphics windows on arbitrary positions on a display line.

In an embodiment of the present invention, the soft horizontal scrolling of graphics windows is implemented based on an architecture in which each graphics window is independently stored in a normal graphics buffer memory device (SDRAM, EDO-DRAM, DRAM) as a separate object. Windows are composed on top of each other in real time as required. To scroll a window to the left or right, a special field is defined in the window descriptor that tells how many pixels are to be shifted to the left or right.

The system according to the present invention provides a method of horizontally scrolling a display window to the left, which includes the steps of blanking out one or more pixels at a beginning of a portion of graphics data, the portion being aligned with a start address; and displaying the graphics data starting at the first non-blanked out pixel in the portion of the graphics data aligned with the start address.

The system according to the present invention also provides a method of horizontally scrolling a display window to the right which includes the steps of moving a read pointer to a new start address that is immediately prior to a current start address, blanking out one or more pixels at a beginning of a portion of graphics data, the portion being aligned to the new start address, and displaying the graphics data starting at the first non-blanked out pixel in the portion of the graphics data aligned with the new start address.

In practice, each graphics window is preferably addressed using an integer word address. For example, if the memory system uses 32 bit words, then the address of the start of a window is defined to be aligned to a multiple of 32 bits, even if the first pixel that is desired to be displayed is not so aligned. Each graphics window also preferably has associated with it a horizontal offset parameter, in units of pixels, that indicates a number of pixels to be ignored, starting at the indicated starting address, before the active display of the window starts. In the preferred embodiment, the horizontal offset parameter is the blank start pixel value in the word 3 of the window descriptor. For example, if the memory system uses 32-bit words and the graphics format of a window uses 8 bits per pixel, each 32-bit word contains four pixels. In this case, the display of the window may ignore one, two or three pixels (8, 16, or 24 bits), causing an effective left shift of one, two, or three pixels.

In the embodiment illustrated by the above example, the memory system uses 32-bit words. In other embodiments, the memory system may use more or less number of bits per word, such as 16 bits per word or 64 bits per word. In addition, pixels in other embodiments may have various different number of bits per pixel, such as 1, 2, 4, 8, 16, 24 and 32.

Figure 15:
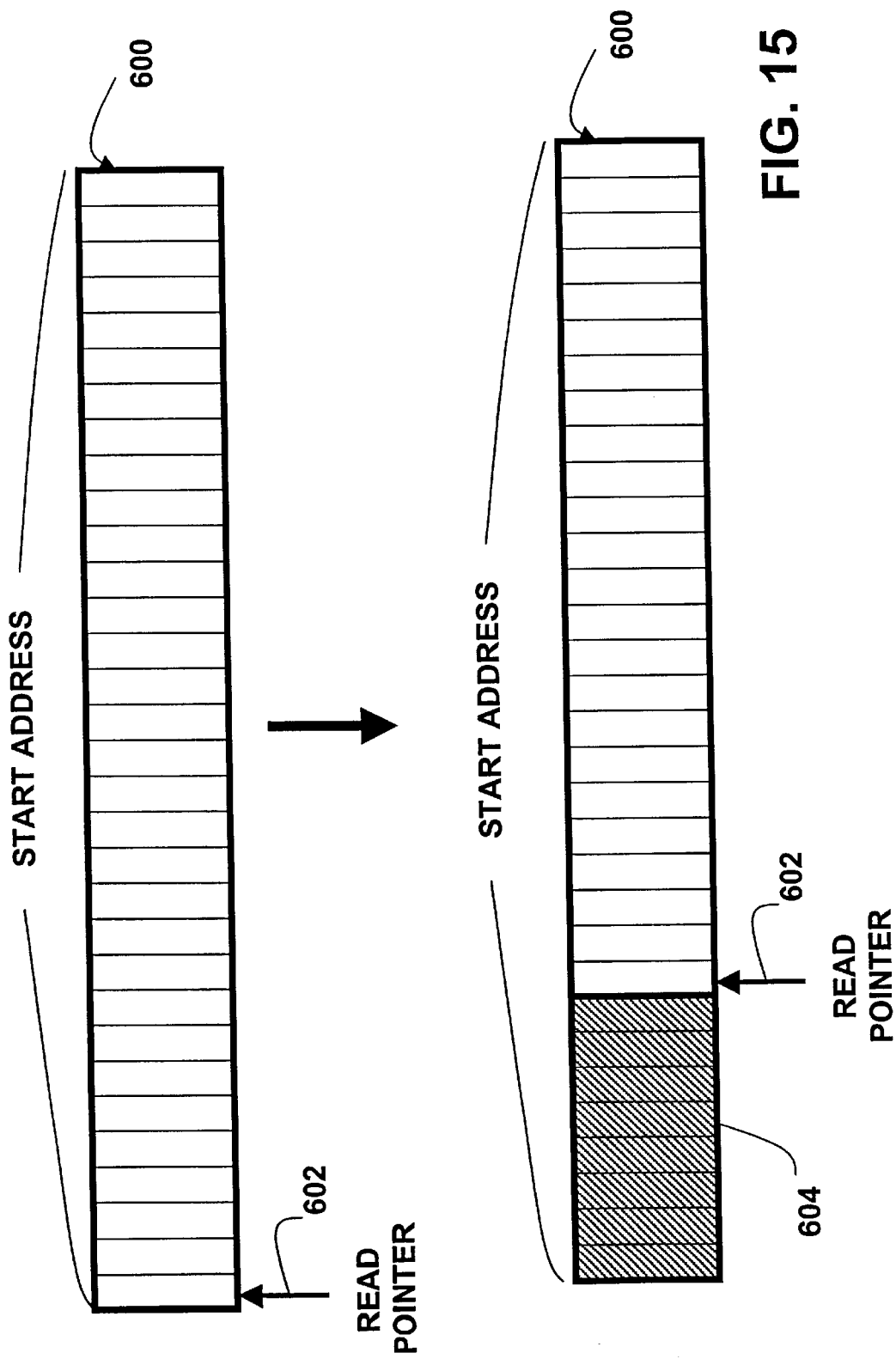
FIG. 15 is a representation of left scrolling using a window soft horizontal scrolling mechanism.

Referring to FIG. 15, in the preferred embodiment, a first pixel (e.g., the first 8 bits) 604 of a 32-bit word 600, which is aligned to the start address, is blanked out. The remaining three 8-bit pixels, other than the blanked out first pixel, are effectively shifted to the left by one pixel. Prior to blanking out, a read pointer 602 points to the first bit of the 32-bit word. After blanking out, the read pointer 602 points to the ninth bit of the 32-bit word.

Further, a shift of four pixels is implemented by changing the start address by one to the next 32-bit word. Shifts of any number of pixels are thereby implemented by a combination of adjusting the starting word address and adjusting the pixel shift amount. The same mechanism may be used for any number of bits per pixel (1, 2, 4, etc.) and any memory word size.

To shift a pixel or pixels to the right, the shifting cannot be achieved simply by blanking some of the bits at the start address since any blanking at the start will simply have an effect of shifting pixels to the left. Further, the shifting to the right cannot be achieved by blanking some of the bits at the end of the last data word of a display line since display of a window starts at the start address regardless of the position of the last pixel to be displayed.

Therefore, in one embodiment of the present invention, when the graphics display is to be shifted to the right, a read pointer pointing at the start address is preferably moved to an address that is just before the start address, thereby making that address the new start address. Then, a portion of the data word aligned with the new start address is blanked out. This provides the effect of shifting the graphics display to the right.

For example, a memory system may use 32-bit words and the graphics format of a window may use 2 bits per pixel, e.g., a CLUT 2 format. If the graphics display is to be shifted by a pixel to the right, the read pointer is moved to an address that is just before the start address, and that address becomes a new start address. Then, the first 30 bits of the 32-bit word that is aligned with the new start address are blanked out. In this case, blanking out of a portion of the 32-bit word that is aligned with the new start address has the effect of shifting the graphics display to the right.

Figure 16:
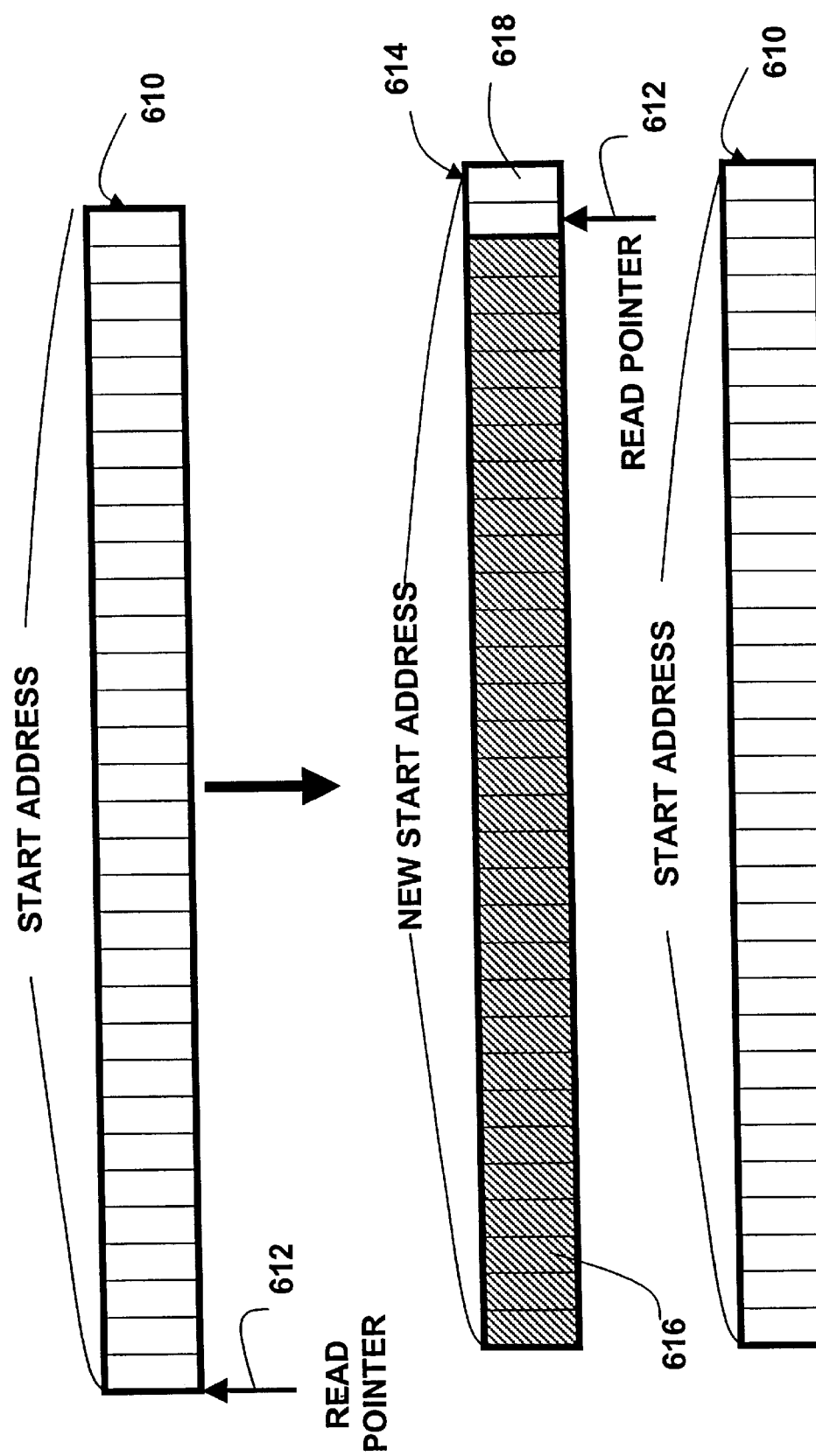
FIG. 16 is a representation of right scrolling using a window soft horizontal scrolling mechanism.

Referring to FIG. 16, a 32-bit word 610 that is aligned with the starting address is shifted to the right by one pixel. The 32-bit word 610 has a CLUT 2 format, and therefore contains 16 pixels. A read pointer 612 points at the beginning of the 32-bit word 610. To shift the pixels in the 32-bit word 610 to the right, an address that is just before the start address is made a new start address. A 32-bit data word 618 is aligned with the new start address. Then, the first 30 bits (15 pixels) 616 of the 32-bit data word 618 aligned with the new start address are blanked out. The read pointer 612 points at a new location, which is the $31^{st}$ bit of the new start address. The $31^{st}$ bit and the $32^{nd}$ bit of the new start address may constitute a pixel 618. Insertion of the pixel 618 in front of 16 pixels of the 32-bit data word 610 effectively shifts those 16 pixels to the right by one pixel.

VII. Anti-Aliased Text and Graphics

TV-based applications, such as interactive program guides, enhanced TV, TV navigators, and web browsing on TV frequently require the display of text and line-oriented graphics on the display. A graphical element or glyph generally represents an image of text or graphics. Graphical element may refer to text glyphs or graphics. In conventional methods of displaying text on TV or computer displays, graphical elements are rendered as arrays of pixels (picture elements) with two states for every pixel, i.e. the foreground and background colors.

In some cases the background color is transparent, allowing video or other graphics to show through. Due to the relatively low resolution of most present day TVs, diagonal and round edges of graphical elements generally show a stair-stepped appearance which may be undesirable; and fine details are constrained to appear as one or more complete pixels (dots), which may not correspond well to the desired appearance. The interlaced nature of TV displays causes horizontal edges of graphical elements, or any portion of graphical elements with a significant vertical gradient, to show a "fluttering" appearance with conventional methods.

Some conventional methods blend the edges of graphical elements with background colors in a frame buffer, by first reading the color in the frame buffer at every pixel where the graphical element will be written, combining that value with the foreground color of the graphical element, and writing the result back to the frame buffer memory. This method requires there to be a frame buffer; it requires the frame buffer to use a color format that supports such blending operations, such as RGB24 or RGB16, and it does not generally support the combination of graphical elements over full motion video, as such functionality may require repeating the read, combine and write back function of all pixels of all graphical elements for every frame or field of the video in a timely manner.

The system preferably displays a graphical element by filtering the graphical element with a low pass filter to generate a multi-level value per pixel at an intended final display resolution and uses the multi-level values as alpha blend values for the graphical element in the subsequent compositing stage.

In one embodiment of the present invention, a method of displaying graphical elements on televisions and other displays is used. A deep color frame buffer with, for example, 16, 24, or 32 bits per pixel, is not required to implement this method since this method is effective with as few as two bits per pixel. Thus, this method may result in a significant reduction in both the memory space and the memory bandwidth required to display text and graphics. The method preferably provides high quality when compared with conventional methods of anti-aliased text, and produces higher display quality than is available with conventional methods that do not support anti-aliased text.

Figure 17:
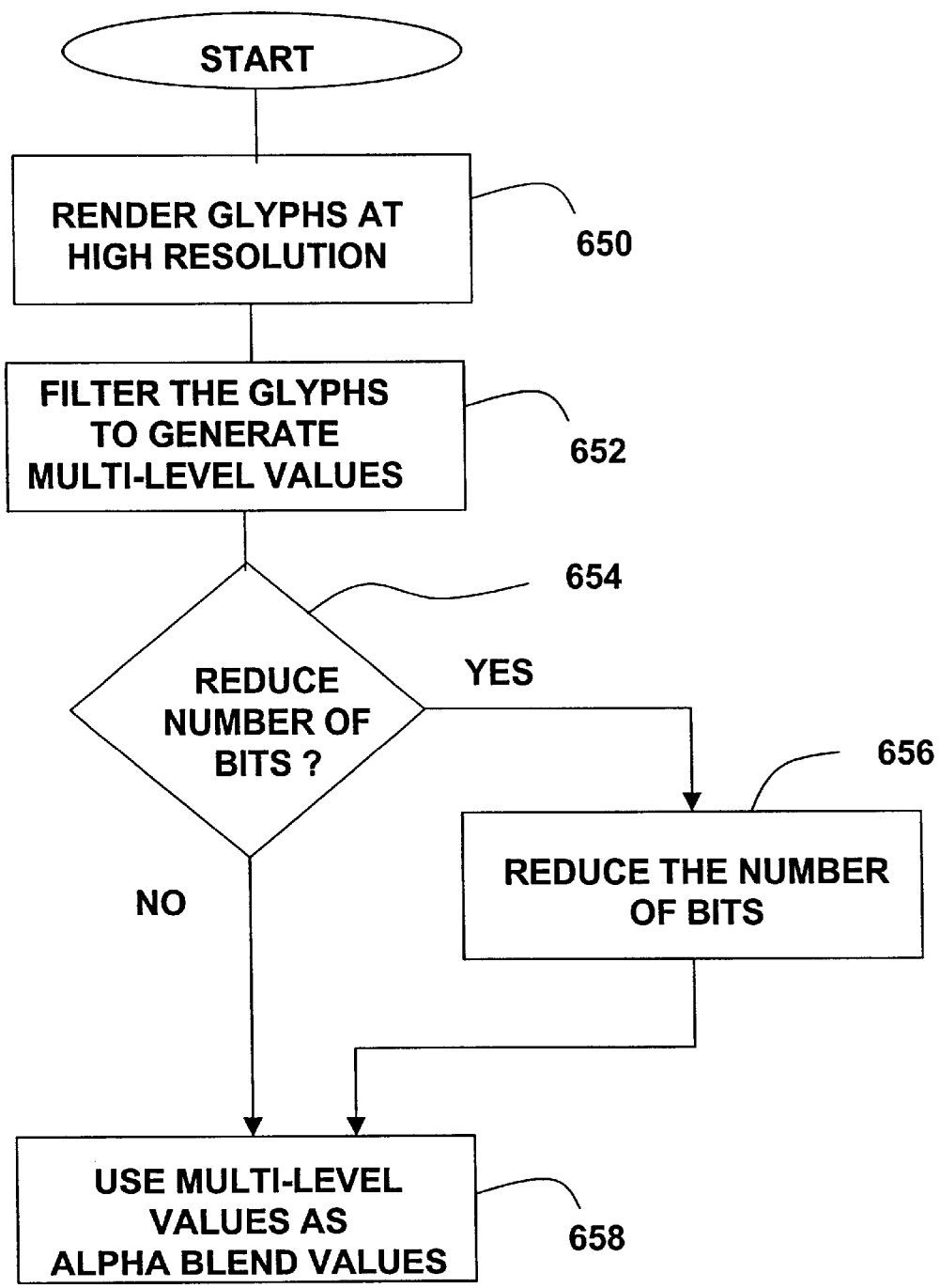
FIG. 17 is a flow diagram illustrating a system that uses graphics elements or glyphs for anti-aliased text and graphics applications.

Referring to FIG. 17, a flow diagram illustrates a process of providing very high quality display of graphical elements in one embodiment of the present invention. First, the bi-level graphical elements are filtered by the system in step 652. The graphical elements are preferably initially rendered by the system in step 650 at a significantly higher resolution than the intended final display resolution, for example, four times the final resolution in both horizontal and vertical axes. The filter may be any suitable low pass filter, such as a "box" filter. The result of the filtering operation is a multi-level value per pixel at the intended display resolution.

The number of levels may be reduced to fit the number of bits used in the succeeding steps. The system in step 654 determines whether the number of levels are to be reduced by reducing the number of bits used. If the system determines that the number of levels are to be reduced, the system in step 656 preferably reduces the number of bits. For example, the result of box-filtering 4×4 super-sampled graphical elements normally results in 17 possible levels; these may be converted through truncation or other means to 16 levels to match a 4 bit representation, or eight levels to match a 3 bit representation, or four levels to match a 2 bit representation. The filter may provide a required vertical axis low pass filter function to provide anti-flutter filter effect for interlaced display.

In step 658, the system preferably uses the resulting multi-level values, either with or without reduction in the number of bits, as alpha blend values, which are preferably pixel alpha component values, for the graphical elements in a subsequent compositing stage. The multi-level graphical element pixels are preferably written into a graphics display buffer where the values are used as alpha blend values when the display buffer is composited with other graphics and video images.

In an alternate embodiment, the display buffer is defined to have a constant foreground color consistent with the desired foreground color of the text or graphics, and the value of every pixel in the display buffer is defined to be the alpha blend value for that pixel. For example, an Alpha-4 format specifies four bits per pixel of alpha blend value in a graphics window, where the 4 bits define alpha blend values of 0/16, 1/16, 2/16, ..., 13/16, 14/16, and 16/16. The value 15/16 is skipped in this example in order to obtain the endpoint values of 0 and 16/16 (1) without requiring the use of an additional bit. In this example format, the display window has a constant foreground color which is specified in the window descriptor.

In another alternate embodiment, the alpha blend value per pixel is specified for every pixel in the graphical element by choosing a CLUT index for every pixel, where the CLUT entry associated with every index contains the desired alpha blend value as part of the CLUT contents. For example, a graphical element with a constant foreground color and 4 bits of alpha per pixel can be encoded in a CLUT 4 format such that every pixel of the display buffer is defined to be a 4 bit CLUT index, and each of the associated 16 CLUT entries has the appropriate alpha blend value (0/16, 1/16, 2/16, ..., 14/16, 16/16) as well as the (same) constant foreground color in the color portion of the CLUT entries.

In yet another alternate embodiment, the alpha per pixel values are used to form the alpha portion of color+alpha pixels in the display buffer, such as alphaRGB(4,4,4,4) with 4 bits for each of alpha, Red, Green, and Blue, or alphaRGB32 with 8 bits for each component. This format does not require the use of a CLUT.

In still another alternate embodiment, the graphical element may or may not have a constant foreground color. The various foreground colors are processed using a low-pass filter as described earlier, and the outline of the entire graphical element (including all colors other than the background) is separately filtered also using a low pass filter as described. The filtered foreground color is used as either the direct color value in, e.g., an alphaRGB format (or other color space, such as alphaYUV) or as the color choice in a CLUT format, and the result of filtering the outline is used as the alpha per pixel value in either a direct color format such as alphaRGB or as the choice of alpha value per CLUT entry in a CLUT format.

The graphical elements are displayed on the TV screen by compositing the display buffer containing the graphical elements with optionally other graphics and video contents while blending the subject display buffer with all layers behind it using the alpha per pixel values created in the preceding steps.

Additionally, the translucency or opacity of the entire graphical element may be varied by specifying the alpha value of the display buffer via such means as the window alpha value that may be specified in a window descriptor.

VIII. Video Synchronization

When a composite video signal (analog video) is received into the system, it is preferably digitized and separated into YUV (luma and chroma) components for processing. Samples taken for YUV are preferably synchronized to a display clock for compositing with graphics data at the video compositor. Mixing or overlaying of graphics with decoded analog video may require synchronizing the two image sources exactly. Undesirable artifacts such as jitter may be visible on the display unless a synchronization mechanism is implemented to correctly synchronize the samples from the analog video to the display clock. In addition, analog video often does not adhere strictly to the television standards such as NTSC and PAL. For example, analog video which originates in VCRs may have synchronization signals that are not aligned with chroma reference signals and also may have inconsistent line periods. Thus, the synchronization mechanism preferably should correctly synchronize samples from non-standard analog videos as well.

The system, therefore, preferably includes a video synchronizing mechanism that includes a first sample rate converter for converting a sampling rate of a stream of video samples to a first converted rate, a filter for processing at least some of the video samples with the first converted rate, and a second sample rate converter for converting the first converted rate to a second converted rate.

Figure 18:
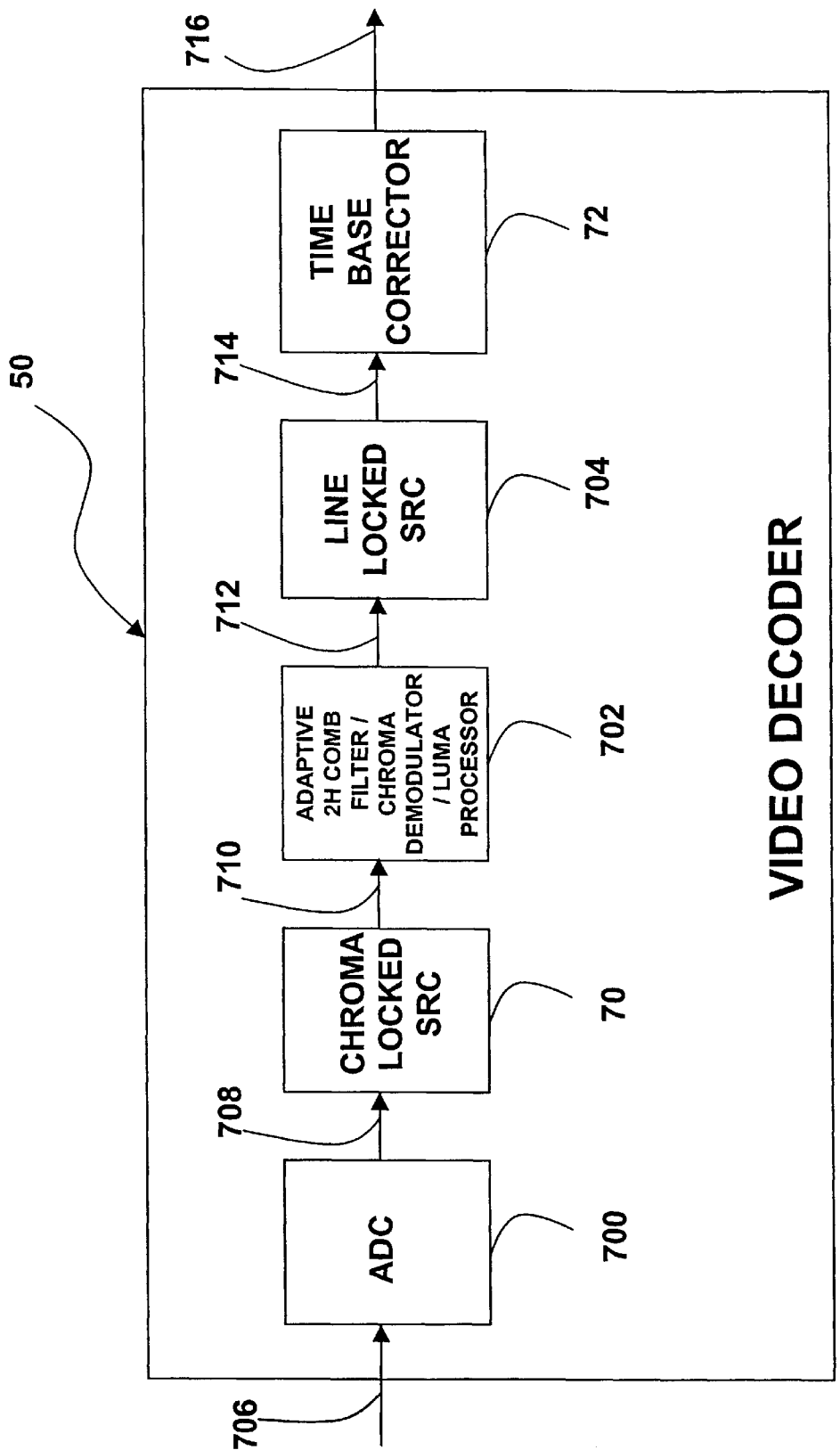
FIG. 18 is a block diagram of certain functional blocks of a video decoder for performing video synchronization.

Referring to FIG. 18, the video decoder 50 preferably samples and synchronizes the analog video input. The video receiver preferably receives an analog video signal 706 into an analog-to-digital converter (ADC) 700 where the analog video is digitized. The digitized analog video 708 is preferably sub-sampled by a chroma-locked sample rate converter (SRC) 708. A sampled video signal 710 is provided to an adaptive 2H comb filter/chroma demodulator/luma processor 702 to be separated into YUV (luma and chroma) components. In the 2H comb filter/chroma demodulator/luma processor 702, the chroma components are demodulated. In addition, the luma component is preferably processed by noise reduction, coring and detail enhancement operations. The adaptive 2H comb filter provides the sampled video 712, which has been separated into luma and chroma components and processed, to a line-locked SRC 704. The luma and chroma components of the sample video is preferably sub-sampled once again by the line-locked SRC and the sub-sampled video 714 is provided to a time base corrector (TBC) 72. The time base corrector preferably provides an output video signal 716 that is synchronized to a display clock of the graphics display system. In one embodiment of the present invention, the display clock runs at a nominal 13.5 MHz.

The synchronization mechanism preferably includes the chroma-locked SRC 70, the line-locked SRC 704 and the TBC 72. The chroma-locked SRC outputs samples that are locked to chroma subcarrier and its reference bursts while the line-locked SRC outputs samples that are locked to horizontal syncs. In the preferred embodiment, samples of analog video are over-sampled by the ADC 700 and then down-sampled by the chroma-locked SRC to four times the chroma sub-carrier frequency (Fsc). The down-sampled samples are down-sampled once again by the line-locked SRC to line-locked samples with an effective sample rate of nominally 13.5 MHz. The time base corrector is used to align these samples to the display clock, which runs nominally at 13.5 MHz.

Analog composite video has a chroma signal frequency interleaved in frequency with the luma signal. In an NTSC standard video, this chroma signal is modulated on to the Fsc of approximately 3.579545 MHz, or exactly 227.5 times the horizontal line rate. The luma signal covers a frequency span of zero to approximately 4.2 MHz. One method for separating the luma from the chroma is to sample the video at a rate that is a multiple of the chroma sub-carrier frequency, and use a comb filter on the sampled data. This method generally imposes a limitation that the sampling frequency is a multiple of the chroma sub-carrier frequency (Fsc).

Using such a chroma-locked sampling frequency generally imposes significant costs and complications on the implementation, as it may require the creation of a sample clock of the correct frequency, which itself may require a stable, low noise controllable oscillator (e.g. a VCXO) in a control loop that locks the VCXO to the chroma burst frequency. Different sample frequencies are typically required for different video standards with different chroma subcarrier frequencies. Sampling at four times the subcarrier frequency, i.e. 14.318 MHz for NTSC standard and 17.72 MHz for PAL standard, generally requires more anti-alias filtering before digitization than is required when sampling at higher frequencies such as 27 MHz. In addition, such a chroma-locked clock frequency is often unrelated to the other frequencies in a large scale digital device, requiring multiple clock domains and asynchronous internal interfaces.

In the preferred embodiment, however, the samples are not taken at a frequency that is a multiple of Fsc. Rather, in the preferred embodiment, an integrated circuit takes samples of the analog video at a frequency that is essentially arbitrary and that is greater than four times the Fsc (4Fsc= 14.318 MHz). The sampling frequency preferably is 27 MHz and preferably is not locked to the input video signal in phase or frequency. The sampled video data then goes through the chroma-locked SRC that down-samples the data to, an effective sampling rate of 4 Fsc. This and all subsequent operations are preferably performed in digital processing in a single integrated circuit.

The effective sample rate of 4 Fsc does not require a clock frequency that is actually at 4 Fsc, rather the clock frequency can be almost any higher frequency, such as 27 MHz, and valid samples occur on some clock cycles while the overall rate of valid samples is equal to 4 Fsc. The down-sampling (decimation) rate of the SRC is preferably controlled by a chroma phase and frequency tracking module. The chroma phase and frequency tracking module looks at the output of the SRC during the color burst time interval and continuously adjusts the decimation rate in order to align the color burst phase and frequency. The chroma phase and frequency tracking module is implemented as a logical equivalent of a phase locked loop (PLL), where the chroma burst phase and frequency are compared in a phase detector to the effective sample rate, which is intended to be 4 Fsc, and the phase and frequency error terms are used to control the SRC decimation rate.

The decimation function is applied to the incoming sampled video, and therefore the decimation function controls the chroma burst phase and frequency that is applied to the phase detector. This system is a closed feedback loop (control loop) that functions in much the same way as a conventional PLL, and its operating parameters are readily designed in the same way as those of PLLs.

Figure 19:
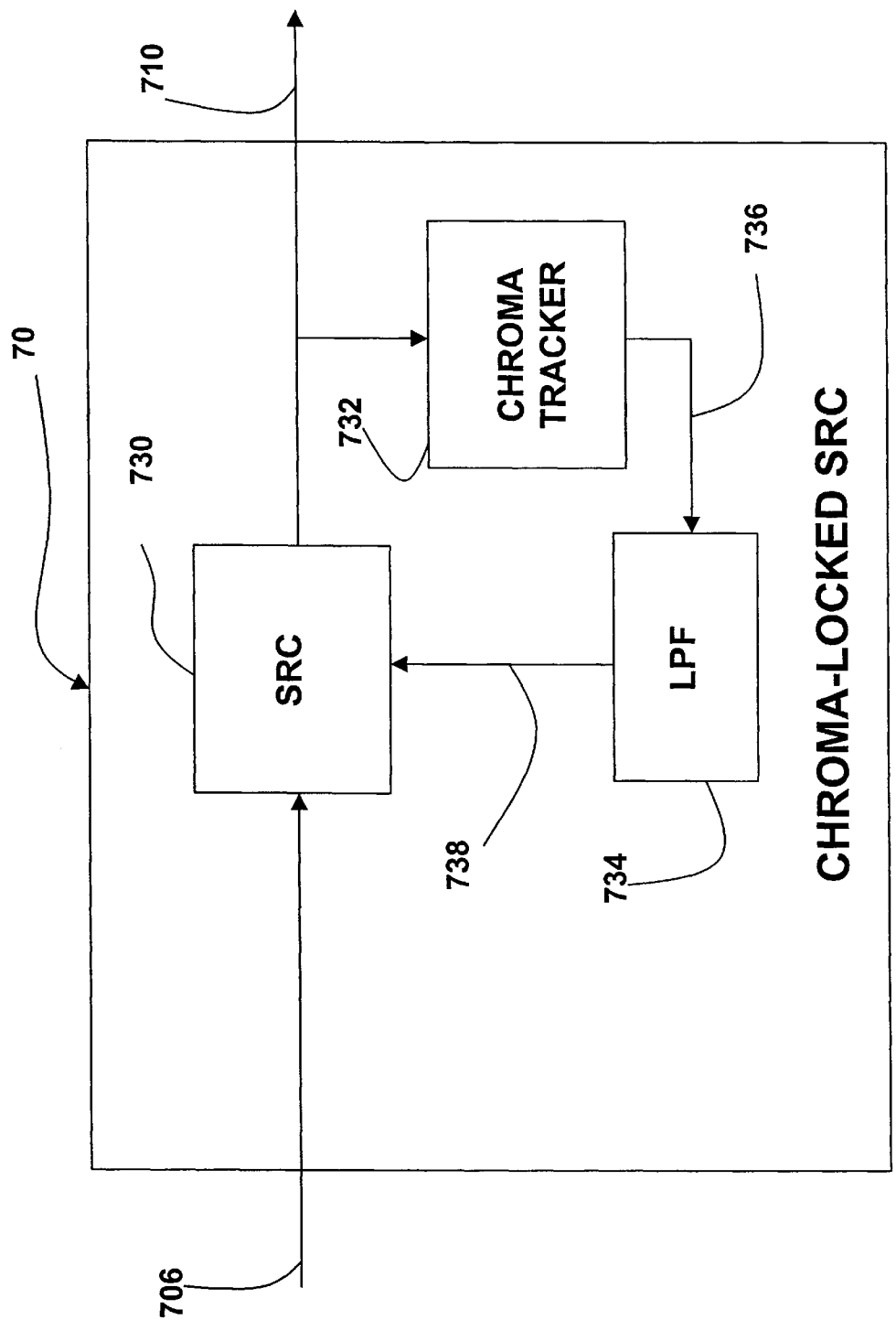
FIG. 19 is a block diagram of an embodiment of a chroma-locked sample rate converter (SRC)

Referring to FIG. 19, the chroma-locked SRC 70 preferably includes a sample rate converter (SRC) 730, a chroma tracker 732 and a low pass filter (LPF). The SRC 730 is preferably a polyphase filter having time-varying coefficients. The SRC is preferably implemented with 35 phases and the conversion ratio of 35/66. The SRC 730 preferably interpolates by exactly 35 and decimates by (66+epsilon), i.e. the decimation rate is preferably adjustable within a range determined by the minimum and maximum values of epsilon, generally a small range. Epsilon is a first adjustment value, which is used to adjust the decimation rate of a first sample rate converter, i.e., the chroma-locked sample rate converter.

Epsilon is preferably generated by the control loop comprising the chroma tracker 732 and the LPF 734, and it can be negative, positive or zero. When the output samples of the SRC 730 are exactly frequency and phase locked to the color sub-carrier then epsilon is zero. The chroma tracker tracks phase and frequency of the chroma bursts and compares them against an expected pattern.

In one embodiment of the present invention, the conversion rate of the chroma-locked SRC is adjusted so that, in effect, the SRC samples the chroma burst at exactly four times per chroma sub-carrier cycle. The SRC takes the samples at phases 0 degrees, 90 degrees, 180 degrees and 270 degrees of the chroma sub-carrier cycle. This means that a sample is taken at every cycle of the color sub-carrier at a zero crossing, a positive peak, zero crossing and a negative peak, (0, +1, 0, −1). If the pattern obtained from the samples is different from (0, +1, 0, −1), this difference is detected and the conversion ratio needs to be adjusted inside the control loop.

When the output samples of the chroma-locked SRC are lower in frequency or behind in phase, e.g., the pattern looks like (−1, 0, +1, 0), then the chroma tracker 732 will make epsilon negative. When epsilon is negative, the sample rate conversion ratio is higher than the nominal 35/66, and this has the effect of increasing the frequency or advancing the phase of samples at the output of the chroma-locked SRC. When the output samples of the chroma-locked SRC are higher in frequency or leading in phase, e.g., the pattern looks like (+1, 0, −1, 0), then the chroma tracker 732 will make epsilon positive. When epsilon is positive, the sample rate conversion ratio is lower than the nominal 35/66, and this has the effect of decreasing the frequency or retarding the phase of samples out of the chroma-locked SRC. The chroma tracker provides error signal 736 to the LPF 734 that filters the error signal to filter out high frequency components and provides the filtered error signal to the SRC to complete the control loop.

The sampling clock may run at the system clock frequency or at the clock frequency of the destination of the decoded digital video. If the sampling clock is running at the system clock, the cost of the integrated circuit may be lower than one that has a system clock and a sub-carrier locked video decoder clock. A one clock integrated circuit may also cause less noise or interference to the analog-to-digital converter on the IC. The system is preferably all digital, and does not require an external crystal or a voltage controlled oscillator.

Figure 20:
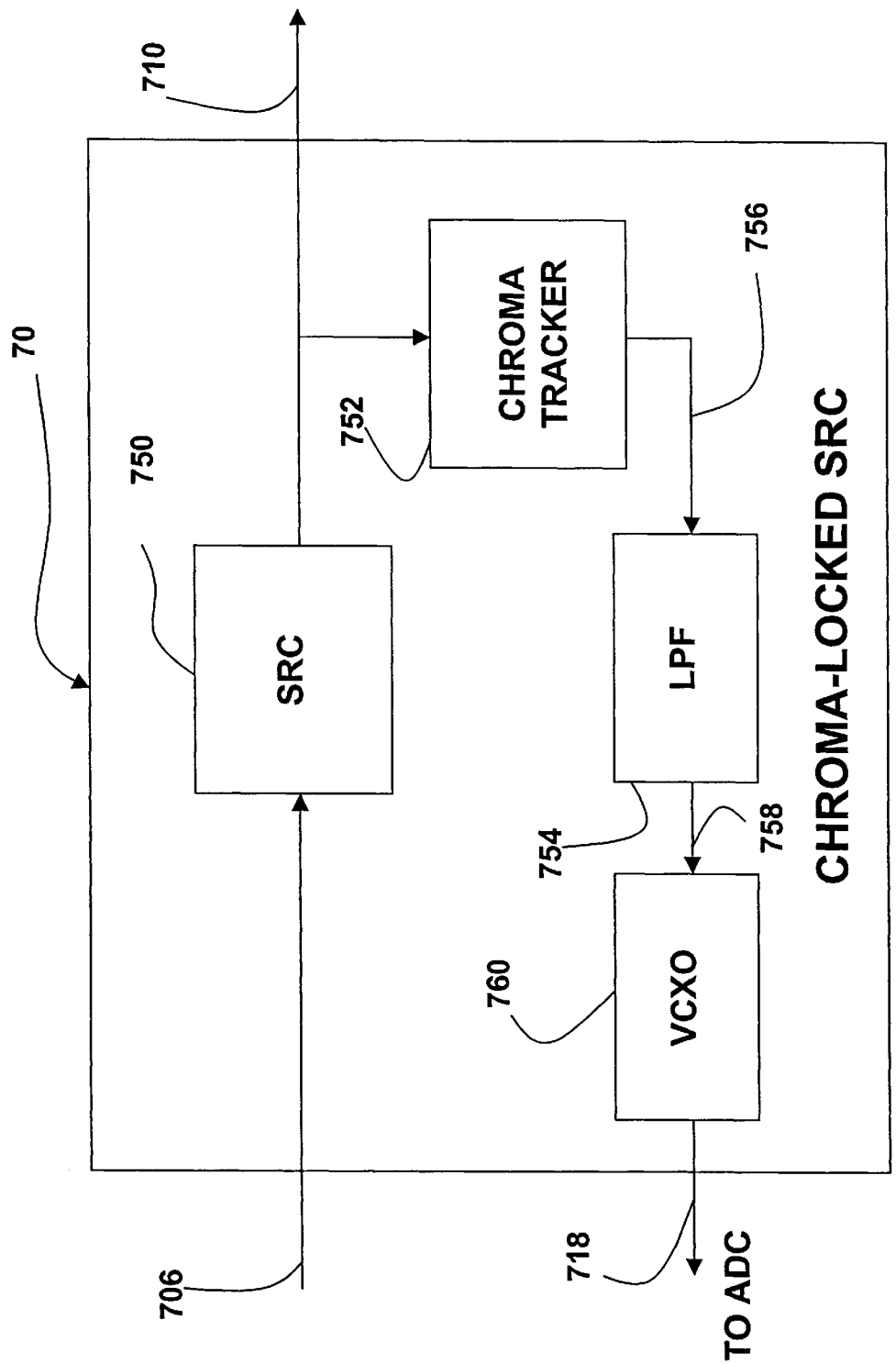
FIG. 20 is a block diagram of an alternate embodiment of the chroma-locked SRC of FIG. 19.

Referring to FIG. 20, an alternate embodiment of the chroma-locked SRC 70 preferably varies the sampling rate while the conversion rate is held constant. A voltage controlled oscillator (e.g., VCXO) 760 varies the sampling rate by providing a sampling frequency signal 718 to the ADC 700. The conversion rate in this embodiment is fixed at 35/66 in the SRC 750 which is the ratio between four times the chroma sub-carrier frequency and 27 MHz.

In this embodiment, the chroma burst signal at the output of the chroma-locked SRC is compared with the expected chroma burst signal in a chroma tracker 752. The error signals 756 from the comparison between the converted chroma burst and the expected chroma burst are passed through a low pass filter 754 and then filtered error signals 758 are provided to the VCXO 760 to control the oscillation frequency of the VCXO. The oscillation frequency of the VCXO changes in response to the voltage level of the provided error signals. Use of input voltage to control the oscillation frequency of a VCXO is well known in the art. The system as described here is a form of a phase locked loop (PLL), the design and use of which is well known in the art.

After the completion of chroma-luma separation and other processing to the chroma and luma components, the samples with the effective sample rate of 4 Fsc (i.e. 4 times the chroma subcarrier frequency) are preferably decimated to samples with a sample rate of nominally 13.5 MHz through the use of a second sample rate converter. Since this sample rate is less than the electrical clock frequency of the digital integrated circuit in the preferred embodiment, only some clock cycles carry valid data. In this embodiment, the sample rate is preferably converted to 13.5 MHz, and is locked to the horizontal line rate through the use of horizontal sync signals. Thus, the second sample rate converter is a line-locked sample rate converter (SRC).

The line-locked sample rate converter converts the current line of video to a constant (Pout) number of pixels. This constant number of pixels Pout is normally 858 for ITU-R BT. 601 applications and 780 for NTSC square pixel applications. The current line of video may have a variable number of pixels (Pin). In order to do this conversion from a chroma-locked sample rate, the following steps are performed. The number of input samples Pin of the current line of video is accurately measured. This line measurement is used to calculate the sample rate conversion ratio needed to convert the line to exactly Pout samples. An adjustment value to the sample rate conversion ratio is passed to a sample rate converter module in the line-locked SRC to implement the calculated sample rate conversion ratio for the current line. The sample conversion ratio is calculated only once for each line. Preferably, the line-locked SRC also scales YUV components to the proper amplitudes required by ITU-R BT. 601.

The number of samples detected in a horizontal line may be more or less if the input video is a non-standard video. For example, if the incoming video is from a VCR, and the sampling rate is four times the color sub-carrier frequency (4 Fsc), then the number of samples taken between two horizontal syncs may be more or less than 910, where 910 is the number of samples per line that is obtained when sampling NTSC standard video at a sampling frequency of 4 Fsc. For example, the horizontal line time from a VCR may vary if the video tape has been stretched.

The horizontal line time may be accurately measured by detecting two successive horizontal syncs. Each horizontal sync is preferably detected at the leading edge of the horizontal sync. In other embodiments, the horizontal syncs may be detected by other means. For example, the shape of the entire horizontal sync may be looked at for detection. In the preferred embodiment, the sample rate for each line of video has been converted to four times the color sub-carrier frequency (4 Fsc) by the chroma-locked sample rate converter. The measurement of the horizontal line time is preferably done at two levels of accuracy, an integer pixel accuracy and a sub-sample accuracy.

The integer pixel accuracy is preferably done by counting the integer number of pixels that occur between two successive sync edges. The sync edge is presumed to be detected when the data crosses some threshold value. For example, in one embodiment of the present invention, the analog-to-digital converter (ADC) is a 10-bit ADC, i.e., converts an input analog signal into a digital signal with ($2^{10}-1=1023$) scale levels.

In this embodiment, the threshold value is chosen to represent an appropriate slicing level for horizontal sync in the 10-bit number system of the ADC; a typical value for this threshold is 128. The negative peak (or a sync tip) of the digitized video signal normally occurs during the sync pulses. The threshold level would normally be set such that it occurs at approximately the mid-point of the sync pulses. The threshold level may be automatically adapted by the video decoder, or it may be set explicitly via a register or other means.

The horizontal sync tracker preferably detects the horizontal sync edge to a sub-sample accuracy of ($\frac{1}{16}$)th of a pixel in order to more accurately calculate the sample rate conversion. The incoming samples generally do not include a sample taken exactly at the threshold value for detecting horizontal sync edges. The horizontal sync tracker preferably detects two successive samples, one of which has a value lower than the threshold value and the other of which has a value higher than the threshold value.

After the integer pixel accuracy is determined (sync edge has been detected) the sub-pixel calculation is preferably started. The sync edge of a horizontal sync is generally not a vertical line, but has a slope. In order to remove noise, the video signal goes through a low pass filter. The low pass filter generally decreases sharpness of the transition, i.e., the low pass filter may make the transition from a low level to a high level last longer.

The horizontal sync tracker preferably uses a sub-sample interpolation technique to obtain an accurate measurement of sync edge location by drawing a straight line between the two successive samples of the horizontal sync signal just above and just below the presumed threshold value to determine where the threshold value has been crossed.

Three values are preferably used to determine the sub-sample accuracy. The three values are the threshold level (T), the value of the sample that crossed the threshold level (V2) and the value of the previous sample that did not cross the threshold level (V1). The sub-sample value is the ratio of (T–V1)/(V2–V1). In the present embodiment a division is not performed. The difference (V2–V1) is divided by 16 to make a variable called DELTA. V1 is then incremented by DELTA until it exceeds the threshold T. The number of times that DELTA is added to V1 in order to make it exceed the threshold (T) is the sub-pixel accuracy in terms of $1/16^{th}$ of a pixel.

For example, if the threshold value T is presumed to be 146 scale levels, and if the values V1 and V2 of the two successive samples are 140 and 156, respectively, the DELTA is calculated to be 1, and the crossing of the threshold value is determined through interpolation to be six DELTAs away from the first of the two successive samples. Thus, if the sample with value 140 is the nth sample and the sample with the value 156 is the (n+1)th sample, the (n+(6/16))th sample would have had the threshold value. Since the horizontal sync preferably is presumed to be detected at the threshold value of the sync edge, a fractional sample, i.e., 6/16 sample, is added to the number of samples counted between two successive horizontal syncs.

In order to sample rate convert the current number of input pixels Pin to the desired output pixels Pout, the sample rate converter module has a sample rate conversion ratio of Pin/Pout. The sample rate converter module in the preferred embodiment of the line-locked sample rate converter is a polyphase filter with time-varying coefficients. There is a fixed number of phases (I) in the polyphase filter. In the preferred embodiment, the number of phases (I) is 33. The control for the polyphase filter is the decimation rate (d_act) and a reset phase signal. The line measurement Pin is sent to a module that converts it to a decimation rate d_act such that I/d_act (33/d_act) is equal to Pin/Pout. The decimation rate d_act is calculated as follows: d_act=(I/Pout)*Pin.

If the input video line is the standardized length of time and the four times the color sub-carrier is the standardized frequency then Pin will be exactly 910 samples. This gives a sample rate conversion ratio of (858/910). In the present embodiment the number of phases (the interpolation rate) is 33. Therefore the nominal decimation rate for NTSC is 35 (=(33/858)*910). This decimation rate d_act may then be sent to the sample rate converter module. A reset phase signal is sent to the sample rate converter module after the sub-sample calculation has been done and the sample rate converter module starts processing the current video line. In the preferred embodiment, only the active portion of video is processed and sent on to a time base corrector. This results in a savings of memory needed. Only 720 samples of active video are produced as ITU-R BT. 601 output sample rates. In other embodiments, the entire horizontal line may be processed and produced as output.

In the preferred embodiment, the calculation of the decimation rate d_act is done somewhat differently from the equation d_act=(I/Pout)*Pin. The results are the same, but there are savings to hardware. The current line length, Pin, will have a relatively small variance with respect to the nominal line length. Pin is nominally 910. It typically varies by less than 62. For NTSC, this variation is less than 5 microseconds. The following calculation is done: d_act= ((I/Pout)*(Pin–Pin_nominal))+d_act_nominal This preferably results in a hardware savings for the same level of accuracy. The difference (Pin–Pin_nominal) may be represented by fewer bits than are required to represent Pin so a smaller multiplier can be used. For NTSC, d_act_nominal is 35 and Pin_nominal is 910. The value (I/Pout) *(Pin–Pin_nominal) may now be called a delta_dec (delta decimation rate) or a second adjustment value.

Therefore, in order to maintain the output sample rate of 858 samples per horizontal line, the conversion rate applied preferably is 33/(35+delta_dec) where the samples are interpolated by 33 and decimated by (35+delta_dec). A horizontal sync tracker preferably detects horizontal syncs, accurately counts the number of samples between two successive horizontal syncs and generates delta_dec.

If the number of samples between two successive horizontal syncs is greater than 910, the horizontal sync tracker generates a positive delta_dec to keep the output sample rate at 858 samples per horizontal line. On the other hand, if the number of samples between two successive horizontal syncs is less than 910, the horizontal sync tracker generates a negative delta_dec to keep the output sample rate at 858 samples per horizontal line.

For PAL standard video, the horizontal sync tracker generates the delta_dec to keep the output sample rate at 864 samples per horizontal line.

In summary, the position of each horizontal sync pulse is determined to sub-pixel accuracy by interpolating between two successive samples, one of which being immediately below the threshold value and the other being immediately above the threshold value. The number of samples between the two successive horizontal sync pulses is preferably calculated to sub-sample accuracy by determining the positions of two successive horizontal sync pulses, both to sub-pixel accuracy. When calculating delta_dec, the horizontal sync tracker preferably uses the difference between 910 and the number of samples between two successive horizontal syncs to reduce the amount of hardware needed.

In an alternate embodiment, the decimation rate adjustment value, delta_dec, which is calculated for each line, preferably goes through a low pass filter before going to the sample rate converter module. One of the benefits of this method is filtering of variations in the line lengths of adjacent lines where the variations may be caused by noise that affects the accuracy of the measurement of the sync pulse positions.

In another alternative embodiment, the input sample clock is not free running, but is instead line-locked to the input analog video, preferably 27 MHz. The chroma-locked sample rate converter converts the 27 MHz sampled data to a sample rate of four times the color sub-carrier frequency. The analog video signal is demodulated to luma and chroma component video signals, preferably using a comb filter. The luma and chroma component video signals are then sent to the line-locked sample rate converter where they are preferably converted to a sample rate of 13.5 MHz. In this embodiment the 13.5 MHz sample rate at the output may be exactly one-half of the 27 MHz sample rate at the input. The conversion ratio of the line-locked sample rate converter is preferably exactly one-half of the inverse of the conversion ratio performed by the chroma-locked sample rate converter.

Figure 21:
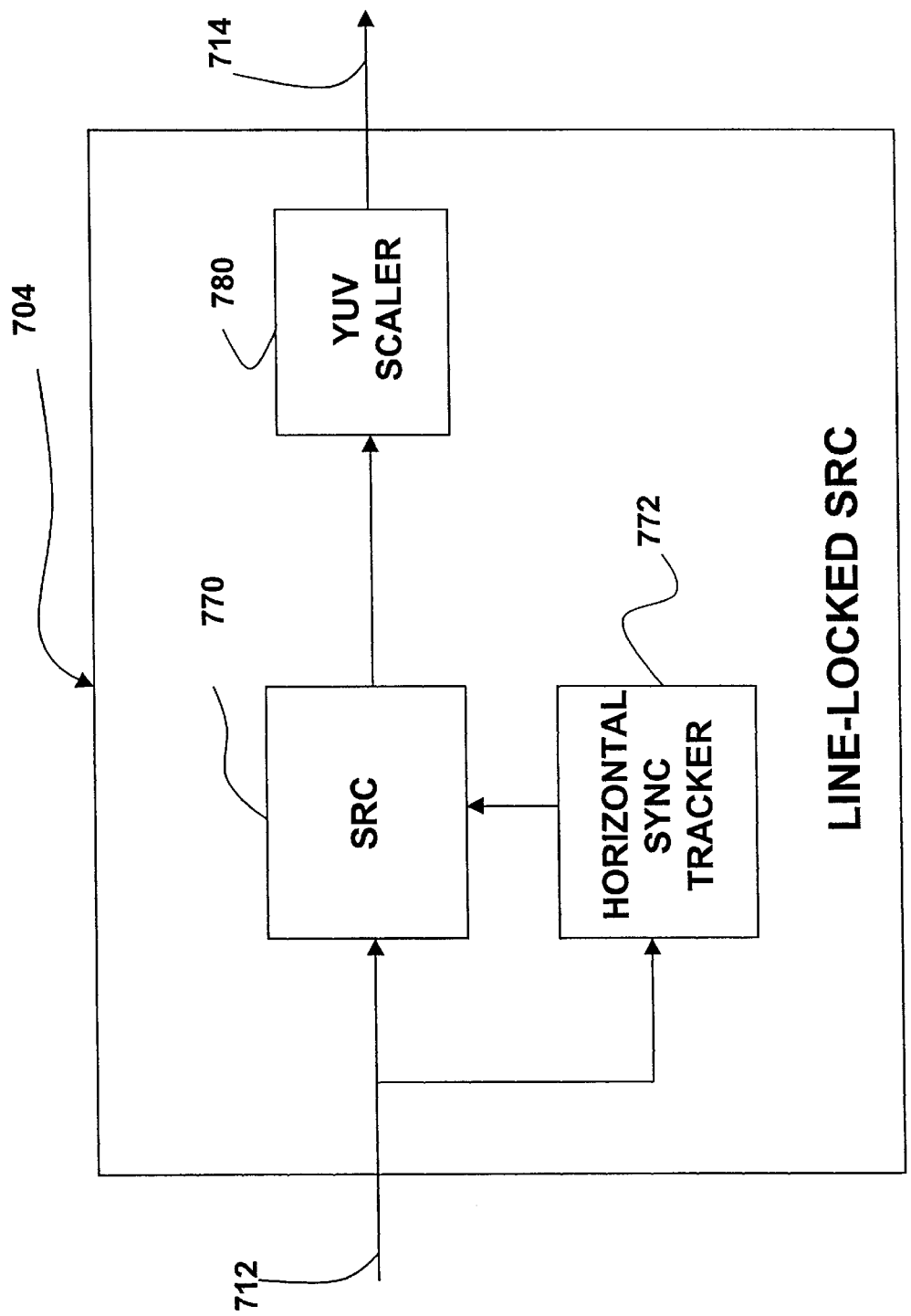
FIG. 21 is a block diagram of an exemplary line-locked SRC.

Referring to FIG. 21, the line-locked SRC 704 preferably includes an SRC 770 which preferably is a polyphase filter with time varying coefficients. The number of phases is preferably fixed at 33 while the nominal decimation rate is 35. In other words, the conversion ratio used is preferably 33/(35+delta_dec) where delta_dec may be positive or negative. The delta_dec is a second adjustment value, which is used to adjust the decimation rate of the second sample rate converter. Preferably, the actual decimation rate and phase are automatically adjusted for each horizontal line so that the number of samples per horizontal line is 858 (720 active Y samples and 360 active U and V samples) and the phase of the active video samples is aligned properly with the horizontal sync signals.

In the preferred embodiment, the decimation (down-sampling) rate of the SRC is preferably controlled by a horizontal sync tracker 772. Preferably, the horizontal sync tracker adjusts the decimation rate once per horizontal line in order to result in a correct number and phase of samples in the interval between horizontal syncs. The horizontal sync tracker preferably provides the adjusted decimation rate to the SRC 770 to adjust the conversion ratio. The decimation rate is preferably calculated to achieve a sub-sample accuracy of $\frac{1}{16}$. Preferably, the line-locked SRC 704 also includes a YUV scaler 780 to scale YUV components to the proper amplitudes required by ITU-R BT. 601.

The time base corrector (TBC) preferably synchronizes the samples having the line-locked sample rate of nominally 13.5 MHz to the display clock that runs nominally at 13.5 MHz. Since the samples at the output of the TBC are synchronized to the display clock, passthrough video may be provided to the video compositor without being captured first.

To produce samples at the sample rate of nominally 13.5 MHz, the composite video may be sampled in any conventional way with a clock rate that is generally used in the art. Preferably, the composite video is sampled initially at 27 MHz, down sampled to the sample rate of 14.318 MHz by the chroma-locked SRC, and then down sampled to the sample rate of nominally 13.5 MHz by the line-locked SRC. During conversion of the sample rates, the video decoder uses for timing the 27 MHz clock that was used for input sampling. The 27 MHz clock, being free-running, is not locked to the line rate nor to the chroma frequency of the incoming video.

In the preferred embodiment, the decoded video samples are stored in a FIFO the size of one display line of active video at 13.5 MHz, i.e., 720 samples with 16 bits per sample or 1440 bytes. Thus, the maximum delay amount of this FIFO is one display line time with a normal, nominal delay of one-half a display line time. In the preferred embodiment, video samples are outputted from the FIFO at the display clock rate that is nominally 13.5 MHz. Except for vertical syncs of the input video, the display clock rate is unrelated to the timing of the input video. In alternate embodiments, larger or smaller FIFOs may be used.

Even though the effective sample rate and the display clock rate are both nominally 13.5 MHz the rate of the sampled video entering the FIFO and the display rate are generally different. This discrepancy is due to differences between the actual frequencies of the effective input sample rate and the display clock. For example, the effective input sample rate is nominally 13.5 MHz but it is locked to operate at 858 times the line rate of the video input, while the display clock operates nominally at 13.5 MHz independently of the line rate of the video input.

Since the rates of data entering and leaving the FIFO are typically different, the FIFO will tend to either fill up or become empty, depending on relative rates of the entering and leaving data. In one embodiment of the present invention, video is displayed with an initial delay of one-half a horizontal line time at the start of every field. This allows the input and output rates to differ up to the point where the input and output horizontal phases may change by up to one-half a horizontal line time without causing any glitches at the display.

The FIFO is preferably filled up to approximately one-half full during the first active video line of every field prior to taking any output video. Thus, the start of each display field follows the start of every input video field by a fixed delay that is approximately equal to one-half the amount of time for filling the entire FIFO. As such, the initial delay at the start of every field is one-half a horizontal line time in this embodiment, but the initial delay may be different in other embodiments.

Figure 22:
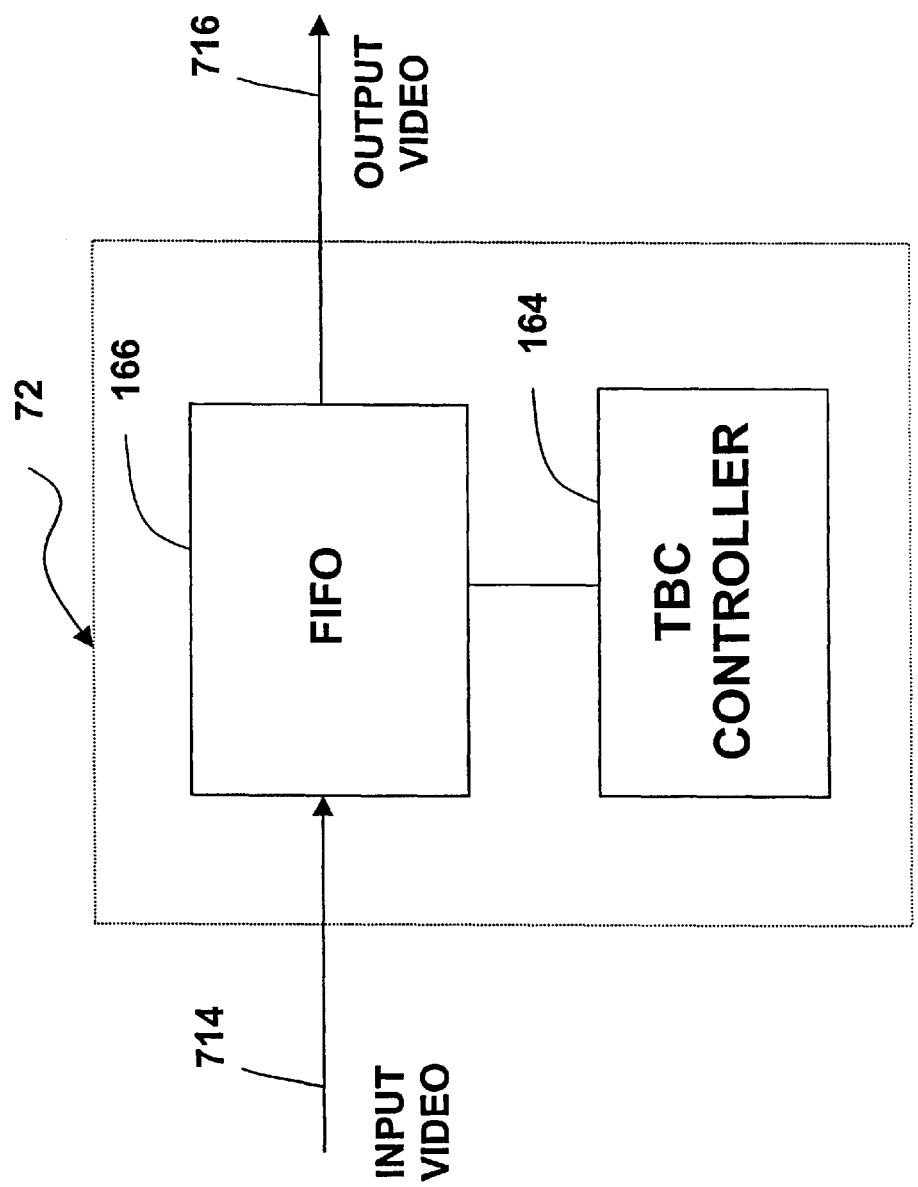
FIG. 22 is a block diagram of an exemplary time base corrector (TBC)

Referring to FIG. 22, the time base corrector (TBC) 72 includes a TBC controller 164 and a FIFO 166. The FIFO 166 receives an input video 714 at nominally 13.5 MHz locked to the horizontal line rate of the input video and outputs a delayed input video as an output video 716 that is locked to the display clock that runs nominally at 13.5 MHz. The initial delay between the input video and the delayed input video is half a horizontal line period of active video, e.g., 53.5 $\mu$s per active video in a horizontal line/2=26.75 $\mu$s for NTSC standard video.

The TBC controller 164 preferably generates a vertical sync (VSYNC) for display that is delayed by one-half a horizontal line from an input VSYNC. The TBC controller 164 preferably also generates timing signals such as NTSC or PAL standard timing signals. The timing signals are preferably derived from the VSYNC generated by the TBC controller and preferably include horizontal sync. The timing signals are not affected by the input video, and the FIFO is read out synchronously to the timing signals. Data is read out of the FIFO according to the timing at the display side while the data is written into the FIFO according to the input timing. A line reset resets the FIFO write pointer to signal a new line. A read pointer controlled by the display side is updated by the display timing.

As long as the accumulated change in FIFO fullness, in either direction, is less than one-half a video line, the FIFO will generally neither underflow nor overflow during the video field. This ensures correct operation when the display clock frequency is anywhere within a fairly broad range centered on the nominal frequency. Since the process is repeated every field, the FIFO fullness changes do not accumulate beyond one field time.

Figure 23:
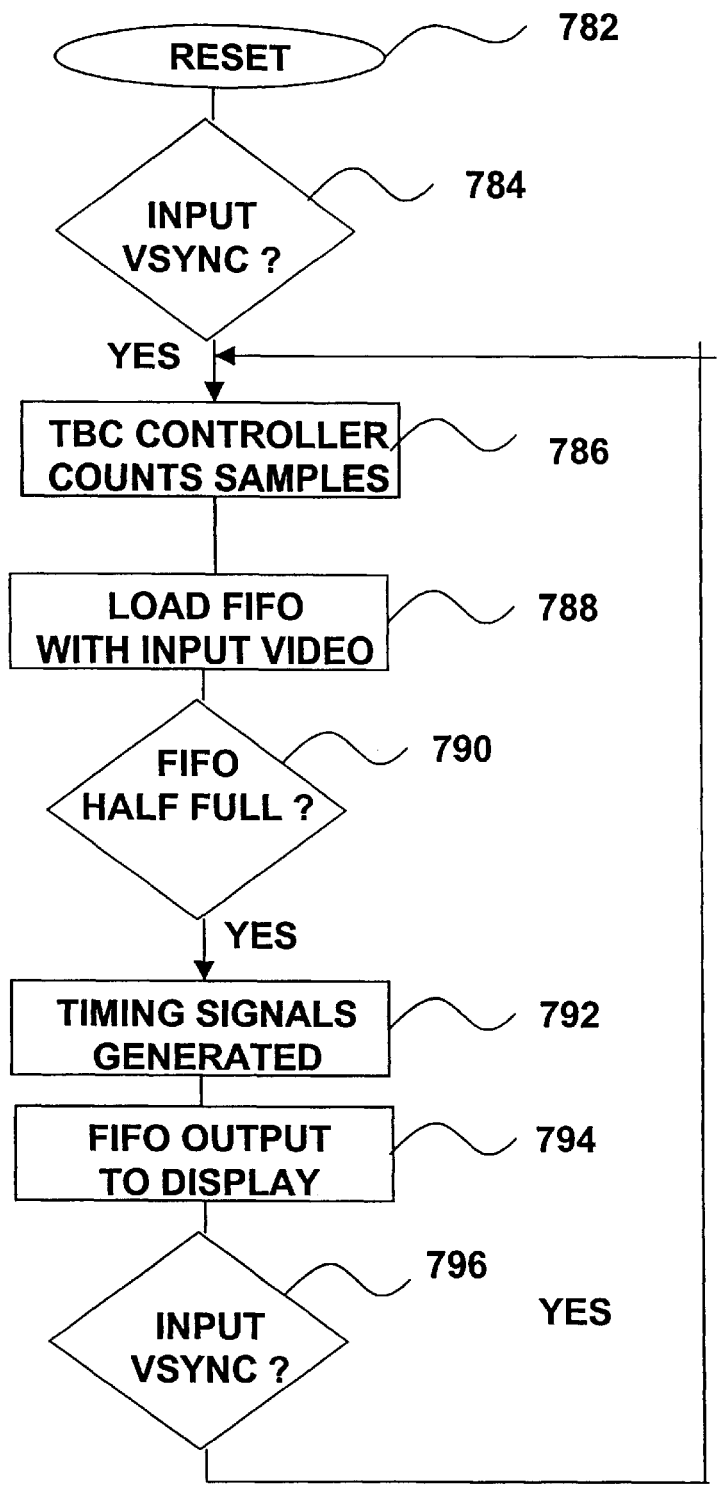
FIG. 23 is a flow diagram of a process that employs a TBC to synchronize an input video to a display clock.

Referring to FIG. 23, a flow diagram of a process using the TBC 72 is illustrated. The process resets in step 782 at system start up. The system preferably checks for vertical sync (VSYNC) of the input video in step 784. After receiving the input VSYNC, the system in step 786 preferably starts counting the number of incoming video samples. The system preferably loads the FIFO in step 788 continuously with the incoming video samples. While the FIFO is being loaded, the system in step 790 checks if enough samples have been received to fill the FIFO up to a half full state.

When enough samples have been received to fill the FIFO to the half full state, the system in step 792 preferably generates timing signals including horizontal sync to synchronize the output of the TBC to the display clock. The system in step 794 preferably outputs the content of the FIFO continuously in sync with the display clock. The system in step 796 preferably checks for another input VSYNC. When another input vertical sync is detected, the process starts counting the number of input video samples again and starts outputting output video samples when enough input video samples have been received to make the FIFO half full.

In other embodiments of the present invention, the FIFO size may be smaller or larger. The minimum size acceptable is determined by the maximum expected difference in the video source sample rate and the display sample rate. Larger FIFOs allow for greater variations in sample rate timing, however at greater expense. For any chosen FIFO size, the logic that generates the sync signal that initiates display video fields should incur a delay from the input video timing of one-half the delay of the entire FIFO as described above.

However, it is not required that the delay be one-half the delay of the entire FIFO.

IX. Video Scaler

In certain applications of graphics and video display hardware, it may be necessary or desirable to scale the size of a motion video image either upwards or downwards. It may also be desirable to minimize memory usage and memory bandwidth demands. Therefore it is desirable to scale down before writing to memory, and to scale up after reading from memory, rather than the other way around in either case. Conventionally there is either be separate hardware to scale down before writing to memory and to scale up after reading from memory, or else all scaling is done in one location or the other, such as before writing to memory, even if the scaling direction is upwards.

In the preferred embodiment, a video scaler performs both scaling-up and scaling-down of either digital video or digitized analog video. The video scaler is preferably configured such that it can be used for either scaling down the size of video images prior to writing them to memory or for scaling up the size of video images after reading them from memory. The size of the video images are preferably downscaled prior to being written to memory so that the memory usage and the memory bandwidth demands are minimized. For similar reasons, the size of the video images are preferably upscaled after reading them from memory.

In the former case, the video scaler is preferably in the signal path between a video input and a write port of a memory controller. In the latter case, the video scaler is preferably in the signal path between a read port of the memory controller and a video compositor. Therefore, the video scaler may be seen to exist in two distinct logical places in the design, while in fact occupying only one physical implementation.

This function is preferably achieved by arranging a multiplexing function at the input of the scaling engine, with one input to the multiplexer being connected to the video input port and the other connected to the memory read port. The memory write port is arranged with a multiplexer at its input, with one input to the multiplexer connected to the output of the scaling engine and the other connected to the video input port. The display output port is arranged with a multiplexer at its input, with one connected to the output of the scaling engine and the other input connected to the output of the memory read port.

In the preferred embodiment, there are different clock domains associated with the video input and the display output functions of the chip. The video scaling engine uses a clock that is selected between the video input clock and the display output clock (display clock). The clock selection uses a glitch-free clock selection logic, i.e. a circuit that prevents the creation of extremely narrow clock pulses when the clock selection is changed. The read and write interfaces to memory both use asynchronous interfaces using FIFOs, so the memory clock domain may be distinct from both the video input clock domain and the display output clock domain.

Figure 24:
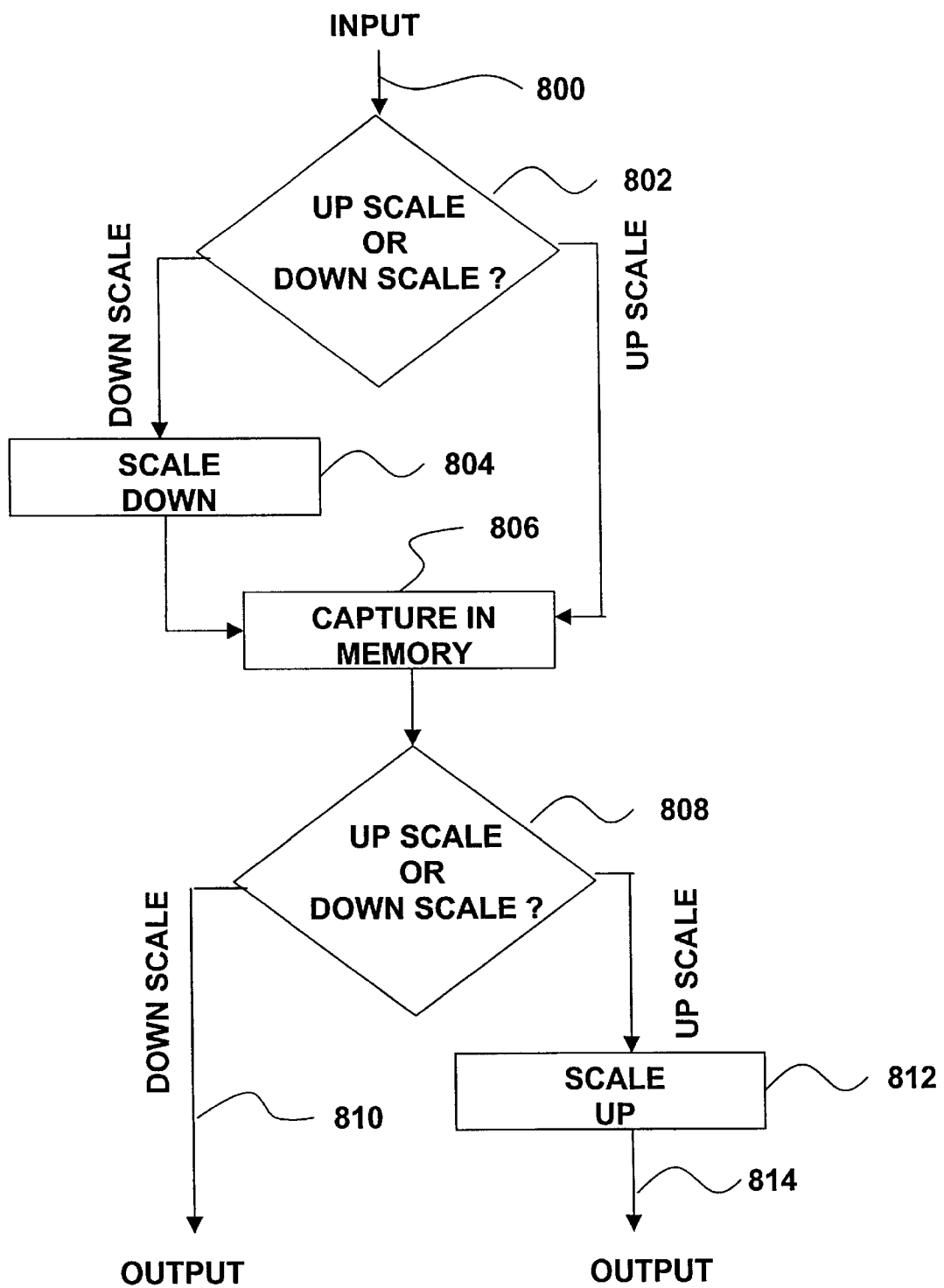
FIG. 24 is a flow diagram of a process for video scaling in which downscaling is performed prior to capture of video in memory and upscaling is performed after reading video data out of memory.

Referring to FIG. 24, a flow diagram illustrates a process of alternatively upscaling or downscaling the video input 800. The system in step 802 preferably selects between a downscaling operation and an upscaling operation. If the downscaling operation is selected, the system in step 804 preferably downscales the input video prior to capturing the input video in memory in step 806. If the upscaling operation is selected in step 802, the system in step 806 preferably captures the input video in memory without scaling it.

Then the system in step 808 outputs the downscaled video as downscaled output 810. The system in step 808, however, sends non-scaled video in the upscale path to be upscaled in step 812. The system in step 812 upscales the non-scaled video and outputs it as upscaled video output 814.

The video pipeline preferably supports up to one scaled video window and one passthrough video window, plus one background color, all of which are logically behind the set of graphics windows. The order of these windows, from back to front, is fixed as background, then passthrough, then scaled video. The video windows are preferably always in YUV format, although they can be in either 4:2:2 or 4:2:0 variants of YUV. Alternatively they can be in RGB or other formats.

When digital video, e.g., MPEG is provided to the graphics display system or when analog video is digitized, the digital video or the digitized analog video is provided to a video compositor using one of three signal paths, depending on processing requirements. The digital video and the digitized analog video are provided to the video compositor as passthrough video over a passthrough path, as upscaled video over an upscale path and a downscaled video over a downscale path.

Either of the digital video or the analog video may be provided to the video compositor as the passthrough video while the other of the digital video or the analog video is provided as an upscaled video or a downscaled video. For example, the digital video may be provided to the video compositor over the passthrough path while, at the same time, the digitized analog video is downscaled and provided to the video compositor over the downscale path as a video window. In one embodiment of the present invention where the scaler engine is shared between the upscale path and the downscale path, the scaler engine may upscale video in either the vertical or horizontal axis while downscaling video in the other axis. However, in this embodiment, an upscale operation and a downscale operation on the same axis are not performed at the same time since only one filter is used to perform both upscaling and downscaling for each axis.

Referring to FIG. 24 a single video scaler 52 preferably performs both the downscaling and upscaling operations. In particular, signals of the downscale path only are illustrated. The video scaler 52 includes a scaler engine 182, a set of line buffers 178, a vertical coefficient memory 180A and a horizontal coefficient memory 180B. The scaler engine 182 is implemented as a set of two polyphase filters, one for each of horizontal and vertical dimensions.

In one embodiment of the present invention, the vertical polyphase filter is a four-tap filter with programmable coefficients from the vertical coefficient memory 180A. In other embodiments, the number of taps in the vertical polyphase filter may vary. In one embodiment of the present invention, the horizontal polyphase filter is an eight-tap filter with programmable coefficients from the horizontal coefficient memory 180B. In other embodiments, the number of taps in the horizontal polyphase filter may vary.

The vertical and the horizontal coefficient memories may be implemented in SRAM or any other suitable memory. Depending on the operation to be performed, e.g. a vertical or horizontal axis, and scaling-up or scaling-down, appropriate filter coefficients are used, respectively, from the vertical and horizontal coefficient memories. Selection of filter coefficients for scaling-up and scaling-down operations are well known in the art.

The set of line buffers 178 are used to provide input of video data to the horizontal and vertical polyphase filters. In this embodiment, three line buffers are used, but the number of the line buffers may vary in other embodiments. In this embodiment, each of the three line buffers is used to provide an input to one of the taps of the vertical polyphase filter with four taps. The input video is provided to the fourth tap of the vertical polyphase filter. A shift register having eight cells in series is used to provide inputs to the eight taps of the horizontal polyphase filter, each cell providing an input to one of the eight taps.

In this embodiment, a digital video signal 820 and a digitized analog signal video 822 are provided to a first multiplexer 168 as first and second inputs. The first multiplexer 168 has two outputs. A first output of the first multiplexer is provided to the video compositor as a pass through video 186. A second output of the first multiplexer is provided to a first input of a second multiplexer 176 in the downscale path.

In the downscale path, the second multiplexer 176 provides either the digital video or the digitized analog video at the second multiplexer's first input to the video scaler 52. The video scaler provides a downscaled video signal to a second input of a third multiplexer 162. The third multiplexer provides the downscaled video to a capture FIFO 158 which stores the captured downscaled video. The memory controller 126 takes the captured downscaled video and stores it as a captured downscaled video image into a video FIFO 148. An output of the video FIFO is coupled to a first input of a fourth multiplexer 188. The fourth multiplexer provides the output of the video FIFO, which is the captured downscaled video image, as an output 824 to the graphics compositor, and this completes the downscale path. Thus, in the downscale path, either the digital video or the digitized analog video is downscaled first, and then captured.

Figure 25:
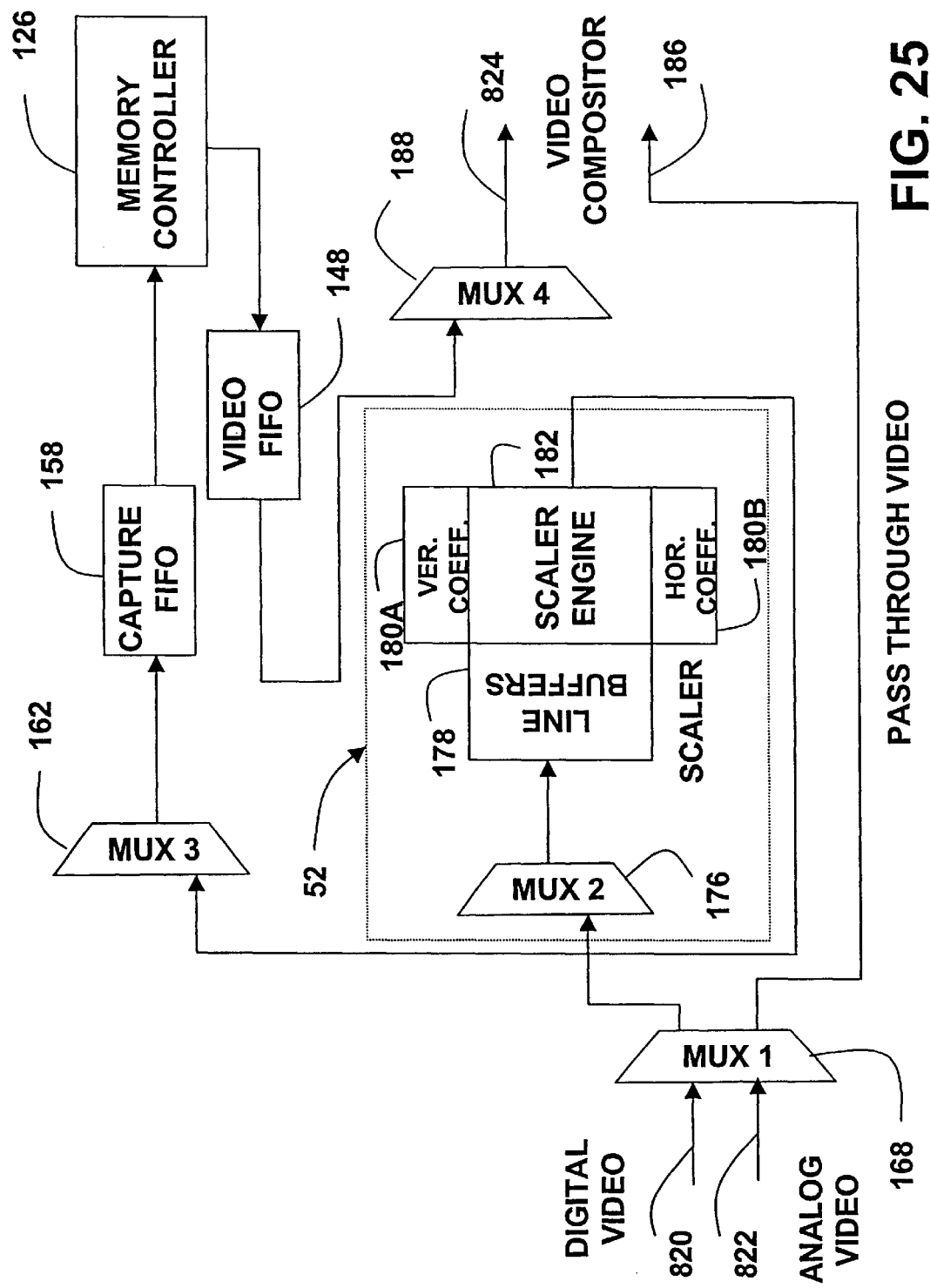
FIG. 25 is a detailed block diagram of components used during video scaling with signal paths involved in downscaling.
Figure 26:
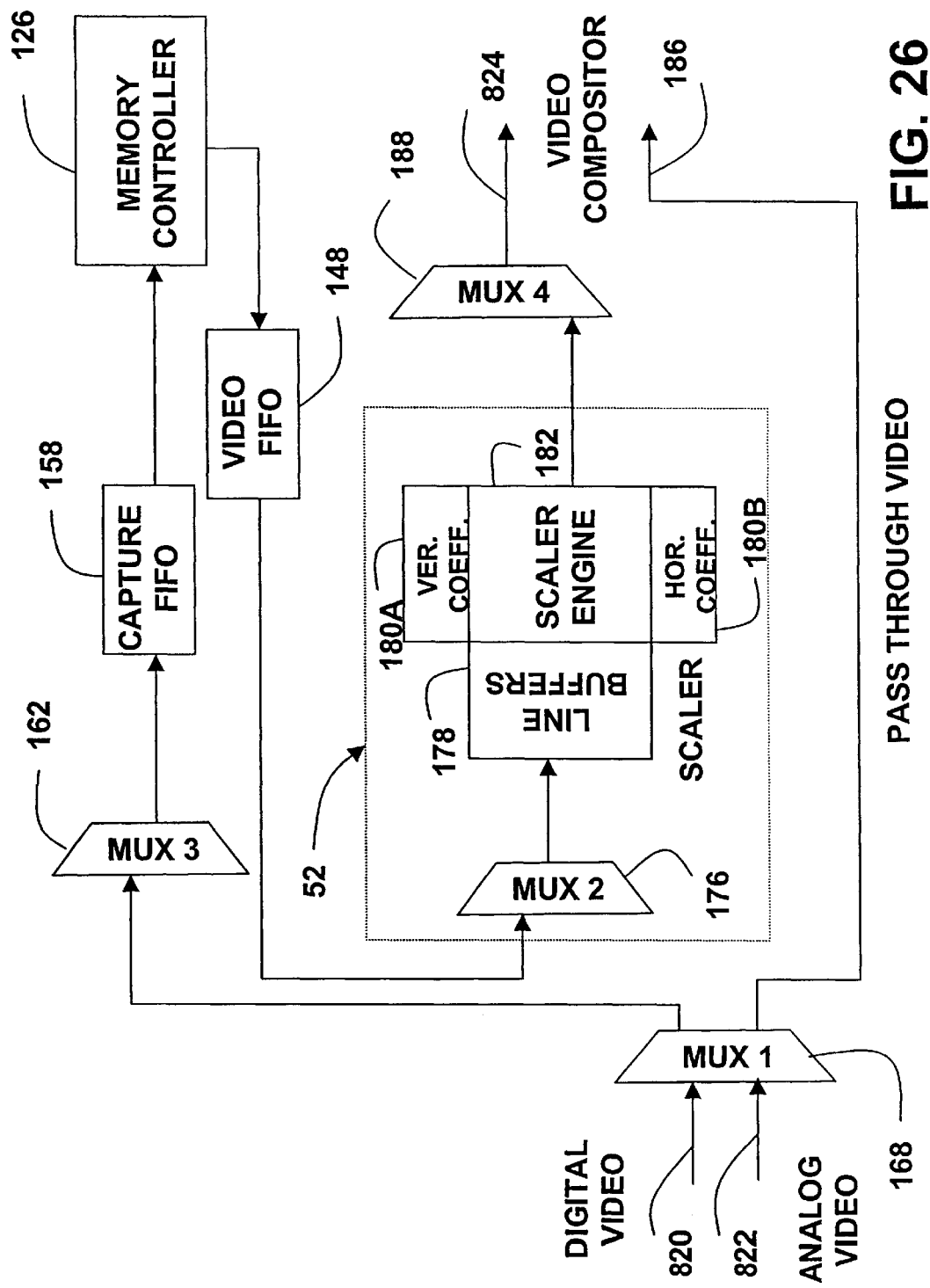
FIG. 26 is a detailed block diagram of components used during video scaling with signal paths involved in upscaling.

FIG. 26 is similar to FIG. 25, but in FIG. 26, signals of the upscale path are illustrated. In the upscale path, the third multiplexer 162 provides either the digital video 820 or the digitized analog video 822 to the capture FIFO 158 which captures and stores input as a captured video image. This captured video image is provided to the memory controller 126 which takes it and provides to the video FIFO 148 which stores the captured video image.

An output of the video FIFO 148 is provided to a second input of the second multiplexer 176. The second multiplexer provides the captured video image to the video scaler 52. The video scaler scales up the captured video image and provides it to a second input of the fourth multiplexer 188 as an upscaled captured video image. The fourth multiplexer provides the upscaled captured video image as the output 824 to the video compositor. Thus, in the upscale path, either the digital video or the digitized analog video is captured first, and then upscaled.

Figure 27:
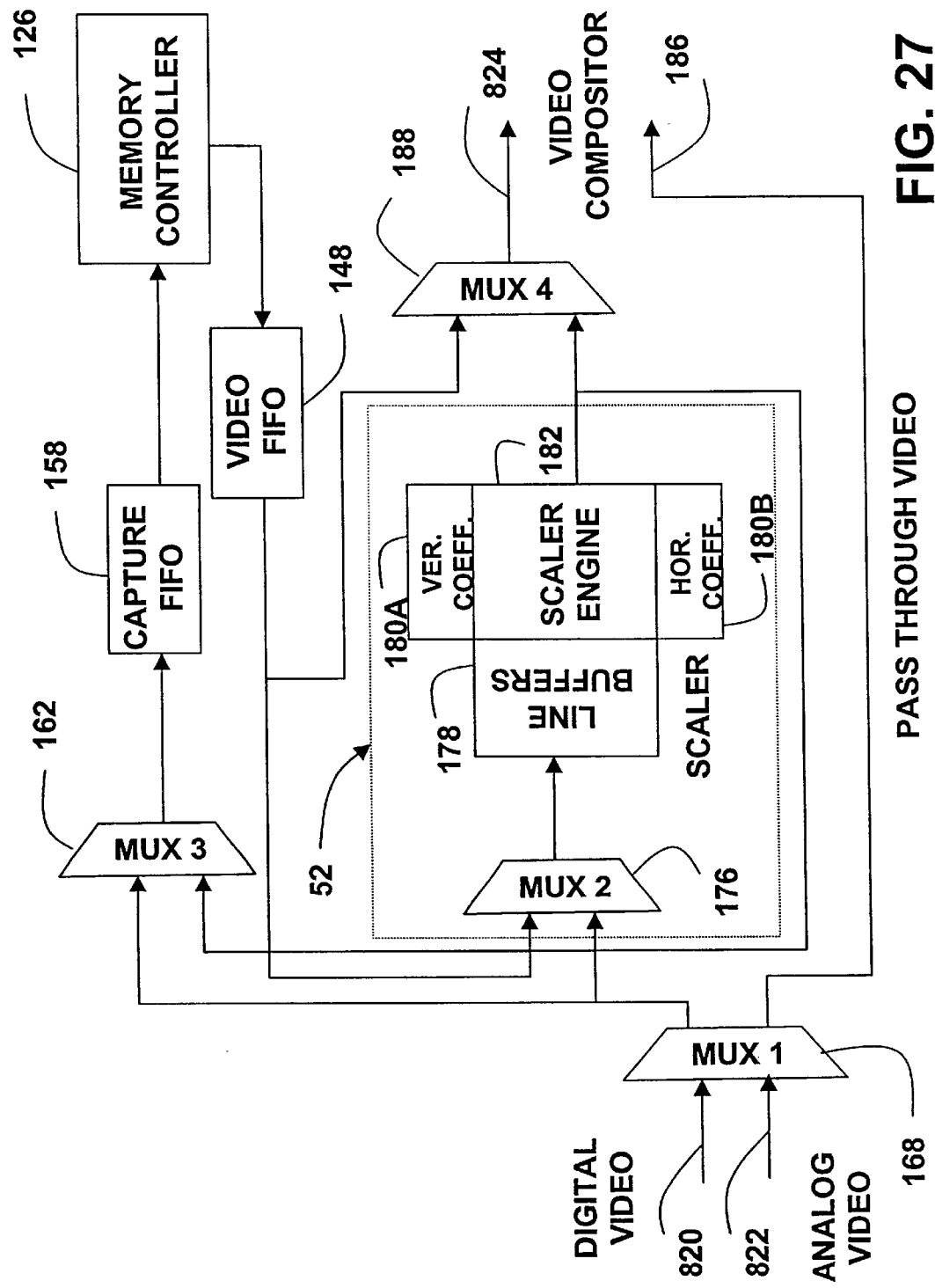
FIG. 27 is a detailed block diagram of components that may be used during video scaling with signal paths indicated for both upscaling and downscaling.

Referring to FIG. 27, FIG. 27 is similar to FIG. 25 and FIG. 26, but in FIG. 27, signals of both the upscale path and the downscale path are illustrated.

X. Blending of Graphics and Video Surfaces

The graphics display system of the present invention is capable of processing an analog video signal, a digital video signal and graphics data simultaneously. In the graphics display system, the analog and digital video signals are processed in the video display pipeline while the graphics data is processed in the graphics display pipeline. After the processing of the video signals and the graphics data have been completed, they are blended together at a video compositor. The video compositor receives video and graphics data from the video display pipeline and the graphics display pipeline, respectively, and outputs to the video encoder ("VEC").

The system may employ a method of compositing a plurality of graphics images and video, which includes blending the plurality of graphics images into a blended graphics image, combining a plurality of alpha values into a plurality of composite alpha values, and blending the blended graphics image and the video using the plurality of composite alpha values.

Figure 28:
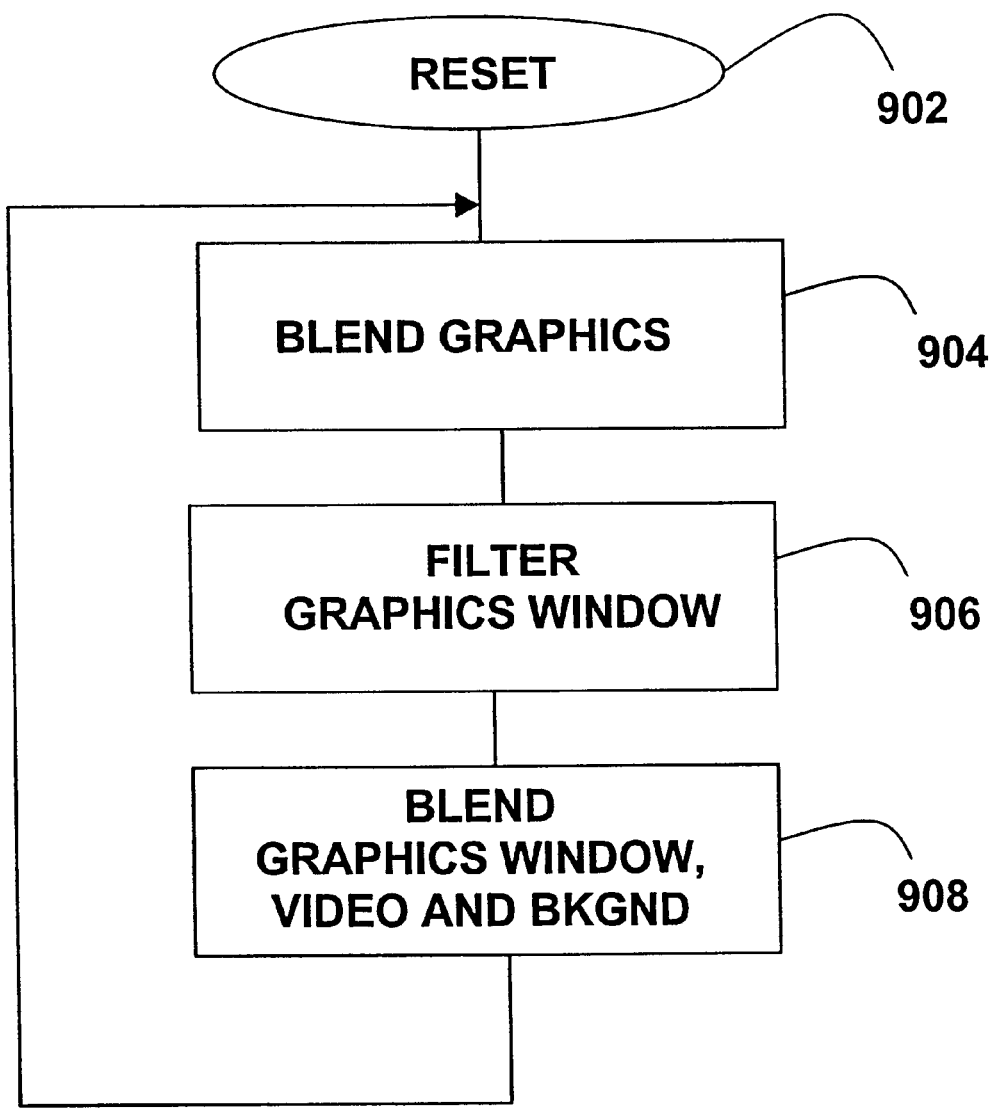
FIG. 28 is a flow diagram of an exemplary process for blending graphics and video surfaces.

Referring to FIG. 28, a flow diagram of a process of blending video and graphics surfaces is illustrated. The graphics display system resets in step 902. In step 904, the video compositor blends the passthrough video and the background color with the scaled video window, using the alpha value which is associated with the scaled video window. The result of this blending operation is then blended with the output of the graphics display pipeline. The graphics output has been pre-blended in the graphics blender in step 904 and filtered in step 906, and blended graphics contain the correct alpha value for multiplication by the video output. The output of the video blend function is multiplied by the video alpha which is obtained from the graphics pipeline and the resulting video and graphics pixel data stream are added together to produce the final blended result.

In general, during blending of different layers of graphics and/or video, every layer $\{L1, L2, L3 \ldots Ln\}$, where L1 is the back-most layer, each layer is blended with the composition of all of the layers behind it, beginning with L2 being blended on top of L1. The intermediate result $R(i)$ from the blending of pixels $P(i)$ of layer $L(i)$ over the pixels $P(i-1)$ of layer $L(i-1)$ using alpha value $A(i)$ is: $R(i)=A(i)*P(i)+(1-A(i))*P(i-1)$.

The alpha values $\{A(i)\}$ are in general different for every layer and for every pixel of every layer. However, in some important applications, it is not practical to apply this formula directly, since some layers may need to be processed in spatial dimensions (e.g. 2 dimensional filtering or scaling) before they can be blended with the layer or layers behind them. While it is generally possible to blend the layers first and then perform the spatial processing, that would result in processing the layers that should not be processed if these layers are behind the subject layer that is to be processed. Processing of the layers that are not to be processed may be undesirable.

Processing the subject layer first would generally require a substantial amount of local storage of the pixels in the subject layer, which may be prohibitively expensive. This problem is significantly exacerbated when there are multiple layers to be processed in front of one or more layers that are not to be processed. In order to implement the formula above directly, each of the layers would have to be processed first, i.e. using their own local storage and individual processing, before they could be blended with the layer behind.

In the preferred embodiment, rather than blending all the layers from back to front, all of the layers that are to be processed (e.g. filtered) are layered together first, even if there is one or more layers behind them over which they should be blended, and the combined upper layers are then blended with the other layers that are not to be processed. For example, layers $\{1, 2 \text{ and } 3\}$ may be layers that are not to be processed, while layers $\{4, 5, 6, 7, \text{ and } 8\}$ may be layers that are to undergo processing, while all 8 layers are to be blended together, using $\{A(i)\}$ values that are independent for every layer and pixel. The layers that are to be filtered, upper layers, may be the graphics windows. The lower layers may include the video window and passthrough video.

In the preferred embodiment, all of the layers that are to be filtered (referred to as "upper" layers) are blended together from back to front using a partial blending operation. In an alternate embodiment, two or more of the upper layers may be blended together in parallel. The back-most of the upper layers is not in general the back-most layer of the entire operation.

In the preferred embodiment, at each stage of the blending, an intermediate alpha value is maintained for later use for blending with the layers that are not to be filtered (referred to as the "lower" layers).

The formula that represents the preferred blending scheme is:

$$R(i)=A(i)*P(i)+(1-A(i))*P(i-1)$$

and $$AR(i)=AR(i-1)*(1-A(i))$$

where R(i) represents the color value of the resulting blended pixel, P(i) represents the color value of the current pixel, A(i) represents the alpha value of the current pixel, P(i−1) represents the value at the location of the current pixel of the composition of all of the upper layers behind the current pixel, initially this represents black before any layers are blended, AR(i) is the alpha value resulting from each instance of this operation, and AR(i−1) represents the intermediate alpha value at the location of the current pixel determined from all of the upper layers behind the current pixel, initially this represents transparency before any layers are blended. AR represents the alpha value that will subsequently be multiplied by the lower layers as indicated below, and so an AR value of 1 (assuming alpha ranges from 0 to 1) indicates that the current pixel is transparent and the lower layers will be fully visible when multiplied by 1.

In other words, in the preferred embodiment, at each stage of blending the upper layers, the pixels of the current layer are blended using the current alpha value, and also an intermediate alpha value is calculated as the product (1−A(i))*(AR(i−1)). The key differences between this and the direct evaluation of the conventional formula are: (1) the calculation of the product of the set of {(1−A(i))} for the upper layers, and (2) a virtual transparent black layer is used to initialize the process for blending the upper layers, since the lower layers that would normally be blended with the upper layers are not used at this point in this process.

The calculation of the product of the sets of {(1−A(i))} for the upper layers is implemented, in the preferred embodiment, by repeatedly calculating AR(i)=AR(i−1)*(1−A(i)) at each layer, such that when all layers {i} have been processed, the result is that AR=the product of all (1−A(i)) values for all upper layers. Alternatively in other embodiments, the composite alpha value for each pixel of blended graphics may be calculated directly as the product of all (1-alpha value of the corresponding pixel of the graphics image on each layer)'s without generating an intermediate alpha at each stage.

To complete the blending process of the entire series of layers, including the upper and lower layers, once the upper layers have been blended together as described above, they may be processed as desired and then the result of this processing, a composite intermediate image, is blended with the lower layer or layers. In addition, the resulting alpha values preferably are also processed in essentially the same way as the image components. The lower layers can be blended in the conventional fashion, so at some point there can be a single image representing the lower layers. Therefore two images, one representing the upper layers and one representing the lower layers can be blended together. In this operation, the AR(n) value at each pixel that results from the blending of the upper layers and any subsequent processing is used to be multiplied with the composite lower layer.

Mathematically this latter operation is as follows: let L(u) be the composite upper layer resulting from the process described above and after any processing, let AR(u) be the composite alpha value of the upper layers resulting from the process above and after any processing, let L(l) be the composite lower layer that results from blending all lower layers in the conventional fashion and after any processing, and let Result be the final result of blending all the upper and lower layers, after any processing. Then, Result=L(u)+AR(u)*L(l). L(u) does not need to be multiplied by any additional alpha values, since all such multiplication operations were already performed at an earlier stage.

In the preferred embodiment, a series of images makes up the upper layers. These are created by reading pixels from memory, as in a conventional graphics display device. Each pixel is converted into a common format if it is not already in that format; in this example the YUV format is used. Each pixel also has an alpha value associated with it. The alpha values can come from a variety of sources, including (1) being part of the pixel value read from memory (2) an element in a color look-up table (CLUT) in cases where the pixel format uses a CLUT (3) calculated from the pixel color value, e.g. alpha as a function of Y, (4) calculated using a keying function, i.e. some pixel values are transparent (i.e. alpha=0) and others are opaque (alpha=1) based on a comparison of the pixel value with a set of reference values, (5) an alpha value may be associated with a region of the image as described externally, such as a rectangular region, described by the four corners of the rectangle, may have a single alpha value associated with it, or (6) some combination of these.

The upper layers are preferably composited in memory storage buffers called line buffers. Each line buffer preferably is sized to contain pixels of one scan line. Each line buffer has an element for each pixel on a line, and each pixel in the line buffer has elements for the color components, in this case Y, U and V, and one for the intermediate alpha value AR. Before compositing of each line begins, the appropriate line buffer is initialized to represent a transparent black having already been composited into the buffer; that is, the YUV value is set to the value that represents black (i.e. Y=0, U=V=128) and the alpha value AR is set to represent (1-transparent)=(1−0)=1.

Each pixel of the current layer on the current line is combined with the value pre-existing in the line buffer using the formulas already described, i.e., $$R(i)=A(i)*P(i)+(1-A(i))*P(i-1)$$

and $$AR(i)=AR(i-1)*(1-A(i)).$$

In other words, the color value of the current pixel P(i) is multiplied by its alpha value A(i), and the pixel in the line buffer representing the same location on the line P(i−1) is read from the line buffer, multiplied by (1−A(i)), and added to the previous result, producing the resulting pixel value R(i). Also, the alpha value at the same location in the line buffer (AR(i−1)) is read from the buffer and multiplied by (1−A(i)), producing AR(i). The results R(i) and AR(i) are then written back to the line buffer in the same location.

When multiplying a YUV value by an alpha value between 0 and 1, the offset nature of the U and V values should preferably be accounted for. In other words, U=V=128 represents a lack of color and it is the value that should result from a YUV color value being multiplied by 0. This can be done in at least two ways. In one embodiment of the present invention, 128 is subtracted from the U and V values before multiplying by alpha, and then 128 is added to the result. In another embodiment, U and V values are directly multiplied by alpha, and it is ensured that at the end of the entire compositing process all of the coefficients multiplied by U and V sum to 1, so that the offset 128 value is not distorted significantly.

Each of the layers in the group of upper layers is preferably composited into a line buffer starting with the backmost of the upper layers and progressing towards the front until the front-most of the upper layers has been composited into the line buffer. In this way, a single hardware block, i.e., the display engine, may be used to implement the formula above for all of the upper layers. In this arrangement, the graphics compositor engine preferably operates at a clock frequency that is substantially higher than the pixel display rate. In one embodiment of the present invention, the graphics compositor engine operates at 81 MHz while the pixel display rate is 13.5 MHz.

This process repeats for all of the lines in the entire image, starting at the top scan line and progressing to the bottom. Once the compositing of each scan line into a line buffer has been completed, the scan line becomes available for use in processing such as filtering or scaling. Such processing may be performed while subsequent scan lines are being composited into other line buffers. Various processing operations may be selected such as anti-flutter filtering and vertical scaling.

In alternative embodiments more than one graphics layer may be composited simultaneously, and in some such embodiments it is not necessary to use line buffers as part of the compositing process. If all upper layers are composited simultaneously, the combination of all upper layers can be available immediately without the use of intermediate storage.

Figure 29:
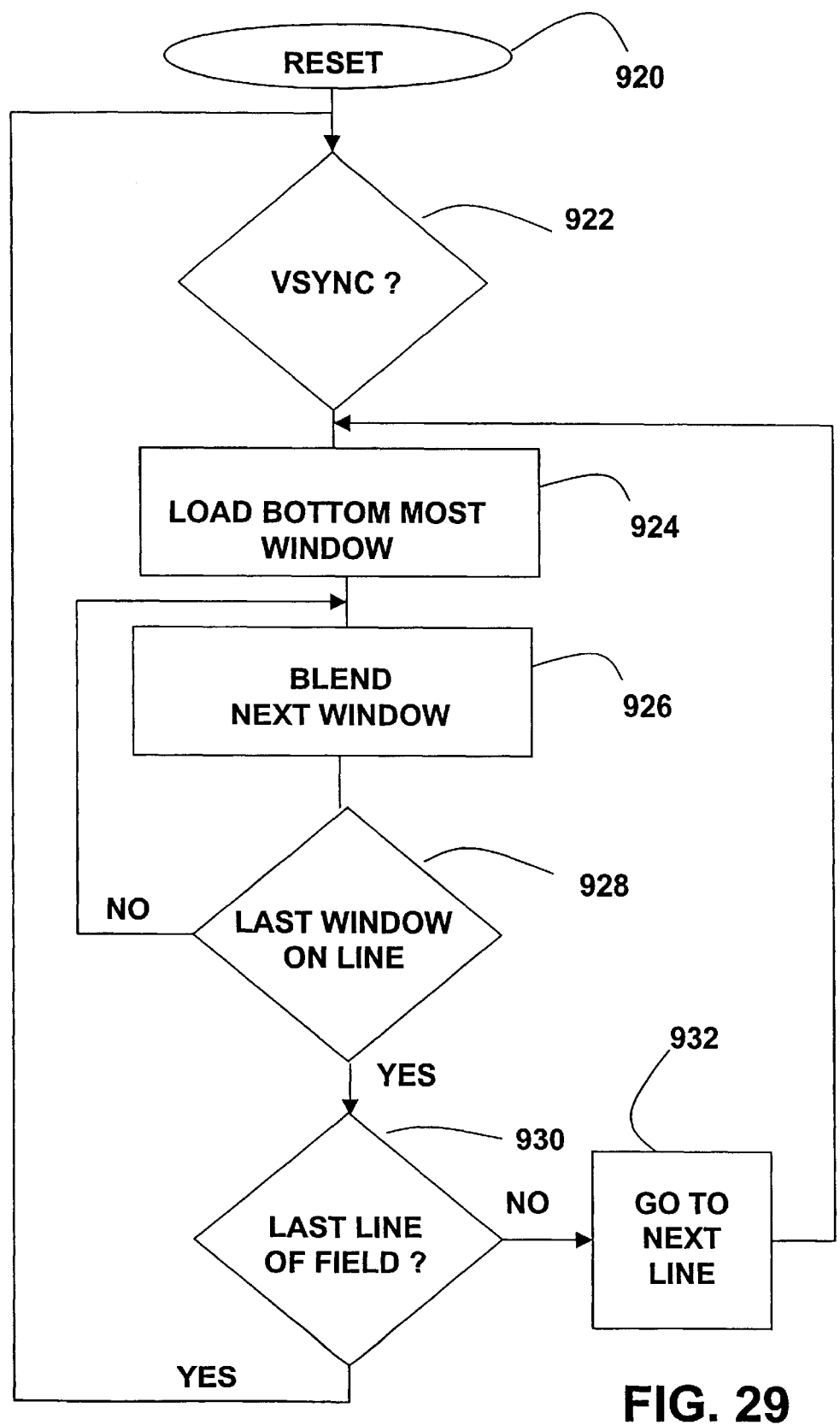
FIG. 29 is a flow diagram of an exemplary process for blending graphics windows into a combined blended graphics output.

Referring to FIG. 29, a flow diagram of a process of blending graphics windows is illustrated. The system preferably resets in step 920. In step 922, the system preferably checks for a vertical sync (VSYNC). If a VSYNC has been received, the system in step 924 preferably loads a line from the bottom most graphics window into a graphics line buffer. Then the system in step 926 preferably blends a line from the next graphics window into the line buffer. Then the system in step 928 preferably determines if the last graphics window visible on a current display line has been blended. If the last graphics window has not been blended, the system continues on with the blending process in step 926.

If the last window of the current display line has been reached, the system preferably checks in step 930 to determine if the last graphics line of a current display field has been blended. If the last graphics line has been blended, the system awaits another VSYNC in step 922. If the last graphics line has not been blended, the system goes to the next display line in step 932 and repeats the blending process.

Figure 30:
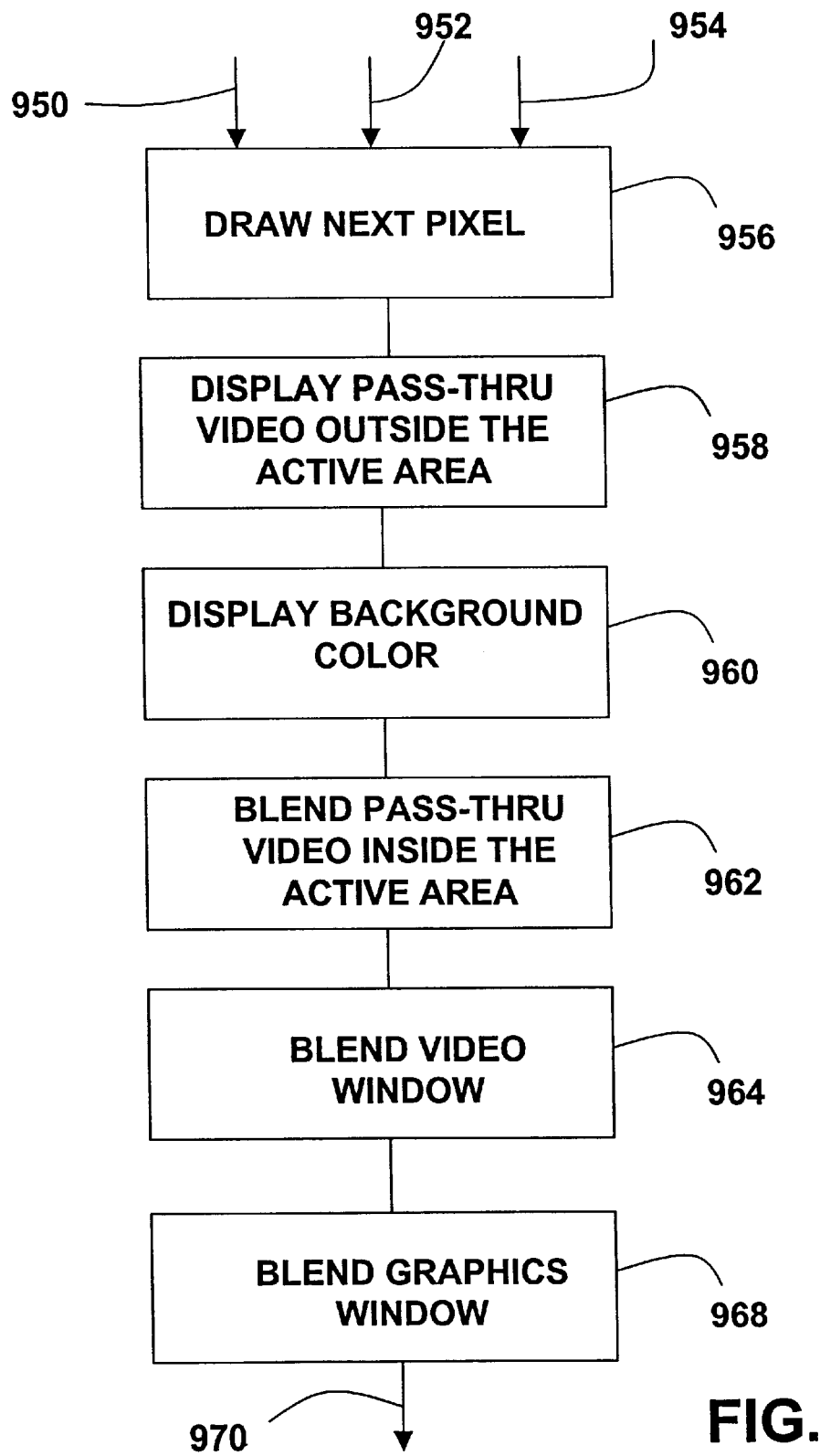
FIG. 30 is a flow diagram of an exemplary process for blending graphics, video and background color.

Referring to FIG. 30, a flow diagram of a process of receiving blended graphics 950, a video window 952 and a passthrough video 954 and blending them. A background color preferably is also blended in one embodiment of the present invention. As step 956 indicates, the video compositor preferably displays each pixel as they are composited without saving pixels to a frame buffer or other memory.

When the video signals and graphics data are blended in the video compositor, the system in step 958 preferably displays the passthrough video 954 outside the active window area first. There are 525 scan lines in each frame and 858 pixels in each scan line of NTSC standard television signals, when a sample rate of 13.5 MHz is used, per ITU-R Bt.601. An active window area of the NTSC standard television is inside an NTSC frame. There are 625 scan lines per frame and 864 pixels in each scan line of PAL standard television, when using the ITU-R Bt.601 standard sample rate of 13.5 MHz. An active window area of the PAL standard television is inside a PAL frame.

Within the active window area, the system in step 960 preferably blends the background color first. On top of the background color, the system in step 962 preferably blends the portion of the passthrough video that falls within the active window area. On top of the passthrough window, the system in step 964 preferably blends the video window. Finally, the system in step 968 blends the graphics window on top of the composited video window and outputs composited video 970 for display.

Interlaced displays, such as televisions, have an inherent tendency to display an apparent vertical motion at the horizontal edges of displayed objects, with horizontal lines, and on other points on the display where there is a sharp contrast gradient along the vertical axis. This apparent vertical motion is variously referred to as flutter, flicker, or judder.

While some image elements can be designed specifically for display on interlaced TVs or filtered before they are displayed, when multiple such image objects are combined onto one screen, there are still visible flutter artifacts at the horizontal top and bottom edges of these objects. While it is also possible to include filters in hardware to minimize visible flutter of the display, such filters are costly in that they require higher memory bandwidth from the display memory, since both even and odd fields should preferably be read from memory for every display field, and they tend to require additional logic and memory on-chip.

One embodiment of the present invention includes a method of reducing interlace flutter via automatic blending. This method has been designed for use in graphics displays device that composites visible objects directly onto the screen; for example, the device may use windows, window descriptors and window descriptor lists, or similar mechanisms. The top and bottom edges (first and last scan lines) of each object (or window) are displayed such that the alpha blend value (alpha blend factor) of these edges is adjusted to be one-half of what it would be if these same lines were not the top and bottom lines of the window.

For example, a window may constitute a rectangular shape, and the window may be opaque, i.e. it's alpha blend factor is 1, on a scale of 0 to 1. All lines on this window except the first and last are opaque when the window is rendered. The top and bottom lines are adjusted so that, in this case, the alpha blend value becomes 0.5, thereby causing these lines to be mixed 50% with the images that are behind them. This function occurs automatically in the preferred implementation. Since in the preferred implementation, windows are rectangular objects that are rendered directly onto the screen, the locations of the top and bottom lines of every window are already known.

In one embodiment, the function of dividing the alpha blend values for the top and bottom lines by two is implemented only for the top fields of the interlaced display. In another embodiment, the function of dividing the alpha blend values for the top and bottom lines by two is implemented only for the bottom fields of the interlaced display.

In the preferred embodiment, there exists also the ability to alpha blend each window with the windows behind it, and this alpha value can be adjusted for every pixel, and therefore for every scan line. These characteristics of the application design are used advantageously, as the flutter reduction effect is implemented by controlling the alpha blend function using information that is readily available from the window control logic.

In a specific illustrative example, the window is solid opaque white, and the image behind it is solid opaque black. In the absence of the disclosed method, at the top and bottom edges of the window there would be a sharp contrast between black and white, and when displayed on an interlaced TV, significant flutter would be visible. Using the disclosed method, the top and bottom lines are blended 50% with the background, resulting in a color that is halfway between black and white, or gray. When displayed on an interlaced TV, the apparent visual location of the top and bottom edges of the object is constant, and flutter is not apparent. The same effect applies equally well for other image examples.

The method of reducing interlace flutter of this embodiment does not require any increase in memory bandwidth, as the alternate field (the one not currently being displayed) is not read from memory, and there is no need for vertical filtering, which would have required logic and on-chip memory.

The same function can alternatively be implemented in different graphics hardware designs. For example in designs using a frame buffer (conventional design), graphic objects can be composited into the frame buffer with an alpha blend value that is adjusted to one-half of its normal value at the top and bottom edges of each object. Such blending can be performed in software or in a blitter that has a blending capability.

XI. Anti-Flutter Filtering/Vertical Scaling

In the preferred embodiment, the vertical filtering and anti-flutter filtering are performed on blended graphics by one graphics filter. One function of the graphics filter is low pass filtering in the vertical dimension. The low pass filtering may be performed in order to minimize the "flutter" effect inherent in interlaced displays such as televisions. The vertical downscaling or upscaling operation may be performed in order to change the pixel aspect ratio from the square pixels that are normal for computer, Internet and World Wide Web content into any of the various oblong aspect ratios that are standard for televisions as specified in ITU-R 601B. In order to be able to perform vertical scaling of the upper layers the system preferably includes seven line buffers. This allows for four line buffers to be used for filtering and scaling, two are available for progressing by one or two lines at the end of every line, and one for the current compositing operation.

When scaling or filtering are performed, the alpha values in the line buffers are filtered or scaled in the same way as the YUV values, ensuring that the resulting alpha values correctly represent the desired alpha values at the proper location. Either or both of these operations, or neither, or other processing, may be performed on the contents of the line buffers.

Once the optional processing of the contents of the line buffers has been completed, the result is the completed set of upper layers with the associated alpha value (product of $(1-A(i))$. These results are used directly for compositing the upper layers with the lower layers, using the formula: Result=$L(u)-AR(u)*L(1)$ as explained in detail in reference to blending of graphics and video. If the lower layers require any processing independent of processing required for the upper layers or for the resulting image, the lower layers are processed before being combined with the upper layers; however in one embodiment of the present invention, no such processing is required.

Each of the operations described above is preferably implemented digitally using conventional ASIC technology. As part of the normal ASIC technology the logical operations are segmented into pipeline stages, which may require temporary storage of logic values from one clock cycle to the next. The choice of how many pipeline stages are used in each of the operations described above is dependent on the specific ASIC technology used, the clock speed chosen, the design tools used, and the preference of the designer, and may vary without loss of generality. In the preferred embodiment the line buffers are implemented as dual port memories allowing one read and one write cycle to occur simultaneously, facilitating the read and write operations described above while maintaining a clock frequency of 81 MHz. In this embodiment the compositing function is divided into multiple pipeline stages, and therefore the address being read from the memory is different from the address being written to the same memory during the same clock cycle.

Each of the arithmetic operations described above in the preferred embodiment use 8 bit accuracy for each operand; this is generally sufficient for providing an accurate final result. Products are rounded to 8 bits before the result is used in subsequent additions.

Figure 31:
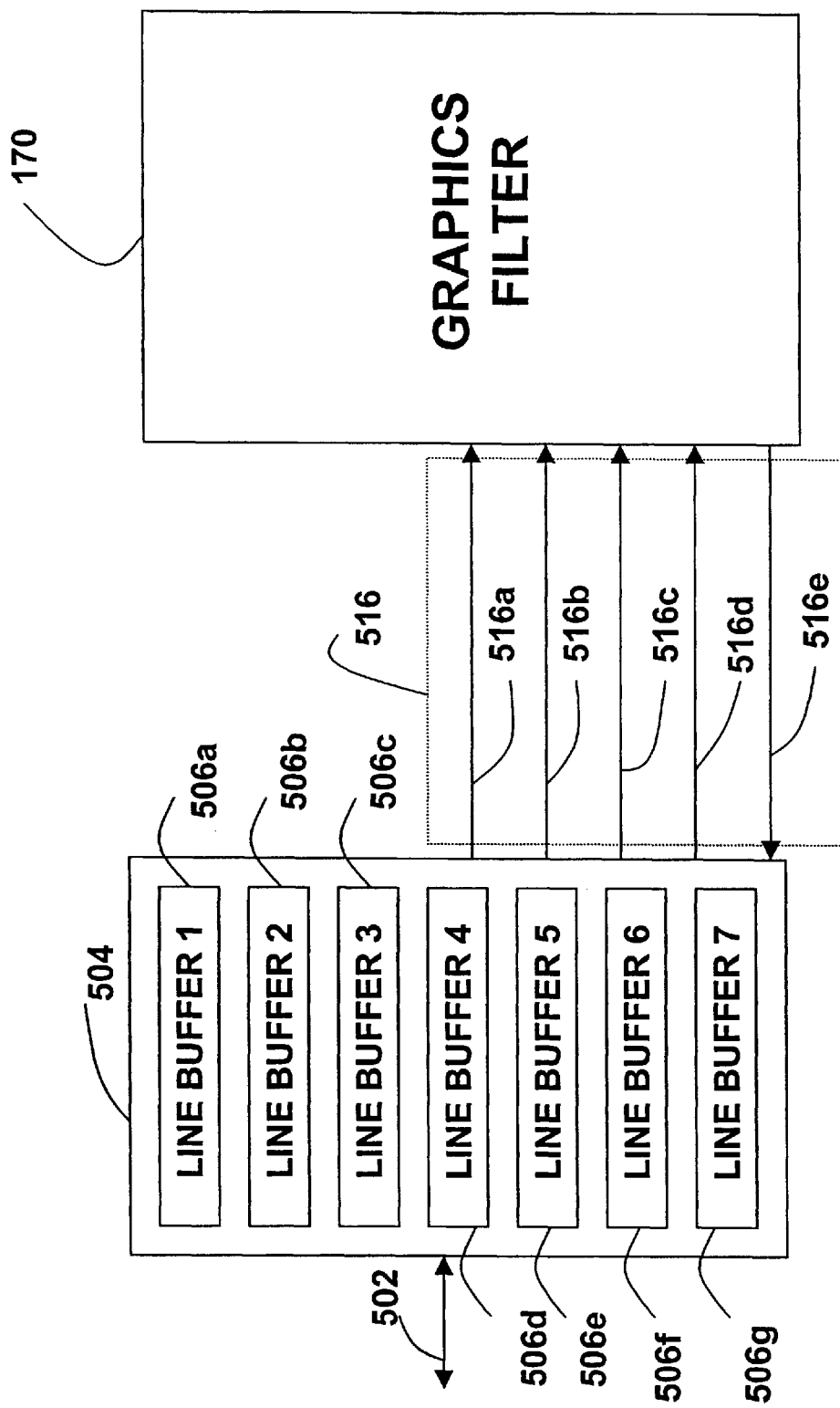
FIG. 31 is a block diagram of a polyphase filter that performs both anti-flutter filtering and vertical scaling of graphics windows.

Referring to FIG. 31, a block diagram illustrates an interaction between the line buffers 504 and a graphics filter 172. The line buffers comprises a set of line buffers 1–7 506a–g. The line buffers are controlled by a graphics line buffer controller over a line buffer control interface 502. In one embodiment of the present invention, the graphics filter is a four-tap polyphase filter, so that four lines of graphics data 516a–d are provided to the graphics filter at a time. The graphics filter 172 sends a line buffer release signal 516e to the line buffers to notify that one to three line buffers are available for compositing additional graphics display lines.

In another embodiment, line buffers are not used, but rather all of the upper layers are composited concurrently. In this case, there is one graphics blender for each of the upper layers active at any one pixel, and the clock rate of the graphics blender may be approximately equal to the pixel display rate. The clock rate of the graphics blenders may be somewhat slower or faster, if FIFO buffers are used at the output of the graphics blenders.

The mathematical formulas implemented are the same as in the first embodiment described. The major difference is that instead of performing the compositing function iteratively by reading and writing a line buffer, all layers are composited concurrently and the result of the series of compositor blocks is immediately available for processing, if required, and for blending with the lower layers, and line buffers are not used for purposes of compositing.

Line buffers may still be needed in order to implement vertical filtering or vertical scaling, as those operations typically require more than one line of the group of upper layers to be available simultaneously, although fewer line buffers are generally required here than in the preferred embodiment. Using multiple graphics blenders operating at approximately the pixel rate simplifies the implementation in applications where the pixel rate is relatively fast for the ASIC technology used, for example in HDTV video and graphics systems where the pixel rate is 74.25 MHz.

XII. Unified Memory Architecture/Real Time Scheduling

Recently, improvements to memory fabrication technologies have resulted in denser memory chips. However memory chip bandwidth has not been increasing as rapidly. The bandwidth of a memory chip is a measure of how fast contents of the memory chip can be accessed for reading or writing. As a result of increased memory density without necessarily a commensurate increase in bandwidth, in many conventional system designs multiple memory devices are used for different functions, and memory space in some memory modules may go unused or is wasted. In the preferred embodiment, a unified memory architecture is used. In the unified memory architecture, all the tasks (also referred to as "clients"), including CPU, display engine and IO devices, share the same memory.

The unified memory architecture preferably includes a memory that is shared by a plurality of devices, and a memory request arbiter coupled to the memory, wherein the memory request arbiter performs real time scheduling of memory requests from different devices having different priorities. The unified memory system assures real time scheduling of tasks, some of which do not inherently have pre-determined periodic behavior and provides access to memory by requesters that are sensitive to latency and do not have determinable periodic behavior.

In an alternate embodiment, two memory controllers are used in a dual memory controller system. The memory controllers may be 16-bit memory controllers or 32-bit memory controllers. Each memory controller can support different configuration of SDRAM device types and banks, or other forms of memory besides SDRAM. A first memory space addressed by a first memory controller is preferably adjacent and contiguous to a second memory space addressed by a second memory controller so that software applications view the first and second memory spaces as one continuous memory space. The first and the second memory controllers may be accessed concurrently by different clients. The software applications may be optimized to improve performance.

For example, a graphics memory may be allocated through the first memory controller while a CPU memory is allocated through the second memory controller. While a display engine is accessing the first memory controller, a CPU may access the second memory controller at the same time. Therefore, a memory access latency of the CPU is not adversely affected in this instance by memory being accessed by the display engine and vice versa. In this example, the CPU may also access the first memory controller at approximately the same time that the display engine is accessing the first memory controller, and the display controller can access memory from the second memory controller, thereby allowing sharing of memory across different functions, and avoiding many copy operations that may otherwise be required in conventional designs.

Figure 32:
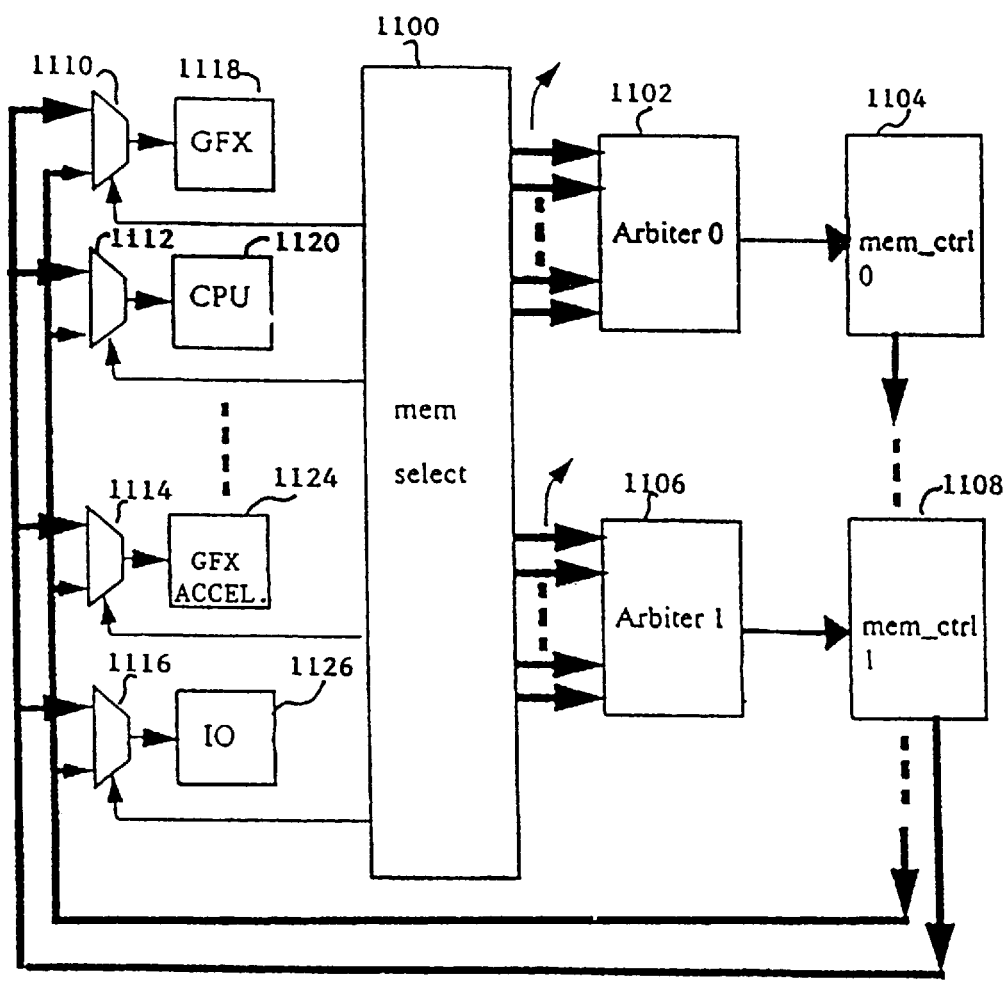
FIG. 32 is a functional block diagram of an exemplary memory service request and handling system with dual memory controllers.

Referring to FIG. 32, a dual memory controller system services memory requests generated by a display engine 1118, a CPU 1120, a graphics accelerator 1124 and an input/output module 1126 are provided to a memory select block 1100. The memory select block 1100 preferably routes the memory requests to a first arbiter 1102 or to a second arbiter 1106 based on the address of the requested memory. The first arbiter 1102 sends memory requests to a first memory controller 1104 while the second arbiter 1106 sends memory requests to a second memory controller 1108. The design of arbiters for handling requests from tasks with different priorities is well known in the art.

The first memory controller preferably sends address and control signals to a first external SDRAM and receives a first data from the first external SDRAM. The second memory controller preferably sends address and control signals to a second external SDRAM and receives a second data from the second external SDRAM. The first and second memory controllers preferably provide first and second data received, respectively, from the first and second external SDRAMs to a device that requested the received data.

The first and second data from the first and second memory controllers are preferably multiplexed, respectively, by a first multiplexer 1110 at an input of the display engine, by a second multiplexer 1112 at an input of the CPU, by a third multiplexer 1114 at an input of the graphics accelerator and by a fourth multiplexer 1116 at an input of the I/O module. The multiplexers provide either the first or the second data, as selected by memory select signals provided by the memory select block, to a corresponding device that has requested memory.

An arbiter preferably uses an improved form of real time scheduling to meet real-time latency requirements while improving performance for latency-sensitive tasks. First and second arbiters may be used with the flexible real time scheduling. The real time scheduling is preferably implemented on both the first arbiter and the second arbiter independently.

When using a unified memory, memory latencies caused by competing memory requests by different tasks should preferably be addressed. In the preferred embodiment, a real-time scheduling and arbitration scheme for unified memory is implemented, such that all tasks that use the unified memory meet their real-time requirements. With this innovative use of the unified memory architecture and real-time scheduling, a single unified memory is provided to the CPU and other devices of the graphics display system without compromising quality of graphics or other operations and while simultaneously minimizing the latency experienced by the CPU.

The methodology used preferably implements real-time scheduling using Rate Monotonic Scheduling ("RMS"). It is a mathematical approach that allows the construction of provably correct schedules of arbitrary numbers of real-time tasks with arbitrary periods for each of the tasks. This methodology provides for a straight forward means for proof by simulation of the worst case scenario, and this simulation is simple enough that it can be done by hand. RMS, as normally applied, makes a number of simplifying assumptions in the creation of a priority list.

In the normal RMS assumptions, all tasks are assumed to have constant periods, such that a request for service is made by the task with stated period, and all tasks have a latency tolerance that equals that task's period. Latency tolerance is defined as the maximum amount of time that can pass from the moment the task requests service until that task's request has been completely satisfied. During implementation of one embodiment of the present invention, the above assumptions have been modified, as described below.

In the RMS method, all tasks are generally listed along with their periods. They are then ordered by period, from the shortest to the longest, and priorities are assigned in that order. Multiple tasks with identical periods can be in any relative order. In other words, the relative order amongst them can be decided by, for example, flipping a coin.

Proof of correctness, i.e. the guarantee that all tasks meet their deadlines, is constructed by analyzing the behavior of the system when all tasks request service at exactly the same time; this time is called the "critical instant". This is the worst case scenario, which may not occur in even a very large set of simulations of normal operation, or perhaps it may never occur in normal operation, however it is presumed to be possible. As each task is serviced, it uses the shared resource, memory clock cycles in the present invention, in the degree stated by that task. If all tasks meet their deadlines, the system is guaranteed to meet all tasks' deadlines under all conditions, since the critical instant analysis simulates the worst case.

When the lowest priority real-time task meets its deadline, without any higher priority tasks missing their deadlines, then all tasks are proven to meet their deadlines. As soon as any task in this simulation fails to meet its deadline, the test has failed and the task set cannot be guaranteed, and therefore the design should preferably be changed in order to guarantee proper operation under worst case conditions.

In the RMS methodology, real-time tasks are assumed to have periodic requests, and the period and the latency tolerance are assumed to have the same value. Since the requests may not be in fact periodic, it is clearer to speak in terms of "minimum interval" rather than period. That is, any task is assumed to be guaranteed not to make two consecutive requests with an interval between them that is any shorter than the minimum interval.

The deadline, or the latency tolerance, is the maximum amount of time that may pass between the moment a task makes a request for service and the time that the service is completed, without impairing the function of the task. For example, in a data path with a constant rate source (or sink), a FIFO, and memory access from the FIFO, the request may occur as soon as there is enough data in the FIFO that if service is granted immediately the FIFO does not underflow (or overflow in case of a read operation supporting a data sink). If service is not completed before the FIFO overflows (or underflows in the case of a data sink) the task is impaired.

In the RMS methodology, those tasks that do not have specified real-time constraints are preferably grouped together and served with a single master task called the "sporadic server", which itself has the lowest priority in the system. Arbitration within the set of tasks served by the sporadic server is not addressed by the RMS methodology, since it is not a real-time matter. Thus, all non-real-time tasks are served whenever there is resource available, however the latency of serving any one of them is not guaranteed.

To implement real-time scheduling based on the RMS methodology, first, all of the tasks or clients that need to access memory are preferably listed, not necessarily in any particular order. Next, the period of each of the tasks is preferably determined. For those with specific bandwidth requirements (in bytes per second of memory access), the period is preferably calculated from the bandwidth and the burst size. If the deadline is different from the period for any given task, that is listed as well. The resource requirement when a task is serviced is listed along with the task. In this case, the resource requirement is the number of memory clock cycles required to service the memory access request. The tasks are sorted in order of increasing period, and the result is the set of priorities, from highest to lowest. If there are multiple tasks with the same period, they can be given different, adjacent priorities in any random relative order within the group; or they can be grouped together and served with a single priority, with round-robin arbitration between those tasks at the same priority.

In practice, the tasks sharing the unified memory do not all have true periodic behavior. In one embodiment of the present invention, a block out timer, associated with a task that does not normally have a period, is used in order to force a bounded minimum interval, similar to a period, on that task. For example a block out timer associated with the CPU has been implemented a in this embodiment. If left uncontrolled, the CPU can occupy all available memory cycles, for example by causing a never-ending stream of cache misses and memory requests. At the same time, CPU performance is determined largely by "average latency of memory access", and so the CPU performance would be less than optimal if all CPU memory accessed were consigned to a sporadic server, i.e., at the lowest priority.

In this embodiment, the CPU task has been converted into two logical tasks. A first CPU task has a very high priority for low latency, and it also has a block out timer associated with it such that once a request by the CPU is made, it cannot submit a request again until the block out timer has timed out. In this embodiment, the CPU task has the top priority. In other embodiments, the CPU task may have a very high priority but not the top priority. The timer period has been made programmable for system tuning, in order to accommodate different system configurations with different memory widths or other options.

In one embodiment of the present invention, the block out timer is started when the CPU makes a high priority request. In another embodiment, the block out timer is started when the high priority request by the CPU is serviced. In other embodiments, the block out timer may be started at any time in the interval between the time the high priority request is made and the time the high priority request is serviced.

A second CPU task is preferably serviced by a sporadic server in a round-robin manner. Therefore if the CPU makes a long string of memory requests, the first one is served as a high priority task, and subsequent requests are served by the low priority sporadic server whenever none of the real-time tasks have requests pending, until the CPU block out timer times out. In one embodiment of the present invention, the graphics accelerator and the display engine are also capable of requesting more memory cycles than are available, and so they too use similar block out timer.

For example, the CPU read and write functions are grouped together and treated as two tasks. A first task has a theoretical latency bound of 0 and a period that is programmable via a block out timer, as described above. A second task is considered to have no period and no deadline, and it is grouped into the set of tasks served by the sporadic server via a round robin at the lowest priority. The CPU uses a programmable block out timer between high priority requests in this embodiment.

For another example, a graphics display task is considered to have a constant bandwidth of 27 MB/s, i.e., 16 bits per pixel at 13.5 MHz. However, the graphics bandwidth in one embodiment of the present invention can vary widely from much less than 27 MB/s to a much greater figure, but 27 MB/s is a reasonable figure for assuring support of a range of applications. For example, in one embodiment of the present invention, the graphics display task utilizes a block out timer that enforces a period of 2.37 $\mu s$ between high priority requests, while additional requests are serviced on a best-effort basis by the sporadic server in a low priority round robin manner.

Figure 33:
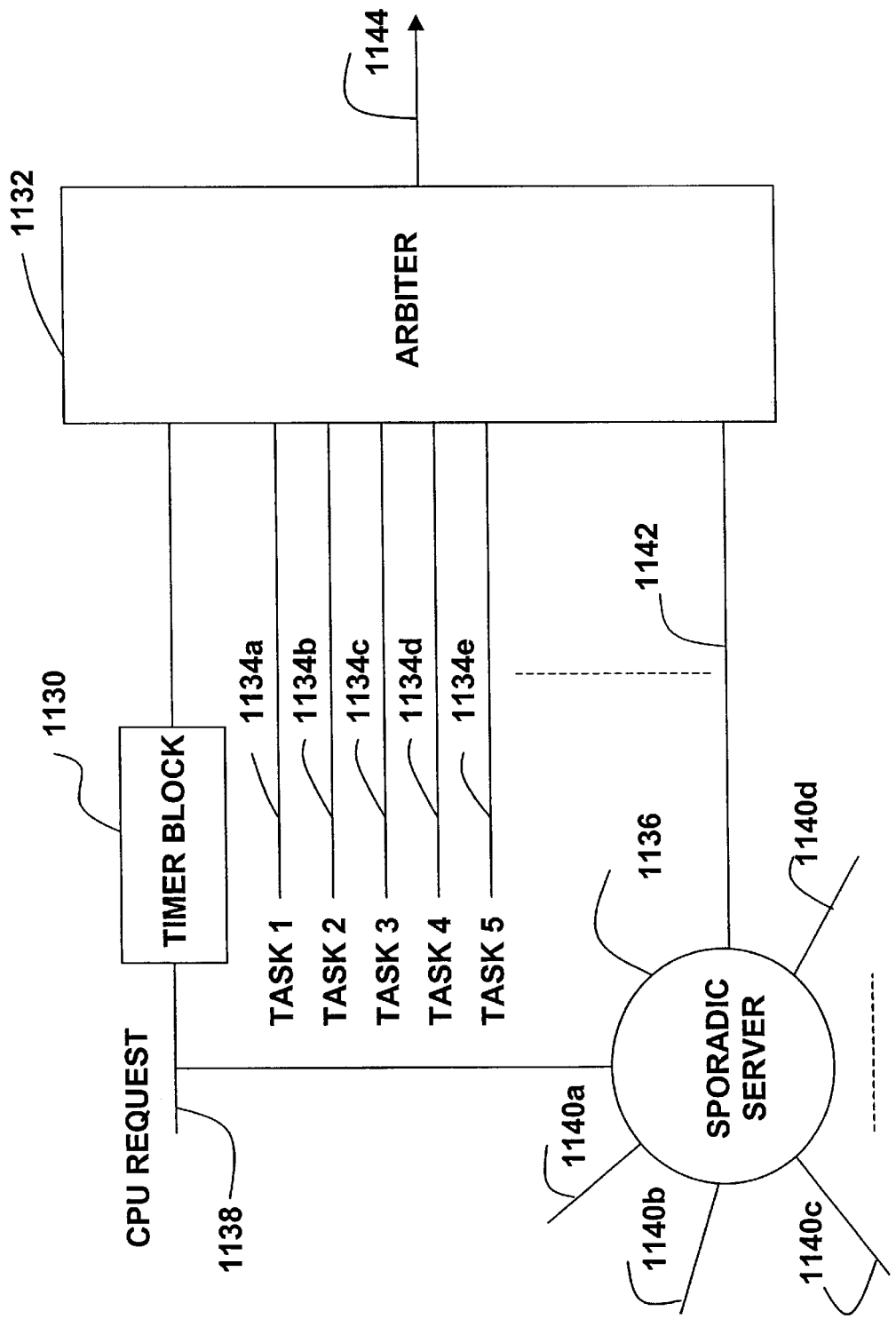
FIG. 33 is a functional block diagram of an implementation of a real time scheduling system.

Referring to FIG. 33, a block diagram illustrates an implementation of a real-time scheduling using an RMS methodology. A CPU service request 1138 is preferably coupled to an input of a block out timer 1130 and a sporadic server 1136. An output of the block out timer 1130 is preferably coupled to an arbiter 1132 as a high priority service request. Tasks 1–5 1134*a–e* may also be coupled to the arbiter as inputs. An output of the arbiter is a request for service of a task that has the highest priority among all tasks that have a pending memory request.

In FIG. 33, only the CPU service request 1138 is coupled to a block out timer. In other embodiments, service requests from other tasks may be coupled to their respective block out timers. The block out timers are used to enforce a minimum interval between two successive accesses by any high priority task that is non-periodic but may require expedited servicing. Two or more such high priority tasks may be coupled to their respective block out timers in one embodiment of the present invention. Devices that are coupled to their respective block out timers as high priority tasks may include a graphics accelerator, a display engine, and other devices.

In addition to the CPU request 1138, low priority tasks 1140a–d may be coupled to the sporadic server 1136. In the sporadic server, these low priority tasks are handled in a round robin manner. The sporadic server sends a memory request 1142 to the arbiter for the next low priority task to be serviced.

Figure 34:
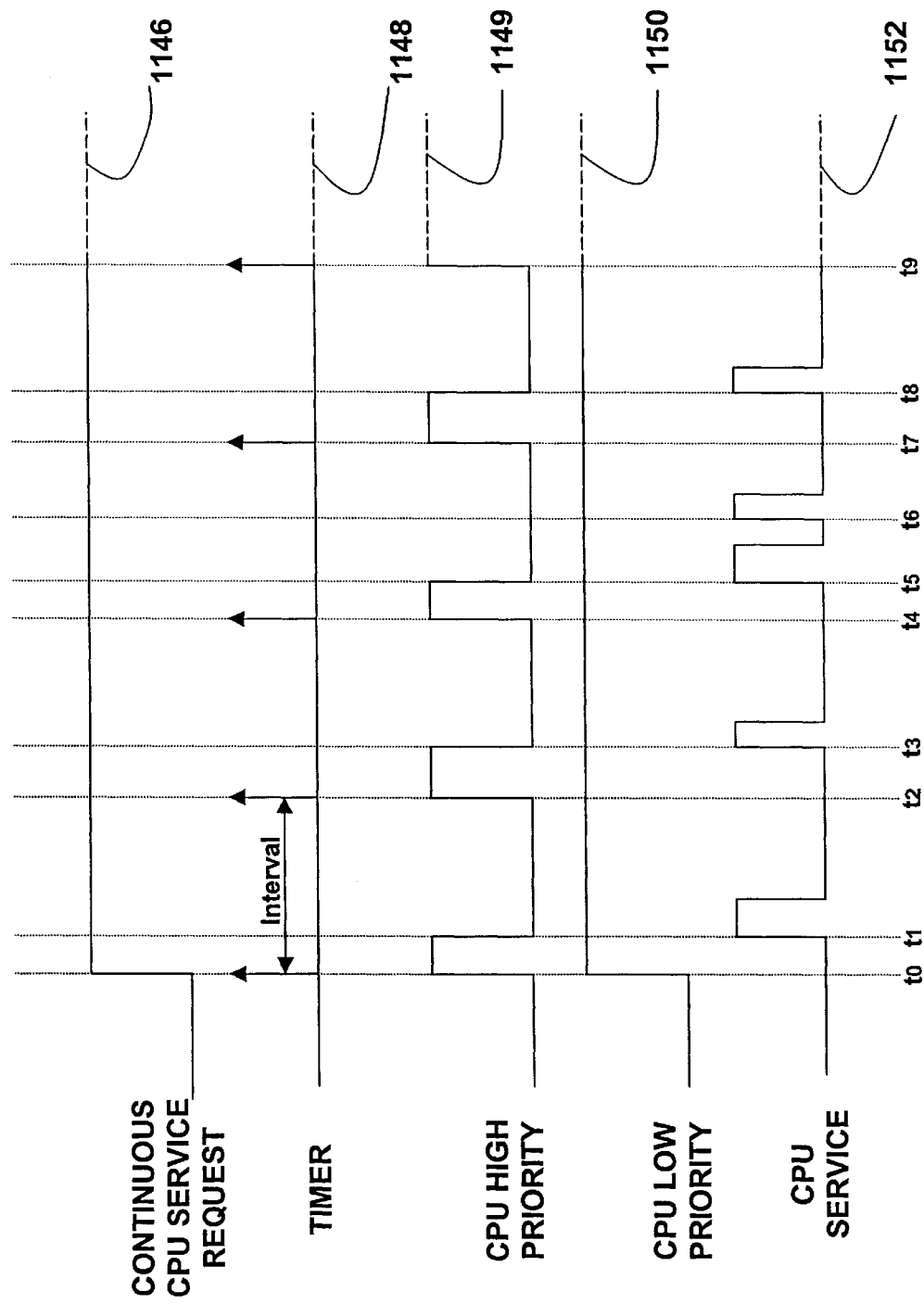
FIG. 34 is a timing diagram of an exemplary CPU servicing mechanism that has been implemented using real time scheduling.

Referring to FIG. 34, a timing diagram illustrates CPU service requests and services in case of a continuous CPU request 1146. In practice, the CPU request is generally not continuous, but FIG. 34 has been provided for illustrative purposes. In the example represented in FIG. 34, a block out timer 1148 is started upon a high priority service request 1149 by the CPU. At time to, the CPU starts making the continuous service request 1146, and a high priority service request 1149 is first made provided that the block out timer 1148 is not running at time $t_0$. When the high priority service request is made, the block out timer 1148 is started. Between time $t_0$ and time $t_1$, the memory controller finishes servicing a memory request from another task. The CPU is first serviced at time $t_1$. In the preferred embodiment, the duration of the block out timer is programmable. For example, the duration of the block out timer may be programmed to be 3 µs.

Any additional high priority CPU request 1149 is blocked out until the block out timer times out at time $t_2$. Instead, the CPU low priority request 1150 is handled by a sporadic server in a round robin manner between time $t_0$ and time $t_2$. The low priority request 1150 is active as long as the CPU service request is active. Since the CPU service request 1146 is continuous, another high priority service request 1149 is made by the CPU and the block out timer is started again as soon as the block out timer times out at time $t_2$. The high priority service request made by the CPU at time $t_2$ is serviced at time $t_3$ when the memory controller finishes servicing another task. Until the block out timer times out at time $t_4$, the CPU low priority request 1150 is handled by the sporadic server while the CPU high priority request 1149 is blocked out.

Another high priority service request is made and the block out timer 1148 is started again when the block out timer 1148 times out at time $t_4$. At time $t_5$, the high priority service request 1149 made by the CPU at time $t_4$ is serviced. The block out timer does not time out until time $t_7$. However, the block out timer is not in the path of the CPU low priority service request and, therefore, does not block out the CPU low priority service request. Thus, while the block out timer is still running, a low priority service request made by the CPU is handled by the sporadic server, and serviced at time $t_6$.

When the block out timer 1148 times out at time $t_7$, it is started again and yet another high priority service request is made by the CPU, since the CPU service request is continuous. The high priority service request 1149 made by the CPU at time $t_7$ is serviced at time $t_8$. When the block out timer times out at time $t_9$, the high priority service request is once again made by the CPU and the block out timer is started again.

The schedule that results from the task set and priorities above is verified by simulating the system performance starting from the "critical instant", when all tasks request service at the same time and a previously started low priority task is already underway. The system is proven to meet all the real-time deadlines if all of the tasks with real-time deadlines meet their deadlines. Of course, in order to perform this simulation accurately, all tasks make new requests at every repetition of their periods, whether or not previous requests have been satisfied.

Figure 35:
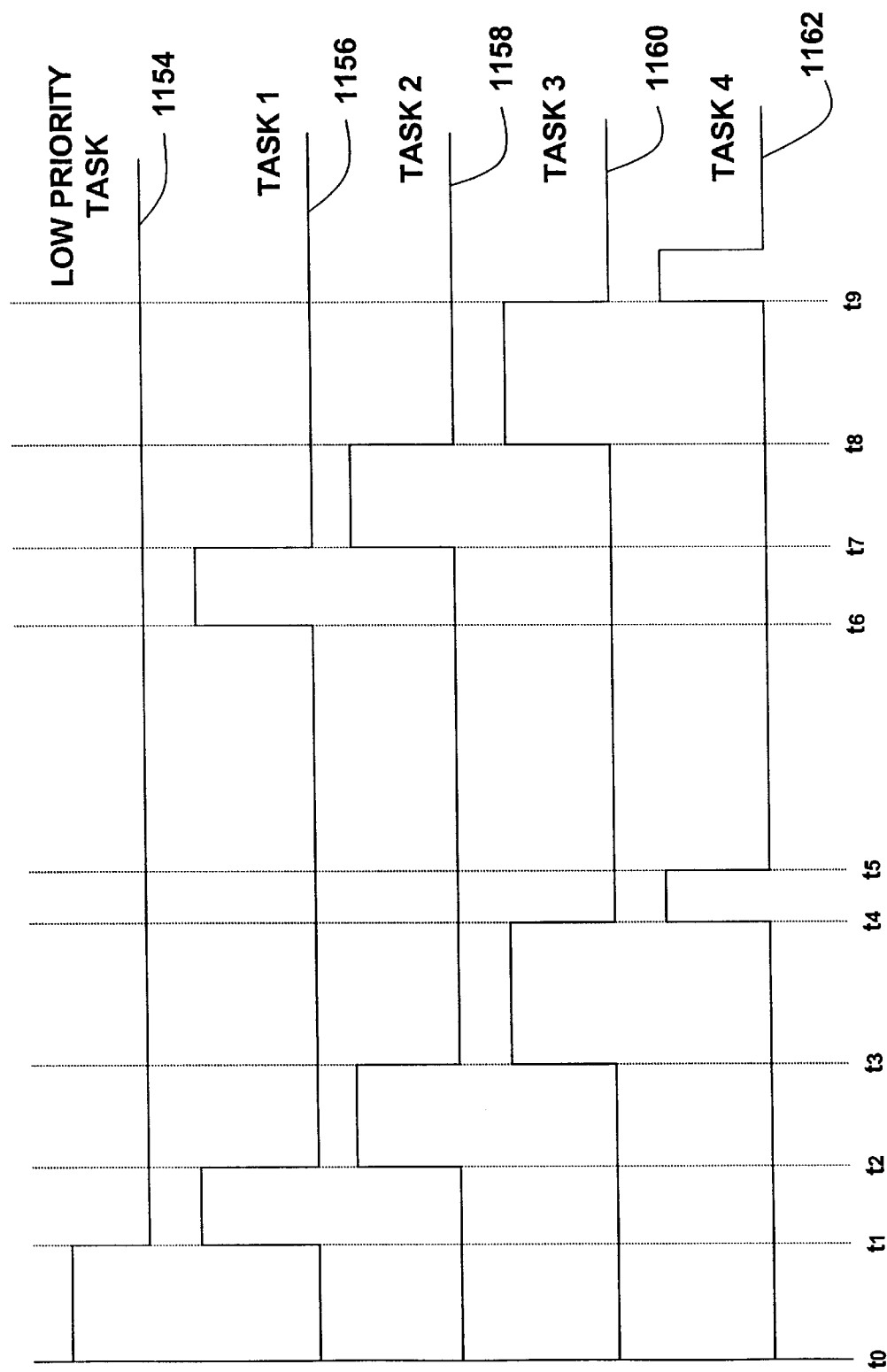
FIG. 35 is a timing diagram that illustrates certain principles of critical instant analysis for an implementation of real time scheduling.

Referring to FIG. 35, a timing diagram illustrates an example of a critical instant analysis. At time $t_0$, a task 1 1156, a task 2 1158, a task 3 1160 and a task 4 1162 request service at the same time. Further, at time $t_0$, a low priority task 1154 is being serviced. Therefore, the highest priority task, the task 1, cannot be serviced until servicing of the low priority task has been completed.

When the low priority task is completed at time $t_1$, the task 1 is serviced. Upon completion of the task 1 at time $t_2$, the task 2 is serviced. Upon completion of the task 2 at time $t_3$, the task 3 is serviced. Upon completion of the task 3 at time $t_4$, the task 4 is serviced. The task 4 completes at time $t_5$, which is before the start of a next set of tasks: the task 1 at $t_6$, the task 2 at $t_7$, the task 3 at $t_8$, and the task 4 at $t_9$.

Figure 36:
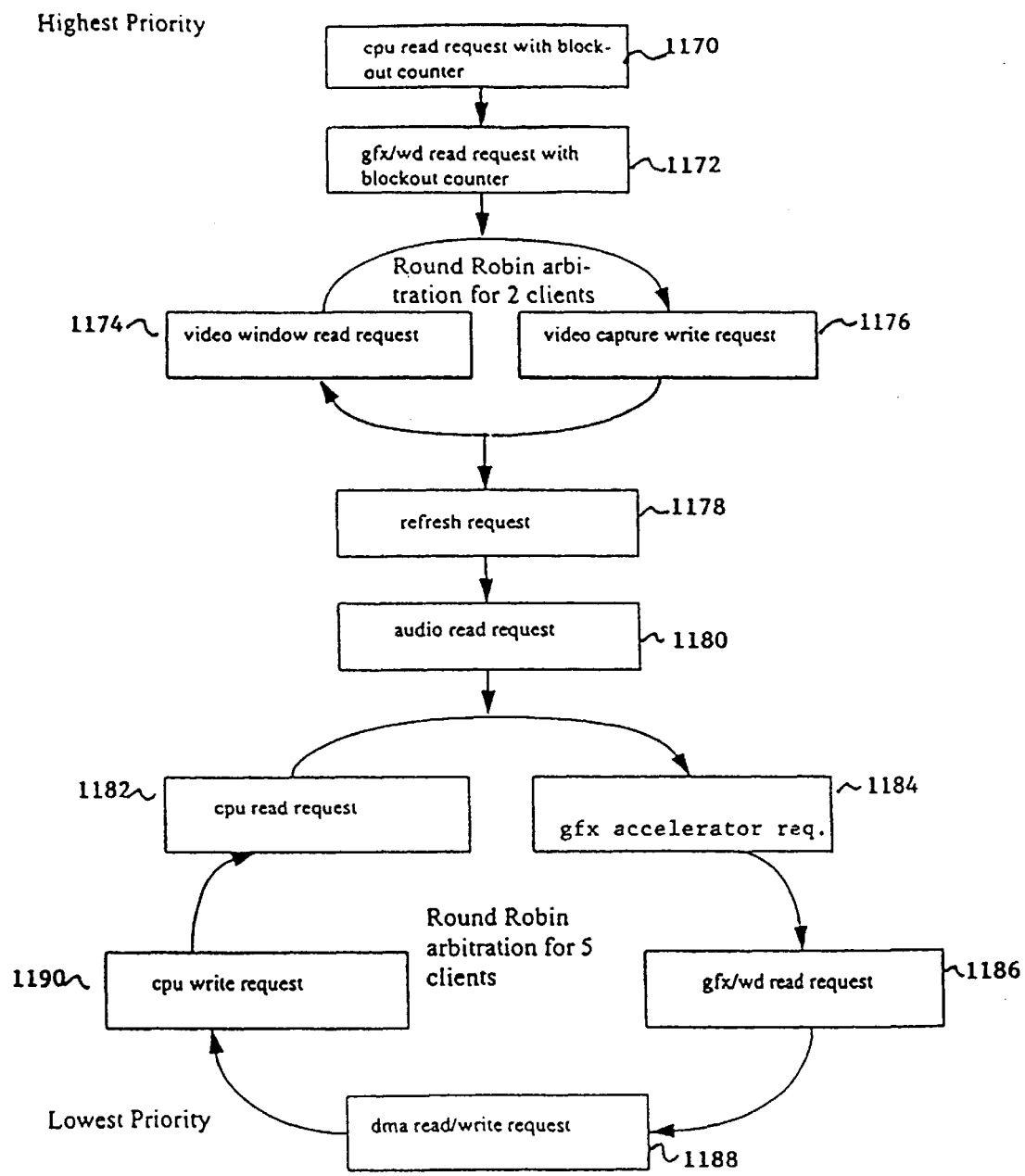
FIG. 36 is a flow diagram illustrating servicing of requests according to the priority of the task.

For example, referring to FIG. 36, a flow diagram illustrates a process of servicing memory requests with different priorities, from the highest to the lowest. The system in step 1170 makes a CPU read request with the highest priority. Since a block out timer is used with the CPU read request in this example, the block out timer is started upon making the highest priority CPU read request. Then the system in step 1172 makes a graphics read request. A block out timer is also used with the graphics read request, and the block out timer is started upon making the graphics read request.

A video window read request in step 1174 and a video capture write request in step 1176 have equal priorities. Therefore, the video window read request and the video capture write request are placed in a round robin arbitration for two tasks (clients). The system in step 1178 and step 1180 services a refresh request and a audio read request, respectively.

While respective block out timers for the CPU read request and the graphics read request are active, the system places the CPU read request and the graphics read request in a round robin arbitration for five tasks (clients), respectively, in step 1182 and step 1186. The system in steps 1184, 1188 and 1190 places other lowest priority tasks such as a graphics accelerator read/write request, a DMA read/write request and a CPU write 20 request, respectively, in this round robin arbitration with five clients.

XIII. Graphics Accelerator

Displaying of graphics generally requires a large amount of processing. If all processing of graphics is performed by a CPU, the processing requirements may unduly burden the CPU since the CPU generally also performs many other tasks. Therefore, many systems that perform graphics processing use a dedicated processor, which is typically referred to as a graphics accelerator.

The system according to the present invention may employ a graphics accelerator that includes memory for graphics data, the graphics data including pixels, and a coprocessor for performing vector type operations on a plurality of components of one pixel of the graphics data.

The preferred embodiment of the graphics display system uses a graphics accelerator that is optimized for performing real-time 3D and 2D effects on graphics and video surfaces. The graphics accelerator preferably incorporates specialized graphics vector arithmetic functions for maximum performance with video and real-time graphics. The graphics accelerator performs a range of essential graphics and video operations with performance comparable to hardwired approaches, yet it is programmable so that it can meet new and evolving application requirements with firmware downloads in the field. The graphics accelerator is preferably capable of 3D effects such as real-time video warping and flipping, texture mapping, and Gouraud and Phong polygon shading, as well as 2D and image effects such as blending, scaling, blitting and filling. The graphics accelerator and its caches are preferably completely contained in an integrated circuit chip.

The graphics accelerator of the present invention is preferably based on a conventional RISC-type microprocessor architecture. The graphics accelerator preferably also includes additional features and some special instructions in the instruction set. In the preferred embodiment, the graphics accelerator is based on a MIPS R 3000 class processor. In other embodiments, the graphics accelerator may be based on almost any other type of processors.

Figure 37:
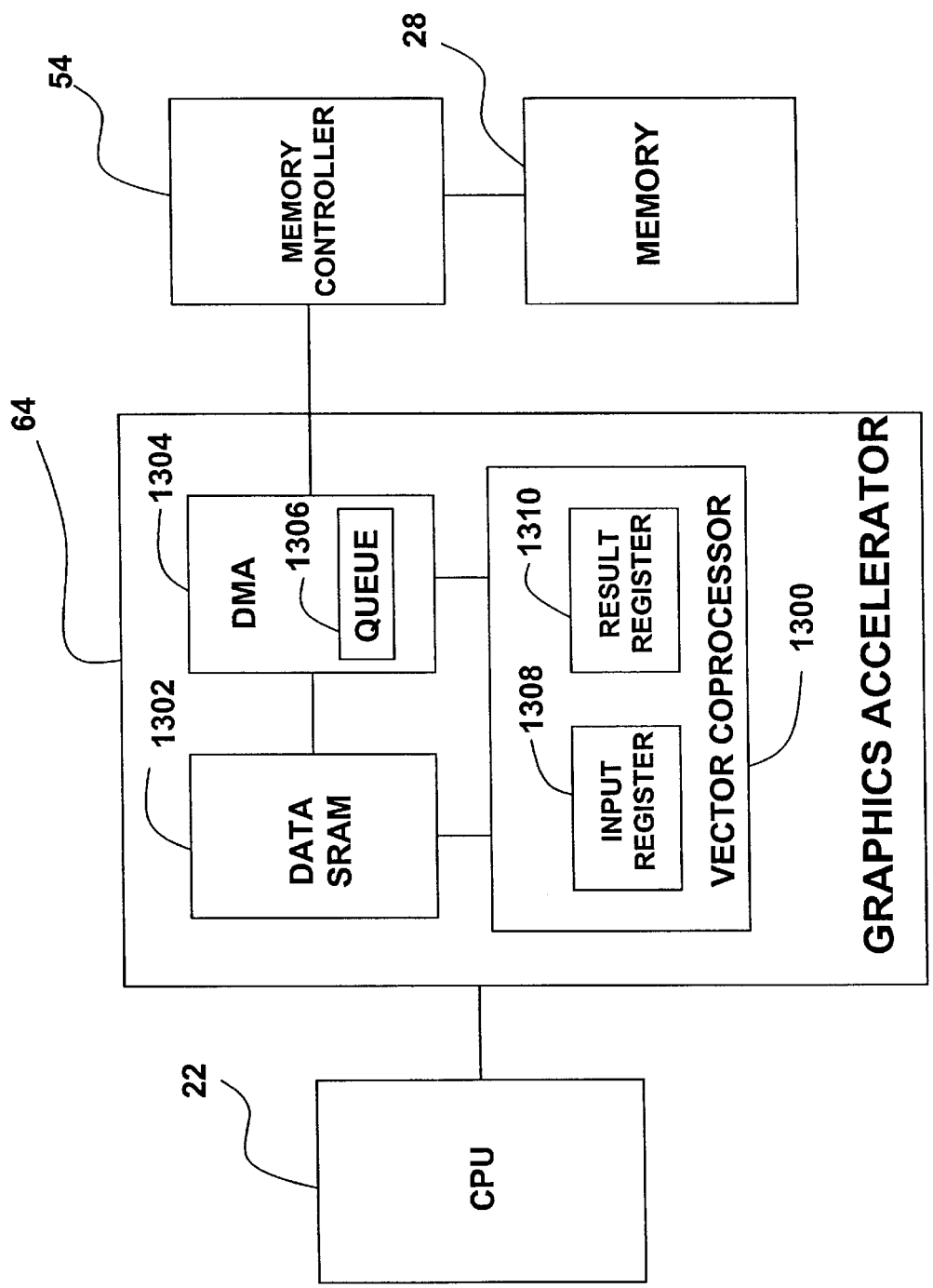
FIG. 37 is a block diagram of a graphics accelerator, which may be coupled to a CPU and a memory controller.

Referring to FIG. 37, a graphics accelerator 64 receives commands from a CPU 22 and receives graphics data from main memory 28 through a memory controller 54. The graphics accelerator preferably includes a coprocessor (vector coprocessor) 1300 that performs vector type operations on pixels. In vector type operations, the R, G, and B components, or the Y, U and V components, of a pixel are processed in parallel as the three elements of a "vector". In alternate embodiments, the graphics accelerator may not include the vector coprocessor, and the vector coprocessor may be coupled to the graphics accelerator instead. The vector coprocessor 1300 obtains pixels (3-tuple vectors) via a specialized LOAD instruction.

The LOAD instruction preferably extracts bits from a 32-bit word in memory that contains the required bits. The LOAD instruction also preferably packages and converts the bits into the input vector format of the coprocessor. The vector coprocessor 1300 writes pixels (3-tuple vectors) to memory via a specialized STORE instruction. The STORE instruction preferably extracts the required bits from the accumulator (output) register of the coprocessor, converts them if required, and packs them into a 32-bit word in memory in a format suitable for other uses within the IC, as explained below.

Formats of the 32-bit word in memory preferably include an RGB 16 format and a YUV format. When the pixels are formatted in RGB 16 format, R has 5 bits, G has 6 bits, and B has 5 bits. Thus, there are 16 bits in each RGB 16 pixel and there are two RGB 16 half-words in every 32-bit word in memory. The two RGB 16 half-words are selected, respectively, via VectorLoadRGB 16Left instruction and VectorLoadRGB 16Right instruction. The 5 or 6 bit elements are expanded through zero expansion into 8 bit components when loaded into the coprocessor input register 1308.

The YUV format preferably includes YUV 4:2:2 format, which has four bytes representing two pixels packed into every 32-bit word in memory. The U and V elements preferably are shared between the two pixels. A typical packing format used to load two pixels having YUV 4:2:2 format into a 32-bit memory is YUYV, where each of first and second Y's, U and V has eight bits. The left pixel is preferably comprised of the first Y plus the U and V, and the right pixel is preferably comprised of the second Y plus the U and V. Special LOAD instructions, LoadYUVLeft and LoadYUVRight, are preferably used to extract the YUV values for the left pixel and the right pixel, respectively, and put them in the coprocessor input register 1308.

Special STORE instructions, StoreVectorAccumulatorRGB 16, StoreVectorAccumulatorRGB 24, StoreVectorAccumulatorYUVLeft, and StoreVectorAccumulatorYUVRight, preferably convert the contents of the accumulator, otherwise referred to as the output register of the coprocessor, into a chosen format for storage in memory. In the case of StoreVectorAccumulatorRGB 16, the three components (R, G, and B) in the accumulator typically have 8, 10 or more significant bits each; these are rounded or dithered to create R, G, and B values with 5, 6, and 5 bits respectively, and packed into a 16 bit value. This 16 bit value is stored in memory, selecting either the appropriate 16 bit half word in memory via the store address.

In the case of StoreVectorAccumulatorRGB 24, the R, G, and B components in the accumulator are rounded or dithered to create 8 bit values for each of the R, G, and B components, and these are packed into a 24 bit value. The 24 bit RGB value is written into memory at the memory address indicated via the store address. In the cases of StoreVectorAccumulatorYUVLeft and StoreVectorAccumulatorYUVRight, the Y, U and V components in the accumulator are dithered or rounded to create 8 bit values for each of the components.

In the preferred embodiment, the StoreVectorAccumulatorYUVLeft instruction writes the Y, U and V values to the locations in the addressed memory word corresponding to the left YUV pixel, i.e. the word is arranged as YUYV, and the first Y value and the U and V values are over-written. In the preferred embodiment, the StoreVectorAccumulatorYUVRight instruction writes the Y value to the memory location corresponding to the Y component of the right YUV pixel, i.e. the second Y value in the preceding example. In other embodiments the U and V values may be combined with the U and V values already in memory creating a weighted sum of the existing and stored values and storing the result.

The coprocessor instruction set preferably also includes a GreaterThanOREqualTo (GE) instruction. The GE instruction performs a greater-than-or-equal-to comparison between each element of a pair of 3-element vectors. Each element in each of the 3-element vectors has a size of one byte. The results of all three comparisons, one bit per each result, are placed in a result register 1310, which may subsequently be used for a single conditional branch operation. This saves a lot of instructions (clock cycles) when performing comparisons between all the elements of two pixels.

The graphics accelerator preferably includes a data SRAM 1302, also called a scratch pad memory, and not a conventional data cache. In other embodiments, the graphics accelerator may not include the data SRAM, and the data SRAM may be coupled to the graphics accelerator instead. The data SRAM 1302 is similar to a cache that is managed in software. The graphics accelerator preferably also includes a DMA engine 1304 with queued commands. In other embodiments, the graphics accelerator may not include the DMA engine, and the DMA engine may be coupled to the graphics accelerator instead. The DMA engine 1304 is associated with the data SRAM 1302 and preferably moves data between the data SRAM 1302 and main memory 28 at the same time the graphics accelerator 64 is using the data SRAM 1302 for its load and store operations. In the preferred embodiment, the main memory 28 is the unified memory that is shared by the graphics display system, the CPU 22, and other peripherals.

The DMA engine 1304 preferably transfers data between the memory 28 and the data SDRAM 1302 to carry out load and store instructions. In other embodiments, the DMA engine 1304 may transfer data between the memory 28 and other components of the graphics accelerator without using the data SRAM 1302. Using data SRAM, however, generally results in faster loading and storing operations.

The DMA engine 1304 preferably has a queue 1306 to hold multiple DMA commands, which are executed sequentially in the order they are received. In the preferred embodiment, the queue 1306 is four instructions deep. This may be valuable because the software (firmware) may be structured so that the loop above the inner loop may instruct the DMA engine 1304 to perform a series of transfers, e.g. to get two sets of operands and write one set of results back, and then the inner loop may execute for a while; when the inner loop is done, the graphics accelerator 64 may check the command queue 1306 in the DMA engine 1304 to see if all of the DMA commands have been completed. The queue includes a mechanism that allows the graphics accelerator to determine when all the DMA commands have been completed. If all of the DMA commands have been completed, the graphics accelerator 64 preferably immediately proceeds to do more work, such as commanding additional DMA operations to be performed and to do processing on the new operands. If not, the graphics accelerator 64 preferably waits for the completion of DMA commands or perform some other tasks for a while.

Typically, the graphics accelerator 64 is working on operands and producing outputs for one set of pixels, while the DMA engine 1304 is bringing in operands for the next (future) set of pixel operations, and also the DMA engine 1304 is writing back to memory the results from the previous set of pixel operations. In this way, the graphics accelerator 64 does not ever have to wait for DMA transfers (if the code is designed well), unlike a conventional data cache, wherein the conventional data cache gets new operands only when there is a cache miss, and it writes back results only when either the cache writes it back automatically because it needs the cache line for new operands or when there is an explicit cache line flush operation performed. Therefore, the graphics accelerator 64 of the present invention preferably reduces or eliminates period of waiting for data, unlike conventional graphics accelerators which may spend a large fraction of their time waiting for data transfer operations between the cache and main memory.

Figure 38:
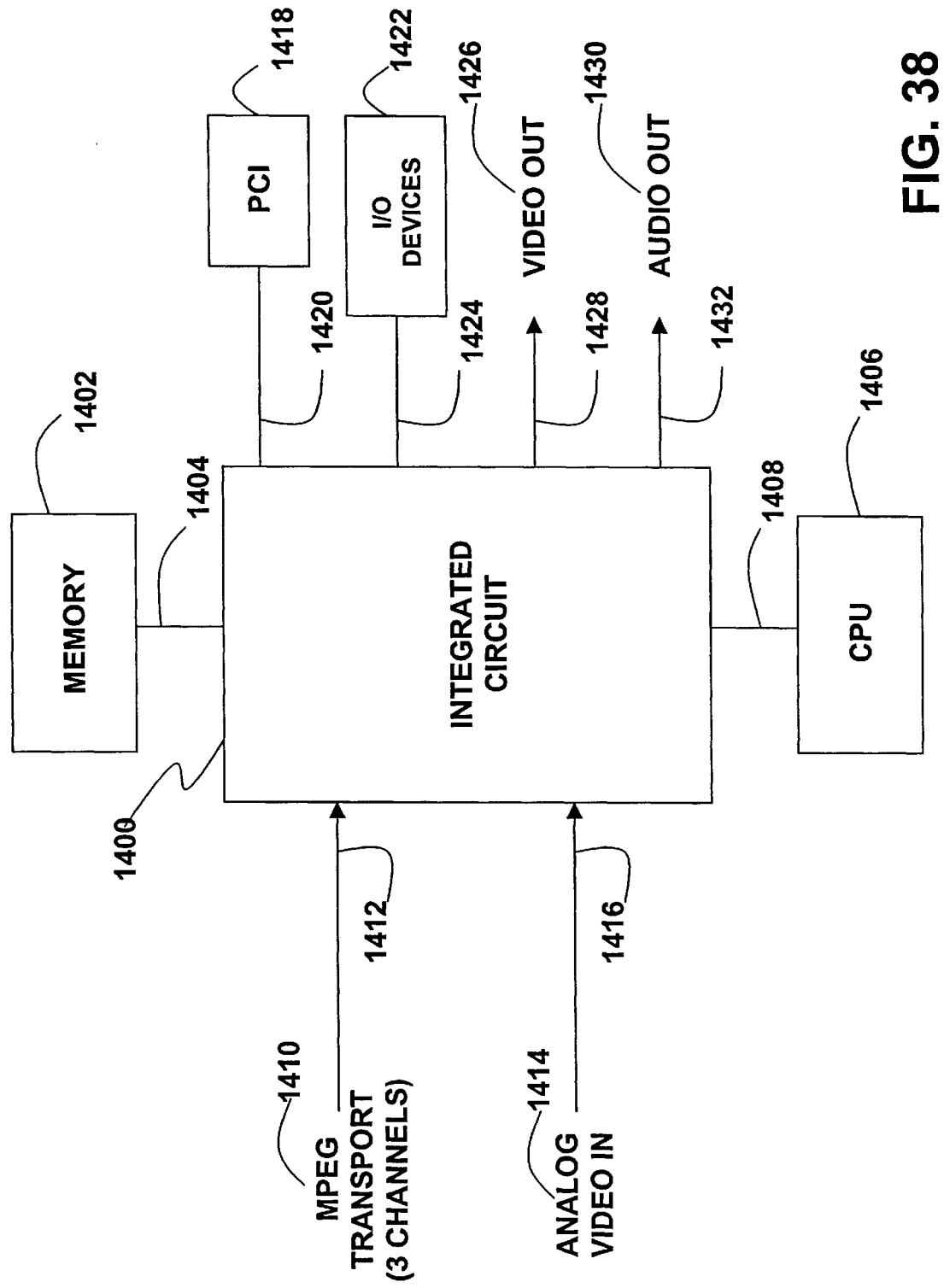
FIG. 38 is a block diagram of an integrated circuit chip, which embodies the system of the present invention, coupled to the CPU and other devices.

Referring to FIG. 38, an integrated circuit 1400 preferably includes one embodiment of the system according to the present invention. The integrated circuit 1400 may include inputs 1412 for receiving three transport channels of MPEG-2 Transport 1410, an analog input 1416 for receiving an analog video 1414, an output 1428 for providing a video output signal 1426, and an output 1432 for providing an audio output signal 1430. In other embodiments, the system may be implemented using two or more separate integrated circuit chips.

The integrated circuit 1400 may also include a bus 1420 for communicating with PCI devices 1418 and a bus 1424 to interface with i/o devices 1422 such as read-only memory (ROM), flash and/or other devices. The integrated circuit may further include a bus 1404 for transferring data to and from memory 1402 and a bus 1408 for connecting to a CPU 1406.

The system accepts video input signals that may include analog video signals, digital video signals, or both. The analog video signals may be, for example, NTSC, PAL and SECAM composite video signals or any other conventional type of analog signal. The digital video signals may include MPEG-2 video. The system may accept multiple channels of MPEG-2 video. For example, the MPEG-2 Transport streams containing MPEG-2 video may include three channels, two in-band channels and one out-of-band channel. The MPEG-2 Transport streams may also contain audio and data information. The system may also be capable of decoding and displaying MPEG-1 video.

The two in-band channels may be used for applications such as, for example, picture-in-picture (PIP). The out of band channel may carry private data, which is any data that is not specified by the MPEG standard. The private data may include program guides.

The MPEG-2 Transport streams (TS) may be provided over a cable, a satellite system or any combination of available media for transmitting MPEG-2 video, audio and data. The MPEG-2 Transport streams may include a DOCSIS (Data over Cable Services Interface Specification) component that is preferably provided to the integrated circuit 1400 through a DOCSIS receiver. A DOCSIS-compliant cable modem generally uses unused 6 MHz video channels within the normal cable spectrum to receive DOCSIS data. One or both of the two in-band channels may carry a signal that is interleaved between MPEG-2 video and DOCSIS data. The DOCSIS data may include, for example, digital television data or HTML files.

The system may work with both the standard definition (SD) television and high definition (HD) television. During high definition mode, frames of picture may optionally be scaled horizontally in order to save memory space and bandwidth. In another embodiment, the frames may be scaled vertically.

Graphics data for display preferably is produced by any suitable graphics library software, such as Direct Draw marketed by Microsoft Corporation, and is read from the CPU 1406 into the memory 1402. The video output signals 1426 may be analog signals, such as composite NTSC, PAL, Y/C (S-video), SECAM, RGB, $YP_RP_B$, $YC_RC_B$, or other signals that may include video and graphics information. In an alternate embodiment, the system provides digital video output to an on-chip or off-chip serializer that may encrypt the output.

The memory 1402 preferably is a unified memory that is shared by the system, the CPU 1406 and other peripheral components. The memory 1402 may be implemented as a synchronous dynamic random access memory (SDRAM). The CPU preferably uses the unified memory for its code and data while the system preferably performs all graphics, video and audio and display functions using the same unified memory.

Figure 39:
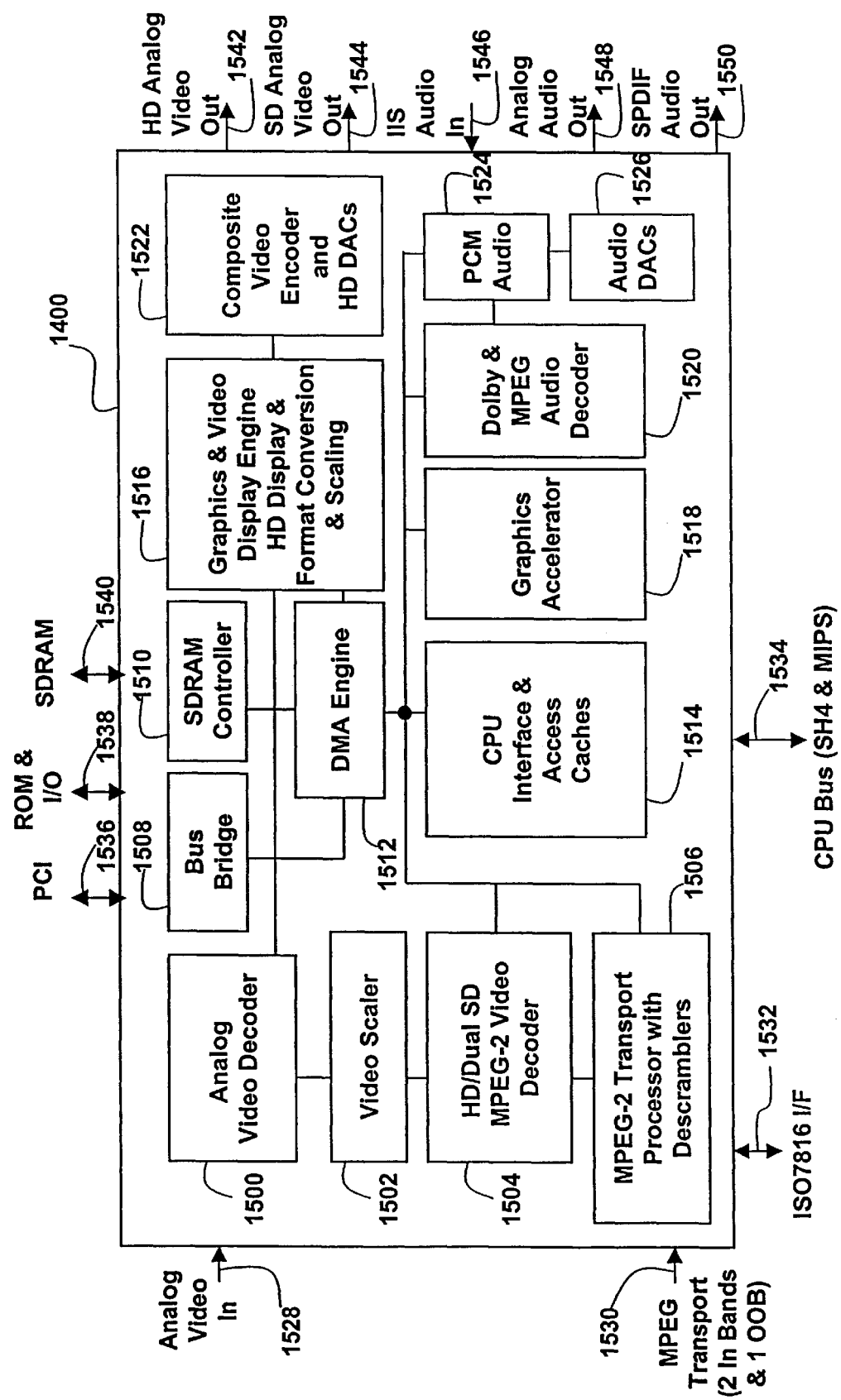
FIG. 39 is a block diagram of the integrated circuit chip in one embodiment of the present invention.

FIG. 39 is a block diagram of one embodiment of the system of the present invention. The system preferably is implemented as a single integrated circuit chip 1400 comprised of an analog video decoder 1500, a video scaler 1502, an HD/Dual SD MPEG-2 video decoder 1504, an MPEG-2 Transport processor with DVB and DES descramblers 1506, a bus bridge 1508, an SDRAM controller 1510, a direct memory access (DMA) engine 1512, a CPU interface & access caches 1514, a graphics & video display engine 1516 with functions including HD display, format conversion and scaling, a graphics accelerator 1518, a Dolby & MPEG audio decoder 1520, a composite video encoder and HD ADCs 1522, a PCM audio 1524 and audio Dac ⅝s 1526.

The system preferably receives analog video through an analog video input 1528, MPEG Transport streams through an MPEG Transport input 1530, and I²S audio through an I²S audio input 1546. The system preferably also provides HD analog video through an HD analog video output 1542, SD analog video through an SD analog video output 1544, analog audio through an analog audio output 1548, and digital audio through an SPDIF audio output 1550. The system preferably communicates with other devices through ISO 7816 interfaces 1532, CPU bus 1534, PCI bus 1536, ROM & I/O bus 1538 and memory bus 1540.

The analog video decoder 1500 may accept NTSC, PAL, SCAM format composite video as well as other conventional or non-conventional analog video such as S-video (a.k.a. y/c), RGB, $YP_RP_B$ and $YC_RC_B$ video. The analog video decoder preferably digitizes the analog video with a 10-bit analog-to-digital converter (ADC). The analog video decoder preferably decodes the digitized analog video using a 2H adaptive comb filter and robust sync and video processing to produce internal YUV component video signals. The YUV component video signals preferably are processed through a time-base corrector (TBC) to provide a stable graphics and digital video display simultaneously with decoded analog video.

The video scaler 1502 preferably downscales and upscales decoded MPEG-2 video and digitized analog video as needed. The scale factors may be adjusted continuously from a scale factor of much less than one to a scale factor of four or more. With both digitized analog and decoded MPEG-2 video input, either one may be scaled while the other is displayed full size at the same time.

The HD/Dual SD MPEG-2 video decoder 1504 preferably decodes all MPEG-2 video streams that are compatible with Main Profile at Main Level (MP@ML), Main Profile at High Level (MP@HL), and 4:2:2 Profile at Main Level (4:2:2@ML), including ATSC (Advanced Television Systems Committee) HDTV (high definition television) video streams, as well as all standard digital cable and satellite streams. The HD/Dual SD MPEG-2 video decoder 1504 may also decode MPEG-2 video streams that are compatible with other profiles such as main profile at High- 1440 Level (MP@H 14), 4:2:2 Profile at High Level (4:2:2@HL) and High Profile at High Level (HP@HL).

The HD/Dual SD MPEG-2 video decoder 1504 preferably is capable of decoding one video stream when decoding MPEG-2 HDTV video stream and multiple video streams as tiled video and/or PIP video when decoding SDTV (standard definition television) video stream. For example, in one embodiment, the video streams may include four video streams as tiled video and one video stream as a PIP video. The HD/Dual SD MPEG-2 video decoder may also perform reduced-memory decoding of MPEG-2 HDTV video streams for substantial savings in both memory size and memory bandwidth while retaining very high quality in both SDTV and HDTV display formats.

The MPEG-2 Transport processor with descramblers 1506 preferably is used for MPEG Transport processing including PID filtering, PSI section filtering, clock recovery and packetized elementary stream (PES) parsing. The MPEG-2 Transport processor with descramblers 1506 preferably also performs Digital-Video Broadcasting (DVB) and Data Encryption Standard (DES) descrambling. The MPEG-2 Transport processor with descramblers may also perform descrambling of transport streams encrypted using other encryption methods. The MPEG-2 Transport processor with descramblers 1506 may also include one or more ISO 7816 smart card or other interfaces for e-commerce and conditional access system use.

The MPEG-2 Transport processor with descramblers 1506 preferably performs processing of video and audio streams, MPEG system layer functions, and data section filtering and buffering for both standard and private section formats. The MPEG-2 Transport processor with descramblers 1506 preferably performs processing of multiple data PID's (packet identification codes) and supports multiple section filters simultaneously, in addition to supporting multiple video PID's, an audio PID, and a program clock reference (PCR) PID. In one embodiment, for example, the MPEG-2 Transport processor and descramblers 1506 supports 32 data PID's, 32 section filters and two video PID's.

The bus bridge 1508 allows the graphics processing system of the present invention to couple the host CPU to the peripheral devices including ROM and I/O devices as well as PCI devices.

The SDRAM controller 1510 preferably controls communications with external memory, e.g., SDRAM. The SDRAM preferably is organized into an unified memory architecture (UMA). The UMA preferably is implemented in 64-bit wide SDRAM, and is used to perform all of the functions including MPEG video decoding, graphics display, and CPU code and data storage.

This UMA design preferably facilitates substantial cost savings at the system level by supporting the use of mainstream high density SDRAMs and allowing the CPU and other functions to utilize this memory at the same time that the memory is being used for MPEG decoding and graphics display. In other embodiments, the unified memory may support only a subset of functions performed by the system.

The DMA engine 1512 preferably allows data to be transferred between the CPU and components of the system without the involvement of CPU processing. Thus, the CPU is typically freed to perform other tasks. The CPU interface & access caches 1514 preferably provides the interface between the CPU and the system.

The graphics & video display engine 1516 preferably composites graphics windows with video. The functions of the graphics & video display engine 1516 preferably include HD display managing, format conversion and scaling. The graphics & video display engine preferably blends multiple graphics windows in parallel to generate blended graphics.

The graphics accelerator 1518 preferably provides fully programmable acceleration for a variety of 3D and 2D effects and functions required by applications and Application Program Interfaces (APIs). The graphics accelerator 1518 preferably is implemented as a MIPS RISC processor with custom instructions and a co-processor that performs vector graphic component functions.

The Dolby & MPEG audio decoder preferably decodes both MPEG audio and Dolby Digital audio streams. The Dolby & MPEG audio decoder preferably decodes Dolby 5.1 channel streams and performs the Dolby specified two channel mixdown with optional Pro-logic encoding. In MPEG audio mode, the digital audio decoder preferably decodes two channels in either MPEG Layer 1 or Layer 2. The digital audio decoder may output both analog stereo audio using on-board digital-to-analog converters (DACs) and digital audio signals using Sony-Philips Digital Interface (SPDIF) serial output, in either compressed or uncompressed PCM format. The audio engine preferably also mixes decoded Dolby or MPEG audio with PCM audio.

The composite video encoder and HD DACs 1522 preferably generates video outputs that include both component ($YP_RP_B$ and RGB) and encoded composite video, e.g., NTSC, PAL or SECAM format video, or Y/C (S-video) compatible formats. The composite video encoder and HD DACs 1522 preferably is capable of converting digital video data into composite video blanking and sync (CVBS), Y/C video (S-video) and to component $YP_RP_B$ or RGB signals.

The composite video encoder and HD DACs 1522 preferably also digital-to-analog converts the video in CVBS, Y/C video (S-video), $YP_RP_B$ or RGB format into analog video signal for display. The composite video encoder and HD DACs 1522 may generate HDTV format signals and SDTV format signals simultaneously.

Figure 40:
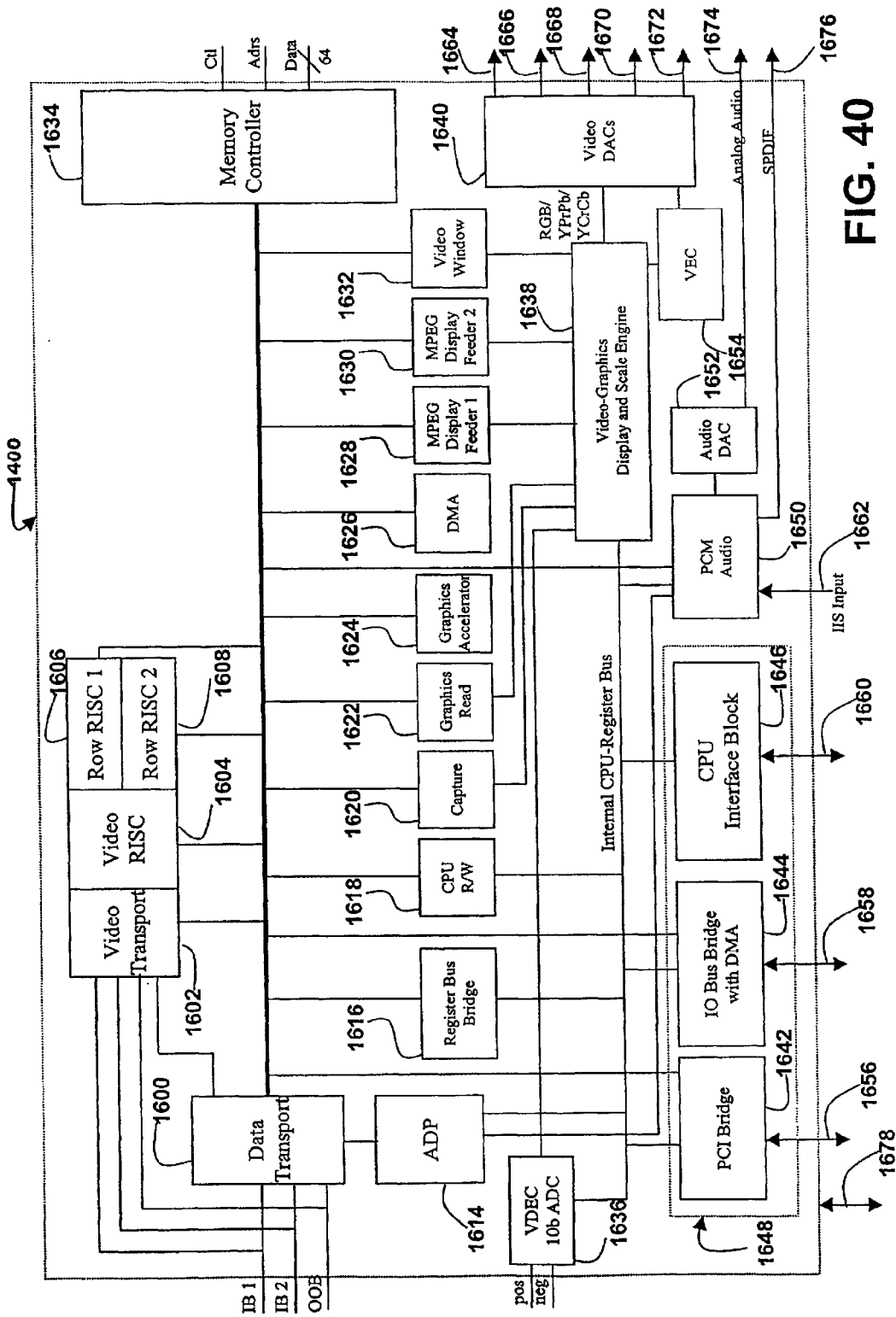
FIG. 40 is a block diagram of the integrated circuit chip in one embodiment of the present invention.

FIG. 40 is a block diagram of another embodiment of the system implemented in an integrated circuit 1400. The system preferably includes a data transport 1600, a video transport 1602, a video RISC 1604, two row RISCs 1606, 1608, an audio decode processor (ADP) 1614, a graphics accelerator 1624, a DMA engine 1626, a memory controller 1634, an analog video decoder (VDEC) with a 10-bit analog-to-digital converter (ADC) 1636, a video-graphics display and scale engine 1638, a set of video DACs 1640, a PCI bridge 1642, an I/O bus bridge with DMA 1644, a CPU interface block 1646, a PCM audio 1650, an audio DAC 1652, and a video encoder (VEC) 1654.

MPEG-2 Transport and decoding in the described embodiment preferably is performed by the data transport 1600, the video transport 1602, the video RISC 1604, the row RISCs 1606, 1608, and the ADP 1614.

The system preferably includes multiple transport processors. For example, in one embodiment, the system may include three transport processors. The data transport 1600 performs descrambling of encrypted transport streams. The encrypted transport streams may have been encrypted using , e.g., DES, DVD or other encryption method. In addition, the data transport 1600 preferably extracts message data and stores the data in an external memory, e.g., SDRAM. The video transport 1602 preferably extracts bit stream for MPEG-2 video. The audio decode processor (ADP) 1614 preferably has a transport function dedicated to extracting audio bit streams.

In-band MPEG Transport streams IB 1 (in-band 1)and IB 2 (in-band 2) are provided to the data transport 1600 and the video transport 1602. An out-of-band NPEG Transport stream OOB preferably is provided to the data transport 1600, and it may also be provided to the video transport 1602.

Thus, the data transport 1600 preferably receives three channels of MPEG Transport streams. The data transport 1600 preferably performs PID and section filtering of the transport streams. The data transport 1600 provides message data obtained through section filtering to the memory controller 1634 for storage in the external memory, e.g., SDRAM. The data transport 1600 preferably also performs descrambling of the transport streams including DES, DVB and/or other descrambling methods. In one embodiment of the present invention, the data transport 1600 provides the descrambled transport streams to the video transport 1602 and the ADP 1614.

The video transport 1602 preferably receives two in-band MPEG Transport streams and one out-of-band MPEG Transport stream. The video transport 1602 preferably extracts compressed MPEG video data by removing transport stream (TS) headers and packetized elementary stream (PES) headers from the input transport streams. Then the video transport 1602 preferably provides the compressed MPEG video data for processing in the video RISC 1604.

In other embodiments, the data transport 1600, the video transport 1602 and the ADP 1614 may receive other types of compressed data streams, which may include packetized compressed data streams. For example, the compressed data streams may include one or more DIRECTV transport streams. DIRECTV is a trademark of DIRECTV, Inc.

The video RISC 1604 and the row RISCs 1606, 1608 make up an MPEG video decoder. The MPEG video decoder preferably decodes the compressed MPEG video data and provides it to the memory controller 1634 to be stored temporarily in an external memory, e.g., SDRAM. Complex video decode process of MPEG video preferably is partitioned into concurrently operable multiple decode functionality. The MPEG video decoder preferably decodes multiple rows of the compressed MPEG video data concurrently.

The video RISC 1604 preferably parses and processes layers of compressed MPEG video data above the SLICE layer, i.e., SEQUENCE, group of pictures (GOP), EXTENSION and PICTURE layers. The two row RISCs 1606, 1608 preferably are used for SLICE layer, macroblock layer and block layer decoding and processing. Row decode paths associated with the row RISCs preferably are used for full speed processing of time critical functions at the macroblock and block layers. Processors used in the described embodiment are RISC processors. Other types of processors may be used in other embodiments.

The MPEG video decoder may scale frames by half when saving them to frame buffers. Thus, savings to memory size and bandwidth may result when the reference frames are saved for reconstruction of P-frames and B-frames. The frames preferably are not scaled vertically during reconstruction. The frame buffers preferably are implemented in external memory.

The audio decode processor (ADP) 1614 performs audio PID parsing to extract audio packets from the transport streams. The ADP 1614 preferably decodes the audio packets extracted from the transport streams. The ADP 1614 provides the decoded audio data to the PCM audio 1650 for mixing with other audio signals.

The register bus bridge 1616 preferably provides interface between the internal CPU-register bus and the memory controller 1634. In one embodiment, the system uses 16-bit registers. In other embodiments, the system may use registers having other bit sizes.

The graphics accelerator 1624 preferably performs graphics operations that may require intensive CPU processing, such as operations on three dimensional graphics images. The graphics accelerator 1624 preferably is implemented as a RISC processor optimized for performing real-time 3D and 2D effects on graphics and video surfaces. The graphics accelerator preferably incorporates specialized graphics vector arithmetic functions for maximum performance with video and real-time graphics.

The graphics accelerator preferably performs a range of essential graphics and video operations with performance approaching that of hardwired approaches. At the same time, the graphics accelerator may be programmable so that it may meet new and evolving application requirements with firmware downloads in the field.

The DMA engine 1626 preferably transfers data between the CPU and components of the system without interrupting the CPU. For example, CPU read and write operations as illustrated in CPU R/W block 1618 are performed by the DMA engine 1626.

The memory controller 1634 preferably reads and writes video and graphics data to and from memory by using burst accesses with burst lengths that may be assigned to each task. The memory preferably is any suitable memory such as an SDRAM. All functions within the system preferably share the same memory having a unified memory architecture (UMA), with real-time performance of all of the hard real time functions. CPU accesses of code and data preferably are performed as quickly and efficiently as possible without impairing the video, graphics, and audio functions. Memory preferably is utilized very efficiently by performing burst accesses with burst lengths optimized for each task, and through careful optimization of the memory access patterns for MPEG video decoding.

The analog video decoder (VDEC) 1636 preferably digitizes and processes analog input video to produce internal YUV component signals having separated luma and chroma components.

The VDEC 1636 preferably takes in an analog video and decodes this video into digital component signals. The analog video received by the VDEC 1636 may be in one or more of the following formats or any other conventional or non-conventional format: NTSC, PAL, SECAM, RGB, Y/C video (S-video), $YP_RP_B$ and $YC_RC_B$.

The VDEC 1636 preferably includes a 10-bit CMOS video analog-to-digital converter (ADC) to digitize analog video o directly. The VDEC 1636 may also include internal anti-aliasing filters which allow simple connections of normal analog video to the system. The VDEC 1636 preferably separates luminance and chroma using an adaptive 2H (3 line) comb filter, adaptive edge enhancement and noise coring.

The video-graphics display and scale engine 1638 takes graphics information from memory, blends the graphics information, and composites the blended graphics with video. The video-graphics display and scale engine 1638 preferably provides the component video, e.g., RGB, $YP_RP_B$ and $YC_RC_B$, to the set of video DACs 1640 for digital-to-analog conversion. In one embodiment, the set of video DACs 1640 includes five DACs.

The video-graphics display and scale engine 1638 preferably provides the composite video, e.g., NTSC, PAL, Y/C video (S-video), to the VEC 1654 for conversion into proper signal format. The VEC 1654 preferably provides the formatted composite video to the set of video DACs 1640 to be converted to analog format. In another embodiment, the VEC 1654 includes a set of video DACs, and thus the formatted composite video is converted to analog video in the VEC 1654.

The set of video DACs 1640 preferably provide multiple digitized video outputs. The multiple digitized video outputs may include component video such as RGB and $YP_RP_B$, in addition to composite video in various formats such as composite video blanking and sync (CVBS) including NTSC and PAL composite video, and Y/C video (S-video). In one embodiment, the set of video DACs 1640 includes five video DACs, and thus all of Y/C video, CVBS video and standard definition component video may be displayed simultaneously.

The video-graphics display and scale engine 1638 preferably supports capturing of video as illustrated in a capture block 1620 and preferably reads graphics from the external memory, e.g., SDRAM, as illustrated in a graphics read block 1622. Decoded MPEG-2 video preferably is provided to the video-graphics display and scale engine 1638 as indicated in MPEG display feeder blocks 1 and 2 1628, 1630. The video-graphics display and scale engine 1638 preferably also receives a video window 1632.

The video-graphics display and scale engine 1638 preferably also performs both downscaling and ,upscaling of MPEG video and analog video as needed. The scale factors may be adjusted continuously from a scale factor of much less than one to a scale factor of four or more. With both analog and MPEG video input, either one may be scaled while the other is displayed full size at the same time. Any portion of the input may be the source for video scaling. To conserve memory and bandwidth, the video-graphics display and scale engine 1638 preferably downscales before capturing video frames to memory, and upscales after reading from memory. The video-graphics display and scale engine 1638 may scale both the HDTV video and SDTV video.

In one embodiment, the video-graphics display and scale engine 1638 provides HDTV video to be displayed while scaling the HDTV video down into SDTV format, and capturing into memory. The HDTV video may be scaled and captured as an SDTV video either before or after compositing with graphics. The HDTV video may also be scaled and captured as an SDTV video both before and after compositing with graphics. The scaled and captured HDTV video may be recorded, e.g., using a standard video cassette recorder (VCR), while the HDTV video is being displayed on TV.

A system bridge controller 1648 preferably provides a "north bridge" function by providing a bridge for the CPU to interface with multiple peripheral devices. The system bridge controller preferably is comprised of the PCI (Peripheral Component Interconnect) bridge 1642, the I/O bus bridge with DMA 1644 and the CPU interface block 1646.

The PCM audio 1650 preferably receives decoded MPEG or Dolby AC-3 audio from the ADP 1614. The PCM audio 1650 preferably also receives I²S audio through an I²S input 1662 and digitizes and captures it for mixing with other audio data. The PCM audio 1650 preferably supports applications that create and play audio locally within a set top box and allow mixing of the locally created audio with audio from a digital audio source, such as the MPEG audio or Dolby AC-3, and with digitized analog audio.

The PCM audio 1650 preferably plays audio from an SDRAM in a variety of sample rates and formats. Both the captured analog audio and the local PCM audio may be played and mixed at the same time, even though they may have different sample rates and formats. The PCM audio 1650 preferably also provides digital audio output 1676 in, e.g., SPDIF serial output format.

The audio DAC 1652 provides the decoded and digital-to-analog converted MPEG and Dolby AC-3 audio component as an analog audio output 1674 of the system. The analog audio output 1674 may also include other audio information such as I²S audio.

The VEC 1654 converts between the HD video color space ($YP_RP_B$) and the standard definition YUV color space, and between either of those and RGB before converting to the respective outputs. For example, video that was originally coded using $YP_RP_B$ may be displayed in $YP_RP_B$ for direct HD output, or converted to YUV for SD display via composite, Y/C or direct RGB output. This function preferably is available regardless of the resolution of the video. Video that was originally coded using YUV may be output as composite, Y/C or RGB, or converted to $YP_RP_B$ for direct HD output.

The HD $YP_RP_B$, component output may support the specified tri-level sync. The RGB output may also support optional sync on green, sync on RGB, or separate H and V sync on 2 Y/CVBS and C outputs, to support various types of standard definition and HD monitors.

Figure 41:
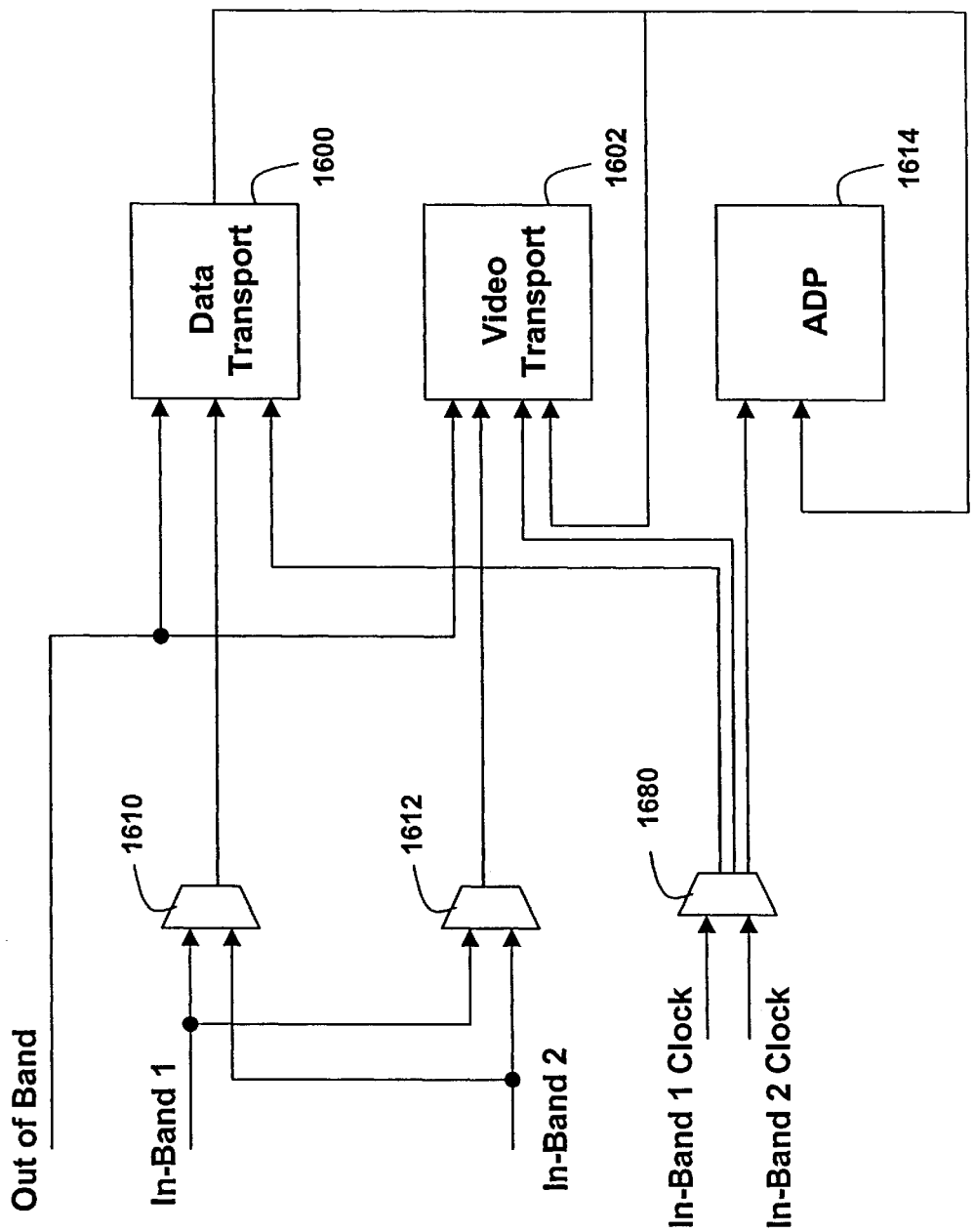
FIG. 41 is a block diagram that illustrates distribution of MPEG Transport streams in one embodiment of present invention.

FIG. 41 is a block diagram that illustrates distribution of in-band and out-of-band transport streams in one embodiment of the present invention. In the described embodiment, the in-band transport streams 1 and 2 are provided to multiplexers 1610 and 1612. The multiplexer 1610 provides output to the data transport 1600 while the multiplexer 1612 provides output to the video transport 1602. The in-band transport streams 1 and 2 provided to the data transport 1600 and the transport RISC 1602 through the multiplexers 1610 and 1612, respectively, preferably include sync and data information. The out-of-band transport stream preferably is provided, without multiplexing, to both the data transport 1600 and the video transport 1602.

In the described embodiment, clocks for the in-band transport streams 1 and 2 preferably are provided to a multiplexer 1680. The multiplexer 1680 multiplexes the clocks and provides the multiplexed output to the data transport 1600, the video transport 1602 and the ADP 1614 as appropriate. For example, when the in-band transport stream 1 is processed in the video transport 1602, the in-band 1 clock is provided to the video transport 1602.

In alternate embodiments, all three of the in-band 1 transport stream, in-band 2 transport stream and the out-of-band transport stream may be provided simultaneously to one or more of the data transport 1600, the video transport 1602 and the ADP 1614. The in-band clock 1 and the in-band clock 2 may also be provided simultaneously to one or more of the data transport 1600, the video transport 1602 and the ADP 1614.

In one embodiment of the present invention, decrypting, e.g., Data Encryption Service (DES) or Digital Video Broadcasting (DVB) descrambling, of the transport streams is performed by the data transport 1600. Thus, when the video transport 1602 or the ADP 1614 processes the crypted, e.g., DES or DVB scrambled, transport stream, the crypted transport stream is first decrypted by the data transport 1600 and provided to the video transport and the ADP, respectively. In other embodiments, the video transport and the ADP may have decryption capabilities as well.

XIV. Data Transport Processor

Figure 42:
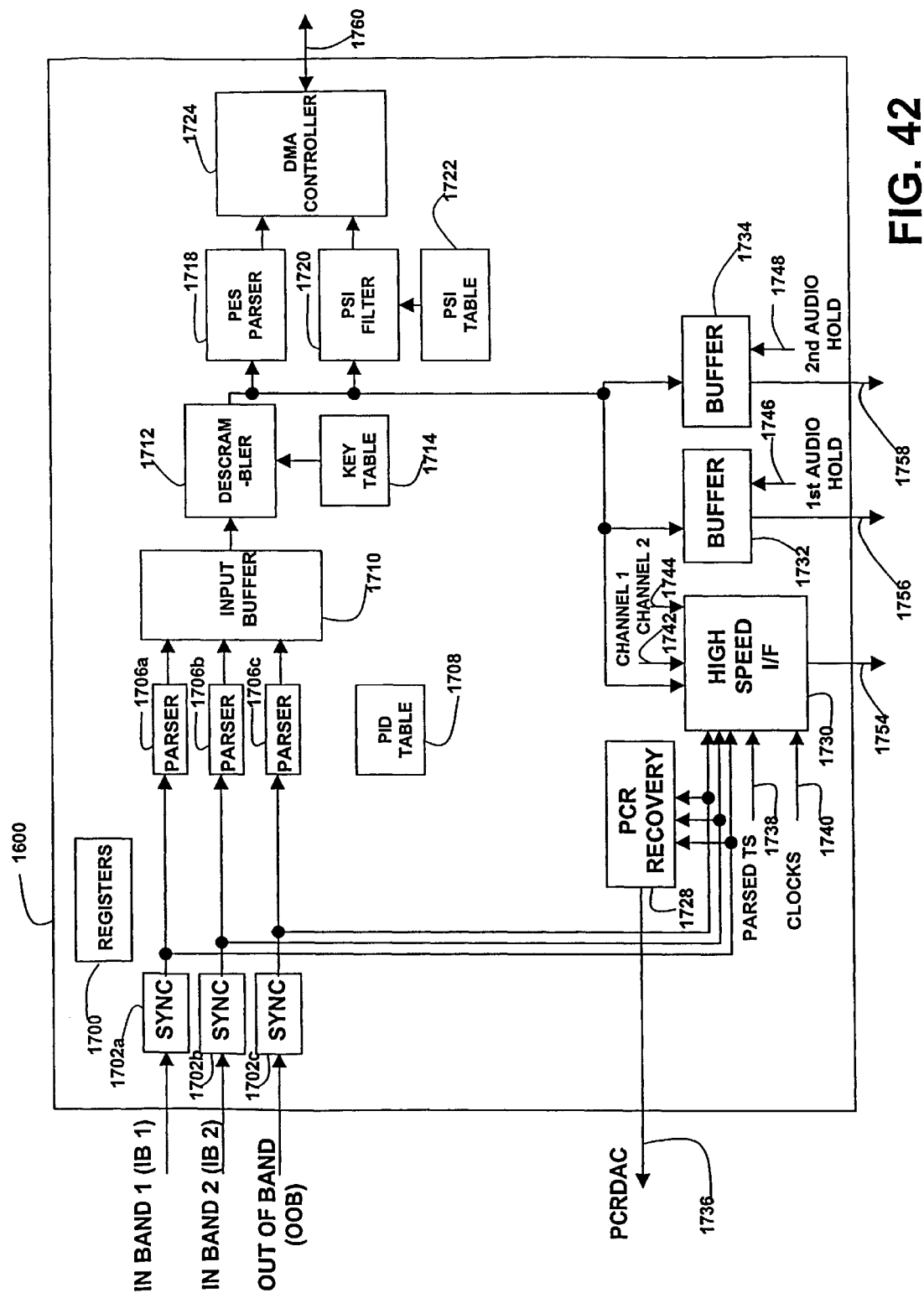
FIG. 42 is a block diagram of one embodiment of a data transport.

FIG. 42 is a block diagram of a data transport 1600 in one embodiment of the present invention. The data transport 1600 preferably performs descrambling of the MPEG Transport streams. The descrambling may include DES and DVB descrambling as well as descrambling of transport streams encrypted using other encryption methods. The data transport 1600 preferably provides the descrambled MPEG Transport streams to a video transport, such as the video transport 1602 of FIG. 41, and an audio decode processor (ADP), such as the ADP 1614 of FIG. 41. The data transport 1600 preferably also extracts message data from the input streams and transfers them to an external memory, e.g., SDRAM. The external memory may be configured as 32, 64 or other suitable number of circular memory buffers.

An MPEG Transport stream typically includes fixed-length transport packets. Each transport packet is typically 188 bytes long. The data transport 1600 preferably is an MPEG-2 Transport stream message/PES parser and demultiplexer. The data transport 1600 preferably is capable of simultaneously receiving and processing three independent serial transport streams, two in-band (IB) streams and one out-of-band (OOB) stream. The data transport 1600 preferably has transport packet processing throughput of 81 Mbps. In other embodiments, the data transport may be capable of receiving more or less than three independent serial transport streams, and the transport packet processing throughput may be more or less than 81 Mbps.

The data transport 1600 preferably performs filtering of multiple, e.g., 32, PID's for message or PES processing. In other embodiments, data transport 1600 may filter more or less than 32 PID's, e.g., up to 64 PID's. In addition, the data transport 1600 preferably includes 32 PSI section filters for processing of MPEG or DVB sections. In other embodiments, the data transport may filter more or less than 32 sections, e.g., up to 64 sections. The sections may include program specific information (PSI) and/or private sections.

The data transport 1600 typically receives the MPEG Transport streams at different data rates. For example, the out-of-band transport stream is typically received synchronized to a 3.5 MHz clock. The in-band transport streams are typically received synchronized to a clock having a frequency range of, e.g., 1 to 60 MHz. Since the data transport 1600 in the described embodiment operates at a fixed frequency, e.g., 40.5 MHz or 81 MHz, the three transport streams are received by three input synchronizers 1702*a–c*.

The three input synchronizers 1702*a–c* preferably synchronize incoming MPEG-2 Transport packets to the data transport clock. In other embodiments, the data transport 1600 may operate at different clock frequencies. Each input synchronizer preferably includes a serial-to-parallel converter for converting incoming data into parallel, e.g., byte-wise, format.

From the input synchronizers 1702*a–c*, the transport streams preferably are provided to parsers 1706*a–c*, which may also be called PID filters. The parsers 1706*a–c* preferably compare the PID's of the incoming transport streams with the PID's in the PID table 1708 to extract only the data associated with the PID's found in the PID table 1708. The parsers 1706*a–c* preferably also perform error checking, such as continuity error checking, to ensure that the received transport packets do not contain error.

The PID table 1708 preferably includes 32 PID's. In other embodiments, the PID table 1708 may include more or less than 32 PID's, e.g., 64 PID's. Some of the PID's may be filtered by hardware for increased throughput, while some other PID's may be filtered by programmable firmware for increased flexibility. Entries in the PID table may be arbitrarily assigned to any of the three transport streams. Each of the three transport streams preferably are processed uniquely, even in cases when two or more of the transport streams contain the same PID.

The synchronizers 1702*a–c* preferably also provide the synchronized transport streams to a high speed interface module 1730. The high speed interface module 1730 preferably also receives parsed transport streams 1738 of all three of the transport streams: IB 1, IB 2 and OOB. The parsed transport streams 1738 preferably are provided by the parsers 1706*a–c*. In addition, the high-speed interface module 1730 preferably receives clocks 1740 for all three of the synchronized transport streams.

The high speed interface module 1730 preferably also receives a channel 1 stream 1742 and a channel 2 stream 1744. The channel 1 stream 1742 and channel 2 stream 1744 are provided by output buffers 1732 and 1734 as outputs 1756 and 1758, respectively. Further, the high speed interface module 1730 preferably receives the decrypted parsed transport streams, which have been decrypted by a descrambler 1712 and provided as an output.

With all these inputs, the high speed interface module 1730 preferably provides an output 1754. The output 1754 may include one or more of the synchronized transport streams, the parsed transport streams 1738, the decrypted parsed transport streams, the clocks 1740 and the channel 1 and channel 2 streams 1742 and 1744. The output 1754 of the high speed interface 1730 preferably is provided to a port as an output of the system, e.g., integrated chip, of the present invention.

Register variables within the data transport 1600 preferably are stored in registers 1700. The registers 1700 preferably are on a register bus of the system.

The parsers 1706*a–c* preferably also provide the parsed transport streams to an input buffer 1710. The input buffer 1710 preferably is capable of storing up to eight 188-byte MPEG-2 Transport packets. In other embodiments, the number of transport packets stored in the input buffer 1710 may be more or less than eight. The input buffer 1710 preferably outputs to a descrambler 1712.

The descrambler 1712 preferably performs DES and DVB descrambling. The descrambler 1712 may also be used to decrypt transport streams encrypted using other encrypting methods. The descrambler 1712 preferably receives key data for decrypting from a key table 1714. Each of the encrypted input transport streams preferably is decrypted using DES, DVB or other descrambling methods. Type of descrambling performed on each transport stream preferably is selectable. For decryption, even and odd keys preferably are provided. Each PID preferably is associated with a different key. The keys typically are 64 bits in size, however, they may be 56 or other number of bits in size in some embodiments.

The output of the descrambler 1712 preferably is also provided to the buffers 1732 and 1734. In addition to receiving the output of the descrambler 1712, the buffers 1732 and 1734 preferably are provided with a first audio hold signal 1746 and a second audio hold signal 1748, respectively. All three transport streams, IB 1, IB 2 and OOB transport streams, preferably are included in a decrypted parsed transport stream output of the descrambler 1712. In other embodiments, one or two, but not all three of the transport streams may be included in the output of the descrambler 1712.

The buffers 1732 and 1734 preferably provide channel 1 and channel 2 outputs 1756 and 1758, respectively. The channel 1 and channel 2 outputs may be provided to the video transport 1602 or to the audio decode processor (ADP) 1614. When decrypted parsed transport streams from the buffers 1732 and 1734 are received by the video transport and the ADP, the video transport and the ADP determine whether the incoming data is video or audio and process them accordingly.

In one embodiment, the video transport is capable of processing video data from both the output buffer 1732 and the output buffer 1734. The data transport and the video transport are capable of processing the incoming MPEG-2 Transport streams to display multiple video simultaneously in, e.g., picture-in-picture (PIP) or tile format. The ADP preferably extracts audio data from one or the other of the output channels 1 and 2 1756 and 1758. In other embodiments, the ADP may extract audio data from both the channels 1 and 2.

The first audio hold and second audio hold signals preferably are provided by the audio decode processor (ADP). The first audio hold signal indicates to the buffer 1732 that an audio buffer, e.g., in the ADP, receiving the channel 1 output 1756 requests that the output 1756 be held until the audio buffer is ready to receive the output 1756 again. Similarly, the second audio hold signal indicates to the output buffer 1734 that the audio buffer, e.g., in the ADP, requests that the channel 2 output 1758 be held. Thus, the first and second audio hold signals preferably safeguard against overflow of the audio buffer.

The input synchronizers 1702a–c preferably also provide synchronized transport streams to a PCR recovery module 1728 for extraction of program clock information (PCRs). The PCR recovery module 1728 preferably extracts the PCRs from the transport streams and outputs as a program clock reference (PCR) output 1736. Maintaining upstream timing synchronicity is typically important when playing transmitted programs directly, and the availability of a local reference clock generally allows playback synchronicity between video and audio. Thus, the PCR output 1736 preferably is provided simultaneously to downstream devices including but not limited to the video transport 1602, the ADP 1614 and other synchronous devices. Using the PCR output 1736, the downstream devices may operate in a time synchronous manner with one another, the data transport 1600 and upstream devices that use the program clock, e.g., an upstream transmitter.

The PCR recovery module 1728 may extract PCRs from transport streams having different formats including but not limited to MPEG Transport streams and DIRECTV transport streams. The PCR output 1736 preferably is a serial output signal as to conserve chip area. In other embodiments, the PCR output 1736 may be a parallel output signal.

The program clock information (PCRs) extracted from the MPEG Transport stream preferably is loaded into a counter and may be used to lock the system clock of the data transport 1600 to the program clock. This way, a timing relationship can be maintained between the data transport 1600 and the upstream transmitter. The PCRs may typically be extracted from the input streams at any time, and sent to the downstream devices either as they are available or only at discontinuities. The discontinuities may exist in the recovered PCRS, for example, when the transport streams include elementary streams generated using different program reference clocks.

A decision circuitry preferably is used to send some or all of the PCRs to the downstream devices such as the video transport 1602 or the ADP 1614. The ADP typically requires a PCR only in the cases when there is a channel change or a PCR discontinuity. The ADP preferably has its own local PCR counter which typically is re-loaded under these conditions. Thus, for example, only the PCRs loaded into a local PCR counter, which may also be referred to as a system time clock (STC) counter, are typically provided to the ADP 1614. The PCRs may also be sent to the downstream devices at other intervals.

The PCR output 1736 preferably is also provided to an external DAC (PCRDAC) for digital-to-analog conversion. The digital-to-analog-converted program clock reference output is provided to a voltage control oscillator (VCXO) to adjust the voltage level to control the VCXO frequency, which in turn adjusts the system clock to lock to the program clock. The data transport may include the PCRDAC in other embodiments. In still other embodiments, the PCRDAC may be included in one of the downstream devices such as the video transport.

In other embodiments, the PCR output 1736 may be programmed by a host CPU, so as to create a reference clock locally, instead of, or in addition to, extracting PCRs from the input streams. For this purpose, the host CPU preferably performs a "direct load" function, in which the host CPU programs serial PCRs that are sent rather than have the PCRs extracted from the input streams. Thus, the mode to transmit the extracted PCRs may be overridden by a mode to transmit user defined PCRs, i.e., programmed PCR output.

The descrambler 1712 preferably also provides the decrypted parsed transport streams to a PES parser 1718. The PES parser 1718 preferably parses the decrypted parsed transport streams and provides the PES header and data to the DMA controller 1724 for storage in the external memory, e.g., the circular memory buffers implemented in SDRAM. In another embodiment, the output of the PES parser 1718 is not stored in the external memory. Instead, the output of the PES parser 1718 provides audio and video streams to the video transport 1602 and the ADP 1614, respectively. In the described embodiment, the data streams are provided to the in-band 1 channel or the in-band 2 channel, respectively, of the video transport 1602.

The PES parser may perform PES packet extraction for any of the PID channels. In other embodiments, there may be more, e.g., 64, or less PID channels. There are 32 (or 64) PID's for all three input transport streams, spanning across all three channels. The packetized elementary stream (PES) parser 1718 preferably looks at the PES header to determine the length of the PES stream, and thereby figure out the end of the PES stream.

The descrambler 1712 preferably also provides the decrypted parsed transport streams to a PSI filter 1720. The PSI filter preferably is a thirteen-byte filter with an associated mask. The PSI filter 1720, in the first part of the section, selectively filters messages out of the data stream of the current PID and provides to the DMA controller 1724 to be written to the external memory, e.g., the circular memory buffers. Thus, the PSI filtering extract messages from the transport streams. The PSI filter 1720 preferably uses PSI filter data from a PSI table 1722 for filtering.

The PSI filter 1720 preferably is comprised of 32 section byte-compare filters. Each of the 32 section byte-compare filters preferably has a capability to filter 13 bytes as well as a mask per bit feature. In the data transport 1600, each PID channel may independently select any number of section byte-compare filters, where each filter may be used by multiple PID channels. The data extracted by the PSI filter 1720 from the out-of-band and in-band transport streams preferably stored in one of circular memory buffers. For example, in one embodiment, there may be 64 circular memory buffers. The output of the PSI filter 1720 preferably is provided to the external memory through the DMA controller 1724 over a 64-bit bus. In other embodiments, the bus width may be different from 64, e.g., the bus may be a 128-bit bus.

The circular memory buffers may be distributed between message data from the PSI filter 1720 and video/audio data from the PES parser 1718. For example, 64 circular memory buffers in one embodiment may be configured into all PES data memory buffers. For another example, 64 circular memory buffers may be apportioned between the PES data and the PSI data—62 PES data buffers and 2 PSI data buffers or any other distribution between the PES data buffers and the PSI data buffers. In addition, the data transport 1600 preferably performs a cyclic redundancy check (CRC) to verify correctness of the data. The CRC is associated with the PSI filter 1720.

Each of the circular memory buffers may be 1K, 2K, 4K, 8K, 16K, 32K, 64K or 128K bytes in size. In other embodiments, the size of the circular memory buffers may have other suitable size. Each of the circular memory buffers preferably is associated with a PID channel. For out-of-band packets, PID channels with duplicate PID's are allowed to output to different circular memory buffers.

The data transport 1600 preferably also includes a special addressing mode for filtering of proprietary messages including but not limited to: message type range, single cast-unit address, network 40 address, multicast 40 address, multicast 24 address, multicast 16 address and independent wild cards for the network 40 and multicast 40 address.

Figure 43:
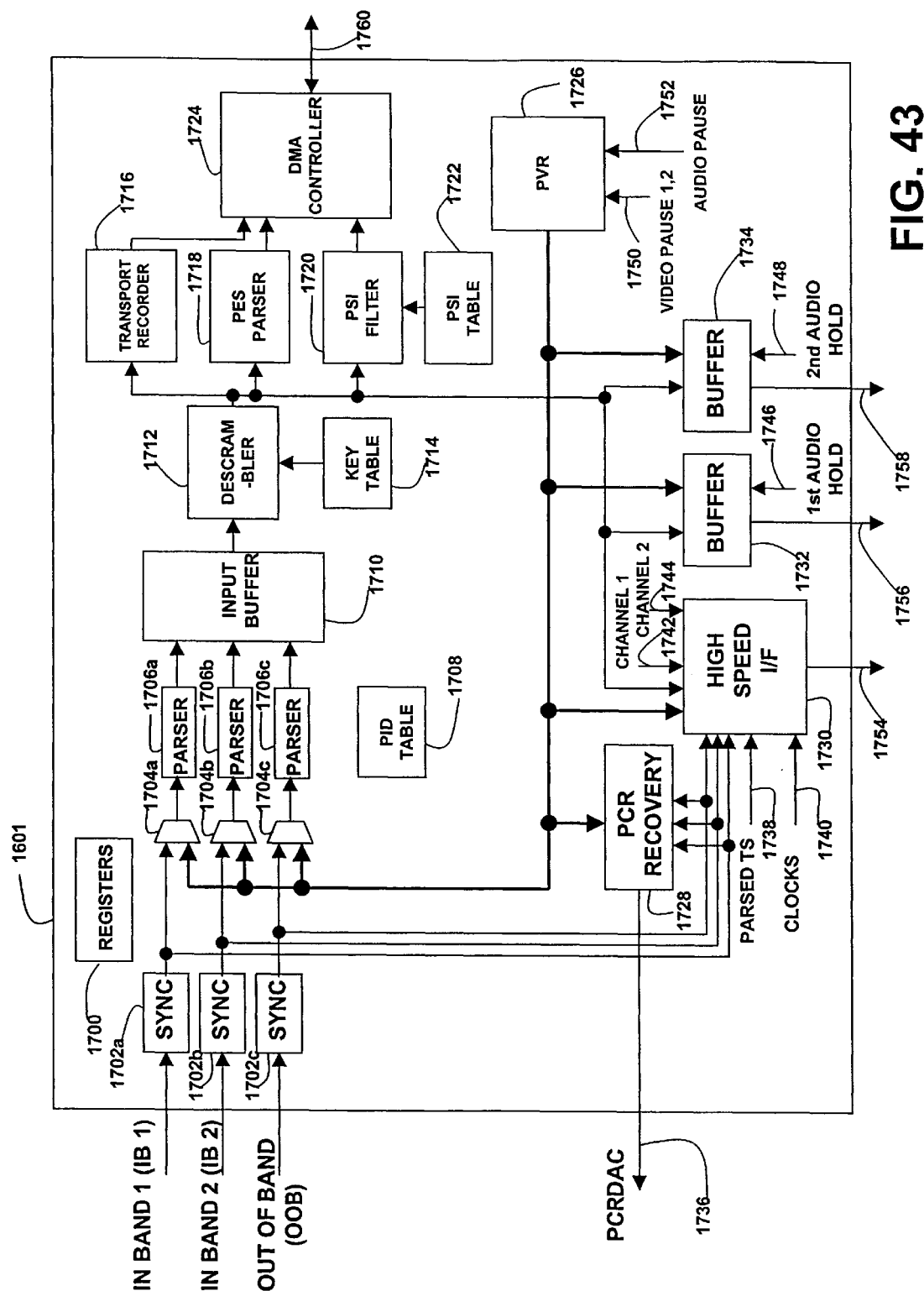
FIG. 43 is a block diagram of another embodiment of a data transport.

FIG. 43 is a block diagram of an alternate embodiment of the data transport. The data transport 1601 is similar to the data transport 1600 except that the data transport 1601 may store complete transport packets in the external memory and playback the stored transport packets when desired.

In addition to the elements of the data transport 1600, the data transport 1601 in FIG. 43 includes multiplexers 1704a–c, a transport recorder 1716 and a playback circuit (PVR) 1726. During normal operation, the multiplexers 1704a–c select the transport streams from the input synchronizers 1702a–c, and thus the data transport 1601 operates similarly to the data transport 1600 of FIG. 43.

The transport recorder 1716 may store complete transport packets in the circular memory buffers through the DMA controller 1760. Data associated with one PID is typically stored in a circular memory buffer. When the record channels are used, one or more of the circular memory buffers preferably are configured for taking transport stream inputs. Thus, data associated with the PID's in the transport stream may be placed into a single circular memory buffer. In one embodiment, a single circular memory buffer may contain data associated with up to 64 PID's. In other embodiments, a single circular memory buffer may contain data associated with more or less than 64 PID's.

The playback circuit (PVR) 1726 may operate in either MPEG mode or DIRECTV mode. The PVR 1726 preferably performs DMA function of transferring data from the external memory, e.g., the circular memory buffers in SDRAM, into the data transport 1601. During the playback mode, the PVR 1726 receives the stored transport packets from the external memory and provides to the buffers 1 and 2 1732 and 1734, the high speed interface module 1730, the PCR recovery module 1728 and the multiplexers 1704a–c. During this mode, the multiplexers 1704a–c provide the stored transport packets to the parsers 1706a–c. Both the transport recorder 1716 and the PVR 1726 preferably have two channels: channel 1 and channel 2. Either channel may be used to store and playback the transport packets.

Unlike in the normal operation, where PCRs preferably are extracted from the input transport streams, during playback, the PCRs preferably are derived from program time stamps (PTS) of the playback stream. This is due to the fact that the packets with PCR information may not have been recorded by the transport recorder 1716. Further, even if they have been recorded, the playback stream is not necessarily played back at a regular rate so that the PCRs may not arrive at proper intervals to be used in a manner that they are designed to be used. For the playback operation, since the PCRs are still needed decoding video and audio, a virtual PCR may be constructed by looking at the PTS information from the input streams. This user defined PCR may then be delivered to the video decoder by utilizing the serial PCR "direct load" capability, which has been discussed earlier.

Unlike directly transmitted data, e.g., in transport streams, which is synchronous because of the PCRs, the playback data is available from memory, potentially at a much higher rate than that required for the actual bit stream. This can cause an overflow of the video buffers. In one embodiment, during playback, two methods are available to prevent this overflow. These two methods preferably allow the video decoder to receive data only as they are needed.

The first method uses a throttling mechanism, allowing the playback stream to be sent at a data rate not faster than the maximum data rate, which may be programmed by the host CPU. This allows controlled bit rate and byte interval commensurate with the processing capabilities of the video decoder, which typically have a limit to input data rate. Thus, the PVR 1726 in this embodiment preferably includes throttle control for controlling the maximum rate at which the recorded transport streams are played back. In this embodiment, the rate of playback may vary between 10 to 81 Mbps with a normal rate of playback of 27 Mbps. Other embodiments may have different playback rates.

The second method uses a hold mechanism which halts the data output. The hold mechanism preferably is activated when the video decoder faces imminent overflow conditions. The PVR 1726 preferably receives video pause signals 1,2 1750 as well as an audio pause signal 1752. The video pause signals 1,2 preferably indicate to the PVR 1726 that a video buffer for video for channel 1 or channel 2, respectively, is getting too full and not ready to receive further input and that the PVR 1726 should pause before providing additional video data. The video buffer may also be called a coded data buffer or a compressed data buffer. The video buffer sometimes is also called a video buffer verifier (VBV) buffer or simply a VBV. In one embodiment, there actually are two video buffers for video for, e.g., PIP display. Thus, video pause signals 1 and 2 preferably are provided by the video decoder to pause the two video buffers independently of each other. Similarly, the audio pause signal 1752 preferably is provided by the ADP to the PVR 1726 to indicate that an audio buffer is getting full and is not ready to receive further input and that the PVR 1726 should pause before providing additional audio data.

In other embodiments, only one of the two methods, namely the throttle control mechanism and the hold mechanism, may be implemented to prevent overflow. In still other embodiments, other methods may be used to prevent overflow in the video and audio buffers.

During the play back mode, the PVR 1726 may playback the packetized elementary streams (PES) extracted by the PES parser 1718 and stored in the external memory, i.e., circular memory buffer, rather than the transport packets. In this case, the PES may not be parsed in the parsers 1706*a*–*c*. The PES stream preferably is provided to the high speed interface module 1730 to be outputted as the output 1754 and to the buffers 1 and 2 1732 and 1734 to be outputted as the outputs 1756 and 1758, respectively.

XV. Video Transport Processor

Referring back to FIG. 40, the video transport 1602, preferably is an MPEG-2 video transport. The video transport 1602 preferably has capabilities to extract video elementary streams from PES or transport streams, detect and handle errors at the transport/PES level of the video streams, segment video into rows and creates a start code table for use by the video RISC 1604 to pick up video data from an external memory. The start code table indicates which video data is at which external memory address. The video transport 1602 stores the start code table in the external memory.

The video transport 1602 preferably has the following features: a capability for receiving two in-band and one out-of-band MPEG-2 Transport streams; a host feed interface for feeding a transport stream; a content addressable memory (CAM) based PID filtering and PSI section filtering; a support for custom message filtering; a PCR recovery and local PCR correction with built-in PWM/PDM; CRC checking for PSI sections; a processor-based transport stream parsing; special instructions for quick transfer of data to external memory and for discarding unwanted packets; and a capability to perform start code alignment and creation of index data structure, i.e., a start code table, for-use by the video RISC 1604.

Figure 44:
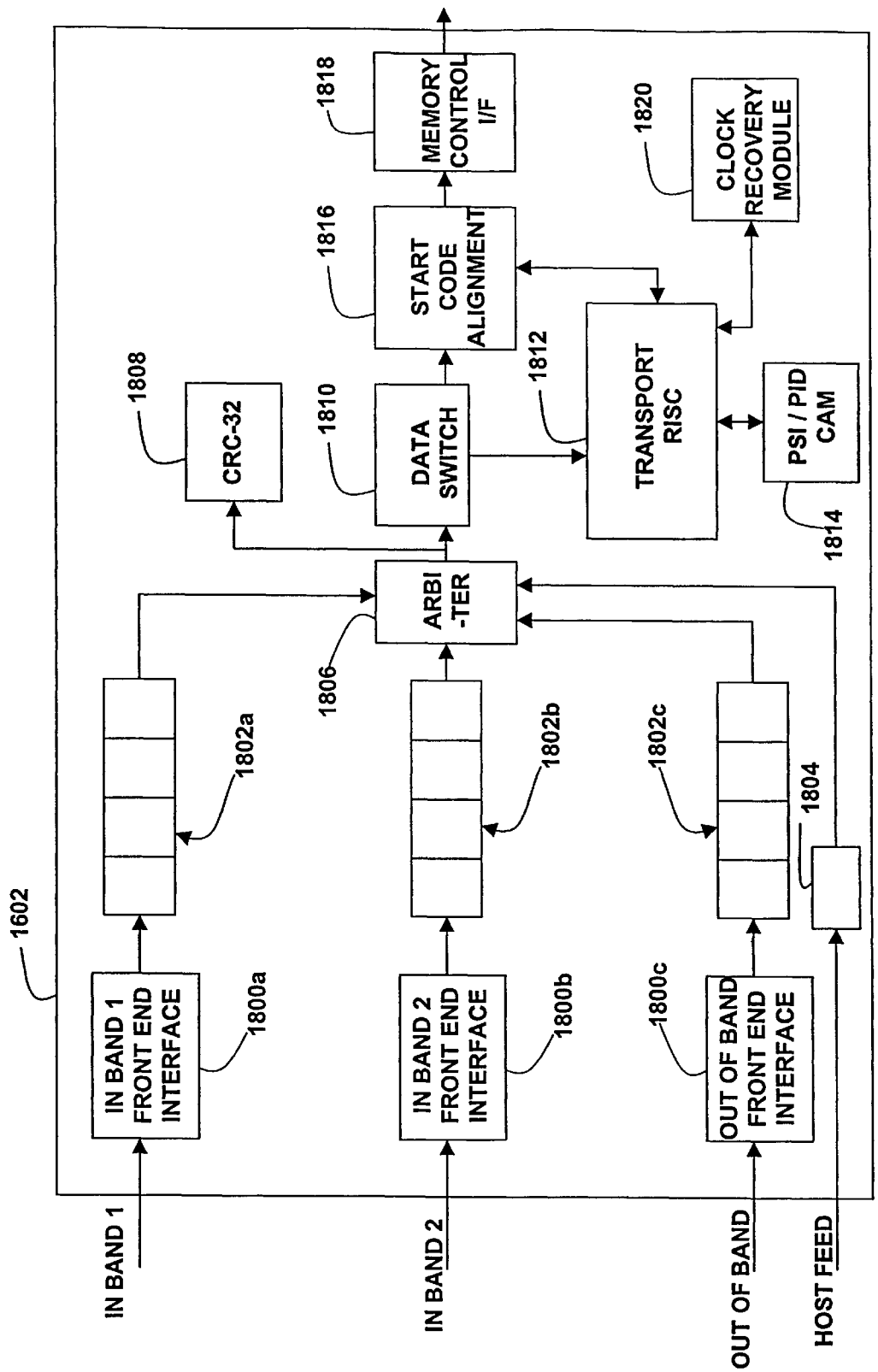
FIG. 44 is a block diagram of a video transport.

FIG. 44 is a block diagram of the video transport 1602 in one embodiment of the present invention. The video transport 1602 preferably processes three simultaneous input channels, two in-band channels and one out-of-band channel. Thus, the video transport 1602 preferably includes three front end interfaces 1800*a*–*c* to receive the incoming serial transport streams. The front end interfaces preferably convert the incoming serial transport streams into parallel, e.g., byte-wise, format.

The video transport 1602 preferably also includes a clock recovery module 1820. The clock recovery module 1820 preferably includes a local program clock reference (LPCR) logic, and may also function as a pulse width modulation (PWM)/pulse duration modulation (PDM) generator and as a watchdog timer. When a program clock reference (PCR) is found in the transport stream, a PCR PID detect state machine preferably sends a strobe to store the current value of the LPCR into registers.

The watchdog timer is a down counter which preferably counts down from the value to which it initialized and generally may interrupt when the terminal count has been reached. The watchdog timer interrupt is used by a transport RISC 1812 to handle any exceptional case list.

The transport RISC 1812 preferably includes a number of components such as transport RISC core for performing main processing, interrupt controller for handling interrupts, timers and DMA for transferring data from the transport RISC to the external memory, e.g., SDRAM.

Although the video transport 1602 has a capability to process three channels simultaneously, one to three channels may be processed simultaneously in practice. In one embodiment of the present invention, the video transport 1602 is capable of receiving either a transport stream or a PES stream from the data transport 1600 as either in-band 1 or in-band 2 input. In other embodiments, the video transport 1602 may receive either a transport stream or a PES stream, but not both, from the data transport 1600. In another embodiment, the source in-band 1 and in-band 2 channels are multiplexed and only one or the other is provided to the video transport as either in-band 1 or in-band 2, but not both.

In one embodiment, the video transport 1602 does not include a descrambler. Thus, if the source in-band transport stream has been encrypted, the source in-band transport stream preferably is descrambled, i.e., decrypted, in the data transport 1600 first, and then provided to the video transport 1602. The descrambling, also known as decrypting, may include but not limited to DES and DVB descrambling. In other embodiments, the video transport 1602 may have a descrambling capability.

In the embodiment illustrated in FIG. 44, after serial-to-parallel conversion in the front end interfaces, the transport streams preferably are provided to three quad packet buffers 1802*a*–*c*. In other embodiments, the transport streams may be provided to other types of buffers such as a single buffer per transport stream or a single buffer per all three transport streams. In still other embodiments, the buffers for receiving the transport streams may not be used.

Each of the quad packet buffers 1802*a*–*c* in FIG. 44 preferably holds four transport packets and presents them in turn to subsequent processing blocks. The video transport 1602 preferably is also capable of receiving a host feed from, for example, a CPU. The host feed is received by a buffer 1804. The buffer 1804 may be a relatively small buffer having size of 256 bytes. An arbiter 1806 preferably selects one of three input transport streams and the host feed, and feeds it to the transport RISC 1812 in a round robin manner. In one embodiment of the present invention, a processing rate of the selected transport packets is 81 Mbps. In other embodiments, the processing rate may be more or less than 81 Mbps.

In one embodiment of the present invention, each of the quad packet buffers may store up to 256 bytes. In other embodiments, the number of bytes each of the quad packet buffers may store may be more or less than 256 bytes in length. Further, there may be more or less than four input buffers in other embodiments.

The CRC 32 module 1808 preferably includes a CRC 32 check logic for checking PSI section errors. The CRC-32 module 1808 preferably is used to check CRC on PSI sections in the transport streams.

The video transport 1602 preferably also includes a data switch 1810 to direct the transport stream from the arbiter 1806 either to the transport RISC 1812 or to an external memory through a start code alignment module 1816. For the processing of the transport header, the data switch 1810 preferably directs the incoming transport stream to the transport RISC 1812. The transport RISC 1812 preferably compares the transport packet PID with one of the PID's from a PSI/PID content addressable memory (CAM) 1814, which preferably has been loaded with the PID's by the transport RISC 1812 (firmware running in the transport RISC) at the start up time.

After the transport header processing, the data switch 1810 preferably directs the transport stream from the arbiter 1806 to the start code alignment module 1816, which preferably detects start codes. Upon detecting a start code, the start code alignment module preferably alerts the transport RISC 1812, e.g., by generating an interrupt. Once alerted, the transport RISC 1812 preferably determines the type of the detected start code, and preferably processes the incoming video elementary stream in accordance with the type of the start code. For example, if the start code is indicative of a SEQUENCE header, the incoming video elementary stream preferably is provided to an external memory, e.g., SDRAM, through the start code alignment module 1816 as a new SEQUENCE.

The start code alignment module 1816 preferably initially transfers the video elementary stream into a buffer in a memory control interface 1818, which interfaces with the memory controller to access the external memory. The buffer in the memory control interface 1818 may be a double buffer in one embodiment of the present invention. The video elementary stream is then placed into the external memory. The memory control interface 1818 preferably also includes a state machine to interface with the memory controller. In one embodiment, the state machine preferably is hardware based.

In one embodiment, when the start code alignment module 1816 stores the incoming video elementary stream in the external memory, the incoming stream may be stored in Gword format, which is 128 bits in size. In other embodiments, the incoming stream may be stored in other formats.

The MPEG video decoder in one embodiment includes row decoders (row RISCs) that decode the video elementary stream (row by row). Starting each macroblock row at the Gword boundary is important for efficient decoding, and start of each row preferably starts at the Gword boundary. If there are some bytes, e.g., 8 bytes, left at the end of one row, these 8 bytes are filled with zeros in order to start the next macroblock row at the next Gword boundary. The Gword alignment in one embodiment preferably is switched on/off by the transport RISC.

In order to align macroblock row at the Gword boundary of the SDRAM, the start code alignment module 1816 in one embodiment preferably performs zero stuffing by introducing zero valued bytes and aligning the start codes to occur on the Gword boundary. The zero stuffing preferably enables easy partitioning, indexing and subsequent access to chunks of the video elementary stream. In other words, the start code alignment module 1816 in one embodiment preferably inserts zero's between the end of one macroblock row and the beginning of the next macroblock row to align each macroblock row to start at the Gword boundary. This process preferably permits the video elementary stream to be decoded simultaneously by multiple decode elements, e.g., row RISCs.

The start code alignment module 1816 preferably also functions as a stream manipulator in one embodiment. The stream manipulator preferably is used to Gword align the start codes in the video elementary stream. A Gword is 128 bits in size. The stream manipulator preferably also helps the transport RISC to make the index address data structure.

The memory control interface 1818 preferably computes the address within a transfer. In case of a video buffer getting full, the memory interface interrupts the transport RISC and waits until a new address of the video buffer is provided by the firmware. The sequence of memory controller commands is decided by the memory interface state machine. At the end of a memory transfer to the external memory, e.g., SDRAM, a "Memory Write Done" interrupt is given to the transport RISC 1812 to indicate that the memory transfer has been completed.

For example, a picture for HDTV (1080i format) may have dimensions of 1920×1080 pixels. This picture is stored in the external memory, e.g., SDRAM, as rows of macroblocks. In one embodiment, each macroblock row is indexed in the start code table, row by row, and the start code table is used as an index of how the video data is saved in the external memory.

In one embodiment, layers down to and including SLICE header preferably are processed in the transport RISC 1812. The transport RISC 1812 identifies the SLICE header. For example, SLICE 0 and associated video data may be identified by the transport RISC 1812. The transport RISC 1812 stores the SLICE header and video data into the external memory. Next, the transport RISC 1812 processes SLICE 1, and so forth. This data stored in the external memory preferably is processed by the video RISC 1604. The video RISC preferably looks for video data at the addresses indicated in the start code table, and provides the video data to the row RISCs 1606, 1608.

XVI. MPEG Video Decoder for Concurrent Multi-Row Decoding

The system of the present invention preferably is capable of decoding MPEG Main Profile at High Level (MP@HL) and ATSC-specified HDTV video streams (up to and including 1080i. The system may also decode MPEG streams that are compatible with other profiles such as main profile at High-1440 Level (MP@H14), 4:2:2 Profile at High Level (4:2:2@HL) and High Profile at High Level (HP@HL). In one embodiment, the system uses concurrent multi-row decoding to handle the complex operations. The concurrent multi-row decoding allows two or more decode paths to be operated concurrently.

Referring back to FIG. 40, MPEG video decoding function in one embodiment is performed by three RISC processors: a video RISC 1604 for processing higher layers of MPEG video and row RISCs 1606 and 1608. In other embodiments, types of processors other than RISC processors and/or different number of processors may be used.

Figure 45:
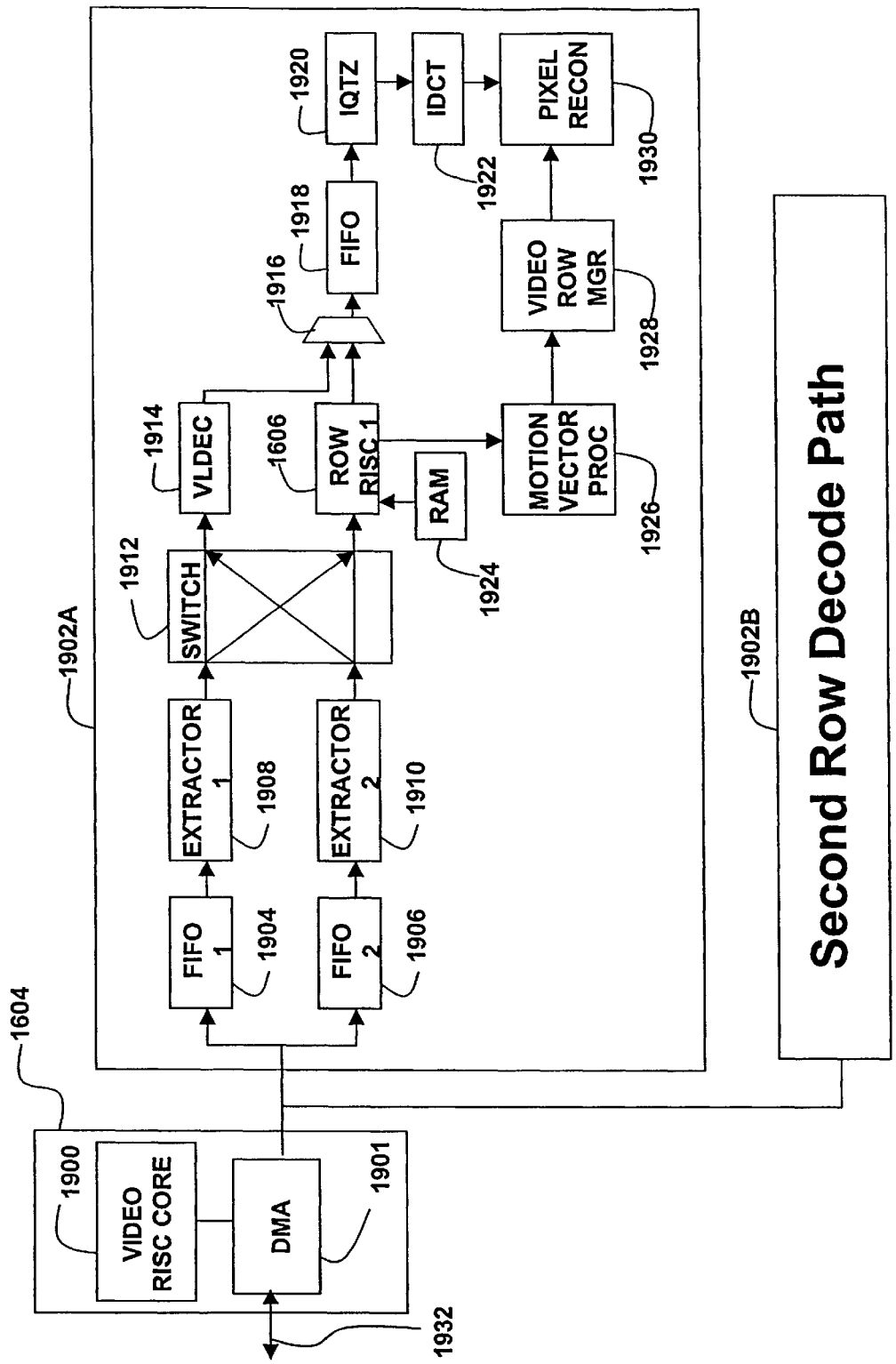
FIG. 45 is a block diagram of first and second decode row paths with which four macroblock rows may be decoded simultaneously.

FIG. 45 illustrates MPEG-2 video decoding in one embodiment of the present invention. Multiple rows are concurrently decoded in two row decode paths 1902A and 1902B. The number of decode paths and the operation frequency may vary in different embodiments of the present invention.

FIG. 45 illustrates details of the first row decode path 1902A only, however, the second row decode path 1902B is substantially identical to the first row decode path 1902A.

All firmware for these RISC processors is preferably executed from on-chip SRAMs, which are preferably loaded from main memory automatically upon initialization of the system. The MPEG video decoding function is preferably performed by a video RISC 1604 and first and second row decode paths 1902A and 1902B. The video RISC 1604 and row RISCs inside the row decode paths preferably share a similar architecture. However, each processor preferably is optimized for its task, thereby significantly improving efficiency and/or size of implementation.

In MPEG-2 video elementary streams, each picture is encoded using multiple slices, where a slice is formed from groups of horizontally neighboring macroblocks. Further, a single row of macroblocks in a picture is typically made up of one or more slices. No slice includes macroblocks from more than one macroblock row.

The video RISC 1604 preferably receives compressed MPEG video data. The video RISC 1604 preferably parses and processes higher level layers of compressed MPEG video data including SEQUENCE, group of pictures (GOP), EXTENSION and PICTURE layers. The SLICEs preferably are provided to the row RISCs for processing of the layers including SLICE, macroblock and block layers.

The video RISC 1604 includes a video RISC core 1900 and a DMA module 1901. The video RISC core 1900 preferably orders the DMA module 1901 to transfer video data from the external memory over a memory interface 1932 to the first and second row decode paths 1902A and 1902B. The video data may also be provided to and consumed by the video RISC core 1900.

Figure 46:
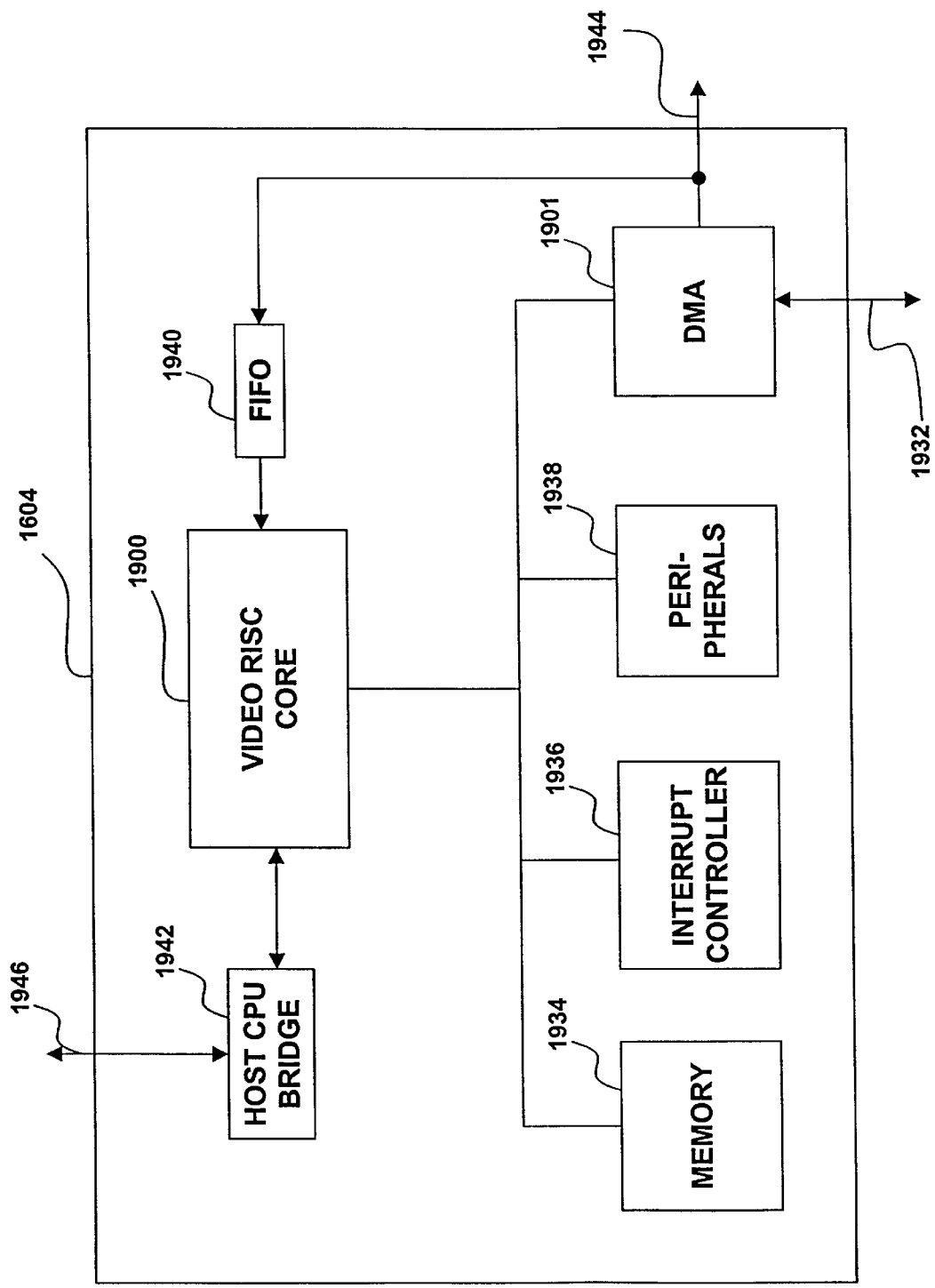
FIG. 46 is a block diagram of a video RISC.

FIG. 46 is a block diagram of the video RISC 1604. The video RISC 1604, preferably includes, in addition to the video RISC core 1900 and the DMA module 1901, a host CPU bridge 1942, a FIFO 1940, a memory 1934, an interrupt controller 1936 and peripherals 1938. The peripherals 1938 are used during operation of the video RISC core 1900 and may include semaphore registers, timers, etc.

The DMA module 1901 transfers video data from the external memory, e.g., SDRAM over the memory interface 1932 and provides to the first and second row decode paths 1902A and 1902B in FIG. 45. The video RISC core 1900 is coupled to the host, e.g., CPU, over a CPU interface 1946 through the host CPU bridge 1942. For example, the CPU interface 1946 may be coupled to the CPU register bus, and the video RISC 1604 may be programmed using this bus. This bus may be mastered by the video RISC core 1900 or by the host, i.e., the CPU. The memory 1934 preferably is a dual ported RAM. Access address is provided to the memory 1934 by the video RISC core 1900.

The video RISC core accesses the start code table and looks up the location (addresses) of video data in the external memory. The video RISC provides the location to the DMA module 1901 and orders the DMA module 1901 to transfer video data from the external memory. The DMA module 1901 requests to the memory controller 1634 to obtain the video data. In one embodiment, the memory controller 1634 preferably reads the video data from the external memory and the DMA module transfers that data to the memory 1934. In other embodiments, video data from the external memory may be transferred directly to FIFOs via the DMA module.

The video RISC core associates the video data in the memory with one of the FIFOs in the first and second row decode paths or with the FIFO 1940. In one embodiments, there are two FIFOs in each of the first and second row decode paths for a total of four FIFOs in the decode paths. The FIFO 1940,is on the same bus as the row decoder FIFOs. Thus, when the DMA 1901 transfers the video data out of the memory 1934, each video data is associated with a FIFO ID. The video data is then read by the FIFO corresponding to the associated FIFO ID. The video RISC core 1900 processes the start code table and accordingly distributes the video data from the external memory to multiple concurrent decode units to different FIFOs. The start code table preferably is prepared by the transport RISC 1812 and stored in the external memory along with the video data. The start code table contains the start point and size of the video data blocks in the external memory.

If the FIFO ID associated with the video data so indicates, the video elementary stream comes through the FIFO 1940 into the video RISC core 1900. The video RISC core performs SEQUENCE, GOP, EXTENSION and PICTURE header decoding with the provided video elementary stream. In the described embodiment, row RISCs 1606 and 1608 in the first and second row decode paths 1902A and 1902B, respectively, perform SLICE layer, macroblock layer and block layer decoding. In other embodiments of the present invention, less layers may be decoded in the video RISC and correspondingly more layers may be decoded in the row RISCs or vice versa.

Information decoded by the video RISC core 1900, such as picture size and picture structure, are used by the row RISCs during decoding. This information is also used to generate addresses needed for motion compensation. These information preferably are passed over the CPU interface 1946, which may include the register bus. The row RISCs 1606 and 1608 are also coupled to the CPU interface 1946, and the generated addresses may be provided to the row RISCs over the CPU interface. Some of the parameters that the video RISC core needs for programming may also be provided to the video RISC core over the CPU interface.

Concurrent Multi-Row Decoding and Double Headed Row Decoding

When decoding a macroblock row of a video picture, macroblocks (group of 16 by 16 pixels) of each slice are typically processed sequentially. There are two distinct sections to each macroblock: the macroblock header and the block layer data.

The processing of block layer data is often difficult and involves use of several decompression algorithms to focus on that aspect, such as Huffman decoding, inverse quantization, inverse discrete cosine transform, etc. In addition, parsing and further interpreting the data from the macroblock header is not at all trivial, especially in the case of bi-directionally predicted macroblocks (B-type) and in the case of dual-prime coded macroblocks. The process of parsing the header, extracting the motion vectors and converting them to memory addresses for pixel prediction takes significant number of clock cycles, even notwithstanding hardware acceleration.

Until and unless all the header bits are processed (parsed and stored), the block layer data typically cannot be reached. In other words, processing of the block layer data generally does not start until the header bits are processed. Thus, the total amount of time used to process a macroblock typically includes both the time used to perform header processing and the time used to process the block layer data. If one decoder were to perform both these tasks, one behind the other, the block layer hardware would be forced to remain idle during the header parsing period, thus wasting precious MIPs and leading to under-performance.

In one embodiment of the present invention, two macroblock rows of compressed video data are provided at a time through two separate FIFOs to both the row RISC and the variable length decoder (VLDEC), also known as a Huffman decoder. The VLDEC in each row decode path is used to variable length decode macroblock headers in the two macroblock rows, alternating between the two on a macroblock by macroblock basis. The row RISCs also have a variable length decoding capability for decoding the block layer data. Each row RISC, along with the associated motion vector processor, variable length decodes and processes both the rows, alternating between the two on a macroblock by macroblock basis. In other embodiments, each row RISC may include a motion vector processor.

Accordingly, in one embodiment, each macroblock is variable length decoded by both the VLDEC and the row RISC. The row RISC decodes the SLICE header, macroblock header and directs the block layer data to the VLDEC for variable length decoding. Thus, the VLDEC and the row RISC in one embodiment process alternate macroblocks from different rows for maximum efficiency, of memory bandwidth.

Returning now to FIG. 45, in one embodiment, compressed video data from the DMA module 1901 is provided to the first row decode path 1902A and the second row decode path 1902B. Each of the two row RISCs 1606 and 1608 may decode any two rows of a given picture simultaneously, alternating between their macroblocks. Therefore, each of the first and second row decode paths 1902A and 1902B is provided with two macroblock rows of compressed video data at a time for concurrent decoding.

The first row decode path 1902A includes FIFO 1 1904 and FIFO 2 1906, which are used to receive video data transferred by the DMA 1901. The first row decode path 1902A also includes an extractor 1 1908 coupled to the FIFO 1 1904 and an extractor 2 1910 coupled to the FIFO 2 1906. The extractors 1 and 2 are used to extracts video data bits for decoding from the FIFOs 1 and 2, respectively.

The first row decode path 1902A also includes a switch 1912. The switch 1912 is used to direct incoming video data either to a VLDEC 1914 or to the row RISC11606. The switch 1912 provides the SLICE header and then the macroblock header of a macroblock to the RISC 1 1606 for decoding; then the switch 1912 provides the block layer data of the same macroblock to the VLDEC 1914 for decoding. As the switch 1912 provides the block layer data of the same macroblock to the VLDEC 1914, it provides the macroblock header of the next macroblock in the other macroblock row to the RISC 1 1606 for decoding, and so on. Therefore, multiple macroblock rows are decoded at the same time in each row decode path. Outputs of the row RISC 1 1604 and the VLDEC 1914 are multiplexed in a multiplexer 1916 and provided to a FIFO 1918, which in turn provides them to an inverse quantizer (IQTZ) module 1920.

Figure 47:
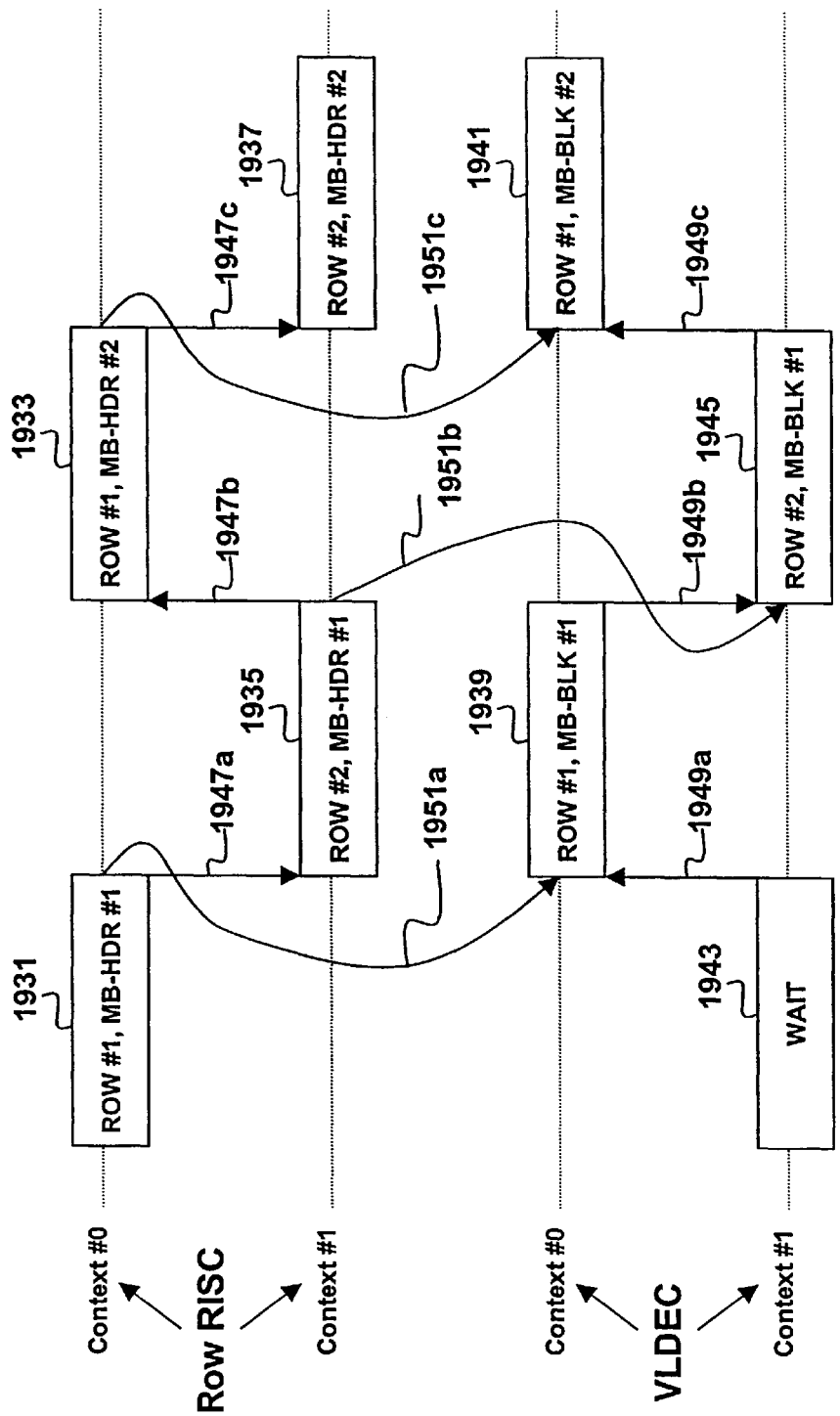
FIG. 47 is a context flow graph of the operation of one of the two row decode paths.

FIG. 47 is a context flow graph showing in more detail the operation of one of the two row decode paths. Each of the two row decode paths is used to decode two macroblock rows concurrently. Each macroblock is made up of a macroblock header and a macroblock content, i.e., block layer data. Macroblock rows 1 and 2 are associated with contexts 0 and 1, and are multiplexed together and provided to the row RISCs and the VLDECs.

The context flow graph depicts how the data flow and control alternates between the two contexts of the row RISC (for macroblock header decode) and the two contexts of the VLDEC (for the block layer data decode). The decoded information from each thread is combined back into a common data stream for further processing by the inverse quantizer and other downstream:modules.

First, the row RISC is associated with the context 0, a macroblock row 1 is provided to the row RISC, and the row RISC decodes the header of macroblock 1 of row 1 in step 1931. Meanwhile, the VLDEC, associated with context 1, waits for the row RISC to complete decoding of the header in the row RISC and the block data of macroblock 1 of row 1 to be provided for block data decoding.

When the row RISC completes decoding of the macroblock header, the context for the row RISC switches as indicated by vector 1947a to the context 1. Similarly, the context for the VLDEC switches as indicated by pointer 1949a. Thus, the block data of macroblock 1 of the row 1 is now provided to the VLDEC as indicated by pointer 1951a. As the VLDEC decodes the block data of macroblock 1 of row 1 in step 1939, the row RISC decodes a macroblock header for macroblock 1 of row 2 in step 1935.

Afterwards, the contexts switch again as indicated in pointers 1947b and 1949b, and the macroblock row 1 is provided to the row RISC while the macroblock row 2 is provided to the VLDEC. Thus, block data of macroblock 1 of row 2 is now provided to the VLDEC for decoding as indicated in pointer 1951b, and the VLDEC decodes the block data of macroblock 1 of row 2 in step 1945. Meanwhile, the row RISC decodes a macroblock header of row 1, macroblock 2 in step 1933.

After the row RISC and the VLDEC finish respective decoding, the contexts switch once again as indicated by pointers 1947c and 1949c, so that the row RISC receives the macroblock row 2 while the VLDEC receives the macroblock row 1. The block data of macroblock 2 of row 1 is now provided to the VLDEC for decoding as indicated in pointer 1951c, and the VLDEC decodes the block data of macroblock 2 of row 1 in step 1941. Meanwhile, the row RISC decodes a macroblock header of row 2, macroblock 2 in step 1937.

The decoding of the macroblocks by the row RISC and the VLDEC continues until all macroblocks of both rows are decoded. Once all the macroblocks of both the rows are decoded, a new pair of rows from the same or the next picture is fed to the row RISC and the VLDEC. More than one row decode paths may be deployed in parallel, to further double or triple the decode performance. This permits a linearly scalable architecture.

Returning now to FIG. 45, the downstream blocks (IQTZ module 1920, IDCT module 1922, pixel reconstruction module 1930) in the row decode path work alternately on macroblocks from two different rows (slices). Thus, some of the information which varies across two different slices of the same decoded picture, such as quantizer scale factor (quantizer scale code) and the DC history values of the luminance and the chrominance pictures are maintained as two contexts.

The motion vector processor 1926 is a co-processor coupled to the row RISC through the processor bus. It serves to accelerate the conversion of motion vectors into the memory address pointers. The motion vector processor 1926 preferably communicates its results to the video row manager 1928, which coordinates memory accesses and the pixel reconstruction module 1930.

XVII. Providing HDTV video and SDTV video of the same video images simultaneously Currently the majority of households own video cassette recorders (VCRs) that are compatible with standard definition television (SDTV) with formats such as NTSC, PAL and SECAM. The SDTV-compatible VCRs typically are incapable of recording a high definition television (HDTV) video. Therefore, while a viewer watches the HDTV video, it may be desirable to have access to the same video program material for recording using an existing SDTV-compatible VCR.

In another embodiment, the SDTV output may have different graphics from the HDTV output. For example, graphics such as subtitles and closed-caption information may be included in the SDTV output and not in the HDTV output, or vice versa. SDTV graphics may be in a different format in order to obtain suitable quality when recorded on an SDTV VCR. Also, the picture-in-picture (PIP) secondary video picture that may be present on the HDTV display may or may not be recorded on the VCR. It may be advantageous not to record the PIP video.

In one embodiment of the present invention, an HDTV video, while being displayed on an HDTV-compatible display, is scaled down to an SDTV video and provided as an output to be recorded using an SDTV-compatible VCR. Since both the HDTV video and the SDTV video are provided, the viewer is allowed to view the HDTV video while recording the SDTV video of the same video images using an SDTV-compatible VCR. The SDTV video may be provided with or without graphics such that the VCR recording may or may not record the graphics along with the video. For example, it may be desirable to record the graphics if the graphics include subtitles for a foreign movie. For another example, it may be desirable to record the SDTV video without the graphics if the graphics include such information as program guide or a graphics window alerting receipt of an e-mail.

Figure 48:
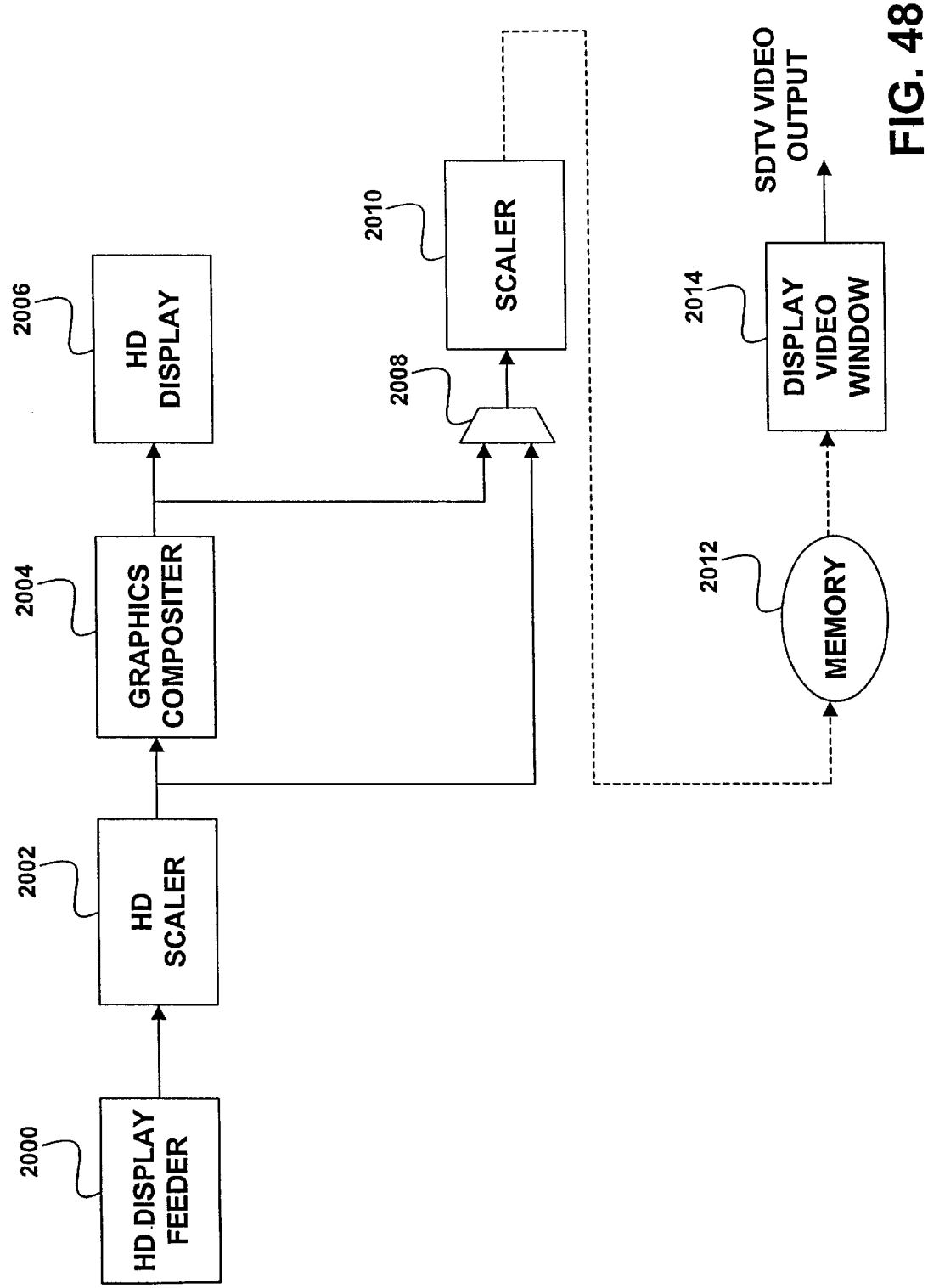
FIG. 48 is a block diagram which illustrates providing an SDTV video output while displaying an HDTV video.

FIG. 48 is a block diagram that illustrates one embodiment of the present invention where an HDTV video is provided as an SDTV video output while being displayed on a high definition (HD) display 2006. The HD display 2006, for example, may be an HDTV monitor. An HD display feeder 2000 preferably provides an HDTV video to an HD scaler 2002. The HDTV video may be in one of many HDTV formats such as an interlaced 1080i format, a progressive 720p format or any other HDTV format. The HDTV scaler 2002 preferably converts the format of the HDTV video to another HDTV format, such as from the 1080i format to the 720p format or vice versa, or from any HDTV format to any other HDTV format. The HDTV scaler 2002 may also scale an SDTV video up to an HDTV video.

The HDTV video is then provided to a graphics compositer 2004 to be blended with graphics. The HDTV video is also provided to a multiplexer 2008. After blending the HDTV video with graphics, the graphics compositor outputs the blended HDTV video both to an HD display 2006 to be displayed and to the multiplexer 2008. Since both the HDTV video and the blended (with graphics) HDTV video are provided to the multiplexer 2008, either the HDTV video or the blended HDTV video with graphics may be provided to a scaler 2010 to be scaled into an SDTV format and captured into a memory 2012. The SDTV format may include NTSC, PAL, SECAM formats, or any other conventional or non-conventional SDTV format.

The SDTV video stored in the memory 2012 preferably is read into a display video window 2014 and provided as the SDTV video output for recording using an SDTV-compatible VCR. An HDTV video is typically displayed at 60 frames or fields per second while, for example, an NTSC-standard SDTV video is typically displayed at 59.94 fields per second. The display rate may be converted from 60 frames or fields per second to 59.94 fields per second when the HDTV video is converted to the NTSC-standard SDTV video.

In some application scenarios such as those where the HDTV content has a rate of 60.0 frames or fields per second, and the SDTV output has a rate of 59.94 fields per second, the SDTV video that is captured to memory preferably is stored into and displayed from dual memory buffers. In one embodiment of the present invention, the system preferably includes the controls and mechanisms to manage the dual memory buffers. These controls may be implemented in software, hardware, or a combination. Double-buffered video and graphics are well understood by those with skill in the art of animated graphics and digital video.

XVIII. Downscaling during Video Decoding to Reduce Memory Size and Bandwidth

Currently the majority of households own standard definition television (SDTV). In order for them to watch the content of high definition (HD) signals on SDTV, the system should perform HD to SD conversion. In addition, downscaling of HDTV images is often desirable to save memory space and memory bandwidth even when HDTV is used for display. In one embodiment of the present invention, downscaling during the video decoding process is implemented. The described embodiment of the present invention reduces the system cost while maintaining image quality.

There are two common conversion methods:
  a) In the first conversion method, full images are reconstructed and stored in external memory (SDRAM). Downscaling is performed during display time.
  b) In the second conversion method, downscaling is typically performed during decoding time. The images are downscaled both horizontally and vertically during reconstruction (pixel prediction & motion compensation). Thus, quarter sized images are reconstructed and stored in external memory.

The first conversion method typically keeps image quality but it consumes significant memory space and memory bandwidth. The second conversion method typically saves memory and memory bandwidth, but using this method generally results in a significant loss of image quality. If images are downscaled vertically during reconstruction, image quality is generally lost because of the use of two major classifications of prediction mode, frame prediction and field prediction, in MPEG-2.

In addition to the two major classifications of prediction mode, MPEG-2 uses two major classifications of the picture structure: frame picture and field picture. Thus, each frame may be a single coded frame-picture or two coded field-pictures (one is a top field picture, and the other one is a bottom field picture). FIGS. 51–57 illustrate different field and frame prediction modes using frames pictures and field pictures.

For example, if all pictures were frame coded or all pictures were field coded, use of vertical downscaling typically would not result in a significant loss of quality. However, MPEG-2 standard supports interlaced video with a variety of coding modes, such that the alternate (even and odd) sets of lines within a macroblock in MPEG-2 may represent different field time in the video stream, and both even and odd lines, that is both fields, may be needed for predicting subsequent pictures. If the video were downscaled vertically during decoding, critically important information that distinguishes between the two fields may be lost.

Figure 49:
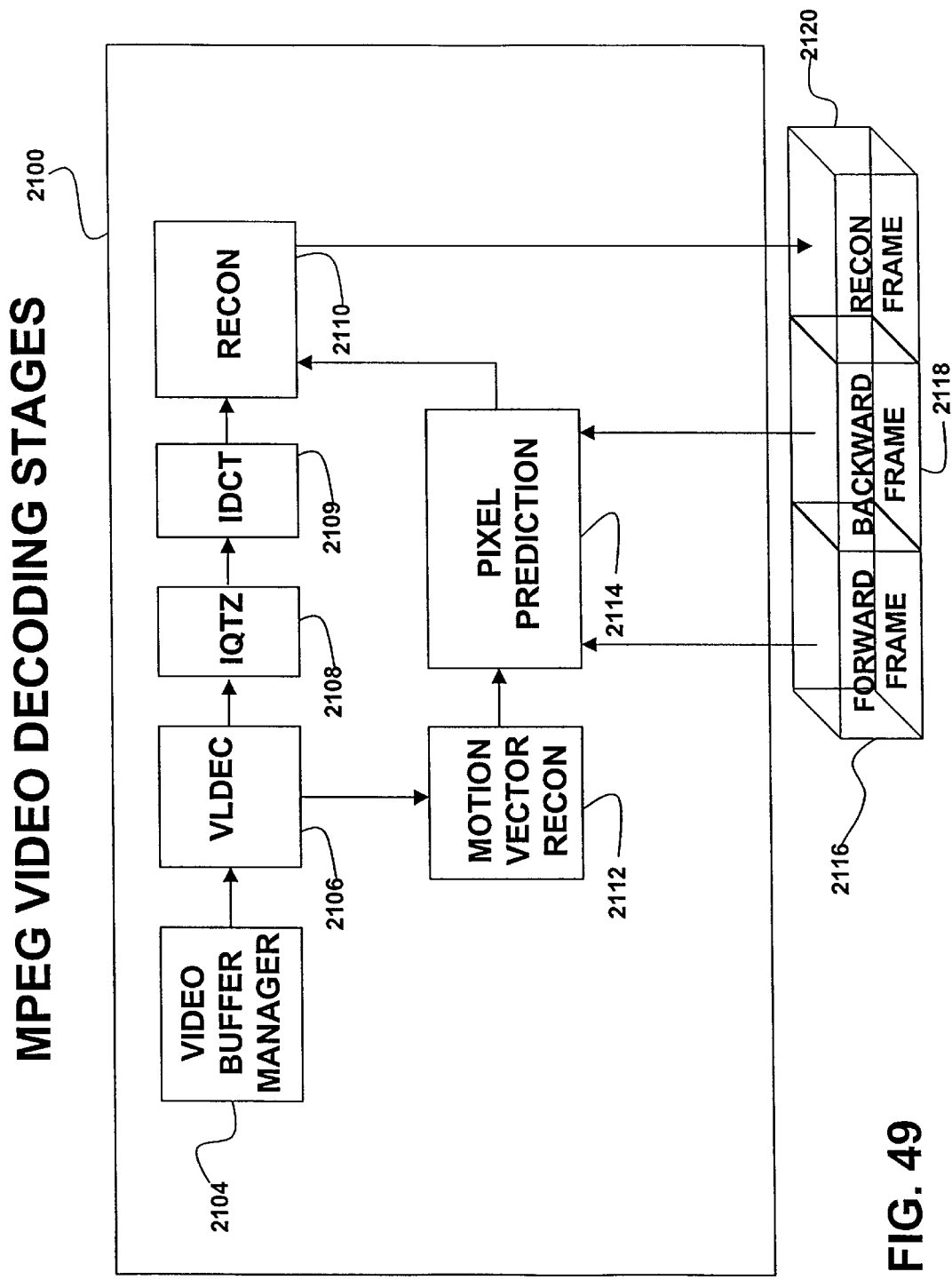
FIG. 49 is a block diagram of MPEG video decoding stages in one embodiment.

FIG. 49 is a block diagram of MPEG video decoding stages 2100 in one embodiment of the present invention. In this embodiment, downscaling of images is not performed.

Figure 50:
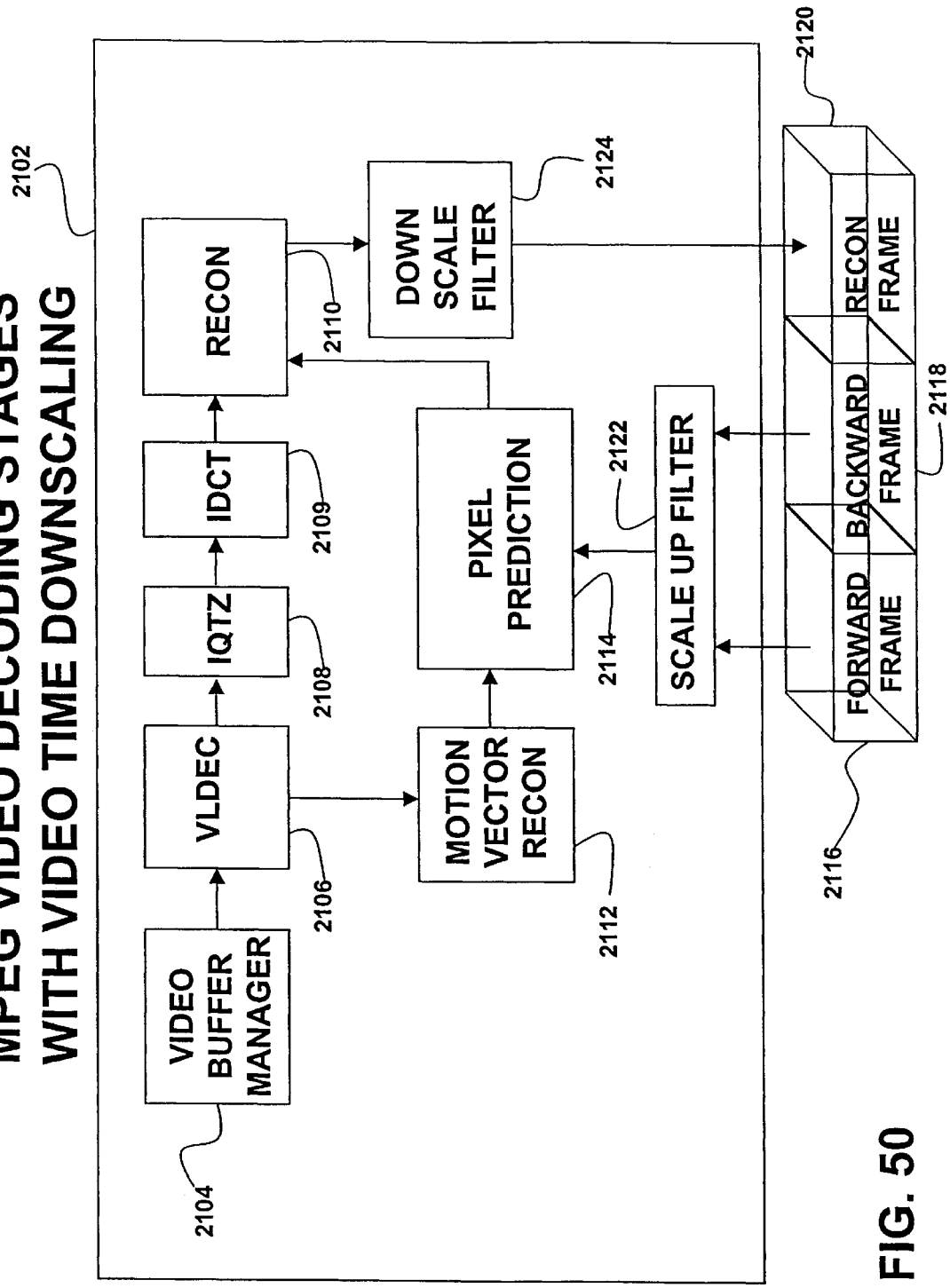
FIG. 50 is a block diagram of MPEG video decoding stages in another embodiment.
Figure 51:
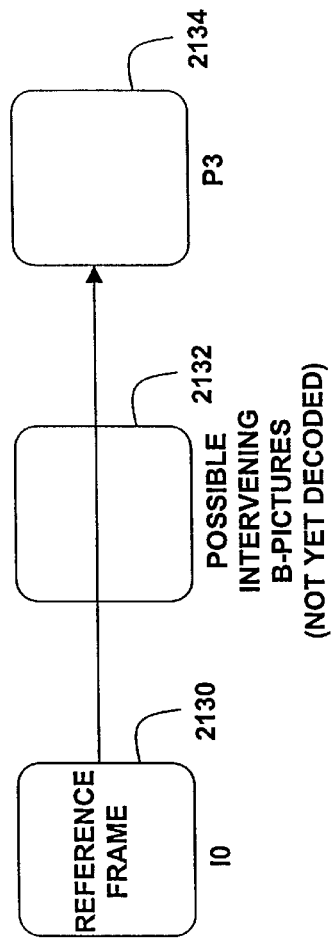
FIG. 51 is a process diagram illustrating frame-prediction for I-pictures and P-pictures.
Figure 52:
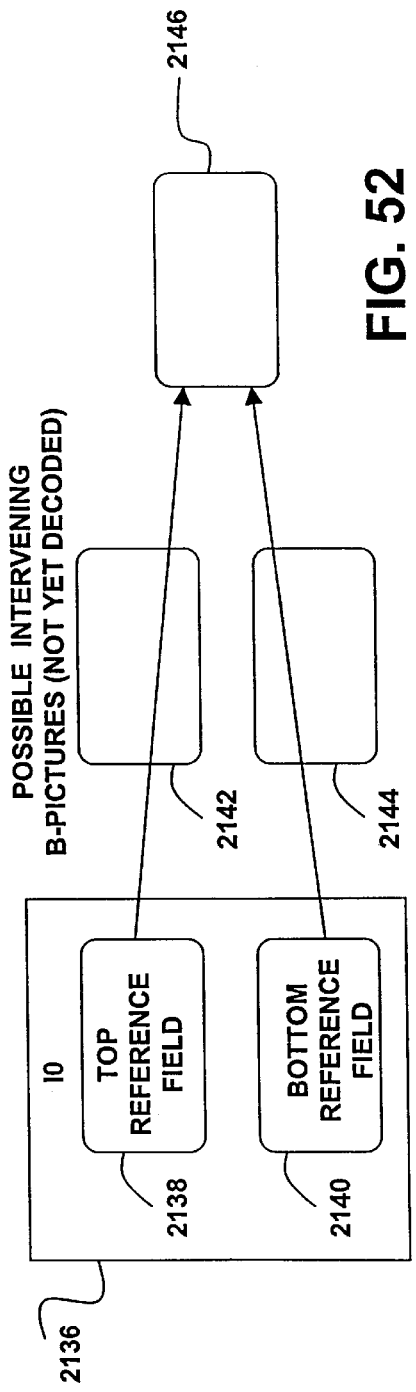
FIG. 52 is a process diagram illustrating field-prediction in a frame-picture.
Figure 55:
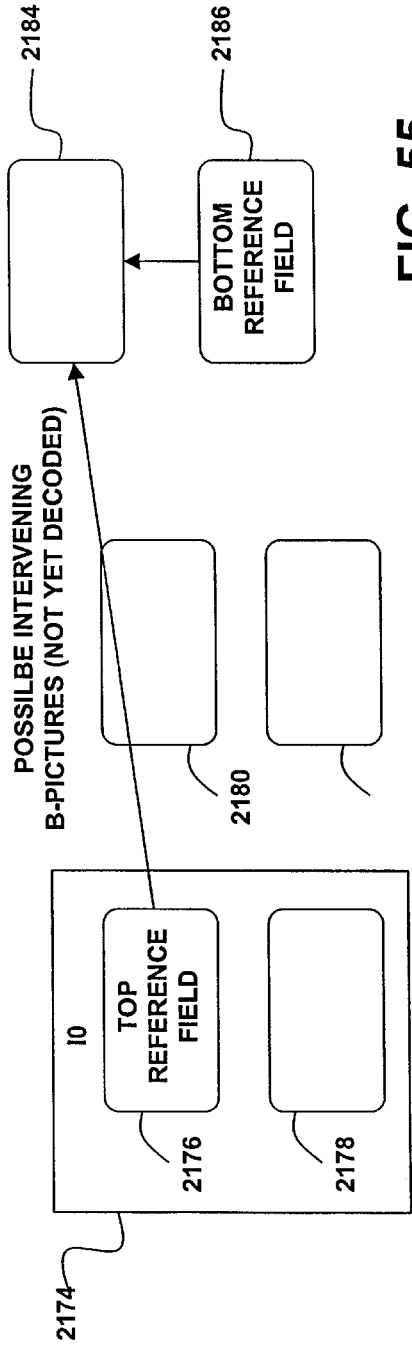
FIG. 55 is a process diagram illustrating prediction of the "top field" second field-picture.
Figure 56:
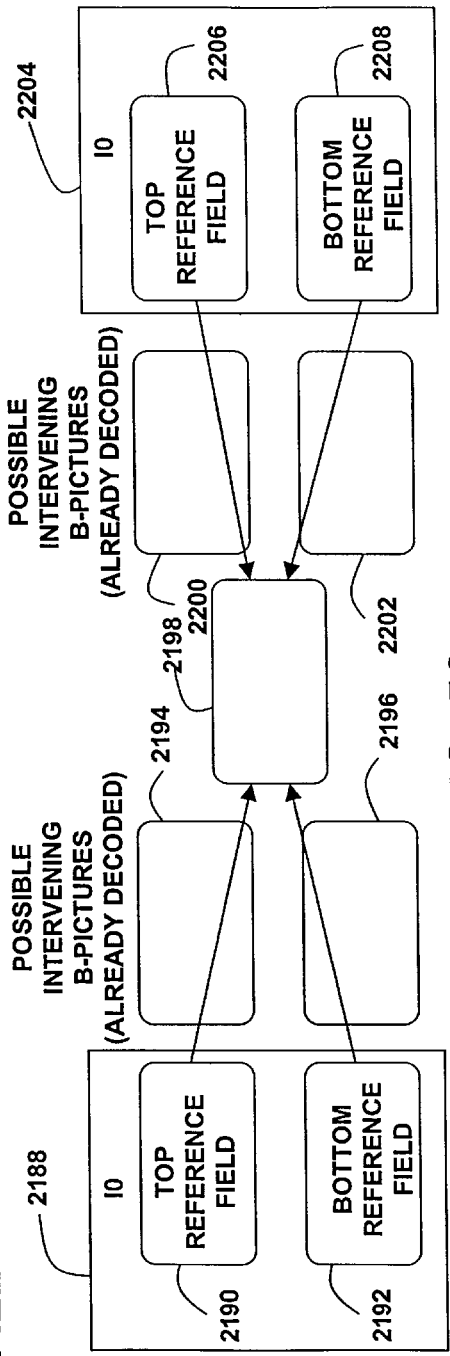
FIG. 56 is a process diagram illustrating prediction of B field pictures or B frame pictures.
Figure 57:
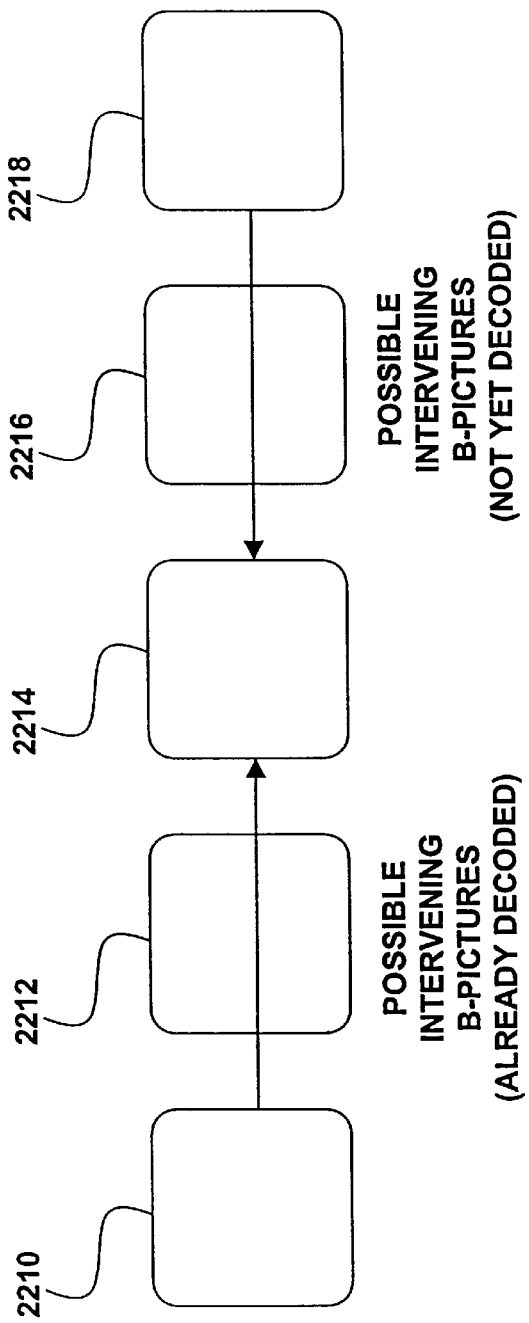
FIG. 57 is a process diagram illustrating frame prediction for B-pictures.

FIG. 50 is a block diagram of MPEG video decoding stages 2102 in another embodiment of the present invention. The MPEG video decoding stages in FIG. 50 preferably operate in reduced memory mode (RMM) with two main goals of reducing required memory bandwidth and reducing required memory space. In addition to the MPEG video decoding stages in FIG. 49, horizontal downscaling is performed in a downscale filtering stage 2124 after reconstruction in a reconstruction stage 2110. The downscaled value preferably is written into the external memory as a reconstructed frame 2120. At the time of prediction, a horizontal upscaling preferably is performed at a scale up filtering stage 2122 after reading the downscaled values, i.e., a forward frame 2116 and a backward frame 2118, from the external memory. The upscaled value preferably is provided to a pixel prediction stage 2114.

If vertical downscaling is performed during reconstruction, accumulated errors generally are increased significantly due to the loss of row information. That is the reason why images are downscaled by half only in the horizontal direction, and not in the vertical direction, in the embodiment illustrated in FIG. 50. Thus, the accumulated errors and loss of information preferably are lessened.

The embodiment of the present invention illustrated in FIG. 50 preferably maintains good image quality while, at the same time, reducing the required memory space and memory bandwidth. This embodiment may be used during conversion of HD to SD output format. The conversion algorithm in this embodiment may also be applied to HD-to-HD conversion applications in order to reduce memory bandwidth and memory space requirements, so that extra memory bandwidth and memory space may be used for other applications (CPU or high-end graphic applications, etc.).

Therefore, a key point of the embodiment illustrated in FIG. 50 is that during the reconstruction stage, images are reduced by half only in horizontal direction, and not in vertical direction. Thus, accumulation of errors and loss of information are lessened when compared with the case where the images are reduced by half in both horizontal and vertical direction. Vertical scaling and further horizontal scaling may be performed in the display engine. In other embodiments, the images may be scaled up or down both horizontally and vertically.

The downscale filter preferably is performing the following functions:

```
For (y = 0; y < row; y++) {
    If (downscale) {
        For (x = 0; x < column; x += 2)
            pel_sd[y] [x >> 1] = (pel[y] [x] + pel[y] [x+1])/2;
        }
    }
    else {
        For (x = 0; x < column; x++) {
            pel_sd[y] [x] = pel[y] [x];
        }
    }
}
``` where pel[ ][ ] preferably is the output of the final reconstruction stage 2110 for the luminance and chrominance (U/V) blocks. pel_sd[ ][ ] preferably is the downscaled value which is written into the external frame buffers.

Since predictions preferably are formed by reading prediction samples from the reference frame buffers, a given sample typically is predicted by reading the corresponding sample in the reference frame buffer offset by the motion vectors. Therefore, the motion vectors preferably are also modified depending on whether downscaling is performed or not.

MVx

The horizontal motion vectors preferably receive from the Motion Vector reconstruction stage 2112 refer to the luminance component.

Full_pel

The decoded motion vector values preferably represent integer pel offsets (rather than half pel units). In MPEG 2, the decoded motion vectors values typically represent half pel units.

Downscale

When high, it preferably indicates that the scale down function is enabled. When low, it preferably indicates that the scale down function is disabled and the pixel prediction will perform the normal operation without scaling.

```
If (Downscale) {
    If (luminance) {
        MVx = MVx >> 2;
    }
    else {
        MVx = MVx/2) >> 2;
    }
}
else
    If (luminance) {
        MVx = MVx >> 1;
    }
    else {
        MVx = (MVx/2) >> 1;
    }
}
```

The upscale filter preferably performs the following functions:

```
For (y = 0; y< row; y ++) {
    If (downscale) {
        For (x = 0; x < column; x++) {
            pel_us[y] [2*x] = pel_ref[y] [x];
            pel_us[y] [2*x+1] = pel_ref[y] [x];
        }
    }
    else {
        For (x = 0; x < column; x++) {
            pel_us [y] [x] pel_ref [y] [x];
        }
    }
}
``` where pel_us[ ][ ] is the upscale sample being formed and pel_ref[ ][ ] are samples in the reference frame buffers.

In yet another embodiment of the present invention, downscaling of images during decoding is disabled when the coded video does not contain B pictures. In the common practice of MPEG video decoding, particularly when following the ATSC (Advanced Television Systems Committee) recommendations, when there are no B pictures, there may be a relatively long string of P pictures, such that prediction error accumulation may be serious. However, when there are no B pictures, the worst case memory bandwidth required for decoding is reduced by approximately half, thereby achieving one main goal of the reduced memory mode (RMM) (except when the encoded video stream uses "dual prime" mode). Further, when there are no B pictures, the maximum memory space required typically is also reduced, thereby making it possible to achieve the other main goal of RMM without any downscaling.

With RMM downscaling turned off, there is no prediction error accumulation, which may also be referred to as "drift". So, simply detecting the lack of B pictures and turning off RMM downscaling provides a great improvement when decoding stream with no B pictures. On the other hand, when there are B pictures in the stream, there generally are not long strings of predicted (P) pictures without intervening I pictures, so RMM method may be used without incurring significant prediction error accumulation, again enabling savings in memory space and bandwidth while retaining good quality.

The odd case is when the stream uses "dual prime". Fortunately, this is rarely if ever used in HDTV encoding or modern SDTV encoding. If and when the "dual prime" is used, RMM downscaling may be left on, risking some loss of quality in some cases, but it still works, or RMM downscaling may be turned off, resulting in normal full decoding, no loss of quality, possible savings in memory space, and no savings in memory bandwidth with worst case streams.

XIX. MPEG Specific Data Transfer Commands

Reading SDRAM for MPEG video decoding can be very inefficient, and efficiency in this operation typically is very important to creating cost effective products that perform properly in various different cases. Normal protocols between memory controllers and their clients, e.g., CPUs or other processing devices use conventional addressing and read/write schemes, such as "read N bytes starting at address A." This typically is inefficient for MPEG video decoding.

In one embodiment of the present invention, the MPEG video decoder preferably indicates to the memory controller exactly what type of addressing pattern is needed to return the data that is requested by the MPEG video decoder, using a special protocol that preferably is optimized for this purpose. The memory controller preferably uses these request types to perform memory address reads that preferably are optimized in terms of efficiency and performance, to read from the memory and return to the MPEG video decoder exactly the data that were requested while preferably using the minimum possible number of memory clock cycles, and also preferably minimizing the number of clock cycles used on the bus that couples the MPEG video decoder to the memory controller.

In one embodiment of the present invention, video data is stored in a manner suitable for building video images, performing reference (prediction) reads, and performing raster scan reads, all in an efficient manner. The luminance data is stored separately from the chrominance data. For example, FIG. 58 is an image block diagram 2250 of image organization of luminance macroblocks. The video image is organized into four banks b0–b3 of 64 bit SDRAM in the described embodiment. Other embodiments may use other memory types with, e.g., different data bus width and/or different number of banks.

Each of the memory locations $M_0$ to $M_{2f}$ includes luma components for one macroblock, i.e., 16×16 pixels. Since the luma component of each pixel is represented by 8 bits, luma components of each macroblock is 128 bits by 16 in size. One pixel row of component macroblock, e.g., four luma blocks of a macroblock, is packed into one logical 128-bit word (Gword). Two successive physical 64-bit memory locations in the SDRAM are used to store a 128-bit Gword. For example, the component macroblock $M_0$ includes 16 rows with 128 bits in each row. Each row with 128 bits, i.e., Gword, is stored in two successive memory locations of the bank $b_0$.

For chroma, U and V component blocks associated with a macroblock, each block has a size of 8×8. Thus, each row in a chroma block has 64 bits. Since the U and V component blocks are typically used side by side, each row of the combined U and V component blocks has a size of 128 bits, a Gword.

Referring back to FIG. 58, four horizontally neighboring component macroblocks are packed into an SDRAM row of a given bank. Consecutive quad-component macroblock sets are packed in incrementing bank numbers. In one embodiment of the present invention, up to four banks per row are packed. In another embodiment, up to two banks per row are packed. In other embodiments, different number of banks may be packed per row. For example, in the macroblock row 1 2252, the bank b0 includes component macroblocks $M_0$, $M_1$, $M_2$ and $M_3$, the bank b1 includes component macroblocks $M_4$, $M_5$, $M_6$ and $M_7$, the bank b2 includes component macroblocks $M_8$, $M_9$, $M_a$ and $M_b$, and the bank b3 includes component macroblocks $M_c$, $M_d$, $M_e$ and $M_f$.

Only 16 macroblocks are depicted in each of macroblock rows 2252, 2254 and 2256 for illustrative purposes. The number of macroblocks in each macroblock row typically depends on image resolution and may be more or less than 16. Thus, N macroblocks of a horizontal strip of a video image may be arranged in this manner. Consecutive horizontal strips of the video image are typically arranged in consecutive locations until all the image space is allocated. Knowledge of horizontal image size, in macroblock units, is utilized to intelligently locate vertically neighboring macroblock pairs.

MPEG Smart SDRAM Control Sequencer

Memory controllers for controlling SDRAM typically are quite simplistic in nature, due to a simple memory organization and a small set of data access types.

SDRAM is generally organized as rows of words. Each row in SDRAM is typically made up of two or four banks with up to 256 columns per bank row. Row Address (RAS) select operation preferably prepares a bank row for access. Column Address Select (CAS) operation preferably accesses a particular column within the row.

For an MPEG decode application, especially at HD resolution, more efficient organization of video data enhances accessibility and throughput. In one embodiment of the present invention, however, a complex memory organization and a vast set of access types are defined to ensure that the most frequent (thus demanding more bandwidth) request types are serviced very efficiently (more data for a given number of clock spent in the access). Thus in the described embodiment, a complex memory controller with capability to access data as suitable for MPEG decode operation is used.

The memory controller in the described embodiment has an "MPEG Smart" implementation, with 128 different types of read and write burst accesses. In other embodiments, the number of read and write burst access types may be more or less than 128. The memory controller, when implementing some (such as: video image prediction reads) of these burst accesses, makes intelligent decisions on the choice of which particular row (addresses) for which particular banks need to be prepared with RAS operations, so as to minimize the wasted clocks and achieve the maximum burst efficiency. Further, the memory controller in the described embodiment is designed to work efficiently, by tailoring the sequence differently in each case, for different sizes of stored video images, different types of SDRAM organization, resulting in different modes of operation, and different peculiar starting addresses for accesses.

Bus Interface with MPEG Specific Commands

For display purposes, pixels preferably are stored and read in raster scan order. However, for decoding, accessing pixels in raster scan order typically does not result in an efficient memory transfer. Since image organization in memory is macroblock oriented in the described embodiment, the data that is fetched for decoding is not linear data; rather, macroblock data is fetched. For example, a pixel immediately below the current pixel may be the next pixel to be fetched. For another example, alternate lines of particular component macroblock may be fetched during field prediction, since each picture is stored in memory in frame format.

Because of these variations, in order to fetch the macroblock data, the external memory is addressed in a particular fashion. Table 5.1 illustrates a list of different types of memory accesses that have been defined in one embodiment of the present invention, In other embodiments, memory access types and number of different memory access types may be different from those defined in table 5.1.

TABLE 5.1

| Request uz,1/9 Type | | | | Count/Offset/ Type | | | | | Request Type |
|---|---|---|---|---|---|---|---|---|---|
| D7 | D6 | D5 | D4 | D3 | D2 | D1 | D0 | Description | Code |
| 'b0000 | | | | | | | | Linear Gwords Read Access | |
| | | | | 0 | 0 | 0 | 0 | 16 Gwords | LG_16R |
| | | | | 0 | 0 | 0 | 1 | 1 Gword | LG_1R |
| | | | | 0 | 0 | 1 | 0 | 2 Gwords | LG_2R |
| | | | | n | n | n | n | N Gwords | LG_NR |
| | | | | 1 | 1 | 1 | 1 | 15 Gwords | LG_15R |
| 'b0001 | | | | | | | | Linear Gwords Write Access (DQM = 0) | |
| | | | | 0 | 0 | 0 | 0 | 16 Gwords | LG 16R |
| | | | | 0 | 0 | 0 | 1 | 1 Gword | LG 1R |
| | | | | 0 | 0 | 1 | 0 | 2 Gwords | LG 2R |
| | | | | n | n | n | n | N Gwords | LG NR |
| | | | | 1 | 1 | 1 | 1 | 15 Gwords | LG 15R |
| 'b0010 | | | | | | | | Gword Lower Write Access | |
| | | | | 0 | 0 | 0 | 0 | Write Byte #0 only | GL 0W |
| | | | | 0 | 0 | 0 | 1 | Write Byte #1 to Byte #0 | GL 1W |
| | | | | 0 | 0 | 1 | 0 | Write Byte #2 to Byte #0 | GL 2W |
| | | | | n | n | n | n | Write Byte #N to Byte #0 | GL NW |
| | | | | 1 | 1 | 1 | 1 | Write Byte #15 to Byte #0 | GL 15W |
| 'b0011 | | | | | | | | Gword Upper Write Access | |
| | | | | 0 | 0 | 0 | 0 | Write Byte #15 to Byte #0 | GU 0W |
| | | | | 0 | 0 | 0 | 1 | Write Byte #15 to Byte #1 | GU 1W |
| | | | | 0 | 0 | 1 | 0 | Write Byte #15 to Byte #2 | GU 2W |
| | | | | n | n | n | n | Write Byte #15 to Byte #N | GU NW |
| | | | | 1 | 1 | 1 | 1 | Write Byte #15 only | GU 15W |
| 'b0100 | | | | | | | | Single Byte Write Access | |
| | | | | 0 | 0 | 0 | 0 | Write Byte #0 | SB 0W |
| | | | | 0 | 0 | 0 | 1 | Write Byte #1 | SB 1W |
| | | | | 0 | 0 | 1 | 0 | Write Byte #2 | SB 2W |
| | | | | n | n | n | n | Write Byte #N | SB NW |
| | | | | 1 | 1 | 1 | 1 | Write Byte #15 | SB 15W |
| 'b0101 | | | | | | | | Single Word Write Access | |
| | | | | 0 | 0 | 0 | 0 | Write 16 bit word #0 | SW 0W |
| | | | | 0 | 0 | 0 | 1 | Write 16 bit word #1 | SW 1W |
| | | | | 0 | n | n | n | Write 16 bit word #N | SW NW |
| | | | | 0 | 1 | 1 | 1 | Write 16 bit word #7 | SW 7W |
| | | | | 1 | x | 0 | 0 | Write 32 bit word #0 | SD 0W |
| | | | | 1 | x | 0 | 1 | Write 32 bit word #1 | SD 1W |
| | | | | 1 | 0 | 1 | 0 | Write 32 bit word #2 | SD 2W |
| | | | | 1 | 0 | 1 | 1 | Write 32 bit word #3 | SD 3W |
| | | | | 1 | 1 | 0 | 0 | 8 Gwords Display Write | |
| | | | | 1 | 1 | 0 | 1 | Reserved | |
| | | | | 1 | 1 | 1 | 0 | Refresh Command | |
| | | | | 1 | 1 | 1 | 1 | Mode Register Set Command | |
| 'b1001 | | | | | | | | Linear Graphics Writes (with client driven DQM Mask) | |
| | | | | 0 | 0 | 0 | 0 | 16 Gwords | LG 16WG |
| | | | | 0 | 0 | 0 | 1 | 1 Gword | LG 1WG |
| | | | | 0 | 0 | 1 | 0 | 2 Gwords | LG 2WG |
| | | | | n | n | n | n | N Gwords | LG NWG |
| | | | | 1 | 1 | 1 | 1 | 15 Gwords | LG 15WG |
| 'b0110 | | | | | | | | Display Read Access | |
| | | | | 0 | 0 | 0 | 0 | 16 Gwords (256 pel component) | DS 16R |
| | | | | 0 | 0 | 0 | 1 | 1 Gword (16 pel component) | DS 1R |
| | | | | 0 | 0 | 1 | 0 | 2 Gwords (32 pel component) | DS 2R |
| | | | | n | n | n | n | N Gwords (N x 16 pel component) | DS NR |
| | | | | 1 | 1 | 1 | 1 | 15 Gwords (240 pel component) | DS 15R |
| 'b1111 | | | | | | | | Down Conversion Macroblock Prediction (Pred) and Write Access | |
| | | | | 0 | 0 | 0 | 0 | 8 Cols, 8 Rows Pred Alternate Reads | M8x8AR |
| | | | | 0 | 0 | 0 | 1 | 8 Cols, 9 Rows Pred Alternate Reads | M8x9AR |
| | | | | 0 | 1 | 0 | 0 | 8 Cols, 4 Rows Pred Alternate Reads | M8x5AR |
| | | | | 0 | 1 | 0 | 1 | 8 Cols, 5 Rows Pred Alternate Reads | M8x5AR |
| | | | | 1 | 0 | 0 | 0 | 8 Cols, 8 Rows Pred Continuous Reads | M8x8CR |
| | | | | 1 | 0 | 0 | 1 | 8 Cols, 9 Rows Pred Continuous Reads | M8x9CR |
| | | | | 1 | 0 | 1 | 0 | 8 Cols, 8 Rows Alternate Writes | M8x8AW |
| | | | | 1 | 0 | 1 | 1 | 8 Cols, 16 Rows Alternate Writes | M8x16AW |
| | | | | 1 | 1 | 1 | 0 | 8 Cols, 8 Rows Continuous Writes | M8x8CW |
| | | | | 1 | 1 | 1 | 1 | 8 Cols, 16 Rows Continuous Writes | M8x16CW |
| 'b0111 | | | | | | | | Macroblock Prediction (Pred) and Write Access | |
| | | | | 0 | 0 | 0 | 0 | 16 Cols, 8 Rows Pred Alternate Reads | M16x8AR |
| | | | | 0 | 0 | 0 | 1 | 16 Cols, 9 Rows Pred Alternate Reads | M16x9AR |
| | | | | 0 | 0 | 1 | 0 | 32 Cols, 8 Rows Pred Alternate Reads | M32x8AR |
| | | | | 0 | 0 | 1 | 1 | 32 Cols, 9 Rows Pred Alternate Reads | M32x9AR |
| | | | | 0 | 1 | 0 | 0 | 16 Cols, 4 Rows Pred Alternate Reads | M16x4AR |
| | | | | 0 | 1 | 0 | 1 | 16 Cols, 5 Rows Pred Alternate | M16x5AR |

TABLE 5.1-continued

| Request uz,1/9 Type | | | | Count/Offset/ Type | | | | | Request Type |
|---|---|---|---|---|---|---|---|---|---|
| D7 | D6 | D5 | D4 | D3 | D2 | D1 | D0 | Description | Code |
| | | | | 0 | 1 | 1 | 0 | 32 Cols, 4 Rows Pred Alternate Reads | M32x4AR |
| | | | | 0 | 1 | 1 | 1 | 32 Cols, 5 Rows Pred Alternate Reads | M32x5AR |
| | | | | 1 | 0 | 0 | 0 | 16 Cols, 8 Rows Pred Cont. Reads | M16x8CR |
| | | | | 1 | 0 | 0 | 1 | 16 Cols, 9 Rows Pred Cont. Reads | M16x9CR |
| | | | | 1 | 0 | 1 | 0 | 32 Cols, 8 Rows Pred Cont. Reads | M32x8CR |
| | | | | 1 | 0 | 1 | 1 | 32 Cols, 9 Rows Pred Cont. Reads | M32x9CR |
| | | | | 1 | 1 | 0 | 0 | 16 Cols, 8 Rows Alternate Writes | M16x8AW |
| | | | | 1 | 1 | 0 | 1 | 16 Cols, 16 Rows Alternate Writes | M16x16AW |
| | | | | 1 | 1 | 1 | 0 | 16 Cols, 8 Rows Continuous Writes | M16x8CW |
| | | | | 1 | 1 | 1 | 1 | 16 Cols, 16 Rows Continuous Writes | M16x16CW |

During "linear Gwords read access" operations, as indicated in table 5.1 with a request type of 'b 0000, one to 16 Gwords (128 bits) preferably are read from memory at a time. During "linear Gwords write access" operations with a request type of 'b 0001, one to 16 Gwords preferably are written to memory at a time.

During "Gword lower write access" and "Gword upper write access" operations with a request type of 'b 0010 and a request type of 'b 0011, respectively, one to 16 bytes preferably are written to memory at a time. During "single byte write access" operations with a request type of 'b 0100, a byte preferably is written at a time. During "single word write access" operations with a request type of 'b 0101, a word preferably is written at a time.

During "display read access" operations with a request type of 'b 0110, one to 16 Gwords may be read at a time in a raster scan order for display. The Gwords in memory are not stored in the raster scan order. Thus, during the display read accesses, Gwords preferably are not accessed in a linear fashion.

Various different access types are defined for "down conversion macroblock prediction and write access" operations with a request type of 'b 1111. During the reduced memory mode, 50% down conversion preferably is performed in horizontal direction only. Thus, each down converted macroblock is 8×16 in size. Therefore, for example, during "down conversion macroblock write access" operations, 128 pixels preferably are accessed during each memory burst access. During read accesses for field prediction, four or eight alternate macroblock rows preferably are read at a time. When half pixel resolution is desired, five or nine alternate macroblock rows preferably are read at a time.

During read accesses for frame prediction, eight continuous macroblock rows are read for normal resolution, and nine continuous macroblock rows are read for half pixel resolution.

During field mode write operations, eight or sixteen macroblock rows preferably are accessed for alternate writing. During frame mode write operations, eight or sixteen macroblock rows preferably are accessed for continuous writing.

Various different access types are defined for "macroblock prediction and write access" operations with a request type of 'b 0111. For example, since each macroblock is 16×16 in size, 256 pixels preferably are accessed during each memory burst access for write in one embodiment of the present invention.

During read accesses for field prediction in normal resolution mode, four or eight macroblock rows preferably are accessed for alternate reading. During read accesses for field prediction in half pixel resolution mode, five or nine macroblock rows preferably are accessed for alternate reading. During read accesses in frame prediction, eight macroblock rows preferably are accessed for continuous writing in normal resolution mode, and nine macroblock rows preferably are accessed for continuous writing in half pixel resolution mode.

XX. Audio Decode Processor (ADP) with an Internal Audio Transport

Referring back to FIG. 40, the ADP 1614 performs audio transport and audio processing functions.

Figure 59:
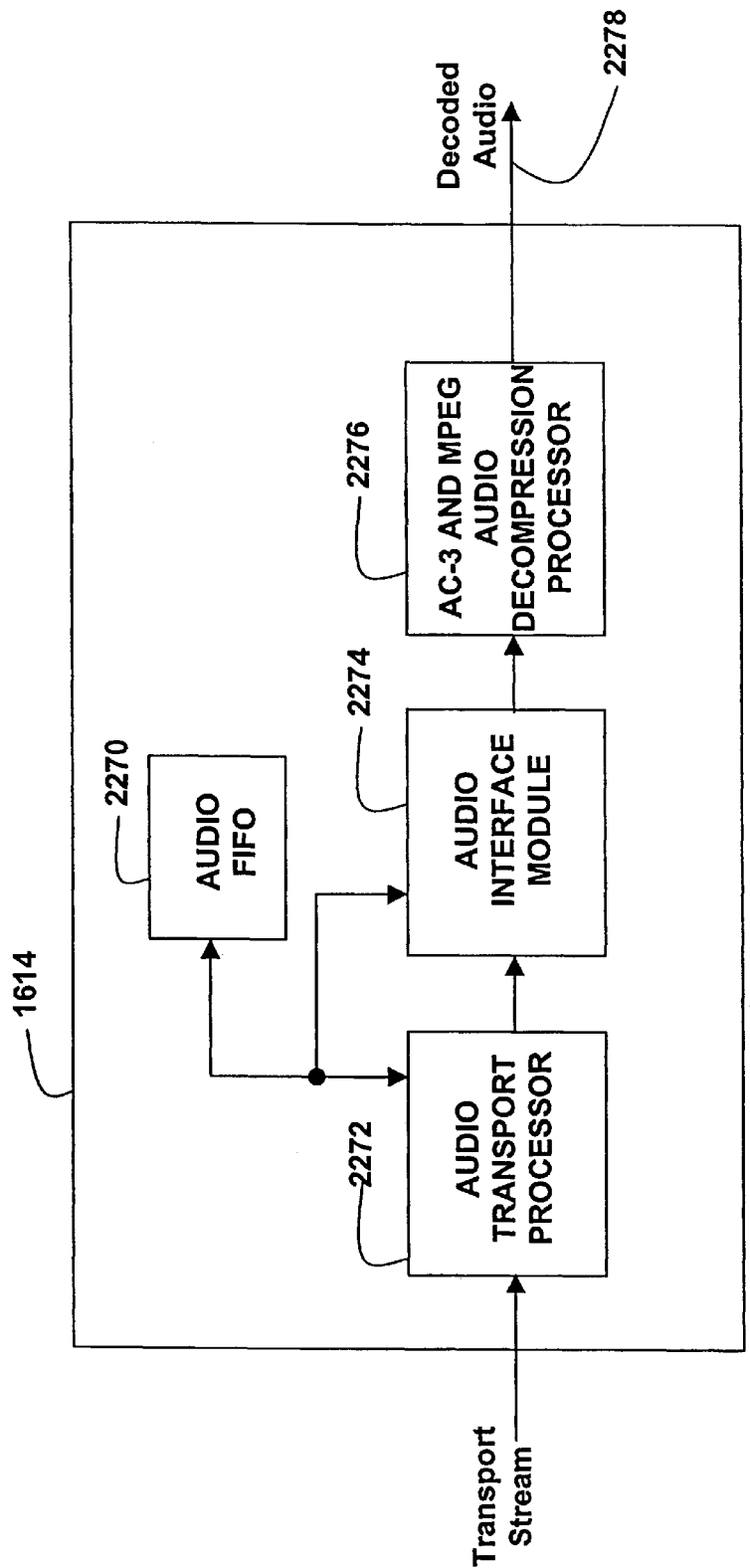
FIG. 59 is a block diagram of an audio decode processor (ADP)

FIG. 59 is a block diagram of the ADP 1614 in one embodiment of the present invention. The ADP 1614 includes an audio transport processor 2272, an audio FIFO 2270, an audio interface module 2274 and an AC-3 and MPEG audio decompression processor 2276.

The ADP 1614 receives a transport stream containing audio data. In one embodiment of the present invention, the transport stream has been DES or DVB descrambled in the data transport 1600. In other embodiments, the ADP 1614 may perform DES and DVB descrambling.

The audio transport processor 2272 receives the transport stream and processes it. The audio transport processor 2272 is responsible for processing the transport header, PES header and data for the audio packets. The audio transport processor 2272 also handles splicing of audio services for functions such as commercial insertion. The audio transport processor 2272 preferably also detects, reports and recovers from transport layer errors.

The audio interface module 2274 is responsible for detection and tracking of Dolby AC-3 and Musicam (Masking pattern Universal Sub-band Integrated Coding And Multiplexing) audio sync frames. The audio interface module 2274 contains a state machine that synchronizes audio delivery to the AC-3 and MPEG audio decompression processor 2276 or an external audio processor using PTS and PCR.

The audio interface module 2274 preferably detects and processes various audio frame errors. These errors preferably are reported to the host, i.e., CPU, via an interrupt or a register. The audio interface module 2274 may maintain the audio FIFO 2270 in an external memory, e.g., SDRAM. The audio interface module preferably formats the compressed audio data from parallel to serial format and delivers the serialized audio data to the AC-3 and MPEG audio decompression processor 2276, which is also called.

The AC-3 and MPEG audio decompression processor 2276 provides a decoded audio 2278. The audio processor 2276 is capable of decoding Dolby AC-3 (audio code number 3) and MPEG bit streams. The audio processor 2276 receives serialized compressed frequency domain samples and control information from the transport demultiplexer and outputs a serial decompressed audio stream as the decoded audio 2278. The audio processor 2276 may process a 5.1 channel (5 independent full-bandwidth audio channels plus a low-frequency sub-woofer channel) Dolby AC-3 input. The 5.1 inputs preferably are mixed down to two-output channels compatible with Dolby Surround equipment. For MPEG-1 and MPEG-2 audio decoding, the audio processor 2278 preferably decodes only layer 1 and layer 2 with basic two-channel audio.

The audio processor 2276 preferably contains its own clock generation, input synchronization, error checking, and demultiplexing circuits. The audio processor 2276 preferably also includes five modules that carry out the decoding process: a sync and demux unit, a sample expansion unit, a coefficient denormalization unit, an inverse transform unit, and an output processing unit. The sync and demux unit preferably is responsible for frame synchronization, bsi decoding and CRC checking. The sample expansion unit preferably forms the frequency domain floating point coefficients from the demultiplexed data.

The coefficient denormalization unit preferably scales and normalizes frequency coefficient and converts frequency domain floating point coefficients to fixed point coefficients. The inverse transform unit preferably processes the frequency domain coefficients back into time domain samples and writes them into the output processing unit after performing down mix and block switch convolution. The output processing unit preferably buffers time domain samples and outputs them based on an internally generated time reference.

In addition, the audio processor 2276 may also include a digital audio port which may be used to buffer either IEC 60958 or IEC 61937 formatted data or AC-3 compressed data for use by an external audio processor via an SPDIF port. The digital audio port preferably supports simultaneous output of compressed AC-3 on SPDIF and decompressed AC-3 on the pulse density outputs.

The ADP 1614 may also include a 3-D audio engine. (not shown) The 3-D audio engine preferably interfaces to the serial output of the audio processor 2276 and performs 3-D audio enhancement signal processing, conforming to the SRS Labs, Inc., TruSurround and SRS algorithms. The 3-D audio engine preferably performs all of its signal processing in the digital domain, and it preferably acts as a co-processor in a digital audio subsystem. The 3-D audio engine may be bypassed, under microprocessor control, for applications not requiring 3-D audio.

The ADP 1614 may also include an audio sigma-delta modulator. (not shown) The audio sigma-delta modulator preferably interfaces to the serial output of the 3-D audio engine and performs all functions necessary to produce an analog output signal. The output of the audio sigma-delta modulator preferably is a pair of differential pulse density outputs for left and right channels. These signals may be low-pass filtered externally to recover the audio signal.

XXI. Integrated System Bridge Controller

A central processing unit (CPU) typically does not have a capability to directly interface with various different peripheral devices. Thus, the CPU typically uses support devices, e.g., other semiconductor chips, to provide capability for communicating with peripheral devices. The CPU ordinarily uses a bridge controller, e.g., a "north bridge", to interface with one or more peripheral devices. Use of the bridge controller increases number of chips in the system and introduces another potential source of system failure.

The system preferably includes a system bridge controller used to couple a CPU to peripheral devices. The system bridge controller preferably supports a full complement of devices used in a set top box or digital TV. The system bridge controller preferably is compatible with the 68000 bus definition, including both active DSACK and passive DSACK (ROM/flash memory devices). The system bridge controller preferably supports external bus masters and retry operations as both master and slave.

The system bridge controller preferably provides very high-performance access and data transfers between I/O devices, the PCI bus, system memory, e.g., SDRAM, controlled by the memory controller, and the CPU. The system bridge controller may also include one or more ISO 7816 smart card interfaces 1678 for e-commerce and conditional access system use.

Figure 60:
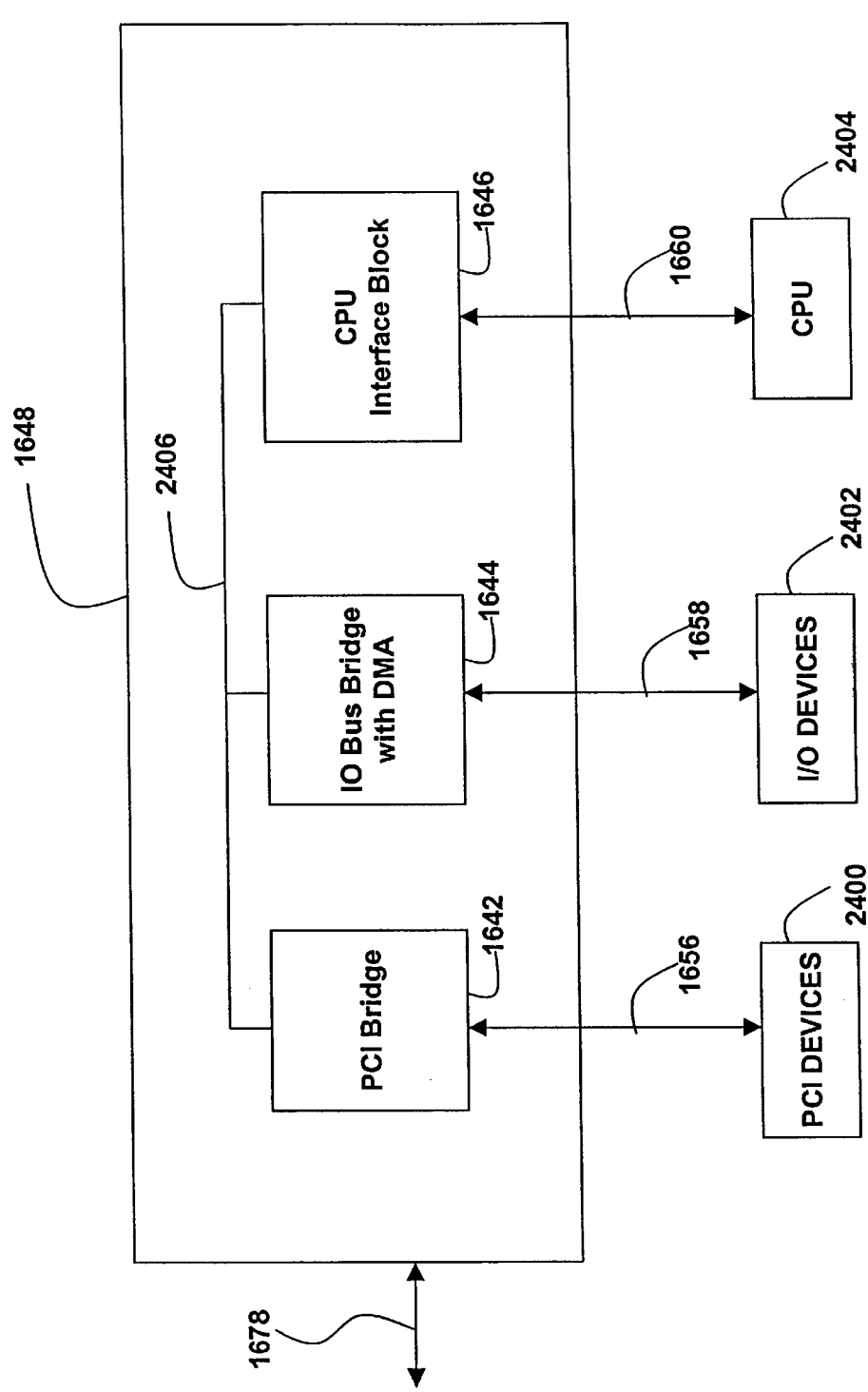
FIG. 60 is a block diagram of a system bridge controller.

FIG. 60 is a block diagram of a system bridge controller 1648 in one embodiment of the present invention. In the described embodiment, the system bridge controller 1648 provides a "north bridge" function to a host, e.g., CPU 2404. The system bridge controller in the described embodiment is comprised of a PCI (Peripheral Component Interconnect) bridge 1642, an I/O bus bridge with DMA 1644 and a CPU interface block 1646. The PCI bridge 1642, the I/O bus bridge with DMA 1644 and the CPU interface block 1646 preferably are coupled together on a CPU-bus 2406. The CPU bus 2406 may include a CPU register bus.

The PCI bridge 1642 is used to control various PCI devices. The PCI bridge 1642 preferably provides a bridge function between the PCI devices 2400 and the CPU through a PCI interface 1656. The PCI bridge 1642 may also provide a DMA function between PCI devices and external memory, such as SDRAM. The PCI bridge 1642 preferably is capable of providing interface to multiple PCI devices. The PCI interface preferably is compatible with 3.3V PCI devices.

Capabilities of the PCI bus interface in one embodiment of the present invention include:
a) two external PCI master support;
b) relocatable PCI I/O and memory spaces;
c) PCI interrupt support;
d) two level write buffering from both the CPU and PCI sides;
e) optional read before write transaction ordering;
f) optional big-endian to little-endian conversion;
g) delayed read completion support from PCI to memory; and
h) data phases burst support from PCI to memory.

The I/O bus bridge with DMA 1644 is used to interface with I/O devices 2402 such as ROM, RAM, Flash, and a variety of 68000-compatible peripheral devices through an I/O interface 1658. The I/O interface 1658 is a 68000 style bus.

The I/O bus bridge with DMA 1644 preferably has a direct bridge function to support CPU to I/O communications. The I/O bus bridge with DMA 1644 includes a four level deep write FIFO and a one level read FIFO to perform the direct bridge function.

Accesses to 16-bit and 8-bit devices preferably are facilitated by automatically converting 32-bit CPU accesses into multiple narrower I/O accesses. The I/O bus bridge with DMA 1644 supports byte swapping for coupling big-endian devices to a little-endian CPU. ROM and/or flash memory for system boot and persistent storage functions preferably is attached directly to the I/O bus bridge with DMA. The I/O bus bridge with DMA 1644 may also support byte swapping for coupling little endian devices to a big-endian CPU.

The I/O bus bridge with DMA 1644 preferably is capable of being coupled to QAM link front-end, cable modem, and any additional communications and I/O functions that may be required either for system development and debug or for production.

The I/O bus bridge with DMA 1644 to SDRAM communications may include both a full scatter-gather linked-list DMA engine and support for external bus masters. The DMA engine preferably supports two bi-directional channels, each of which may have its own linked list of buffer descriptor records. The buffer descriptors preferably provide direct support for full scatter-gather DMA operations, with access to the full address space of both the SDRAM and the I/O bus and various different size transfers, using lists of descriptors that may access up to 4 KB each.

The linked-list DMA engine may be used with various different types of cable modems. The linked-list DMA engine preferably allows transparent high-speed transfer of all upstream and downstream data traffic, allowing networking software in the CPU to read and write data at full SDRAM speeds without occupying CPU bus bandwidth during DMA transfers. The DMA linked lists preferably are established by software, which may monitor and control the operation of the DMA engine while in progress. The system bridge controller to SDRAM interface preferably includes a two level deep FIFO for writes (to the I/O module) and a one level deep FIFO for I/O reads. Byte swapping preferably is supported in the system bridge controller to SDRAM path to support little-endian CPUs.

The system bridge controller preferably supports delayed read and retry of reads by external masters. This typically allows higher I/O bus throughput, as it generally avoids the need for the external master to hold the bus while waiting on read cycles. The system bridge controller preferably also supports retry cycles when it is the master, i.e., when the CPU or DMA engine are reading from I/O devices.

External bus masters may be coupled directly to the I/O bus bridge with DMA 1644. One external bus master may be coupled directly, and utilize the bus request (BR#), bus grant (BG#) and bus grant acknowledge (BGACK#) signals on the system. Additional masters may be coupled to the I/O bus module through the use of glue logic to provide additional levels of bus arbitration.

The system bus controller 1648 preferably supports both big-endian and little-endian configurations of the CPU and operating system. This feature generally eliminates the need for software to intercept and reformat reads and writes when the video-audio-graphics device has a different endian-ness configuration from the CPU and operating system.

All functions of the system that are affected by the choice of endian-ness preferably are configured at reset into the selected mode, including graphics and video display and the audio engine. The I/O bus bridge with DMA and the PCI bridge preferably convert I/O and DMA accesses between the big-endian I/O bus, little-endian PCI bus and the little-endian memory and CPU format when the system is in little-endian mode.

The CPU interface block 1646 preferably integrates a CPU interface that is configurable for both MIPS "SYSAD" and Hitachi SH 4 "MPXBus" CPU bus definitions. Both modes implement a multiplexed address and data structure, with 32 bits of address and data. Both CPU modes fully support burst accesses in both read and write directions, for maximum performance with any mix of CPU I-cache loads, D-cache loads, D-cache write-backs, and uncached data reads and writes.

The CPU interface block 1646 preferably provides a direct, glue-less interface to both MIPS and SH3/SH4 processors through a CPU interface 1660.

The CPU interface 1646 preferably includes extensive data buffering capabilities, supporting posted writes with up to four cache lines or non-cache words, in any combination and order, and with a read FIFO to match the full SDRAM bandwidth to processors with slower bus speeds.

The CPU bus interface 1646 may operate at a clock frequency that is independent of the core and other interface clocks of the system, providing flexibility in system design and implementation. The maximum frequency of the CPU bus clock in one embodiment of the present invention is 81 MHz. The CPU interface of the system preferably operates as a slave on the CPU bus.

XXII. Parallel Processing of Graphics Windows

The system of the present invention preferably includes a display engine. The display engine preferably is a component of the video-graphics display and scale engine 1638 in FIG. 40. The display engine blends graphics windows created by software applications into blended graphics. The blended graphics is composited together with digital video and digitized analog video in a video compositor, which preferably also is a component of the video-graphics display and scale engine 1638.

Any conventional display engine may be used for blending, filtering and scaling graphics. For example, one embodiment of the present invention incorporates the display engine used in one embodiment of the invention described in commonly owned U.S. patent application Ser. No. 09/437,208, filed Nov. 9, 1999 and entitled "Graphics Display System," the contents of which are hereby incorporated by reference.

Figure 61:
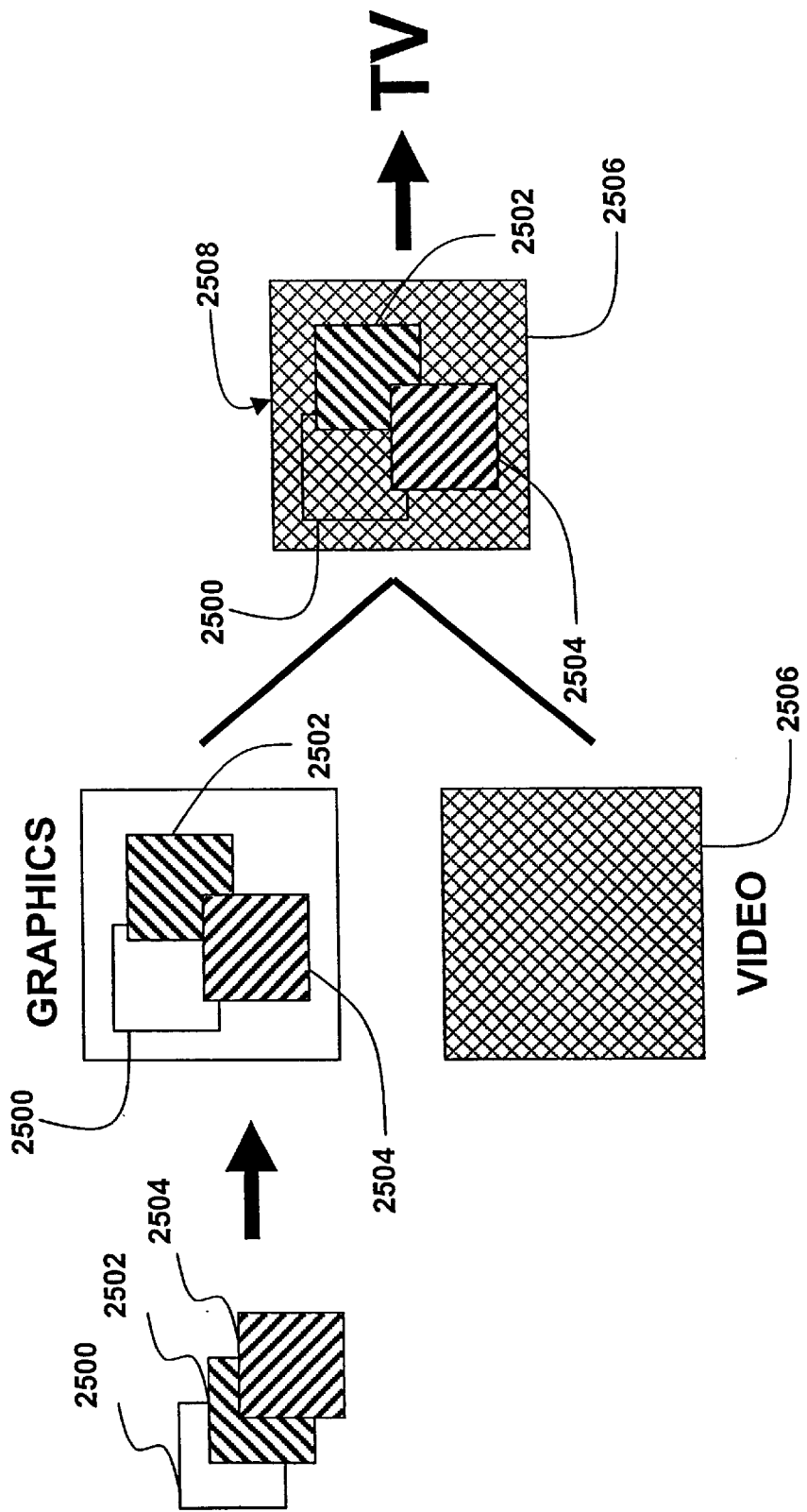
FIG. 61 is a process diagram that illustrates how graphics windows are blended together into blended graphics and composited with video.

FIG. 61 is a process diagram that illustrates combination of graphics windows 2500, 2502 and 2504 into blended graphics and then composition with video contents 2506 to form a single blended graphics and video window 2508 in one embodiment of the present invention. The display engine preferably performs blending/mixing of the graphics windows into the blended graphics. The blended graphics preferably is then combined with the video 2506 to form the single blended graphics and video window 2508.

Figure 62:
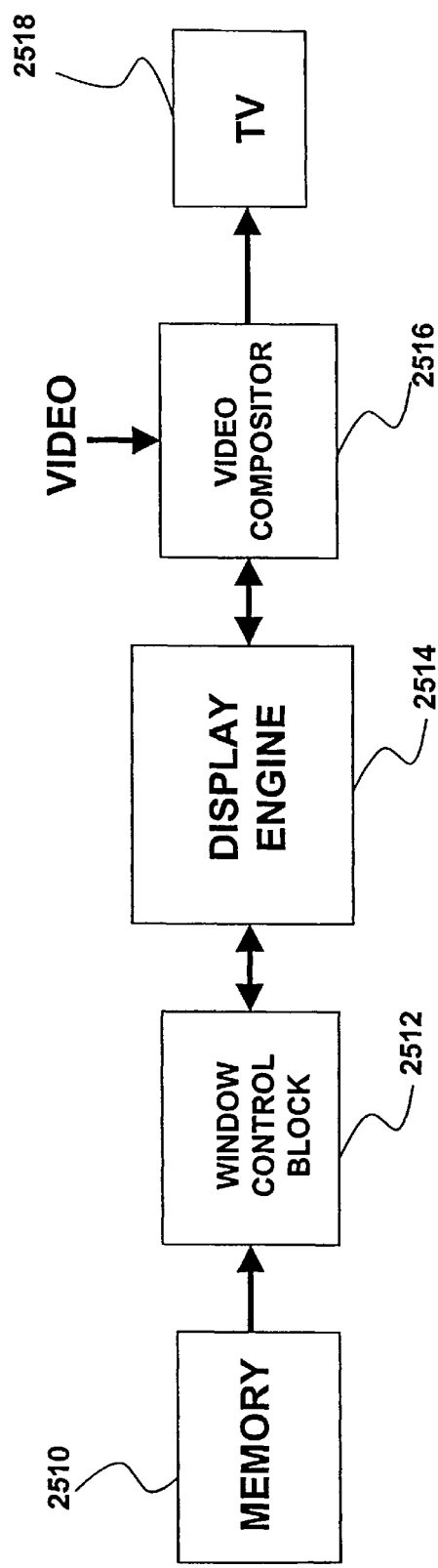
FIG. 62 is a block diagram of integrated circuit containing a display engine, the integrated circuit is coupled to external memory and television.

FIG. 62 is a block diagram that illustrates a system-level view of a display engine 2514 coupled with other components to perform its function. A window control block 2512 preferably retrieves graphics data from an external memory 2510, puts them into correct format, and provides the formatted graphics data to the display engine 2514.

The window control block 2512 preferably sorts the window descriptors according to the relative depth of their corresponding windows on the display. For graphics windows, the window control block 2512 preferably sends header information to the display engine 2514 at the beginning of each window on each scan line, and sends window header packets to the display engine as needed to display a window. The window control block 2512 may also coordinate capture of video into an external memory and transfer of video from the external memory into the video compositor 2516.

In one embodiment of the present invention, the external memory 2510 preferably has a unified memory architecture (UMA). In other words, the external memory 2510 preferably is concurrently used by various different devices such as CPU, the display engine, and the MPEG decoder. The memory 2510 may be implemented in a synchronous dynamic random access memory (SDRAM) or any other suitable memory.

A video compositor 2516 preferably provides timing information to the display engine so that the display engine 2514 may send blended graphics to the video compositor to be blended with the video contents. The blended graphics, often composited with the video contents, preferably is displayed on a television set 2518.

Since the system is used for high definition TV, the time to composite a scan line is typically limited. The number of pixels in each scan line is typically also increased. The serial compositing is typically not fast enough at the higher speed display clock. The window controller in one embodiment of the present invention has been designed for parallel compositing. The compositing function is implemented in four parallel pipelines. Each pipeline preferably is controlled by a separate state machine. The sorting logic is based on Y scan line order and window X (horizontal) start position. The left-most window is typically processed first. The right-most window is typically processed last. The sorting order is an ascending order. The window descriptor with smaller number of Y scan line order and X start position is typically processed first.

Figure 63:
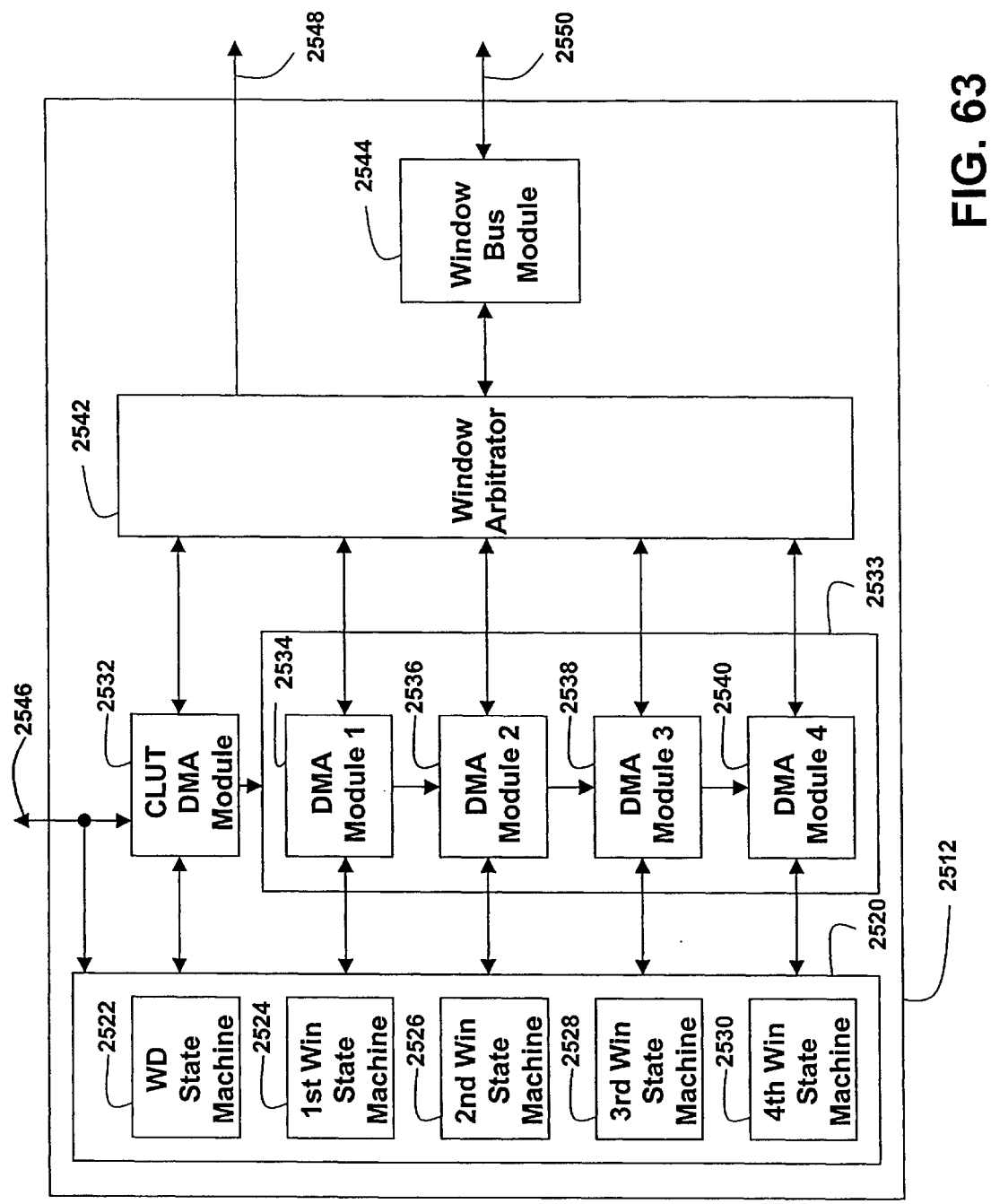
FIG. 63 is a block diagram of a window control block.

FIG. 63 is a block diagram of the window control block 2512 in one embodiment of the present invention. The window control block 2512 preferably performs the window display controlling functions including: loading window descriptors from memory, parsing and sorting of the window descriptors, state machine functions to control the window display operations, assembling window headers and sending them to graphics FIFOs, DMA operation to transfer pixel information from memory to graphics FIFOs, DMA operation to load CLUT, and local arbitration of access to memory. The window control block 2512 in the embodiment of FIG. 63 includes five modules: a window controller 2520, a CLUT DMA module 2532, a window DMA module 2533, a window arbitrator 2542 and a window bus module 2544.

The window controller 2520 preferably loads window descriptors from external SDRAM through a memory bus interface 2546 and parses the descriptors to decide which window area is to be displayed on the screen. The window controller 2520 preferably stores up to eight window descriptors. In other embodiments, the window controller 2520 may store more or less than eight window descriptors. The window controller 2520 may also include a window descriptor (WD) update DMA and other control logic. The window controller 2520 preferably performs window descriptor control logic functions such as window descriptor sorting and window descriptor status update.

The window controller preferably includes four window state machines: a first window state machine 2524, a second window state machine 2526, a third window state machine 2528 and a fourth window state machine 2530. The four window state machines preferably perform window control operation in parallel to meet HD graphics timing requirement. In addition, the window controller 2520 preferably includes a window descriptor state machine 2522, which manages loading of window descriptors from external memory.

The CLUT DMA module 2532 preferably handles updating of a color lookup table (CLUT). The CLUT DMA module 2532 preferably receives requests from the window state machines to update the CLUT. In response, the CLUT DMA module sends a request to the window arbitrator 2542 to read the CLUT data from external memory, e.g., SDRAM, and then sends the data together with write strobe to the display engine to update the CLUT. The CLUT DMA module 2532 preferably also separates each memory request into many small burst sized requests. The CLUT DMA module 2532 preferably calculates the correct transfer size and increments the address for each memory request.

The window DMA module 2533 preferably takes requests from the window state machines to fill the graphics FIFOs. In response, the window DMA module 2533 preferably sends request to read the current window data from external SDRAM and writes to graphics FIFOs. The window DMA module also assembles the header packet for new line and new window condition and sends to the graphics FIFOs. The window DMA module preferably also sends line end headers to the graphics FIFOs. The window DMA module preferably includes four DMA modules, DMA module 1 2534, DMA-module 2 2536, DMA module 3 2538 and DMA module 4 2540 for parallel processing of window graphics data. Each of the four DMA modules 1–4 sends memory requests to the window arbitrator and writes header data or pixel data to four graphics FIFOs in the display engine. The window DMA module 2533 preferably also separates each memory request into many small burst sized requests. The window DMA module 2533 preferably calculates the correct transfer size and increments the address for each memory request.

Therefore, the window DMA module 2533 controls sending of new window header, line end header and the graphics memory read request from memory. The window DMA module preferably has a burst size option. The burst size is programmable to be either 32-oword or 16-oword. The oword is defined to be 64-bit word. The CLUT DMA module 2532 is similar to the window DMA module except that this module does not control the sending of header packet.

The window arbitrator 2542 preferably performs round-robin arbitration between four window DMA requests, one CLUT DMA request and one window descriptor (WD) load request. Based on the arbitration result, the window arbitrator selects the correct address and size for the memory request and sends the memory request 2548 to a memory controller. The window arbitrator also multiplexes the requested memory address and memory size and send to the window bus module 2544.

The window bus module 2544 converts the memory requests to memory bus protocol and interfaces directly with the memory controller over a memory control interface 2550. The window bus module 2544 preferably also communicates with the memory controller and the window arbitrator to decide the bus ownership.

The window bus module also controls the output enable of the bus and drives the memory request size when it acquires the bus ownership.

Therefore, the window bus module 2544 converts between memory bus protocols. The window bus module preferably detects memory acknowledge identification for the request acknowledgment and detects memory read identification for the data acknowledgment. The window bus module also combines requested address and size into a 32-bit command (m_cmd[31:0]) and drives the tri-state command bus.

The format of the window descriptor preferably is compatible with video having HD resolution. In one embodiment of the present invention, the window descriptors have format illustrated in Table 7.1.

TABLE 7.1

Window Descriptor Format

| Window Descriptor Parameter 0 | | |
|---|---|---|
| win_mem_start | mem_data[25:0] | Start Memory Address of the Graphics Data |
| win_format | mem_data[29:26] | Window Format |
| win_operation | mem_data[31:30] | Window Operation |
| Window Descriptor Parameter 1 | | |
| win_color | mem_data[15:0] | Color for Window |
| win_mem_pitch | mem_data[27:16] | Memory Pitch for Window |
| win_layer | mem_data[31:28] | Window Layer Number |
| Window Descriptor Parameter 2 | | |
| win_ystart | mem_data[10:0] | Y Starting Value for Window |

TABLE 7.1-continued

Window Descriptor Format

| | | |
|---|---|---|
| win_yend | mem_data[21:11] | Y Ending Value for Window |
| win_alpha | mem_data[29:22] | Alpha Value for Window |
| Alpha_type | mem_data[31:30] | Alpha Extraction Method |
| | Window Descriptor Parameter 3 | |
| win_xstart | mem_data[10:0] | X Starting Value for Window |
| win_xsize | mem_data[21:11] | X Size of Window |
| Blank_start_pixel | mem_data[25:22] | Pixels to be Blanked out at the Beginning of Window |
| win_filt_enb | mem_data[26] | Enable Window Filter |
| Blank_start_pixel | mem_data[27:22] | Pixels to be Blanked out at the Beginning of Window |
| win_filter_enb | mem_data[28] | Enable Window Filter |
| Reserved | mem data[31:29] | Reserved |

The window controller 2520 preferably contains five state machines: a window descriptor state machine, a first window state machine, a second window state machine, a third window state machine and a fourth window state machine.

The window controller 2520 preferably also contains up to eight on-chip window descriptors. The eight window descriptors preferably are implemented in flip-flops. Each window descriptor typically includes four 32-bit words of parameters. In other embodiments, the number of window descriptors in the window controller may be more or less than eight, and the number of 32-bit words in each window descriptor may be more or less than four.

The window controller 2520 preferably updates the status of each on-chip window descriptor using a window status flag. The window status flag is a 2-bit flag associated with each window descriptor (WD), and indicates whether the associated WD should be processed at current line or not. A sorting logic preferably sorts the window descriptors based on the Y scan line order and X start position. Each window state machine processes particular window descriptor based on this sorting result.

The memory start location of each window preferably is kept in the associated window descriptor. However, each time the scan line count increments, the memory start location preferably is added with a memory pitch offset. If the output is an interlaced display, two times memory pitch is added to the window memory start address. If the output is a non-interlaced display, only one memory pitch is added to the window memory start address. This process is performed every time a window descriptor finishes processing on each line. A carry look ahead adder preferably is used for timing purposes.

Figure 64:
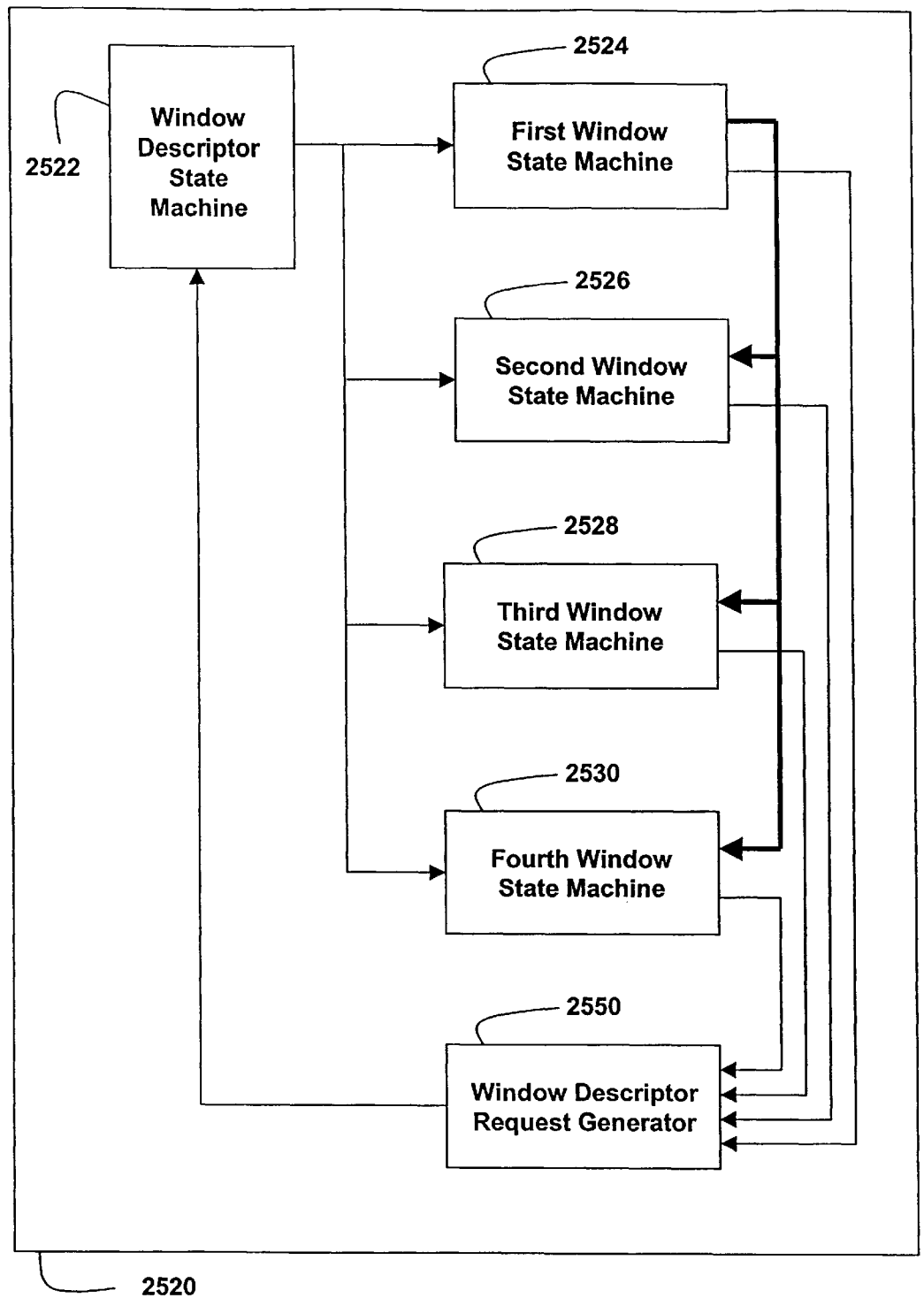
FIG. 64 is a block diagram of window controller state machines.

FIG. 64 is a block diagram of one embodiment of the window controller 2520 illustrating interactions between the five state machines included in the window controller. The window descriptor state machine 2522 loads the window descriptors from the external memory and provides to the window state machines 2524, 2526, 2528 and 2530 in response to requests generated by a window descriptor request generator 2550. The window descriptor request generator 2550 requests to the window descriptor state machine in response to the requests by the four window state machines. The window state machines 2524, 2526, 2528 and 2530 preferably perform sorting of the received window descriptors.

The window descriptor state machine 2522 preferably manages the on-chip window descriptor loading from external memory. The loading of window descriptors may be separated into two categories: initial loading and update loading.

An initial loading is the loading of window descriptors (WDs) after the vertical sync. In one embodiment of the present invention, up to eight WDs are loaded during the initial loading. The window descriptor initiation flag is set during the initial loading. This window descriptor initiation flag is used as a kick-off signal for the four window state machines. An update loading is the WD loading during middle of display. An update loading typically is performed when the total number of WDs is greater than eight. A window load pointer, which is a control logic, keeps track of which WD is to be loaded into the window controller. During the initial loading, the window load pointer is linearly incremented.

Each window descriptor has an associated window status parameter, each with an associated value. Table 7.2 gives values and descriptions of the window status parameters used in one embodiment of the present invention.

TABLE 7.2

DEFINITION OF WINDOW STATUS PARAMETERS

| Window Status Parameter | Value | Description |
|---|---|---|
| NOT_PROC | 1 | Not Processed |
| CUR_PROC | 0 | Currently Being Processed |
| DONE_PROC | 2 | Already Processed |
| NULL_WD | 3 | Invalid Window Descriptor |

During the update loading, the window load pointer points to the WD with a window status of DONE_PROC, which is set when last line of the window associated with this WD is less than the current line count. In other words, when the current display line is below the last line of a window associated with the WD, the display of that window has been completed. Thus, the window status of DONE_PROC indicates that the associated WD is completely processed. A counter records the number of window descriptors with DONE_PROC status. The value of this counter is used to determine the number of WD to be loaded during the update loading.

Figure 65:
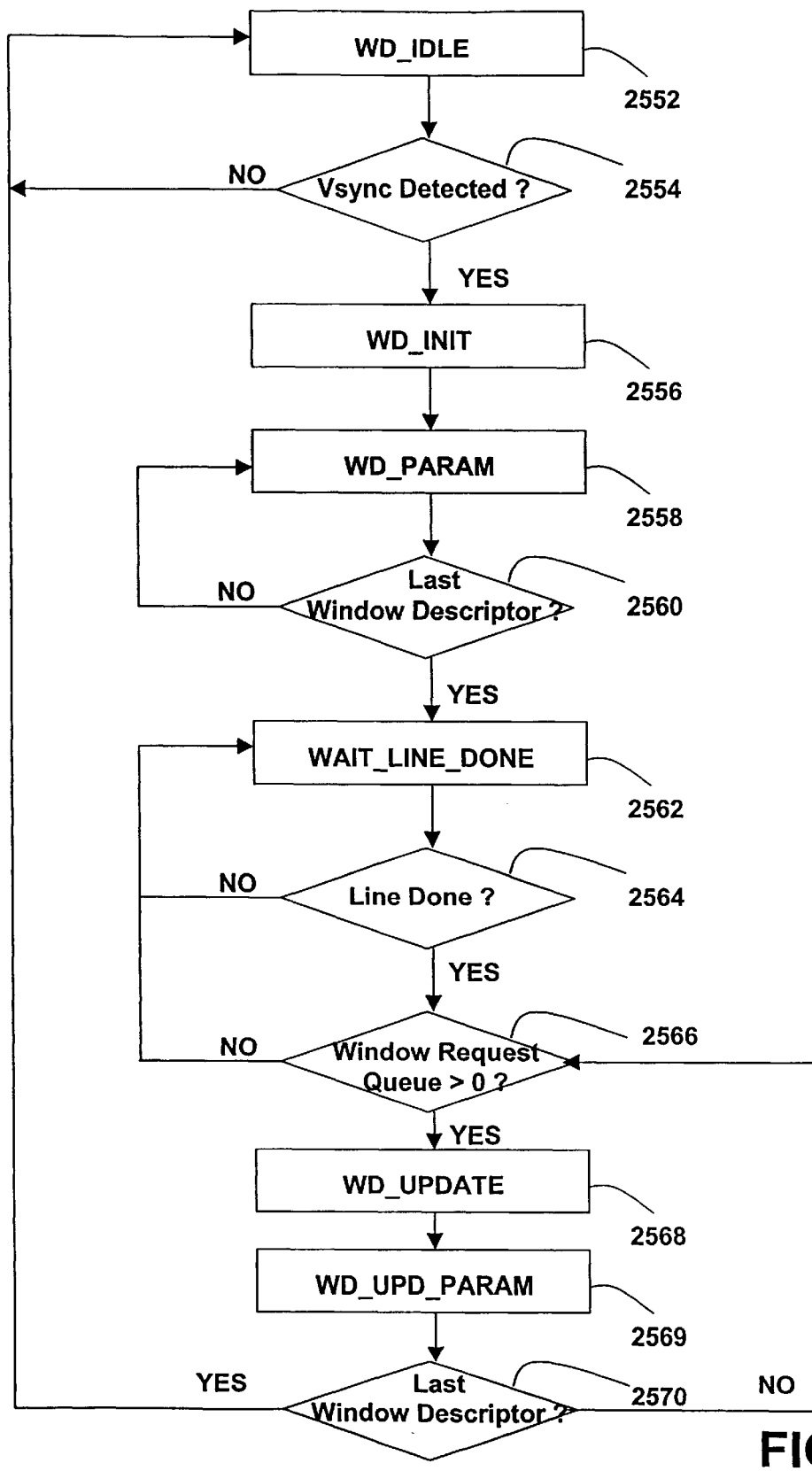
FIG. 65 is a state diagram of a window descriptor state machine.

FIG. 65 is a state diagram that illustrates operation of one embodiment of the WD state machine 2522. The WD state machine 2522 in the described embodiment has following six states: WD_IDLE, WD_INIT, WD_PARAM, WAIT_LINE_DONE, WD_UPDATE and WD_UPD_PARAM. Upon system start up, the WD state machine enters the WD_IDLE state in block 2552. In this state, the WD state machine waits to receive a vertical sync.

When a vertical sync is detected as indicated in block 2554, the WD state machine 2522 enters the WD_INIT state in block 2556. In the WD_INIT state, the WD state machine 2522 preferably sends a request to read window descriptors from the external memory, e.g., SDRAM. In the WD_INIT state, a WD initialization flag is set to indicate that initial loading of window descriptors is to start.

Then the WD state machine 2522 enters the WD_PARAM state in block 2558. In the WD_PARAM state, up to eight window descriptors are read from the external memory and loaded into the window controller. When the last window descriptor of the current line is reached, regardless of the number of window descriptors that have been loaded, a last window descriptor flag is set to indicate that the last window descriptor has been loaded. The WD state machine in block 2560 checks to determine if the last window descriptor flag has been set.

If the last window descriptor flag is set, the WD state machine 2522 exits the WD_PARAM state and enters the WAIT_LINE_DONE state in block 2562. Upon exiting from the WD_PARAM state, the WD initialization flag is reset to indicate that the initial loading of window descriptors have been completed. While the WD state machine is in the WAIT_LINE_DONE state, the window descriptors are processed until all four window state machines complete processing of the current line. The WD state machine in block 2564 checks if all four window state machines have completed the current line processing. If the processing has been completed, the WD state machine checks if there is any request for window descriptors in the window descriptor request queue in block 2566. If there is no request for window descriptors, the WD remains at the WAIT_LINE_DONE state.

If there is any request for window descriptors, the WD state machine enters the WD_UPDATE state in block 2568. In the WD_UPDATE state, the window state machines send request to the WD state machine to load additional window descriptors in update loading mode. In the WD_UPDATE state, a window descriptor update flag is set to indicate that an update loading is to take place.

Then the WD state machine 2522 enters the WD_UPD_PARAM state, which is similar to the WD_PARAM state. In the WD_UPD_PARAM state, as long as the memory controller provides valid data, window descriptors are loaded into the window controller in the update loading mode. Similar to the WD_PARAM state, up to eight window descriptors are loaded until the last window descriptor of the current line is loaded.

If eight window descriptors have been loaded or the last window descriptor of the current line has been loaded, the WD state machine in block 2570 checks to see if a last window descriptor flag has been set. The last window descriptor flag is set when the last window descriptor of the field has been loaded. If the last window descriptor flag is not set, the WD state machine returns to the block 2566 to check if there is any window descriptor request in the queue. If the last window descriptor flag is set, the WD state machine returns to the WD_IDLE state to wait for the next vertical sync to start the process of loading and processing window descriptors for the next field.

Figure 66:
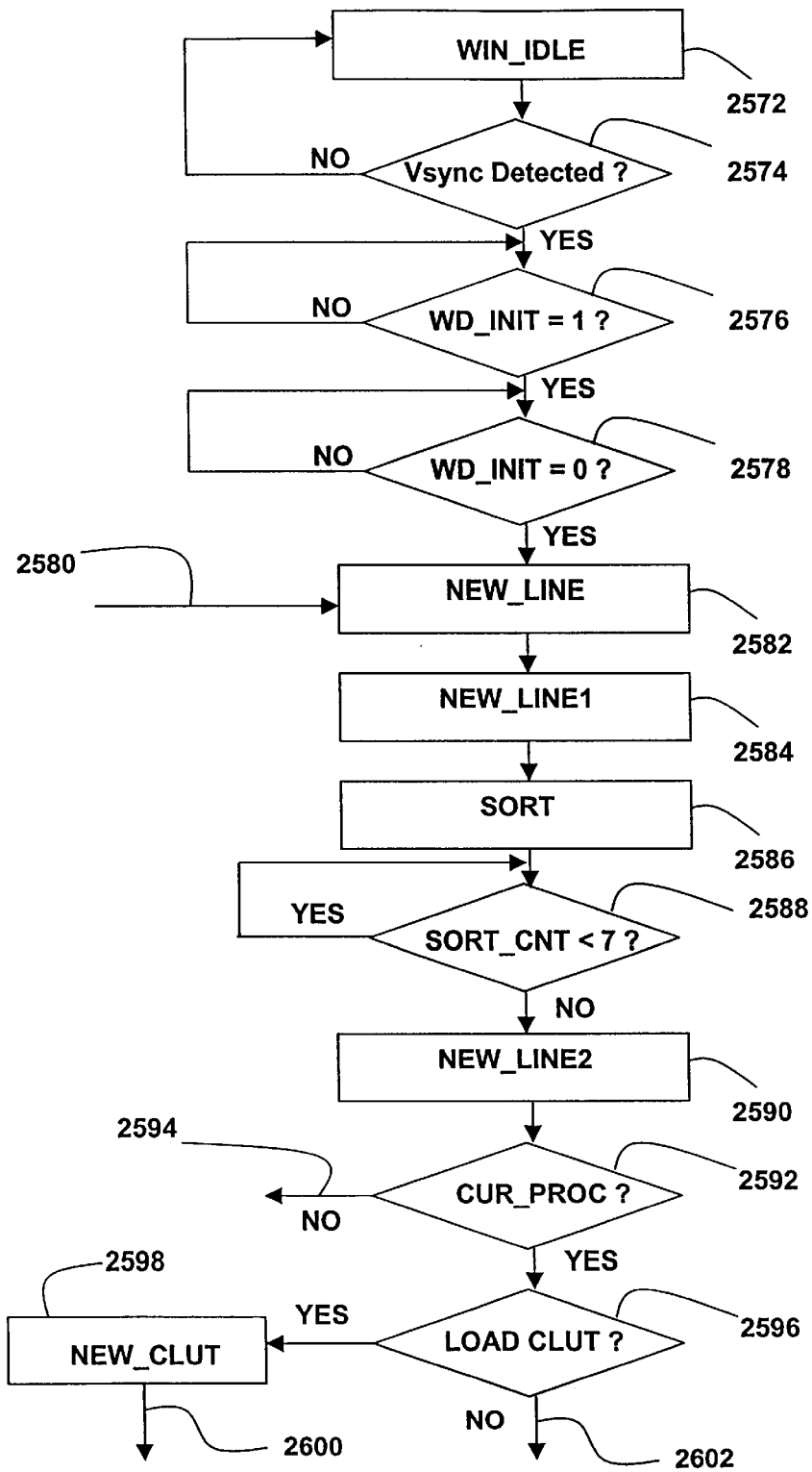
FIG. 66 is a state diagram of a window state machine.
Figure 67:
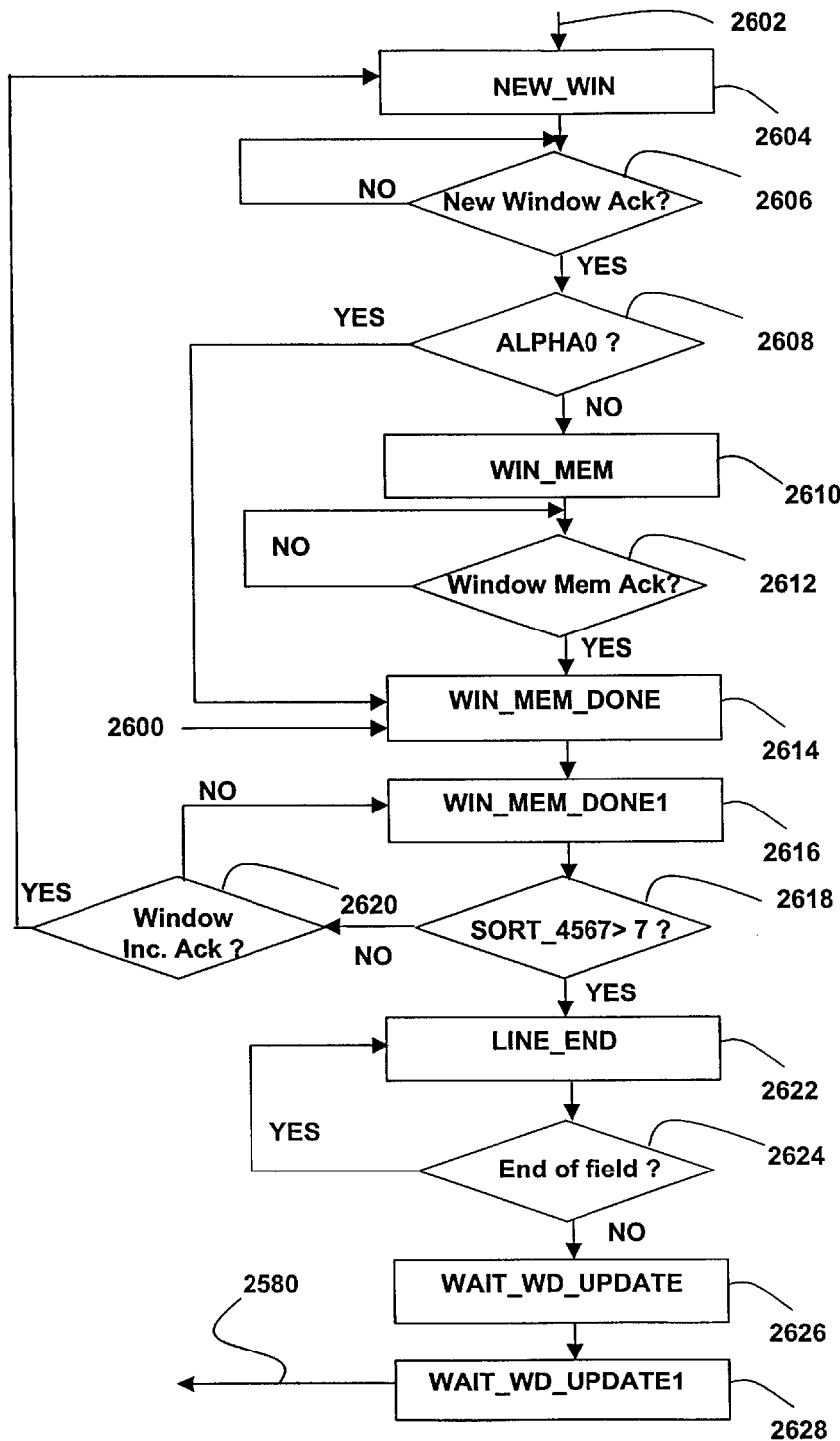
FIG. 67 is a state diagram of a window state machine.

FIGS. 66 and 67 are a state diagram that illustrates operation of one embodiment of the first window state machine 2524. The first window state machine preferably controls one of four graphics pipelines in the display engine. In the described embodiment, the other three window state machines 2526, 2528 and 2530 have identical states and state diagrams as the first window state machine except that the first window state machine maintains the line count increment and sort count increment, unlike the other three state machines. Thus, a window state machine is discussed below with reference to all four window state machines.

The window state machine in one embodiment of the present invention has the following 21 states: WIN_IDLE, WAIT_WD_INIT, WAIT_WD_INIT1, WAIT_WD_UPD, WAIT_WD_UPD1, WAIT_WD_UPD2, WAIT_WD_UPD3, NEW_LINE, NEW_LINE1, SORT, NEW_LINE2, NEW_LINE3, NEW_CLUT, NEW_WIN, NEW_WIN_ACK, WIN_MEM, WIN_MEM_DONE, WIN_MEM_DONE1, WIN_MEM_DONE2, WIN_MEM_DONE3 and LINE_END. In other embodiments, number of states may be more or less than 21, and the states may also be different.

In the WIN_IDLE state 2572, a line count and a sort count preferably are reset. The line count preferably is updated at the beginning of each field. The line count is then incremented by one or by two depending on whether the display is progressive or interlaced. The incrementation is performed when all window descriptors in the current line are processed. The sort count preferably is used for sorting eight window descriptors. The sort count is used as a pipe line delay counter as well as sorting index.

The window state machine waits in the WIN_IDLE state 2572 until a vertical sync is detected in block 2574. When the vertical sync is detected, the window state machine enters the WAIT_WD_INIT state in which setting of the WD initialization flag is checked in block 2576. The WD initialization flag is set by the WD state machine to indicate initial loading of the window descriptors, as discussed in reference to FIG. 65. Upon setting of the WD initialization flag, the window state machine enters the WAIT_WD_INIT1 to wait for resetting of the WD initialization flag. As discussed in reference to FIG. 65, the WD state machine resets the WD initialization flag to indicate completion of the initial loading of up to eight window descriptors.

When the WD initialization flag is found to be reset in block 2578, the window state machine enters the NEW_LINE state 2582 in which the line count is incremented by the first window state machine in the described embodiment. In other embodiments, the line count may be incremented by one or more of the other window state machines. Then the window state machine enters the NEW_LINE1 state 2584 in which the window status is updated. The window status is updated when there is a line count increment.

Then the window state machine enters the SORT state 2586 to start sorting of the window descriptors. In the described embodiment, the first window state machine increments the sort count in block 2588 until the sort count reaches 7. In other embodiments, the sort count may be incremented by one or more of the other window state machines.

When the sort count reaches 7, the window state machine enters the NEW_LINE2 state 2590 in which the window indexes are assigned. A first window index, used by the first window state machine, points to the window descriptor to be serviced by the first window state machine for the first graphics pipeline. The first window index is typically set to sort[0] at the beginning of each field/frame. The sort [0] indexes the window descriptor with the smallest sorting parameters. The second window index, used by the second window state machine, is typically set to sort[1] at the beginning of each field/frame. The third window index, used by the third window state machine, is typically set to sort[2] at the beginning of each field/frame. The fourth window index, used by the fourth window state machine, is typically set to sort[3] at the beginning of each field/frame.

Upon exiting the NEW_LINE2 state 2590, the window state machine enters the NEW_LINE3 state in which the indexed window is checked in block 2592 to determine whether the indexed window is currently processed, i.e., the index window has a window status of CUR_PROC. If the indexed window is not a currently processed window, the window state machine enters the LINE_END state 2622 in FIG. 67 as indicated by a state change indicator 2594.

However, if the indexed window is a currently processed window, the window state machine in block 2596 checks if the window descriptor associated with the currently indexed window is for loading CLUT. If the window descriptor is for loading CLUT, the window state machine enters the NEW CLUT state 2598 in which a CLUT memory request is sent to the memory controller for loading new CLUT data from the external memory. Then the window state machine enters the WIN_MEM_DONE state 2614 in FIG. 67 as indicated by a state change indicator 2600. If the window descriptor is not for loading CLUT, the window state machine enters the NEW_WIN state 2604 in FIG. 67 as indicated by a state change indicator 2602.

In the NEW_WIN state 2604, the window state machine sends a new window request to the WD state machine to receive a new window header. The window state machine waits for the new window to be acknowledged by the window arbitrator as indicated in block 2606. If the new window is acknowledged, then the window state machine enters the NEW_WIN_ACK state 2606 in which the window state machine checks whether the window format is an ALPHA 0 format. Since ALPHA 0 format defines a special type of window having a single color, no graphics pixel data typically is read from the external memory for windows having ALPHA 0 format. Thus, if the window state machine in block 2608 determines that the window has ALPHA 0 format, the window state machine enters the WIN_MEM_DONE state 2614 without loading any graphics pixel data.

When the window does not have ALPHA 0 format, the window state machine sends a window memory request to the window arbitrator to read graphics pixel data from the external memory. Then the window state machine waits for the corresponding window DMA module to acknowledge the transfer of graphics pixel data.

Upon acknowledgment of the graphics pixel data transfer as indicated in block 2612, the window state machine enters the WIN_MEM_DONE state 2614. In this state, if the line count is greater than the last line of the window associated with this window descriptor, a window line done flag is set for this window descriptor to indicator that the processing of this window descriptor has been completed.

The window state machine then enters a WIN_MEM_DONE1 state 2614 in which the next WD index is obtained from a sort_4567 sorting index. The window state machine also requests to increment the sort_4567 index. Each of the first window index, the second window index, the third window index, the fourth window index, sort[0], sort[1], sort[2], sort[3], sort[4], sort[5], sort[6], sort[7] and sort_4567 is a 3-bit register set for indexing of eight window descriptors.

After the WIN_MEM_DONE state 2614, the window state machine enters the WIN_MEM_DONE2 state 2616 in which sort_4567 is compared against 7 as indicated in block 2618. The sort_4567 sorting index is a register set which typically points to the next window descriptor index to be serviced. For example, when sort[0] to sort[3] are being serviced at the beginning of field/frame, the sort_4567 points to sort[4]. When one of the pipeline completes processing of one window descriptor, the window state machine associated with that pipeline typically references sort_4567 to point to sort[4] to find the next window descriptor for processing. The register set sort_4567 is then incremented by one to point to the next sorting which is sort[5]. This process repeats until sort_4567 equals 7, which means that all eight of the window descriptors on the current line have been processed. The sort_4567 is reset back to 4 for the processing of next line.

When the sort_4567 is less than or equal to 7, the window state machine checks in block 2620 whether a window increment has been acknowledged. If the window increment has been acknowledged, the window state machine reverts back to the NEW_WIN state 2604 to send another window request to obtain a new window header. If the window increment has not been acknowledged, the window state machine enters the WIN_MEM_DONE1 state to get the next WD index from sort_4567 and request to increment sort_4567.

When the sort_4567 index is greater than 7, the window state machine enters the LINE_END state 2622. In the LINE_END state, the window state machine sends a line end request to the window arbitrator to send a line end header. While in the LINE_END state, the window state machine checks whether a field end flag is set in block 2624. If the field end flag is set, the window state machine keeps requesting a line end header until the next vertical sync, i.e., vsync, is received.

When all the window descriptor status shows DONE_PROC and no more WD is to be updated, WD request queue is empty, and last WD is loaded, the field end flag is set. All four window state machines preferably stay in the LINE_END state 2622 and keep sending line end header until a vertical sync is detected. The vertical sync resets all five state machines and re-start the process for next field/frame.

If the field end flag is not set, the window state machine enters the WAIT_WD_UPD state 2626 and waits for the new WD update loading by the WD state machine. When all four window state machines reach the WAIT_WD_UPD state 2626, a line done flag is generated. The line done flag is used by the WD state machine to start a WD update loading process. In the WAIT_WD_UPD state 2626, the window state machine increments the line count and enters the WAIT WD_UPDATE1 state 2628. In the WAIT WD_UPD1 state 2628, the window state machine waits for the WD state machine to reset the WD update flag to indicate completion of the WD update loading. After the update loading of window descriptors completes, indicated by reset of the WD update flag, all four window state machines enter a NEW_LINE 2582 in FIG. 66 state to process the next line as indicated by a state change indicator 2580.

Both Y scan line order and X starting position in the described embodiment are defined in 11-bit registers to cover HD resolutions. Sorting of eight on-chip window descriptors based on 22-bit parameters typically takes many levels of logic, large gate counts and long propagation time to complete the sorting. The large area of combinational logic with long propagation delay usually cause problem in back-end timing driven layout.

Reduction in the number of bits, gate counts and the multiple clocks of propagation delay is important and beneficial to back-end routing, especially in a large and complicated system-on-chip design.

In the system implementation in one embodiment of the present invention, the 11-bit Y scan line order is replaced by a 2-bit window status. Window status of each window descriptor is derived by comparing its win_ystart and win_yend parameters with the current line count. Both win_ystart and win_yend are part of window descriptor parameters. The win_ystart parameter is defined as the window starting scan line. The win_yend parameter is defined as the window ending scan line.

A line count is a counter in the window controller. The line count tracks the currently processed scan line number. If the line count is smaller than win_ystart, the window status for this window is set to NOT_PROC. If the line count is between win_ystart and win_yend, the window status for this window is set to CUR_PROC. If the line count is greater than win_yend, the window status of this window is set to DONE_PROC. If this window descriptor is not a valid window descriptor, the window status of this window is set to NULL_WD.

For example, when the total number of WD is less than on-chip WD number, eight, the last few window descriptors are defined to have a window status of NULL_WD since they don't contain a valid window. The window status of all the on-chip window descriptors are updated at the beginning of each scan line. A window status bit is available in the window controller and is also used by each state machine for other purpose.

The window status of CUR_PROC is assigned to a smallest value, which is 0. During window descriptor sorting, the two-bit window status is assigned to two most significant bits. With this arrangement, the currently being processed window will be sorted to the highest priority because the two most significant bit is smallest. With this approach, the 11-bit Y scan line order is replaced with 2-bit window status. This reduces the number of bits in the sorting parameters from 22 down to 13. In one embodiment of the present invention, the sorting parameters in verilog code is defined as "sort_xstart", which is defined as a 2-dimensional array, total of 8 sorting parameters with 13-bit number in each sorting parameter.

Even though the number of sorting bits are reduced from 22 to 13, it is still very difficult to complete sorting of all eight window descriptors within one high speed clock cycle. In one embodiment of the present invention, the sorting logic runs at 81 MHz. In order to avoid the multiple cycle restriction for the back-end timing driven layout, sorting of eight window descriptors is performed in 8 pipeline stages. Each stage preferably is completed within one cycle.

In the described embodiment, each stage preferably sorts for the smallest number of sorting parameter which is 13-bit definition of window status and win_xstart. This preferably is implemented as three levels of comparison where each level of comparison uses a 13 bit comparator. When the smallest number of sorting parameters is found, the smallest window descriptor index is saved to a result register and the sorting parameter of this window descriptor is replaced with 0x 1fff which is the largest number.

The propagation delay of the 3-level comparator logic may be achieved in one 81 MHz clock cycle using 0.22 mm technology. During the second pipeline stage, since the smallest sorting parameter is replaced with 0x 1fff, the second smallest sort parameter typically is found and saved in a result register, then replaced with 0x 1fff. There is a sorting counter which is incremented at each pipeline stage. This counter is also used as an index to save the window descriptor to the correct result register and to replace the corresponding sorting parameter with 0x 1fff.

After eight cycles of sorting, all eight window descriptors are sorted in ascending order based on their sorting parameters which represents their Y scan line order and X start position. With this approach, there is no need to define multiple cycle restriction for timing driven layout and the design may be implemented in fully synchronous logic.

Thus, the complicated 22-bit sorting logic is reduced to 13-bit sorting in the described embodiment of the present invention. Further, the complicated sorting logic is further simplified to 3-level comparator to locate the smallest index. This 3-level comparison logic preferably is reused in the eight sorting cycles. During each sorting cycle, the smallest index is identified and then replaced with largest number for next clock sorting. This typically results in minimum gate counts.

Figure 68:
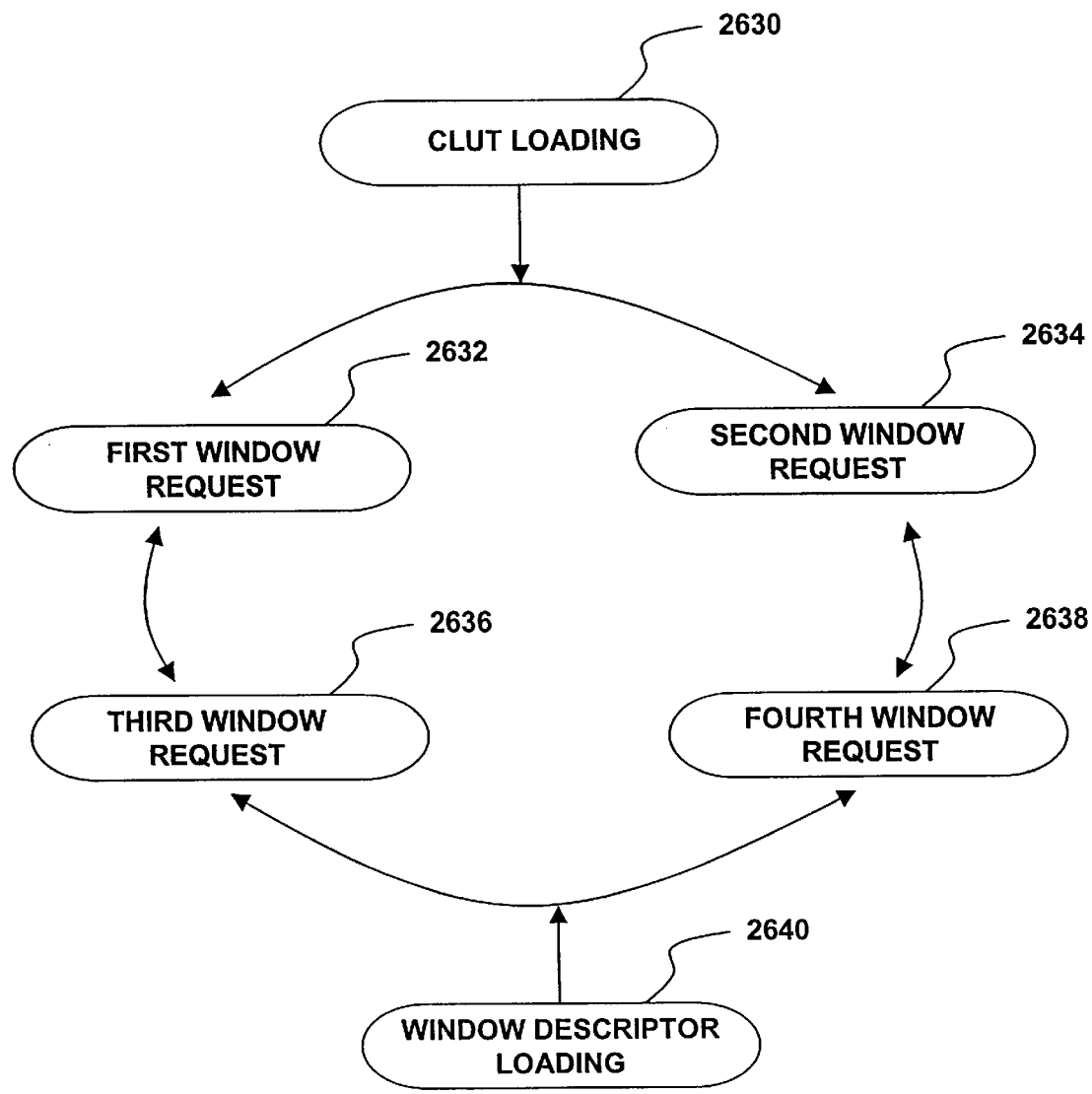
FIG. 68 is a priority diagram that illustrates window arbitration priorities.

FIG. 68 is a priority diagram that illustrates window arbitration priorities. The window arbitrator performs arbitration between window descriptor loading, color lookup table loading and four window memory requests. The color table lookup loading 2630 typically has the highest priority. The four window memory requests 2632, 2634, 2636 and 2638 typically have the middle priority and is arbitrated in a round-robin manner. The window descriptor loading 2640 typically has the lowest priority.

The display engine 2514 preferably receives the graphics data into graphics FIFOs. The display engine preferably first converts the graphics data into graphics windows having a common internal format. The graphics windows preferably are blended together in graphics blenders, where the graphics windows are overlaid on top of each other according to their layer depth order. The output of the graphics blenders, i.e., blended graphics, preferably is stored in a buffer and then filtered for aspect-ratio correction and/or high frequency content removal. The filtered blended graphics preferably is provided to the video compositor to be combined with the video contents.

Thus, the display engine in one embodiment of the present invention preferably performs following major tasks:
1) graphics format conversion;
2) capable of processing 4 graphics layers at the same time using 81 MHz processing clock;
3) perform graphics composition and blending;
4) perform aspect-ratio correction (SRC) and anti-flicker filtering (AFF) in SD mode.

The display engine preferably constructs screens of video and graphics using visual "surfaces", which may also be called "windows", "regions", "sprites", "objects", or "canvasses". Each visual surface preferably is independent of the others, and may have its own image pixel format, alpha blend factor, location on the screen, address in memory, and other parameters. The display engine may support a variety of pixel formats including RGB16, RGB15, YUV 4:2:2 (ITU-R 601), CLUT2, CLUT4, CLUT8, and others.

In addition to each surface having its own alpha blend factor, each pixel may also have its own alpha blend factor; this capability may be used to advantage in creating top quality imagery.

Visual surfaces may be comprised of any combination of image contents, such as anti-aliased text, patterns, GIF images, JPEG images, live video from MPEG or analog video, 3D graphics, backgrounds, pointers, control panels, etc., all of which may be smoothly animated as desired. Surfaces of different types may be readily layered one on top of another. For example, anti-aliased text may as easily be on top of live video as on top of graphics imagery or a solid colored background.

In one embodiment of the present invention, surfaces preferably are composited directly to the screen at the time the screen is displayed. Thus, in the described embodiment, display frame buffers, buffered displays, or off-screen bit maps may not be needed. Since frame buffers need not be constructed for every new view of the screen, high-bandwidth blitter functions to perform animations and compositing may not be needed. As a result, the described embodiment of the present invention preferably allows a dramatic reduction in memory requirements and in memory bandwidth demands, when compared with conventional PC-type and blitter-based architectures.

In other embodiments, the surfaces may be stored in display frame buffers prior to being displayed. In these cases, display frame buffers, buffered displayed and/or off-screen bit maps may be used.

Display surfaces preferably are controlled by a display list mechanism using window descriptors. The window descriptors in memory preferably control all the surfaces on the screen with the parameters of each surface, and the hardware reads the window descriptors when the information is needed in order to construct the display screen. Multiple window descriptors may be stored in memory simultaneously, and they may be selected automatically by the hardware at the beginning of every display field.

The number of surfaces (windows) that may be displayed simultaneously is typically very large and supports very demanding applications. In one embodiment of the present invention, every display scan line may have a unique set of up to eight graphics windows, in addition to the two video windows, either or both of which may be full screen video or scaled video, and background surfaces. In other embodiments, the numbers of graphics display surfaces on each scan line may be more or less. In one embodiment of the present invention, up to four graphics windows, plus the two video surfaces and background, may be overlaid at every pixel. In other embodiments, the numbers of graphics windows that may be overlaid at every pixel may be more or less than four.

Pointers, e.g., cursors, preferably are readily supported in hardware simply by creating another display surface. Pointers may have all the properties and flexibility of normal graphics windows.

The display engine preferably supports simultaneously the various types of alpha blending that are required by advanced applications and for top quality text and graphics display. Alpha blending in the display engine preferably supports a full 8 bits (256 levels) of alpha control on a per-window and per-pixel basis simultaneously, in all graphics formats. Alpha values preferably are determined individually for each window and pixel, regardless of the number of layers of windows composited and regardless of the depth order of the window on the display.

Fewer than eight bits of alpha may be desired for many important functions. For example, only two bits per pixel are generally adequate for very high quality anti-aliased text, and four bits per pixel typically produces a result that is visually as high quality as eight bits per pixel text. Using smaller number of bits per pixel generally saves memory and memory bandwidth. The per pixel alpha values, including ones that have two or four bits, preferably are combined with the per surface alpha value to produce an 8-bit alpha result within the display engine.

The display engine preferably also includes a high quality anti-flutter filter which eliminates the flutter effect that is inherent to interlaced display of high resolution text and imagery on standard definition TVs. Unlike other solutions with a filter that processes the output of a graphics engine, the anti-flutter filter in the display engine of the present invention generally does not affect the display of normal or scaled live video, which is meant for interlaced display and which would be distorted by a filter. In addition, the display engine preferably eliminates most sources of flutter even without utilizing the anti-flutter filter.

In many practical applications such as web browsing or using computer generated graphics, the graphical content is generally coded with square aspect ratio pixel sampling, e.g., 640×480 resolution, while the standard for digital video on standard definition TV displays (ITU-R BT. 601) specifies a pixel aspect ratio that is not square. The display engine of the present invention may optionally adjust the pixel aspect ratio of the graphics to match that of the video. Further, the pixel aspect ratio scaling in the display engine preferably matches the graphics size to the displayable size of normal TVs. In addition, the display engine preferably supports display of the same graphical content on both NTSC and PAL/SECAM televisions without modifying the graphics imagery.

The pixel aspect ratio matching function and the anti-flutter filter preferably are integrated into one optimized multi-tap polyphase vertical filter and sample rate converter, for maximum quality and minimum hardware complexity. The parameters of this filter preferably are fully programmable, supporting custom filter designs.

As with the anti-flutter filter, the pixel aspect ratio matching function preferably does not have any effect on either full screen or scaled live video, while at the same time there may be a large number of graphics surfaces composited anywhere on the screen with aspect ratio correction.

Figure 69:
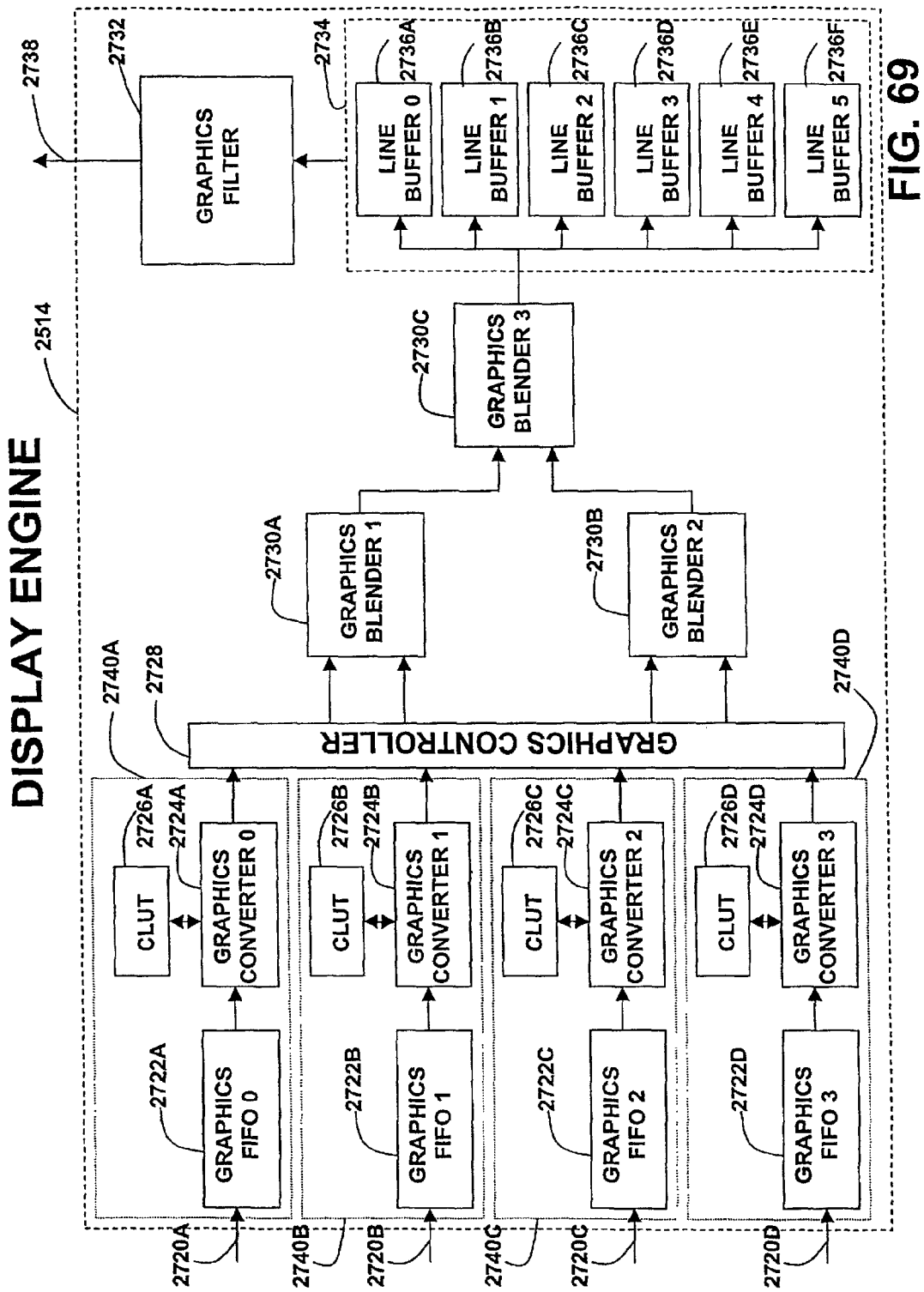
FIG. 69 is a block diagram of a display engine in one embodiment of the present invention.

FIG. 69 is a block diagram of the display engine 2514 in one embodiment of the present invention and its major functional blocks. The display engine 2514 preferably receives graphics data from the window controller through inputs 2720A–D into four parallel graphics FIFOs 0–3 2722A–D. The display engine preferably processes the graphics data in the FIFOs 0–3 2722A–D in parallel and in synchronization such that the graphics data are aligned to each other pixel by pixel in the processing pipelines. In other embodiments, the graphics data may be processed in series, line by line.

These graphics data preferably are converted from their native format into a common internal format, YUV 4:4:4:4, by going through RGB-TO-YUV conversion (for RGB type of graphics) or by looking-up from color look-up tables (CLUTs) 2726A–D(for CLUT type of graphics). In one embodiment of the present invention, each of the CLUTs 2726A–D is associated with and is used with one of the graphics converters 0–3 2724A–D. In other embodiments, each CLUT may be associated with two or more graphics converters. In still other embodiments, the system may include just one CLUT associated with all the graphics converters.

A graphics controller 2728 preferably controls blending of the graphics windows from the graphics converters 0–3 2724A–D in accordance with the layer depth order. The graphics windows from the graphics converter 0 2724A and the graphics converter 1 2724B preferably are blended with each other in the graphics blender 1 2730A. Similarly, the graphics windows from the graphics converter 2 2724C and the graphics converter 3 2724D preferably are blended with each other in the graphics blender 2 2730B. Outputs of the graphics blenders 1–2 2730A–B preferably are blended together in the graphics blender 3 2730C into the blended graphics.

In one embodiment, the blended graphics preferably is temporarily stored in six graphics line buffers 2736A–F that comprise a buffer 2734. In other embodiments, more or less line buffers may be used. In one embodiment of the present invention, contents of a selected line buffer preferably is read out and filtered in a graphics filter 2732 to remove high-frequency component and/or aspect-ratio correction, and then taken out as the blended graphics output 2738 to be mixed with video. In another embodiment, the contents of the selected line buffer is read out, then taken out to be mixed with video without being filtered. In other embodiments, the contents of the selected line buffer may optionally be filtered.

In a typical application, graphics data is created by a high-level application tool, e.g., a browser, as individual graphics windows. A lower-level driver for the integrated circuit (IC) chip is typically used to communicate with the IC chip to "load" the graphics windows into a unified memory at external memory location, e.g., the memory 2510 in FIG. 62, so that they may be retrieved to be displayed. Each graphics window is typically treated as an independent object, which may be created and modified by any graphics creation tool.

Geometry and physical locations of graphics windows in the graphics data preferably are described by using a list of window descriptors. Each node in the list typically describes properties of a graphics window, its format, alpha type, geographical locations, etc. The window descriptor list preferably is created and stored in a memory location retrievable by the window controller and loaded into the on-chip buffers during graphics display. The window descriptor list preferably is pre-sorted in accordance with the vertical start location of all graphics windows so that the graphics may be loaded for display sequentially line by line.

During graphics display, the window controller preferably loads the window descriptors according to the order of vertical start locations of all graphics windows to be displayed. In one embodiment of the present invention, a maximum of eight window descriptors may be loaded on the IC chip. Therefore, in the described embodiment, up to eight different graphics windows may be displayed on any given display line. In other embodiments, the maximum number of different graphics windows that may be displayed on a display line may be more or less than eight.

Starting with the eight graphics windows at the beginning, e.g., field start, graphics preferably is retrieved and loaded into the graphics FIFOs line by line. When a window is finished, a new window descriptor preferably is loaded onto the chip to replace it and the process continues until the end of the field is reached or until the window descriptor list is exhausted.

The system preferably uses a special data packet format to transfer graphics window parameters and window data to the display engine from the window controller through the graphics FIFOs as packetized data. The packetized data preferably is comprised of two parts: header and graphics content. Graphics content data typically follows the header and some graphics format may only require the presence of a header in a packet. A data type bit, which preferably is the most significant bit of a FIFO word, typically indicates if the word is a header word (1) or a data word (0). A header generally is comprised of a single 129-bit word, but and graphics data may typically be of multiple 129-bit words.

Following graphics formats preferably are supported by the display engine in one embodiment of the present invention.

1) RGB 16: 5-bit red, 6-bit green, and 5-bit blue;
2) RGB 15: 5-bit red, 5-bit green, 5-bit blue and 1-bit alpha;
3) RGBA 4444: 4-bit red, 4-bit green, 4-bit blue, 4-bit alpha;
4) CLUT2: 2-bit Color Look-Up;
5) CLUT4: 4-bit Color Look-Up;
6) CLUT8: 8-bit Color Look-Up;
7) ACLUT16: 8-bit alpha and 8-bit Color Look-Up;
8) ALPHA0: 0-bit single-color;
9) ALPHA2: 2-bit alpha single-color;
10) ALPHA4: 4-bit alpha single-color;
11) ALPHA8: 8-bit alpha single-color; and
12) YUV422: 16-bit YC (YU/YV, 8-bit Y and 8-bit C) in 4:2:2 format. Thus, the number of bits per pixel may be 0, 2, 4, 8 or 16 in the described embodiment.

Other embodiments may have different number of bits per pixel. The alpha value generally is a relative weight of a layer in the blending of two graphics layers using following equation:

$$\text{Blended} = \text{alpha} \times \text{TopLayer} + (1 - \text{alpha}) \times \text{BottomLayer}$$

A graphics image typically has more than one color component. For example, YUV 4:2:2 images have three color components: Y, U and V. In this case, the resulting image preferably is derived by applying above equation to all three color components. A graphics image may have a single alpha applied to the entire image in one embodiment of the present invention. In other embodiments, each pixel may have its own alpha value, which may be different from pixel to pixel across the entire image.

As discussed earlier, a layer of graphics may have a single alpha value applied to all the pixels on the layer or each pixel may have a different alpha value throughout the layer. In one embodiment, four types of alpha derivation methods preferably are supported. The alpha derivation methods include:

1) SINGLE: single alpha throughout the window;
2) FROM_KEY: pixel alpha derived from chroma/luma keying;
3) FROM_Y: pixel alpha derived from Y component for YUV 4:2:2 type of graphics;
4) FROM_CLUT: pixel alpha looked up from Color Lookup Table.

The SINGLE alpha derivation method typically results in a single alpha throughout the window. All other listed methods generally result in alpha per pixel, i.e., each pixel may have a different alpha value. In the display engine, regardless of which alpha derivation method is used for each pixel, another single alpha value, i.e., window alpha, preferably is applied to the whole window to support special features such as fade-in or fade-out of a window.

The chroma key and luma key alpha derivation method used in the described embodiment typically are used to derive a pixel's alpha value by comparing the color component(s) of the pixel to a predefined value(s). If the comparison is positive (in range or compared) then the alpha for the pixel is 0 (transparent) otherwise it is 1 (opaque).

When chroma key is used in RGB types of graphics, all three color components preferably are compared to a single set of range values (max key for the upper bound and min key for the lower bound) to ascertain if a pixel is transparent or opaque.

When chroma key is used in CLUT types of graphics, the single pixel value used to index to a CLUT preferably is compared to a predefined value. If they are the same, then the pixel becomes transparent, otherwise the pixel is opaque.

The luma key preferably is used with the graphics having YUV 4:2:2 format. The legal range of the Y component of a YUV 4:2:2 image typically is between 16 and 235. When the Y component of a graphics image is set to zero, which may not happen in the real world, then the pixel is typically set to be transparent, otherwise the pixel is typically set to be opaque.

In system for displaying graphics, the pixel map start address should typically be at a page boundary for efficient burst data read from the external memory, which may be SDRAM. By placing the start address at the page boundary, maximum throughput may be maintained because SDRAM access overhead is typically minimized. Horizontal window scrolling generally is equivalent to changing the window graphics data starting address. Thus, the start address may be placed at a location other than a page boundary during horizontal window scrolling. Thus, changing start address may make SDRAM access inefficient.

The system in one embodiment of the present invention uses a soft horizontal scrolling mechanism to solve the problem of inefficient SDRAM access. In the described embodiment, instead of changing start address for scrolling, the original graphics data is loaded into the display engine and preferably a number of pixels at the beginning of the start address are discarded. Since some of the leading pixels are discarded at the start address, the screen in effect is scrolled left horizontally.

In the described embodiment, the screen may also be scrolled horizontally to the right in a soft manner. For scrolling right horizontally, the start address to the previous page/word preferably is advanced by one and all the pixels in the new page/word are blanked/masked except for the amount to be scrolled. A mask/blank count preferably is provided in the window descriptor to indicate the amount to be scrolled.

As discussed earlier, the blended composition graphics is blended together with the video content in the video composition. Each individual graphics window typically has its own alpha. In addition, each pixel may have different alpha value. As a result, each pixel in the video content underneath the blended graphics layer may have different alpha values applied to different pixels.

To derive the alpha value for the video windows, following accumulation process preferably is performed when compositing the graphics windows:

$$\text{Alpha}_{video} = \prod_{n=1}^{N}(1-\text{Alpha}_n),$$

where $\text{Alpha}_n$ is the $n^{th}$ layer of the graphics windows and N is the total number of graphics layers on a pixel. In one embodiment of the present invention, four graphics windows are blended in parallel into blended graphics and therefore, N is equal to 4.

In one embodiment of the present invention, a special ALPHA0 type of graphics may be used to 'clear' everything underneath it.

The special graphics is typically called a see-through/clear/tunneling layer. ALPHA 0 image serving for this purpose preferably has its alpha derivation method set to 'FROM_KEY' (normally it should be set to SINGLE) and its window alpha set to 0.

As discussed earlier, the display engine preferably supports various types of graphics. To blend different graphics windows together and also to blend the blended graphics with the video contents at the video compositor, a common internal format preferably is used. In one embodiment of the present invention, YUV 4:2:2 +ALPHA format has been selected as the common graphics format. Thus, in the described embodiment after the conversion, a common 16-bit YUV 4:2:2 plus an 8-bit alpha format preferably is used in the display engine as well as the rest of the system.

The graphics pixel data after compositing typically has different meanings from the one before blending. After blending, the luma and chroma values preferably are already multiplied with the pixel's alpha value and the alpha portion of the pixel data is the equivalent "weight" of the layer(s) logically underneath the graphics layer.

In one embodiment of the present invention, all RAMs inside the display engine preferably are testable by a built-in self test structure, RamBist. A RamBist controller preferably is external to the design and provides the test vectors and controls through the RamBIST ports on the display engine. These ports, except for the chip select signal ports, preferably are shared among all RAMs under test. The chip select signal ports preferably are not shared because chip select signals are typically ram depth dependent. A RamBIST wrapper generally contains each RAM which preferably provides the appropriate multiplexing function and RamBIST mode real-time comparison under the control of a comparison enable signal and the chip select signal. Each RAM preferably has its own pass(0)/fail(1) flag signal going to outside.

Referring back to FIG. 69, in one embodiment of the present invention, four independent graphics conversion pipelines 2740 A–D handle processing of four overlapping graphics windows at the same time. This parallel graphics processing architecture preferably speeds up graphics conversion process by a factor of four as compared to using only one pipeline at a time. The parallel graphics processing architecture is especially useful for HD applications where higher display clock frequency is generally required.

In addition to speeding up the graphics processing process, using parallel graphics conversion architecture may also alleviate the bandwidth requirements on the pipeline so that a lower clock frequency may be used. In one embodiment of the present invention, an 81 MHz clock is used for graphics processing. Using four parallel pipelines 2740 A–D, however, generally limits the maximum number of windows that may be overlapped at any pixel to four.

Each of the graphics conversion pipelines 2740A–D preferably includes a graphics FIFO. Each of the graphics FIFOs 2722A–D preferably has a size of 32 words by 129 bits at its interface to the window controller. Each graphics FIFO preferably is coupled to a graphics converter having a CLUT attached to it. The graphics converter performs conversion of graphics format.

The graphics controller 2728 preferably provides the core control for the display engine 2714 in that it synchronizes the four pipelines 2740A–D in equal pace and stalls the pipelines if necessary so that the four graphics windows processed in the pipelines are aligned up in order to be blended together at a later stage.

The graphics controller 2728 preferably also redirects the four graphics windows processed to different sources of the blenders according to the depth (layer) number present in their window descriptors so that graphics layers are blended together appropriately. The graphics controller 2728 preferably also manages the graphics line buffer usage by selecting an appropriate line buffer to write a new line of blended graphics to.

Other elements in the processing chain preferably include graphics blenders 1–3 2730A–C. Each of the graphics blender 1 2730A and the graphics blender 2 2730B preferably blends a pair of graphics windows, respectively, and the graphics blender 3 2730C preferably performs the final blending of the outputs of the graphics blenders 1 and 2, 2730A and 2730B. The blended color components are generated in the graphics blenders. In addition, an accumulated equivalent alpha for the layers underneath the graphics layer preferably is generated. Each line of blended graphics preferably is stored in one of the six graphics line buffers 2736A–F selected by the graphics controller 2728.

The last element in this processing chain preferably is the graphics filter employed for aspect-ratio conversion as well as anti-flutter filtering for standard definition mode. The graphics filter preferably is a 4-tap vertical only polyphase filter that uses programmable coefficients.

Each graphics conversion pipeline preferably is comprised of 1) a FIFO and a FIFO controller and 2) a graphics converter. For example, the first graphics conversion pipeline preferably includes the graphics FIFO 0 2722A having a FIFO and a FIFO controller, and the graphics converter 0 2724A. Since all four graphics conversion pipelines are similar, only the first graphics conversion pipeline will be discussed hereon. A CLUT read port is also part of the graphics converter but typically is physically located outside of the graphics converter.

The graphics FIFO 0 2722A preferably is a synchronous FIFO with write port controlled by the window controller and read port controlled by the display engine. The write address preferably is generated locally by the FIFO controller. Write enable provided by the window controller preferably is used to increment a modulo-64 counter. A synchronous reset provided by the window controller preferably initially resets the counter to zero at field start and then fills the FIFO whenever it has empty space.

The RAM used as the graphics FIFO preferably has a size of 32 words by 129 bit comprised of two RAMs with sizes of 32×64 and 32×65, respectively, because of the speed consideration and vendor RAM compiler limitations.

The read port of the graphics FIFO preferably is also synchronous but preferably is controlled by an inverted 81 MHz clock instead of the non-inverted 81 MHz clock. The reason for using the invented 81 MHz clock is that the graphics FIFO read operation preferably is completed within one clock cycle in order to achieve a control feedback constraint. Read address preferably is generated on the rising edge of 81 MHz clock and read data preferably is latched on the same edge. Thus, the graphics FIFO read preferably is performed by the falling edge of the clock to meet the feedback constraint.

As discussed earlier, graphics data loaded into the graphics FIFOs is typically packetized. On any display line, each graphics window generally has a corresponding packet associated with it. A packet is typically comprised of a single-word packet header describing the graphics window followed by the packet body comprised of graphics data. A header preferably is distinguished from the data body by a header/data bit in each 129-bit FIFO word with a value of 1 indicating that the FIFO word is a header.

Window packet header preferably describes the properties of a graphics window. In one embodiment of the present invention, 129 bits in each packet preferably has the mapping as illustrated in Table 7.3.

TABLE 7.3

| Name | Bit Location | Description |
|---|---|---|
| DATA_TYPE | 128 | header (1) or data (0) indicator |
| GFX_TYPE | 127:124 | graphics format |
| FIRST_WIN | 123 | first window of the current line indicator |
| LINE_END | 122 | current line done indicator |
| ALFA_TYPE | 121:120 | alpha per pixel derivation method |
| WINDOW_ALPHA | 119:112 | single alpha for the whole window |
| COLOR | 111:96 | window color used in alpha type of graphics |
|  | 95:64 | unused |
| BLANK_CNT | 63:58 | number of pixels to be blanked/masked/unused at start of line |
| VERT_EDGE | 57 | current line being top or bottom edge of the window indicator |
| WIN_START | 56:46 | window start location on horizontal direction |
| LAYER | 45:42 | window order in the z/depth direction |
| FILT_ENB | 41 | YUV444 to YUV422 conversion using filter indicator |
| WIN_SIZE | 40:30 | window size on the horizontal direction |
|  | 29:0 | unused |

A local two-entry read-ahead ping-pang FIFO preferably is created in the graphics converter 0 2724A to interface with the graphics FIFO 0 2722A in an attempt to provide a complete clock cycle for the following processing pipe stages. The two-entry FIFO in the graphics converter 0 2724A preferably maintains its local pointers and monitors the graphics FIFO 0 2722A for emptiness. If the local two-entry FIFO has space and the graphics FIFO 0 2722A is not empty, graphics data preferably is transferred to the local two-entry FIFO. The local two-entry FIFO preferably maintains the pointers for the graphics FIFO 0 2722A as well as for itself upon freed local FIFO space or an asserted read strobe generated by the internal finite state machine.

The endian-ness of graphics data preferably is handled by swapping bits in the local FIFO word when reading it out. There typically are three cases to handle: little-endian where nothing is swapped, big-endian byte swap and big-endian 16-bit word swap.

A YUV422 image is typically considered to be a 32-bit quantity and no swapping is generally performed.

The graphics converter 0 2724A preferably includes a finite state machine (FSM). The FSM preferably coordinates the processing of graphics packet data in that pipeline and also reports its state vector to the graphics controller. This FSM preferably has four states:

1) LINE_START: indicates that it is at the beginning of a graphics line.
2) HEADER: indicates that it is processing the header of a packet.
3) RETIRED: indicates that it has no more windows to process on current line.
4) CONTENT: indicates that it is processing the graphics data of a packet.

The finite state machine (FSM) preferably is first reset to its initial state, LINE_START, at system reset. When the graphics FIFO 0 2722A begins to be filled with graphics data and graphics data is transferred to the local two-entry FIFO, the FSM preferably starts. At the LINE_START state, the FSM preferably automatically assumes that the first data is a header with its first_win bit turned on, otherwise FSM waits until the start of next field.

The first_win bit preferably indicates that the corresponding graphics window is the first one on the current line.

If the FSM finds that the current line is empty, the FSM preferably goes to the RETIRED state, signaling that the current conversion pipeline is done with the current line. Otherwise, it preferably goes to the next state, HEADER, to go ahead to process the header information.

At RETIRED state, the FSM preferably checks if all four conversion pipelines have retired for the current line. When it happens, it preferably moves on to the next line and so the FSM enters into the LINE_START state.

At the HEADER state, the FSM preferably waits for the header information to be processed and window parameters transferred to the local registers and preferably moves to the CONTENT state after one clock cycle when the data in the local FIFO is recognized as valid header word.

At the CONTENT state, the FSM preferably enables the graphics data processing. The FSM preferably remains in this state until all graphics data is processed for the current window and then preferably goes to: 1) RETIRED state if the current window is the last one at the current line; or, 2) HEADER state if there are more windows to be converted for the current line.

The FSM preferably goes back and forth between HEADER state and CONTENT state if there are more than one windows to be processed by the current conversion pipeline.

A window of the format ALPHA 0 is in a special format that typically does not have a data body in its packet. In this case, the FSM typically moves to the next packet by checking if the value of the virtual pixel counter, xcnt, generated by the graphics controller has moved across the window right boundary. If it is true and the FSM sees the header of the next packet, the FSM preferably switches to the HEADER state. The graphics controller preferably uses the virtual counter xcnt to synchronize the four parallel conversion pipelines so that their outputs to the blenders are on the same pixels at any given time.

The FSM preferably also updates a read strobe signal, fifo_ren, whenever it identifies: 1) an empty line; 2) a header; or 3) a end-of-line indicator.

In one embodiment of the present invention, the following graphics packet combinations are allowed:
1) a header-only packet indicating an empty line;
2) a data packet with its header indicating a first window at current line followed by possible other packets and at last a header-only packet indicating the end of current line.

Therefore, if a line is not empty, then the last packet typically is a header-only packet with its LINE_END bit set.

All graphics packets are pre-sorted and put into the Graphics FIFO in the order that the corresponding windows appear on the screen, from left to right. The graphics converter preferably includes many types of registers. They typically are the same type of registers but generally kept and used for different pipeline delay stages.

An inactive window is defined as a window that a graphics converter has already started to work on (header already processed) but has no effect on the blended output because its horizontal range is outside of the range where the virtual counter is pointing at. An active window, on the other hand, is typically a window in range where the virtual counter is pointing at.

When a graphics window processed in any conversion pipeline is inactive, its absence is typically implicitly declared by zeroing its window alpha, which is equivalent to zeroing out its presence in the following-on blending process. This information preferably is also passed on to the graphics controller by concatenating it to the window layer number in the current conversion pipeline.

Figure 70:
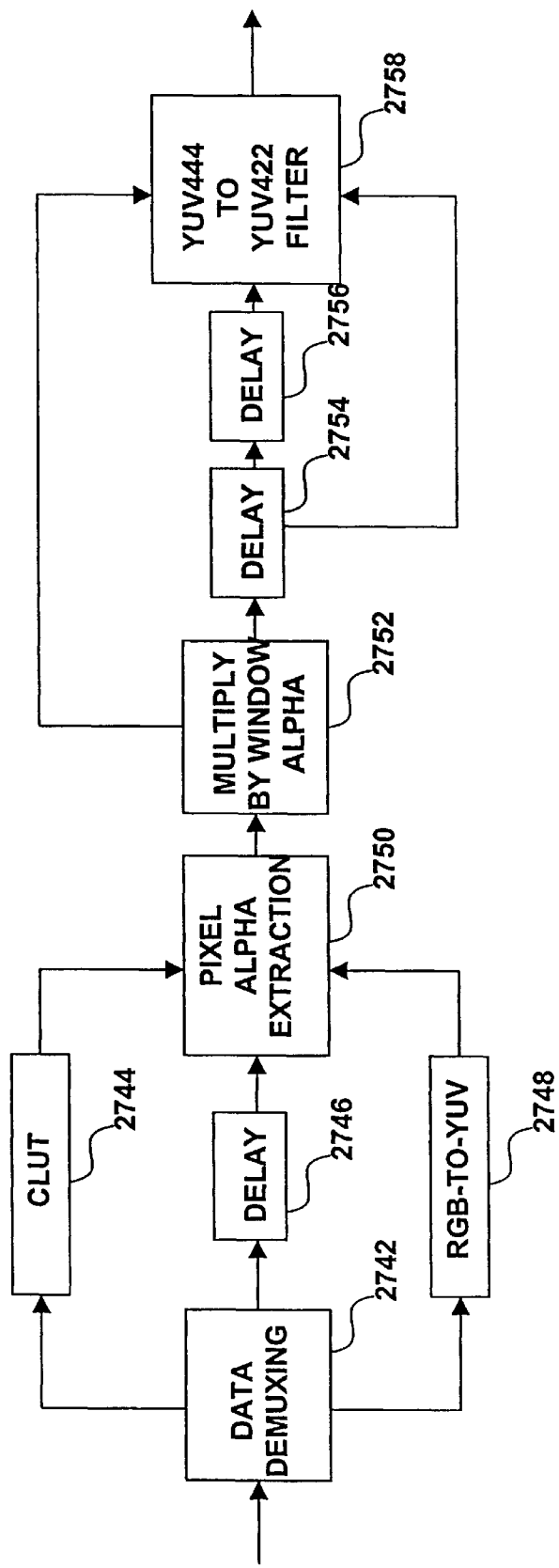
FIG. 70 is a process diagram that illustrates conversion stages of graphics data in a graphics converter.

FIG. 70 is a process diagram of seven graphics data processing pipeline stages in a graphics converter in one embodiment of the present invention. The seven graphics data processing pipeline stages shown in FIG. 70 do not include header handling.

The first stage preferably is comprised of a data demultiplexing block 2742. At this stage, a long data word coming out of the local two-entry FIFO preferably is first processed for endian-ness, followed by demultiplexing to extract appropriate bits according to the graphics format and expected data size. If the graphics data is in CLUT format, corresponding lookup table input to a CLUT block 2744 preferably is prepared. If the graphics data is in RGB format, corresponding input to an RGB-to-YUV conversion block 2748 preferably is prepared.

The second stage preferably is comprised of a CLUT block 2744, a delay block 2746 and a RGB-TO-YUV conversion block 2748. At this stage, color and pixel alpha preferably is looked up for graphics in CLUT format from the CLUT as indicated in the CLUT block 2744. Similarly, RGB to YUV444 conversion is performed on graphics in RGB format, as indicated in RGB-to-YUV block 2748. For graphics already in YUV 4:2:2 format, graphics pixel data is delayed by one clock cycle as indicated in the delay block 2746.

The third stage preferably is comprised of a pixel alpha extraction block 2750. At this stage, per-pixel alpha is derived according to the ALPHA_TYPE for all types of graphics including keying operation if the ALPHA_TYPE is of CHROMA_KEY type. In this stage, if the current graphics line falls on the upper or lower edges of the graphics window processed, the pixel alpha for the window is preferably decreased by half to achieve better visual effect equivalent to filtering on the horizontal running edges.

The fourth stage preferably is comprised of a window alpha multiplication block 2752. At this stage, the window alpha, i.e., global alpha, preferably is multiplied with corresponding per-pixel alpha to achieve global window fade-in/fade-out effect.

The fifth and sixth stages preferably are comprised of first and second delay blocks 2754 and 2756, respectively. At the fifth and sixth stages, converted graphics pixel data in YUV 4:4:4 format preferably are delayed one clock cycle at each stage to prepare for the YUV 4:4:4 to YUV 4:2:2 three-tap horizontal filtering.

The seventh stage preferably is comprised of a YUV 4:4:4 to YUV 4:2:2 conversion block 2758. At the seventh stage, if the original graphics is of the RGB, ALPHA, or CLUT type, then an optional YUV 4:4:4 to YUV 4:2:2 conversion preferably is performed using a 1- 2- 1 3-tap filter kernel. In one embodiment of the present invention, the optional YUV 4:4:4 to YUV 4:2:2 conversion is enabled when the filter enable bit FILT_ENB is set. The color components as well as the per-pixel alpha, after being multiplied with the window alpha, may be filtered using the same filter kernel.

All RGB types of graphics preferably are first converted to a common RGB16 (16-bit, R5, G6, B5) format before entering into the YUV 4:4:4 to YUV 4:2:2 conversion. This means that all RGB types of graphics other than RGB16 preferably are up-scaled to 16-bit for conversion to RGB16. In one embodiment of the present invention, during the conversion to RGB16, the lowest significant bits (LSBs) preferably are added to Red (R), Green (G) and blue (B) components to extend them to the bit size of corresponding RGB16 color components, i.e., R5/G6/B5.

In one embodiment of the present invention, during RGB16 to YUV 4:4:4 conversion, each of the color components is bit extended to 8-bit and then following formulas are applied to convert from the RGB16 color space to the YUV 4:4:4 color space:

$$Y=((66{\times}R)+(129{\times}G)+(25{\times}B)+16)/\ 128;$$

$$U=((-38{\times}R)+(-74{\times}G)+(112{\times}B)+128)/\ 128;$$

$$V=((112{\times}R)+(-94{\times}G)+(-18{\times}B)+128)/\ 128.$$

Conversion from YUV 4:4:4 to YUV 4:2:2 typically requires sub-sampling of the U and V components. Pixel alpha preferably is filtered as well. If the graphics data is already in YUV 4:2:2 format, then the YUV 4:4:4 to YUV 4:2:2 conversion is generally bypassed.

To achieve best visual quality, chroma preferably is pre-multiplied with the alpha before the YUV 4:4:4 to YUV 4:2:2 conversion is performed. Alpha values preferably are filtered separately. Luma values preferably are not filtered but pre-multiplied with the filtered alpha.

Since converted YUV 4:2:2 graphics generally assumes a co-sited property, i.e., chroma on the even pixels logically belongs to the odd pixel and should also carry the same alpha value as for the odd pixels, at even pixels, the filtered alpha value is different for luma as compared for chroma and the chroma uses the alpha value in the previous pixel, that of the odd pixels.

The bit width for the alpha value in the window descriptor and packet header is 8-bit, which typically may represent numbers in the range of 0–255. A true opaque image, however, generally requires that alpha is equal to 256. The alpha value of 255 preferably is selected to represent the value of 256. Thus, the alpha value of 255 is generally not available.

In the alpha output (combining pixel alpha value and window alpha value together), nine bits preferably are used to represent each alpha value. In this case, alpha typically has a full dynamic range and there are no missing values.

Referring back to FIG. 69, the color look-up tables (CLUT) 2726A–D are typically comprised of two logical modules: a CLUT write port controller and a RAM. The CLUT preferably is a one-write and four-read CLUT to provide simultaneous read access for four conversion pipelines.

The CLUT write port preferably is controlled by a special window called a LOAD_CLUT window. When graphics composites to the line that LOAD_CLUT is activated, the window controller preferably starts to update the CLUT with new entries. There typically are two signals for the control, clut_mem_req and clut_data_wr. The clut_mem_req preferably synchronously resets the internal write port counter. While clut_mem_req is high, each consecutive clut_data_wr following the reset preferably updates one CLUT word and moves the write pointer to the next address location.

The logical 1-write-port and 4-read-port CLUT RAM preferably is comprised of four single-port RAMs under the assumption that CLUT read and write do not happen at the same time. The CLUT RAM may also be implemented in a single RAM.

The RAM preferably is 64 words deep and 128 bits wide to satisfy the SDRAM interface requirements (128-bit). Each CLUT word therefore preferably contains 4 entries of 32-bit words, which are actually used. The graphics converter preferably de-multiplexes the word when used.

The graphics controller 2728 preferably performs the following tasks:

1) manages, coordinates and synchronizes the four conversion pipelines, including generating virtual pixel count for them;
2) manages the usage of 6 graphics line buffers;
3) redirects converted graphics to appropriate blender inputs according to their layer numbers;
4) maintains line buffer pointers.

The graphics controller 2728 preferably maintains a virtual pixel counter, xcnt, to synchronize the four conversion pipelines to have their pixel processing aligned to each other. At the beginning of each graphics line, all four graphics converter pipelines preferably initialize themselves to a state LINE_START to and the virtual pixel counter resets to 0.

For follow-on operations, pipelines are generally enabled if and only if following conditions are met:

1) Either each convert pipeline is in the CONTENT state and its local FIFO is not empty or has finished all the windows for the current line; and
2) The line buffer receiving the graphics data is ready, either there is a free line buffer (standard definition) or the line buffer has room (high definition).

In other words, the pipelines are generally enabled when each conversion block has processed their packet header successfully and enters into the CONTENT state for data processing or has exhausted all their windows at current line.

Each individual pipeline preferably monitors xcnt to see if the window processed is currently in range, i.e., xcnt points to a location their windows processed reside. If the window processed is currently not in range, the pipeline preferably puts out a pixel equivalent to a transparent one so that it will have no effect on the net output when blended with graphics windows from other pipelines.

When a particular pipeline is not ready to proceed (FIFO is empty or needs to move to the next new window in the pipeline) then all pipelines typically stall and wait for the particular pipeline to become ready again.

The graphics blender 1 2730A and the graphics blender 2 2730B preferably are first-level blenders and their outputs go to the graphics blender 3 for the final blending.

The chroma preferably is blended independently from the luma, and vice versa. The video alpha, i.e., alpha for the video layers underneath the graphics layers, is accumulated as well. Three multipliers are employed. One clock cycle is consumed during this blending.

As discussed earlier, since YUV 4:2:2 is co-sited, alpha values for chroma and luma are typically separated. Accumulation of alpha is only needed for alpha_y which will be stored to line buffers later.

Similar to the graphics blender 1 2730A, the graphics blender 2 is a 2730B first-level blender used to blend the third and fourth of the four graphics windows. Slightly different from graphics blender 1, the graphics blender 2 generally receives the clear input of the third graphics window. On the output side, it also generates a signal to tell if either the third or the fourth graphics window is the clear window.

Since the output of the graphics blender 2 is typically blended with output of the graphics blender 1 and so not only alpha_y is accumulated but alpha_c preferably is also accumulated. The graphics blender 2 typically uses one clock cycle to perform all the operations.

The graphics blender 3 2730C is the final graphics blender which preferably takes outputs of the graphics blenders 1 and 2, and blends them together to produce a single 24-bit output, which is the blended graphics.

XXIII. Graphics Line Buffers Having a Single-Port RAM Used Similarly as a Dual-Port RAM The graphics line buffer 2734 preferably is comprised of six line buffers 2736A–F and a line buffer controller. The line buffers preferably are synchronous to the 81 MHz clock. There generally are two distinct cases for which line buffers 2736A–F are handled: standard definition (SD) mode and high definition (HD) mode.

When the video display is in the SD mode, graphics may be filtered vertically to remove flickers. A sample-rate-conversion may also be performed to convert graphics designed in square-pixel aspect ratio to the video display which has a aspect ratio of 4:3. In addition, filtering may also be performed on a frame-based graphics instead of field-based graphics. To perform these functions, a total of six line buffers are typically required. These line buffers preferably are treated as a circular FIFO such that buffers are recycled and released for composition whenever they are freed by the filter.

When the video display is in the HD mode, graphics filtering is generally not performed. Thus, only one of the six line buffers is generally used. In this case, the single line buffer preferably is treated as a pixel FIFO such that graphics pixel data is composited and stored into the FIFO whenever there is space in it and is not line-based.

Thus, for the HD mode, only the line buffer 0 preferably is used as a pixel FIFO. At field start, the FIFO read and write pointers typically point at 0. The FIFO generally does not have data at beginning so the line buffers typically have nothing to send to the Display FIFO. Only after the write address increments to 16 then the filter controller typically starts to move data from the line buffer to the display FIFO. All subsequent transfers typically assume that the line buffer is not empty and has data to be transferred. The transfer preferably is controlled by a FIFO full/clear_full mechanism (for Display FIFO) similar to the ones used for line buffer control. In SD mode, since all line buffers are generally available prior to the time when display starts to use them, no such restriction is imposed.

A display FIFO preferably is a 16-word deep and 24-bit wide two-port FIFO implemented using a register file. In one embodiment of the present invention, the display FIFO is comprised of a RAM and a FIFO controller. The FIFO controller preferably uses a gray code for the read and write address generation to ensure hazard-free operations on them to generate full and clear_full signals, which are asynchronous in nature. Besides the asynchronous resets, synchronous resets preferably are also employed to reset the write and read pointers to their initial values in their respective clock domains.

The write port preferably also maintains two more counters, wpt_add8 and wpt_add9 to be used during generation of full and clear_full signals. They are typically a 8-word and 9-word look-ahead counters so that full signal is typically asserted if write pointer is 8-word ahead of read pointer and clear_full is asserted if the difference is 9.

In the case of SD mode, the graphics controller maintains a pointer to select the line buffer that current graphics line preferably is to be stored to. At each line start, the pointer preferably changes its value. The number of new buffers that the filter has released preferably is indicated by three mutually exclusive indicators: 1d_free_1, 1d_free_2, and 1d_free_3. An internal buffer counter, num_free_ld, preferably keeps track of how many line buffers are ready for newly blended graphics.

In the case of HD mode, a simple mutually exclusive two-wire control is typically used for the FIFO write: an ld_clear_full generated by the graphics filter is generally asserted high when the FIFO is almost full and ld_clear_full is generally asserted when FIFO has cleared out enough room for safe transfer of new composited graphics data. ld_waddr is typically updated according to ld_wen. The latter one is typically related to the pipe_en_all control signal and has a scheduled delay to account for blender pipeline delays.

The graphics blenders 2730A and 2730B typically expect graphics windows from the four conversion pipelines in certain order, e.g., the layers to blender 1 preferably are logically underneath layers to blender 2. In addition, the two layers to blender 1 as well as to blender 2 are preferably distinguished into bottom and top layers. The graphics coming out of the four conversion pipelines, however, generally are out of order, so they preferably are sorted by the graphics controller 2728. The graphics controller 2728 preferably sorts the graphics windows based on their layer numbers: graphics layers with smaller layer number are generally placed underneath others having a larger layer number.

The layer variable coming into the graphics controller preferably has its MSB designated for a special purpose: the MSB is typically zero when the layer is not active. Thus, any layer having zero as the MSB of its layer variable typically does not participate in the sorting through reassigning the layer number to a largest number possible, a hex value of ffff.

Sorting process preferably is a simple and classical two for-loop approach. After sorting, corresponding blender inputs are multiplexed from the four input sources.

The line buffer controller typically performs a number of tasks. The line buffer controller preferably generates full and clear_full signals for HD mode using the graphics line buffer 0 2736A as a pixel FIFO. The full and clear_full signals typically are mutually exclusive from their functionality, i.e. write and read addresses are linearly incrementing and the full and clear_full signals generally are not asserted at the same time. The full signal preferably is asserted when read address reaches 8 locations away from write address and the clear_full signal preferably is asserted when they are apart by 12 locations.

The line buffers are generally implemented using static RAM. A static RAM is typically comprised of three major area-consuming portions: 1) cell; 2) sense amplifier; and 3) address decoder. The relative percentages of these three portions in the total RAM area typically change when bit size, data size, or configuration of a RAM changes. Total cell area of a RAM generally does not change with the data/word size. The area of sense amplifier is generally determined by the total output bit size. The area of an address decoder of a RAM is typically inversely proportional to the number of address bits, i.e., for RAMs of the same bit size, wider the data/word size, smaller the address decoder.

If a RAM is sufficiently big, then the total cell area typically is the determining factor for the total cell area. Site of each memory cell is typically is determined by the RAM configuration: if the RAM is single-port, two-port or dual-port, or higher-number-port. The more the port number, the bigger the basic cell size and hence the RAM size and therefore a design generally should avoid using multiple-port RAM because of this area consequence.

Line buffers are used extensively in image processing related applications where image lines are stored and updated into a line buffer and at the same time read out concurrently for processing. Functionally this generally requires a two-port or dual-port RAM because of the requirement of simultaneous access or read and write of the RAM. Line buffers are typically large and the two-port or dual-port version is generally significantly bigger in size than the single-port counterpart. In most cases, two-port RAM generally occupies about 30% to 40% more area than the single-port counterpart.

The graphics line buffers 2736A–F preferably are built with a single-port static RAM (SRAM). The reason for being able to use a single-port to replace the two-port RAM requirement is that RAM read and write may be scheduled such that they are performed at different cycles. A single-port RAM is much smaller physically than a two-port RAM. Thus, use of a single-port RAM typically results in savings to occupied chip area.

Fortunately, RAM read and write are sequential for typically a lot of applications. In other words, sequential memory address are accessed for consecutive reading operations, and likewise for the writing operations. Because of this property, read and write may be predicted, i.e., the next read or write is at the address located by incrementing the current address. Therefore, read and write operations may be interleaved such that read or write generally occurs on every other cycle instead of every cycle. Further, each read or write may perform two data word read or write by doubling the data width (while reducing the number of words by half). Since cell area is typically dominating for most line buffers, area is generally significantly reduced.

The following criteria generally needs to be met, however, to replace a two-port RAM with a single-port RAM:

1) read and write preferably use the same clock or their control signals are preferably generated using one clock reference;

2) both read and write ports preferably are linearly addressed. Address jumping and consecutive same-address read or write access preferably are not allowed;
3) both read strobe and write strobe preferably are provided;
4) when read or write ports are reset, neither write strobe nor read strobe should typically be asserted.

Based on above assumptions, a scheme is used in one embodiment of the present invention to use a single-port RAM to do simultaneous read/write access:
1) the RAM configuration is changed to make it twice as wide but half as deep so that a single read/write for RAM using the new configuration may perform read/write of two words at the same time. This arrangement makes it possible that read or write accesses to the RAM alternately, e.g., every other cycle in average.
2) two local registers preferably hold two words scheduled for the write request and RAM actual writes preferably happens when read is not happening and at least two write data have been accumulated.
3) real RAM read preferably happens when its address is even, i.e., bit 0 of the address is 0.
4) read preferably has higher priority over write, i.e., when in a cycle both read and write are asked to be performed, then write preferably waits until the next cycle. Since there are two local registers to buffer the writes, the write data is not lost.
5) optionally, both read and write ports may be reset periodically by their own resets. When these resets happen, preferably no read or write is requested. But if the controller found that there is still one write latched in the local registers, it will generally flush and write only a single word to the RAM when write port reset happens. In SD mode, these resets typically happen at line start; and in HD mode they typically happen at field start.

Figure 71:
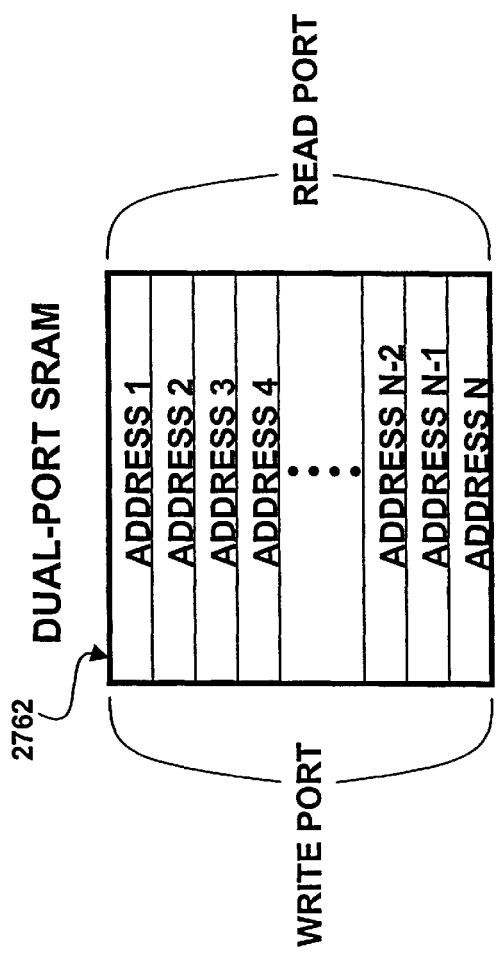
FIG. 71 is block diagram of a two-port SRAM.
Figure 72:
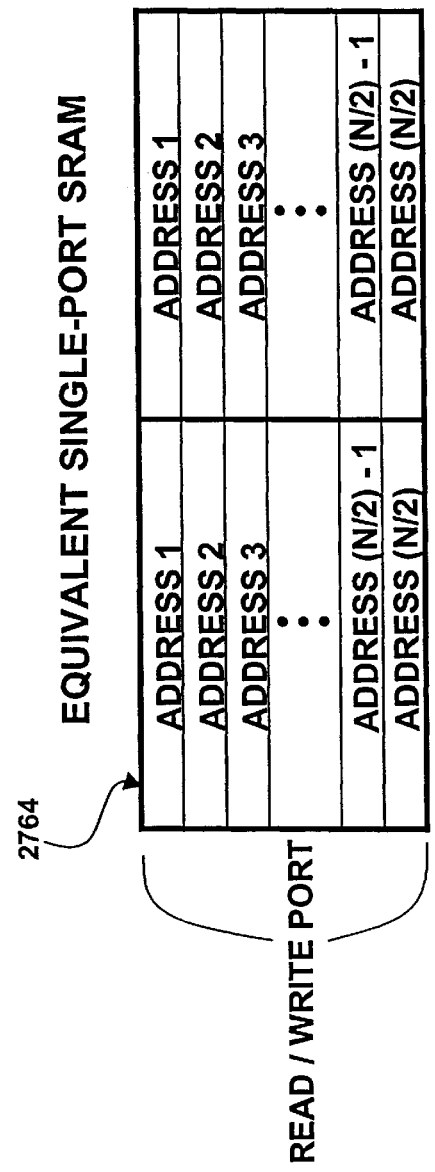
FIG. 72 is a block diagram of a single-port SRAM that simulates a dual-port SRAM.

FIG. 71 is a block diagram of a dual-port SRAM 2762 having depth of N addresses and a particular data width. The dual-port SRAM 2762 has both a write port and a read port. Thus, read and write operations may be performed simultaneously. FIG. 72 is a single-port SRAM 2764 that has been configured to emulate the data bandwidth of the dual-port SRAM of FIG. 71. The single-port SRAM has a depth of N/2 addresses and a data width that is twice the data width of the dual-port SRAM in FIG. 71. Thus, twice as much data may be read or written simultaneously using the single-port SRAM 2764 of FIG. 72 as the dual-port SRAM 2762 of FIG. 71. Therefore, only a single port for both read and write operations may be used to achieve same data bandwidth as the dual-port SRAM of FIG. 71.

In the above embodiment of the present invention, the single-port SRAM used as line buffers is configured to have same bandwidth as the dual-port SRAM. However, this technique of saving chip area may have broad applications to other memory devices such as synchronous dynamic random access memory (SDRAM) and flash memory devices. In addition, this technique may be used to save chip areas for other circuit components such as FIFOs and frame buffers.

Figure 73:
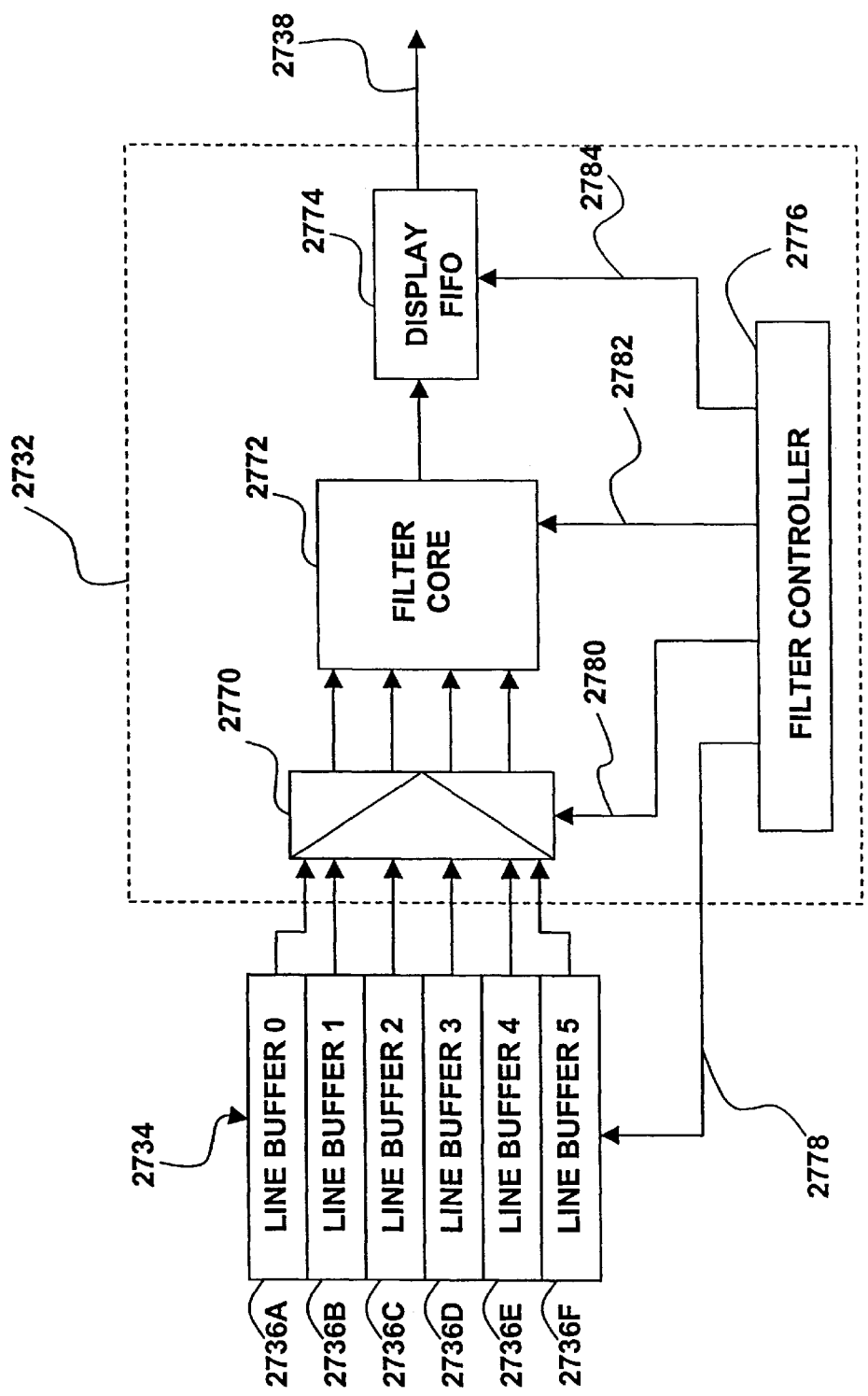
FIG. 73 is a block diagram of a graphics filter coupled to graphics line buffers.

FIG. 73 is a block diagram of a graphics filter 2732 in one embodiment of the present invention coupled to the buffer 2734 comprised of graphics line buffers 0–5 2736A–F. The graphics filter 2732 is comprised of three modules: a graphics filter controller 2776, a graphics filter core 2772 and a display FIFO 2774.

The graphics filter 2732 preferably is used to perform aspect ratio conversion as well as to correct "flickers" on the vertical dimension. Thus the graphics filter 2732 is a single filter that serves dual roles. In one embodiment of the present invention, only vertical filtering is performed. In other embodiments, both vertical and horizontal filtering may be performed.

A high definition (HD) display typically has much finer vertical resolution than a standard definition (SD) display. In addition, the HD display is square-pixel based. Thus, in the described embodiment, the graphics filter 2732 preferably is used during the SD mode and preferably is bypassed in the HD mode.

In other embodiments, graphics filters may filter the blended graphics in HD mode as well as in SD mode. For example, the graphics filter 2732 may be used for format conversion of graphics between HDTV-compatible format and SDTV-compatible format. For another example, the graphics filter 2732 may be used for format conversion of graphics between one HDTV-compatible format and another HDTV-compatible format. In one specific example in HD mode, the graphics format may be converted between a format compatible with HDTV 720p format and another format compatible with HDTV 1080i format.

The filter core 2772 preferably is a 4-tap polyphase (FIR) filter. Design and application of polyphase filters are well known in the art.

In NTSC mode, which is one of the SD modes supported, scaling-down with a scale factor of 720/640 is typically performed to convert square-pixel graphics to NTSC pixel aspect ratio. For PAL mode, which is another SD mode supported, a scaling-up of the same scale factor is generally performed.

The graphics filter 2732 preferably also supports frame-based or field-based modes. Frame-based mode typically assumes that filtering has been performed on the frame picture to achieve highest possible filter quality even though the output may be field-based. During field-based mode, on the other hand, field-based pictures are used for both input and output. A frame-based filtering consumes twice as much of input data bandwidth as compared to field-based flittering.

As discussed earlier in reference to graphics line buffers, the graphics line buffers preferably are implemented using a staggered read/write by folding the RAMs and rescheduling read and write operations. Both read and write port resets are generated in the graphics filter controller as indicated by output 2778 of the graphics filter controller. For SD mode, reset preferably occurs at beginning of a display line and for HD mode, the reset preferably occurs at field start. In the case of HD or filter bypass modes, the second stage is skipped and filter is bypassed.

The filter operation may be expressed in a weighted sum of four consecutive graphics lines as follows:

$$\text{Output} = \sum_{n=1}^{4} W_n \times \text{Line}_n$$

$W_n$ is the weight to be given to $\text{Line}_n$ during summation. The filter core 372 preferably performs the filter operation described above.

Figure 74:
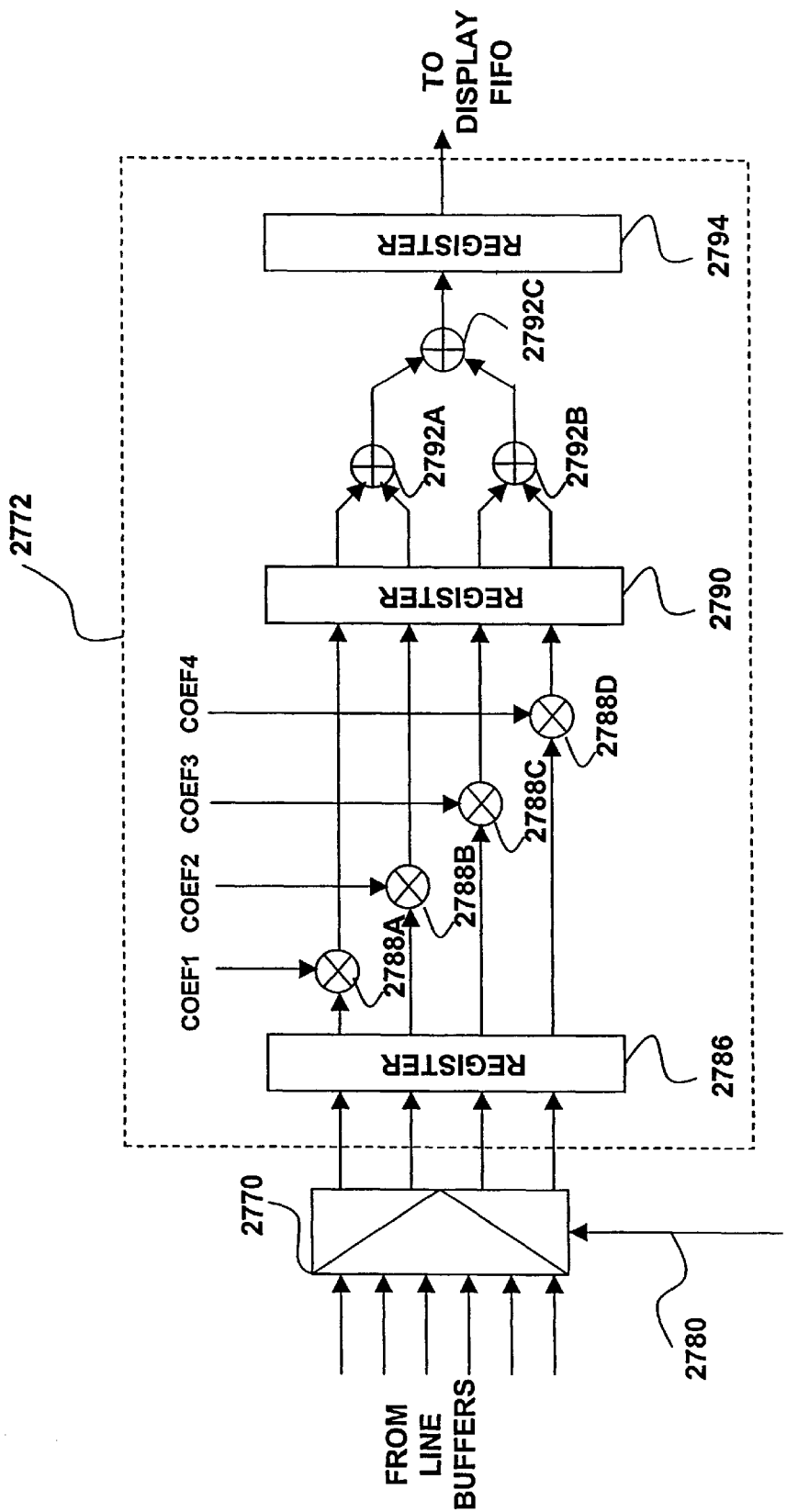
FIG. 74 is a block diagram of a filter core in the graphics filter.

FIG. 74 is a block diagram of the filter core 2772 coupled to the demultiplexer 2770. The ld_dat_sel signal 2780 preferably is used to demultiplex the six line buffers to four input lines for the filter core 2772.

The graphics data preferably is first loaded in a register 2786. Coming out of the register 2786, the graphics data is multiplied with filter coefficients COEF1–4 by multipliers 2788A–D, respectively. The results of the multiplications are stored in a register 2790. Coming out of the register, the graphics data in first and second pipelines are summed together in a first adder 2792A. Similarly, the graphics data in third and fourth pipelines are summed together in a second adder 2792B. The outputs of the first and second adders are summed together in a third adder 2792C. The output of the third adder 2792C is stored in a third register 2794, and then provided to a display FIFO.

Accordingly, the present invention provides a system for HDTV and SDTV applications including capability for displaying video and graphics. The system includes MPEG Transport and decode capabilities for video and audio.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

What is claimed is:

1. A system comprising:
   an input for receiving compressed video data;
   an input for receiving data representing graphics;
   a video decoder for processing the compressed video data to generate a video for displaying;
   a display engine for processing the data representing graphics to generate graphics for displaying; and
   means for overlaying the video and the graphics to generate an output video,
   wherein the display engine includes a plurality of line buffers that are used during conversion of a graphics format from a first format to a second format which is compatible with a video format, wherein the line buffers are implemented in a single-port RAM configured to simulate a dual-port RAM,
   wherein the single-port RAM has been configured to be twice as wide and half as deep, and wherein two words are concurrently read in a read operation during a first memory access cycle, and two words are concurrently written in a write operation during a second memory access cycle, and
   wherein the read operation during the first memory access cycle and the write operation during the second memory access cycle immediately following the first memory access cycle can be performed on a same one of the line buffers or different ones of the line buffers.

2. The system of claim 1 wherein the single-port RAM is comprised of a single-port SRAM.

3. The system of claim 1 wherein the input for receiving compressed video data, the input for receiving data representing graphics, the video decoder, the display engine and the means for overlaying the video and the graphics are integrated on an integrated circuit chip.

4. The system of claim 1 further comprising one or more local registers coupled to the single-port RAM, and the one or more local registers hold at least two words to be used during the write operation.

5. The system of claim 1 wherein the write operation waits until a next memory access cycle when both the read operation and the write operation are asked to be performed in a current memory access cycle.

6. The system of claim 1 wherein the display engine further includes a graphics filter for converting format from the first format to the second format.

7. The system of claim 6 wherein the graphics filter is used to convert the graphics format from an HDTV-compatible format to an SDTV-compatible format.

8. The system of claim 6 wherein the graphics filter is used to convert the graphics format from a first HDTV-compatible format to a second HDTV-compatible format.

9. The system of claim 8 wherein the first HDTV format is compatible with an HDTV 720p format, and the second HDTV format is compatible with an HDTV 1080i format.

10. The system of claim 1 wherein the compressed video data include MPEG-2 video data included in one or more MPEG-2 Transport streams.

11. The system of claim 1 wherein the video decoder is an MPEG-2 video decoder.

12. The system of claim 1 wherein the video for displaying includes an HDTV video.

13. The system of claim 1 wherein the video for displaying includes an SDTV video.

14. A method of processing video and graphics comprising the steps of:
   receiving compressed video data;
   receiving data representing graphics;
   processing the compressed video data to generate a video for displaying;
   processing the data representing graphics to generate graphics for displaying;
   overlaying the video and the graphics to generate an output video;
   converting a graphics format to a format compatible with a video format using a plurality of line buffers that are implemented on a single-port RAM configured to simulate a dual-port RAM,
   wherein converting the graphics format comprises concurrently reading two words in a read operation during a first memory access cycle and concurrently writing two words in a write operation during a second memory access cycle, and
   wherein the read operation during the first memory access cycle and the write operation during the second memory access cycle immediately following the first memory access cycle can be performed on a same one of the line buffers or different ones of the line buffers.

15. The method of claim 14 wherein the step of converting the graphics format further comprises the step of holding at least two words in one or more local registers coupled to the single-port RAM, to be used during the write operation.

16. The method of claim 14 wherein the step of converting the graphics format further comprises the step of postponing the write operation until a next memory access cycle when both the read operation and the write operation are asked to be performed in a current memory access cycle.

17. The method of claim 14 wherein the step of converting the graphics format comprises the step of converting the graphics format from an HDTV-compatible format to an SDTV-compatible format.

18. The method of claim 14 wherein the step of converting the graphics format comprises the step of converting the graphics format from a first HDTV-compatible format to a second HDTV-compatible format.

19. The method of claim 18 wherein the step of converting the graphics format from a first HDTV-compatible format to a second HDTV-compatible format comprises the step of converting the graphics format from an HDTV 720p format to an HDTV 1080i format.

20. The method of claim 18 wherein the step of receiving compressed video data comprises the step of receiving one or more MPEG-2 Transport streams including MPEG-2 video data.

21. The method of claim 20 wherein the step of processing the compressed video data comprises the step of decoding the MPEG-2 video data.

22. A memory access system comprising:

an input for receiving first data;

an output for providing second data;

a plurality of line buffers implemented on a single-port RAM configured to simulate a dual-port RAM; and one or more registers to store at least two words of the first data to be used during a write operation, wherein two words of the second data are read concurrently from the line buffers in a read operation during a first memory access cycle, and two words of the first data are written concurrently to the line buffers in the write operation during a second memory access cycle, and wherein the read operation during the first memory access cycle and the write operation during the second memory access cycle immediately following the first memory access cycle can be performed on a same one of the line buffers or different ones of the line buffers.

23. The memory access system of claim 22 wherein the first data written into the line buffers are provided as the second data read from the line buffers.

24. The memory access system of claim 22 wherein the read operation has higher priority over the write operation.

25. The memory access system of claim 22 wherein the read operation is performed on even addresses.

26. The memory access system of claim 22 wherein the input and the output, respectively, include an input port and an output port, and wherein the input port and the output port are periodically reset.

* * * * *